United States Patent
Watanabe et al.

(10) Patent No.: US 8,164,594 B2
(45) Date of Patent: Apr. 24, 2012

(54) IMAGE PROCESSING DEVICE, IMAGE PROCESSING METHOD, PROGRAM, STORAGE MEDIUM AND INTEGRATED CIRCUIT

(75) Inventors: Tatsumi Watanabe, Osaka (JP); Shuichi Ojima, Osaka (JP)

(73) Assignee: Panasonic Corporation, Osaka (JP)

( * ) Notice: Subject to any disclaimer, the term of this patent is extended or adjusted under 35 U.S.C. 154(b) by 1091 days.

(21) Appl. No.: 11/802,503

(22) Filed: May 23, 2007

(65) Prior Publication Data

US 2007/0273686 A1 Nov. 29, 2007

(30) Foreign Application Priority Data

May 23, 2006 (JP) .................................. 2006-142491

(51) Int. Cl.
*G06T 15/50* (2011.01)
(52) U.S. Cl. ........ 345/426; 345/427; 345/428; 345/581; 345/584; 382/274
(58) Field of Classification Search .................. None
See application file for complete search history.

(56) References Cited

U.S. PATENT DOCUMENTS 6,888,544 B2 * 5/2005 Malzbender et al. ......... 345/423
7,064,753 B2 * 6/2006 Ohba et al. .................. 345/419
7,692,662 B2 * 4/2010 Ohba ........................... 345/584
2003/0108251 A1 6/2003 Kim et al.

FOREIGN PATENT DOCUMENTS

| JP | 2003-196639 | 7/2003 |
|----|-------------|--------|
| JP | 2005-157584 | 6/2005 |

* cited by examiner

*Primary Examiner* — Antonio A Caschera
(74) *Attorney, Agent, or Firm* — Wenderoth, Lind & Ponack, L.L.P.

(57) ABSTRACT

It is an object to easily, and using existing devices, perform shadow enhancement that achieves an increase in the feeling of depth of 2D video. The input image data are first converted into brightness information by a brightness information calculation portion. Then, based on that brightness information, the normal direction and the edge information in the pixel targeted for processing are estimated by a normal direction estimation portion. A corrected gradation derivation portion then performs correction processing such as the addition of shadow component on the input image based on the brightness information and the estimated normal direction and edge information to create a processed image that has a feeling of depth, and then an output portion converts this to a predetermined image format and outputs it. In this way, it is possible to easily increase the feeling of depth of a 2D image through the addition of shadow, for example, in accordance with the characteristics of the input image.

35 Claims, 86 Drawing Sheets

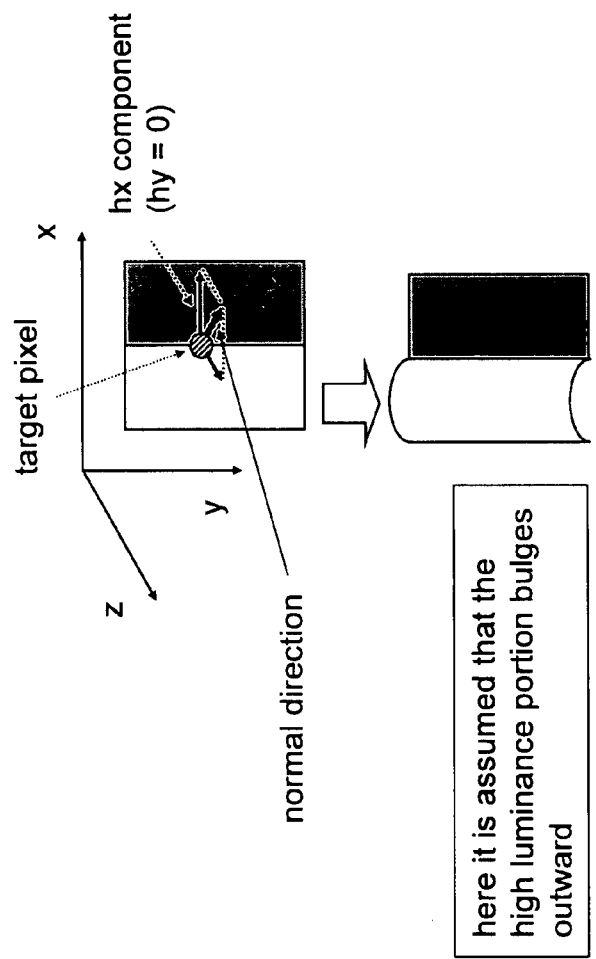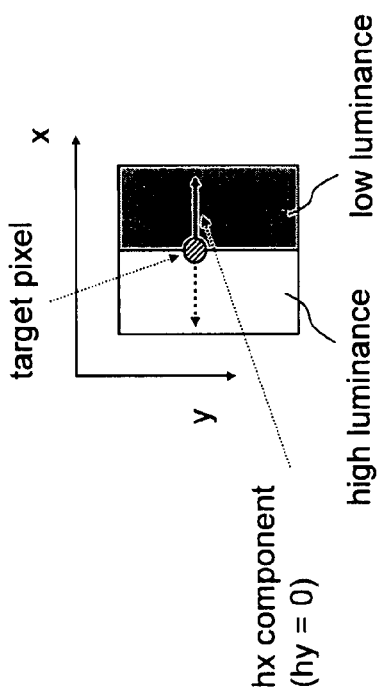
Fig. 10

Ko = Koa + Kob + Koc

- Ko ← brightness at a given point
- Koa ← diffuse reflection component
- Kob ← mirror reflection component
- Koc ← ambient light component

*Fig. 12*

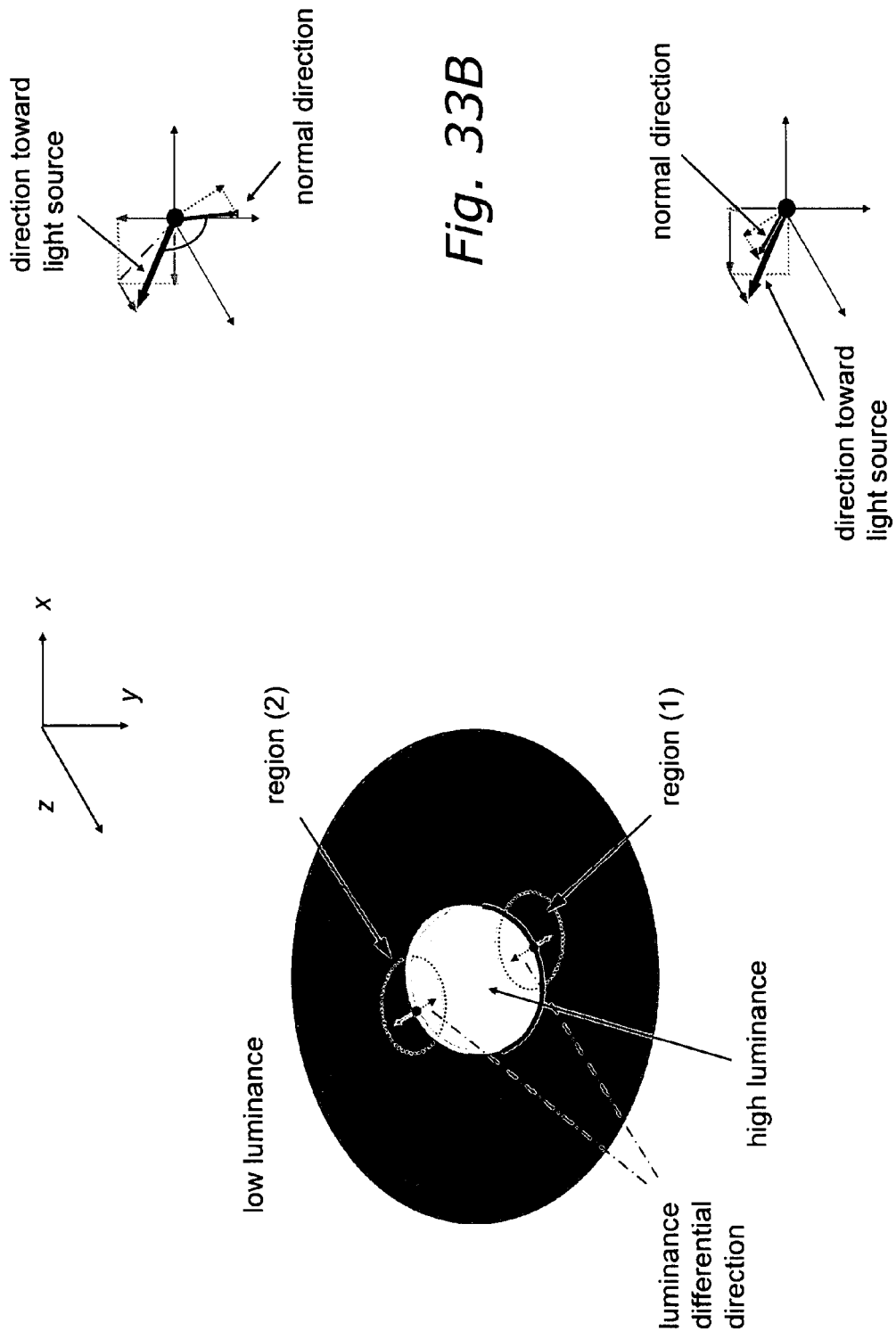

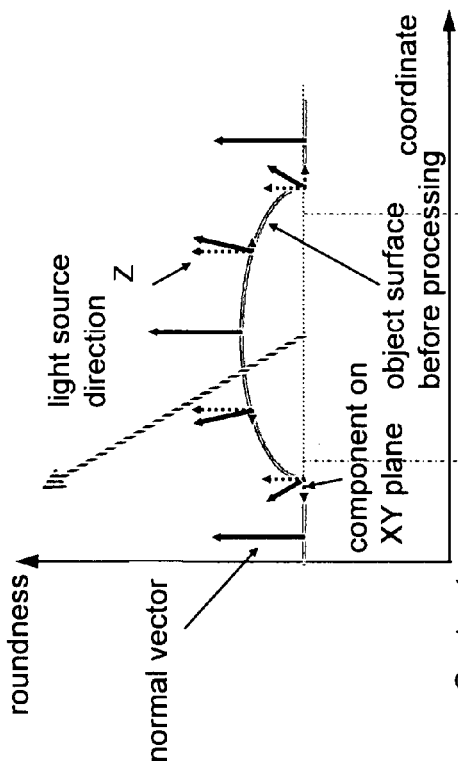
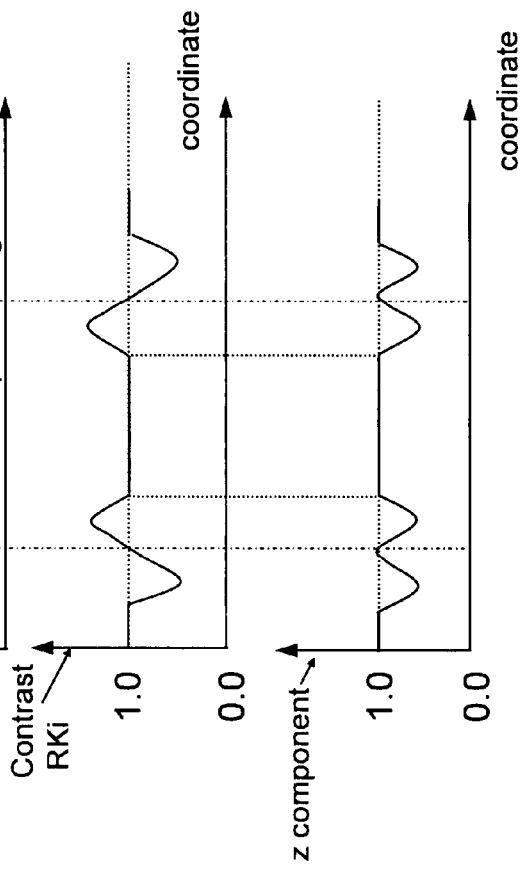
Fig. 42A
Fig. 42B
Fig. 42C visual depth information $$Z \approx Z^d = K(x,y) \cdot (1 + \boxed{gK(RK(x,y))} = G_k(\underbrace{K(x,y)}_{\text{brightness}}, \underbrace{AK(x,y)}_{\text{surrounding brightness average}}))$$

contrast effect $$dz = \frac{\partial G_k}{\partial K} \cdot dK + \frac{\partial G_k}{\partial (AK)} \cdot d(AK)$$

$$dz = (\frac{\partial G_k}{\partial K} \cdot \frac{\partial K}{\partial x} + \frac{\partial G_k}{\partial (AK)} \cdot \boxed{\frac{\partial (AK)}{\partial x}}) \cdot dx$$

$$+ (\frac{\partial G_k}{\partial K} \cdot \frac{\partial K}{\partial y} + \frac{\partial G_k}{\partial (AK)} \cdot \boxed{\frac{\partial (AK)}{\partial y}}) \cdot dy$$

regard as 0
AK(x,y) is brightness average of wide surrounding region

X component of normal vH × (-1)

Y component of normal vH × (-1)

normal vH at
(dx,dy,dz) =(-dGk/dK × (∂K/∂x), -dGk/dK × (∂K/∂y), 1)

X direction change dKx in brightness      Y direction change dKy in brightness

*Fig. 45* visual depth information brightness contrast effect    color contrast effect $$Z \approx Z^d = \alpha \cdot K(x,y) \cdot (1 + gK(RK(x,y)) + \beta \cdot K(x,y) \cdot (1 + gV(RV(x,y)))$$

brightness   surrounding brightness average   surrounding saturation average $$= G_t(K(x,y), AK(x,y), AV(x,y))$$

$$dz = \frac{\partial G_t}{\partial K} \cdot dK + \frac{\partial G_t}{\partial (AK)} \cdot d(AK) + \frac{\partial G_t}{\partial (AV)} \cdot d(AV)$$

$$dz = (\frac{\partial G_t}{\partial K} \cdot \frac{\partial K}{\partial x} + \boxed{\frac{\partial G_t}{\partial (AK)} \cdot \frac{\partial (AK)}{\partial x}}^{0} + \boxed{\frac{\partial G_t}{\partial (AV)} \cdot \frac{\partial (AV)}{\partial x}}^{0}) \cdot dx$$

$$+ (\frac{\partial G_t}{\partial K} \cdot \frac{\partial K}{\partial y} + \boxed{\frac{\partial G_t}{\partial (AK)} \cdot \frac{\partial (AK)}{\partial y}}^{0} + \boxed{\frac{\partial G_t}{\partial (AV)} \cdot \frac{\partial (AV)}{\partial y}}^{0}) \cdot dy$$

normal vH at
(dx,dy,dz) =(-dGt/dK×(∂K/∂x), -dGt/dK×(∂K/∂y,))

X direction change dKx in brightness    Y direction change dKy in brightness

*Fig. 53*

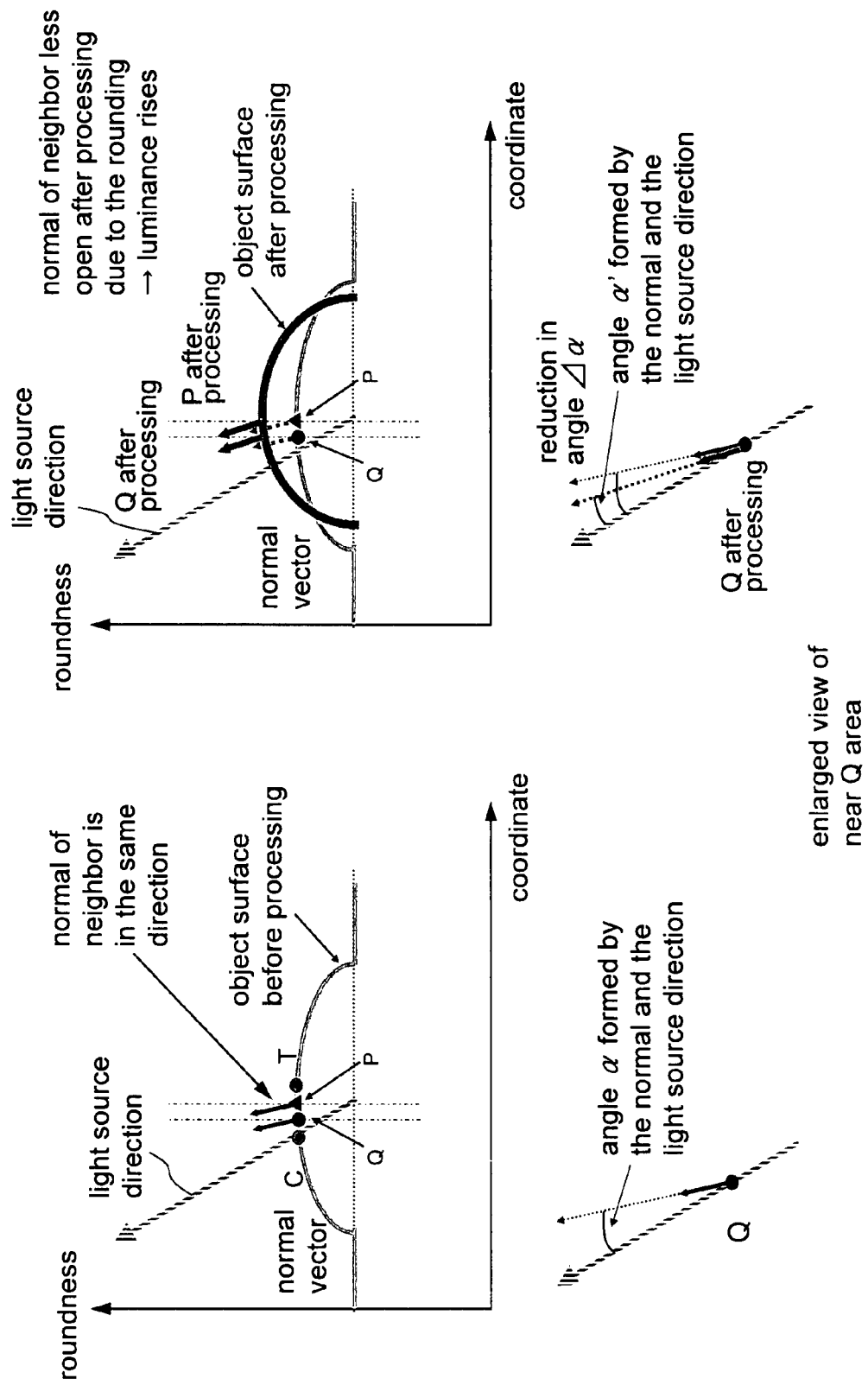

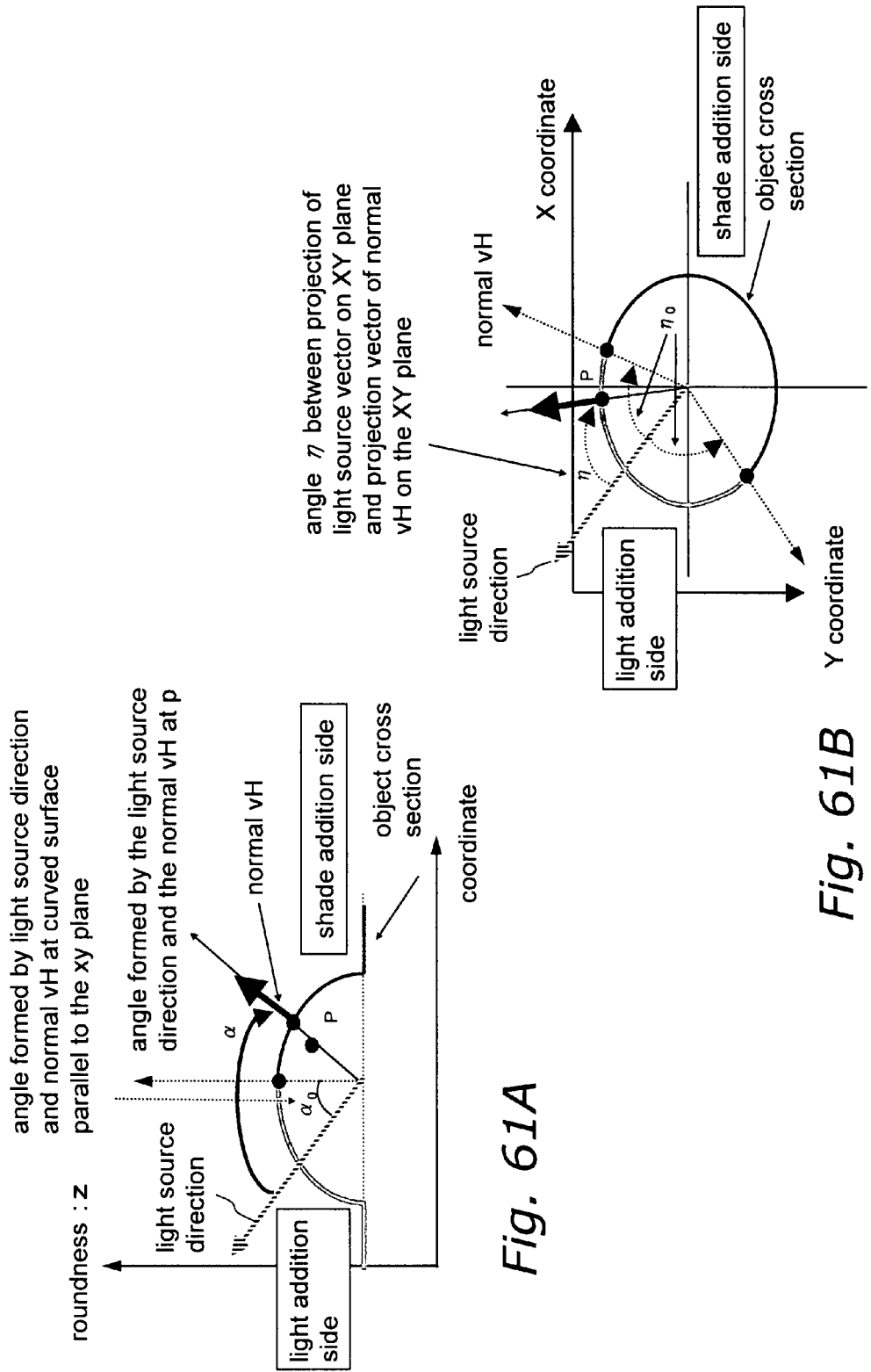

$$Ko = Koa + Kob + Koc$$

- $Ko$: brightness at a given point
- $Koa$: diffuse reflection component
- $Koc$: ambient light component
- $Kob$: mirror reflection component $$\Delta K_o(x,y) = dK_o/d\alpha_o \times \Delta\alpha_o = (dK_{oa}/d\alpha_o + dK_{ob}/d\alpha_o + dK_{oc}/d\alpha_o) \times \Delta\alpha_o$$

- $\Delta K_o(x,y)$: brightness modulation of the given point
- $dK_{oa}/d\alpha_o$: amount of change in the diffuse reflection component with respect to the angle $\alpha_0$
- $dK_{ob}/d\alpha_o$: amount of change in the mirror reflection component with respect to the angle $\alpha_0$
- $dK_{oc}/d\alpha_o$: amount of change in the ambient light component with respect to the angle $\alpha_0$
- $\Delta\alpha_o$: amount of angle modulation with respect to angle $\alpha_0$

Fig. 63

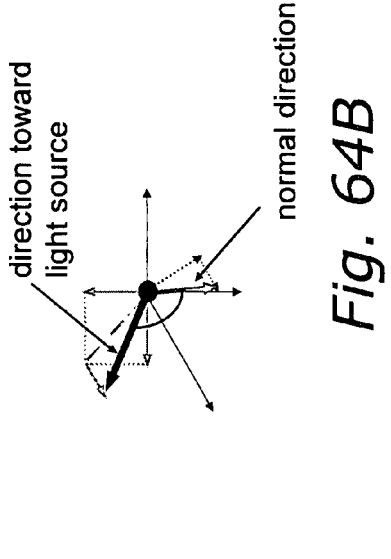
Fig. 64B
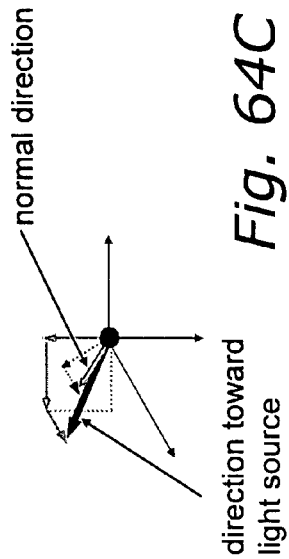
Fig. 64C
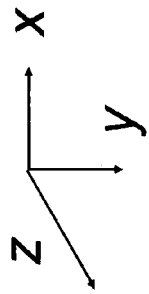
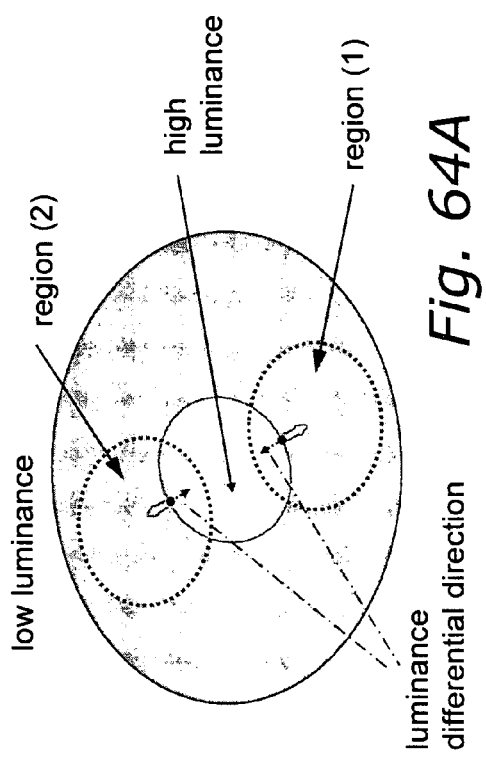
Fig. 64A
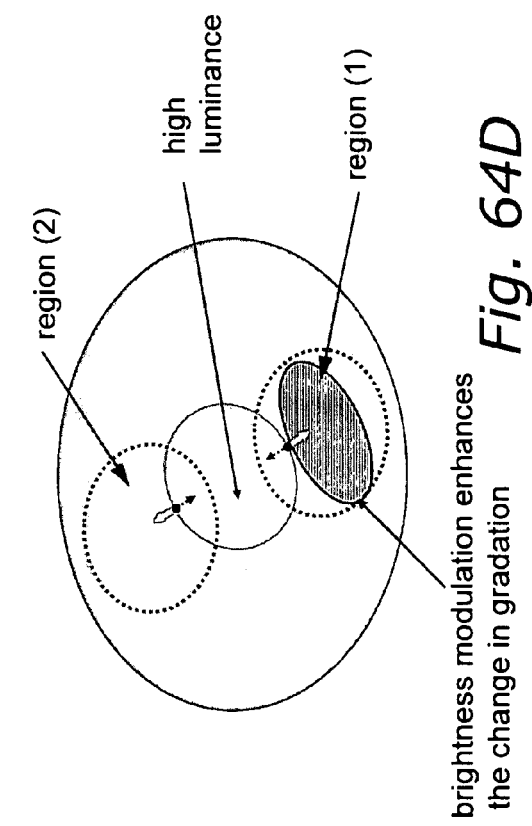
Fig. 64D

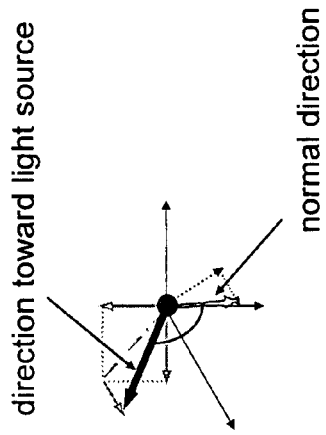
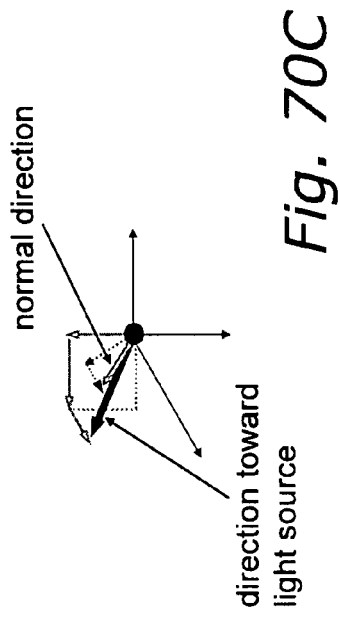
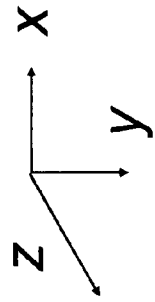
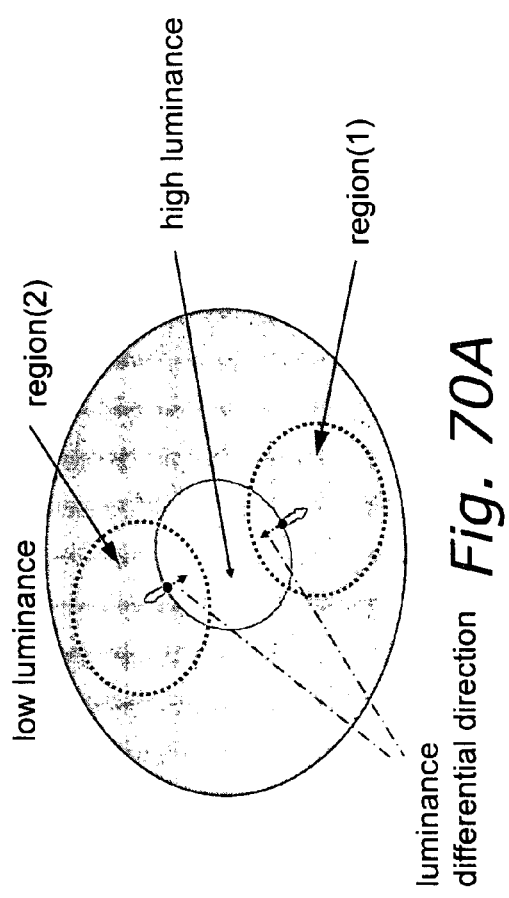
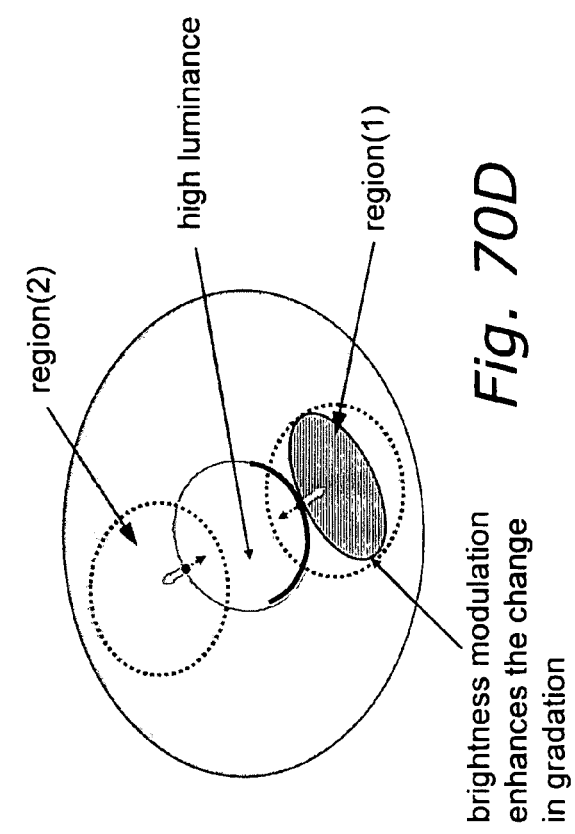
Fig. 70A
Fig. 70B
Fig. 70C
Fig. 70D

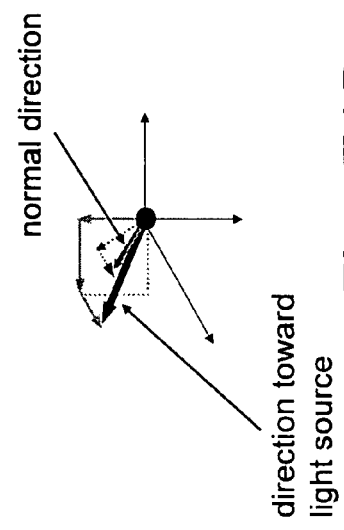
Fig. 71B
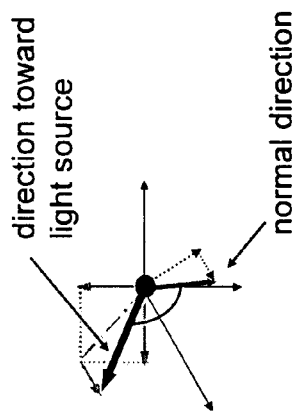
Fig. 71C
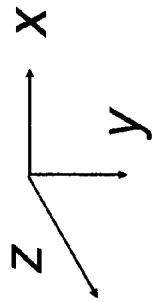
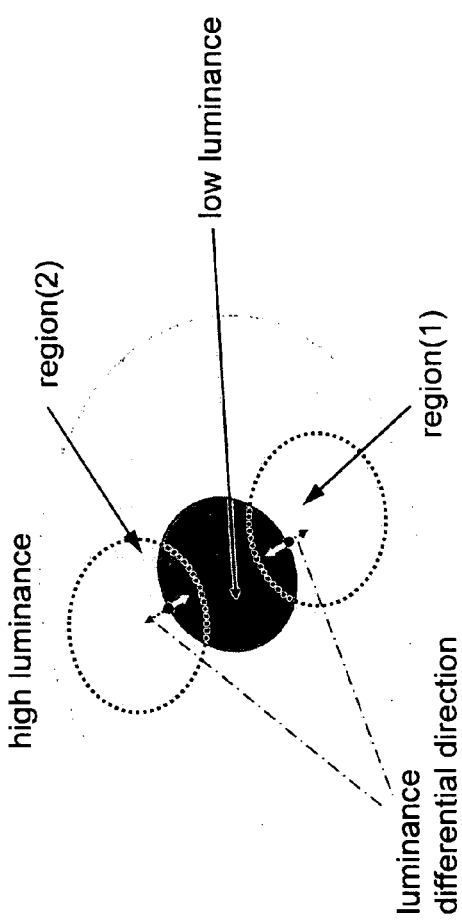
Fig. 71A
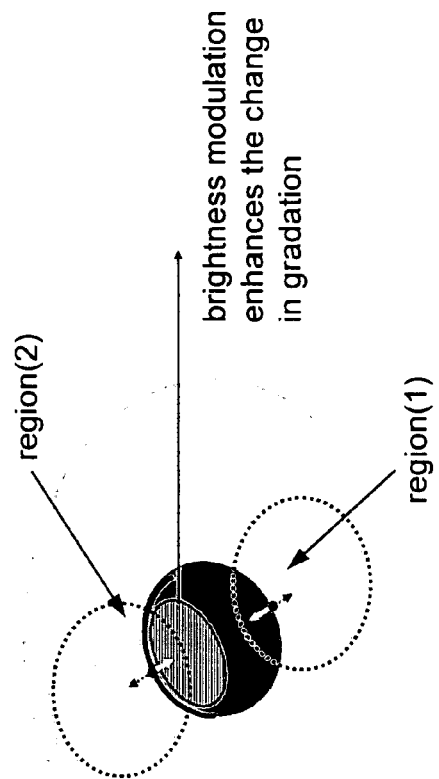
Fig. 71D

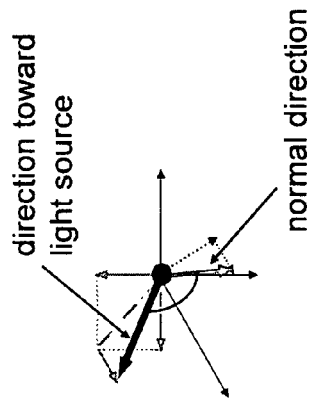
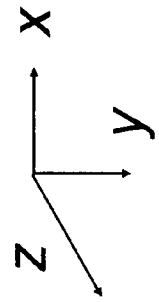
Fig. 74B
Fig. 74C
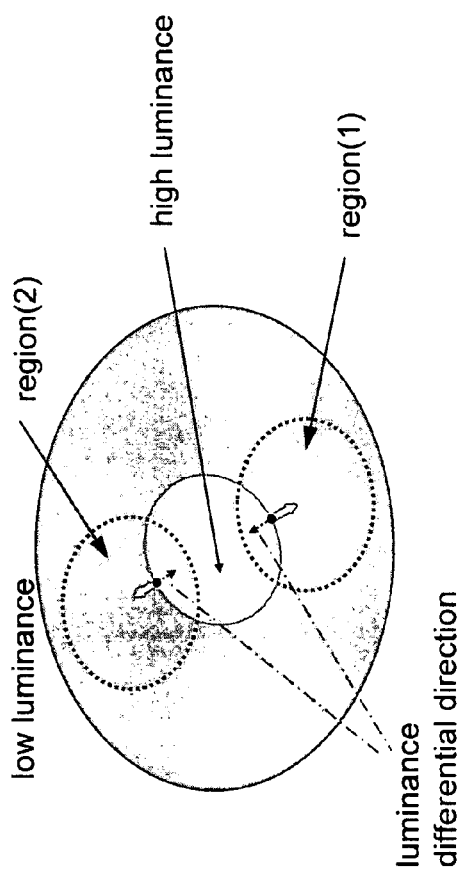
Fig. 74A
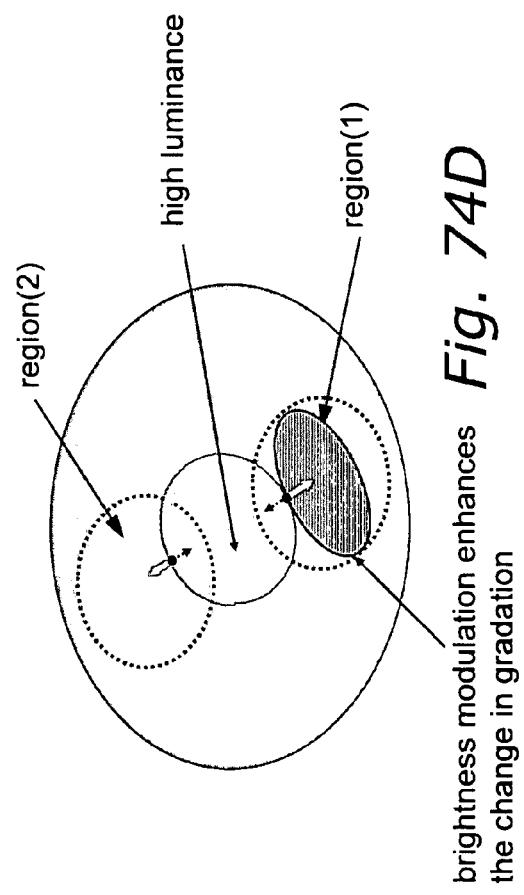
Fig. 74D

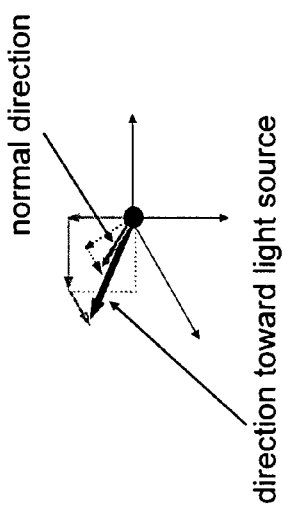
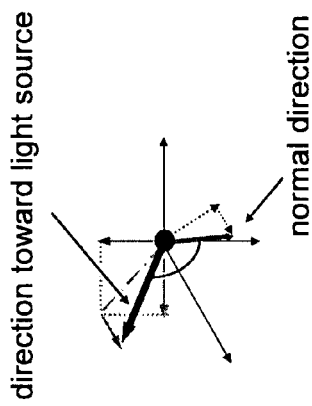
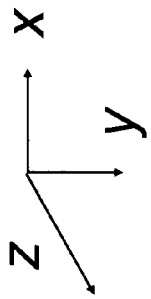
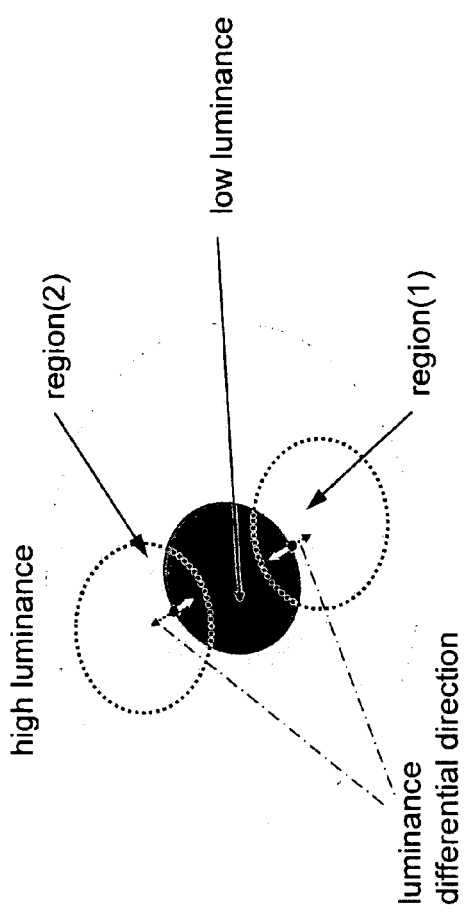
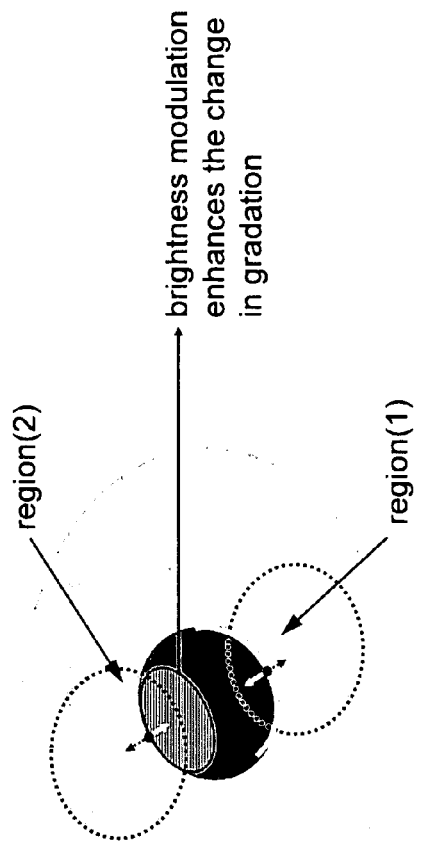

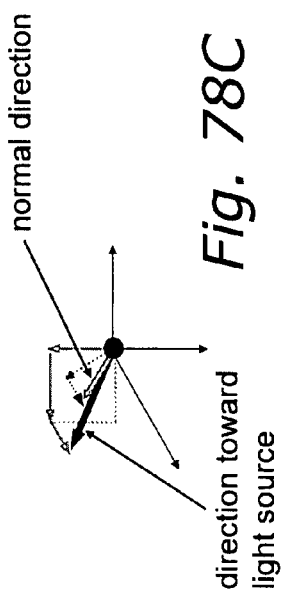
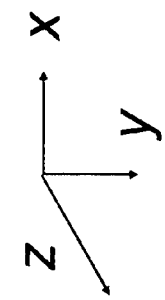
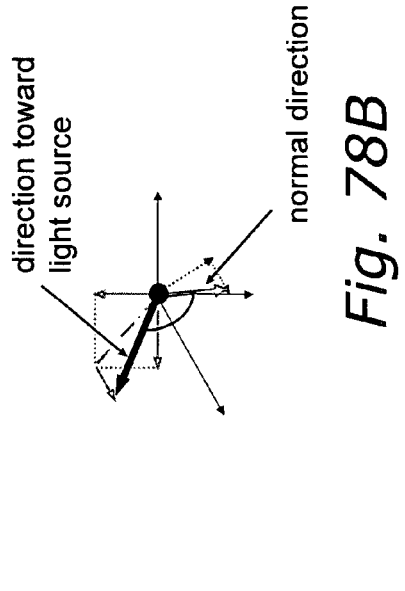
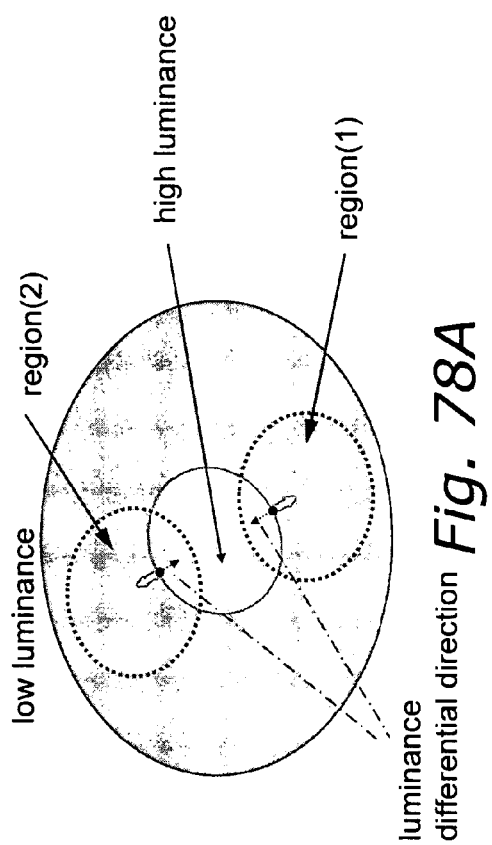
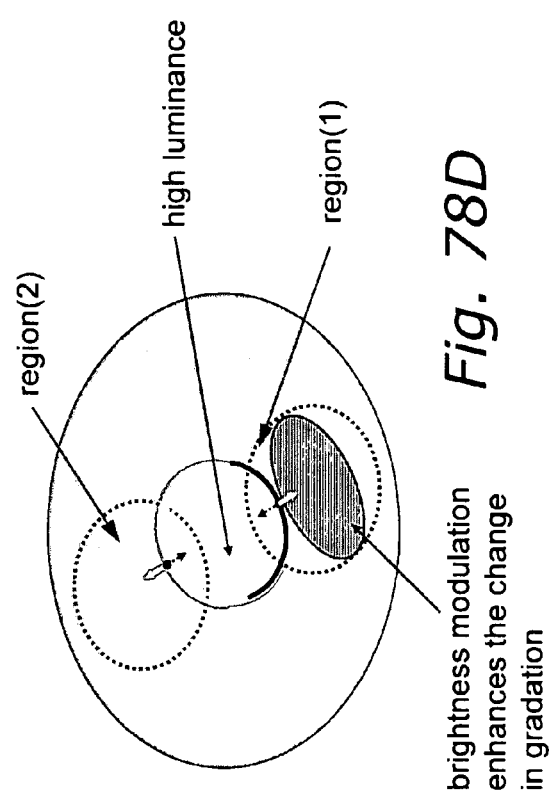

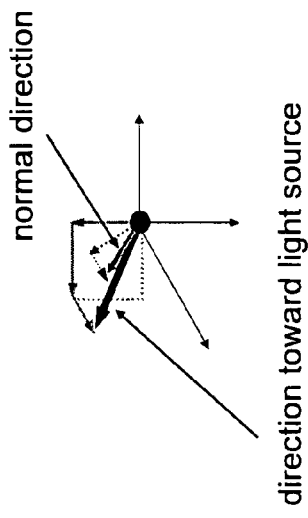
Fig. 79B
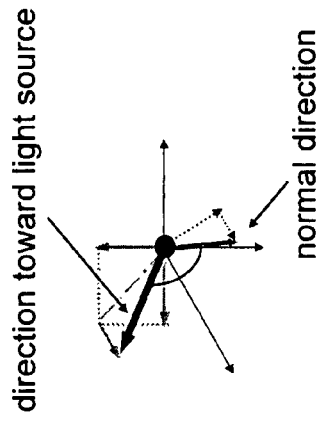
Fig. 79C
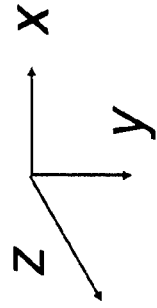
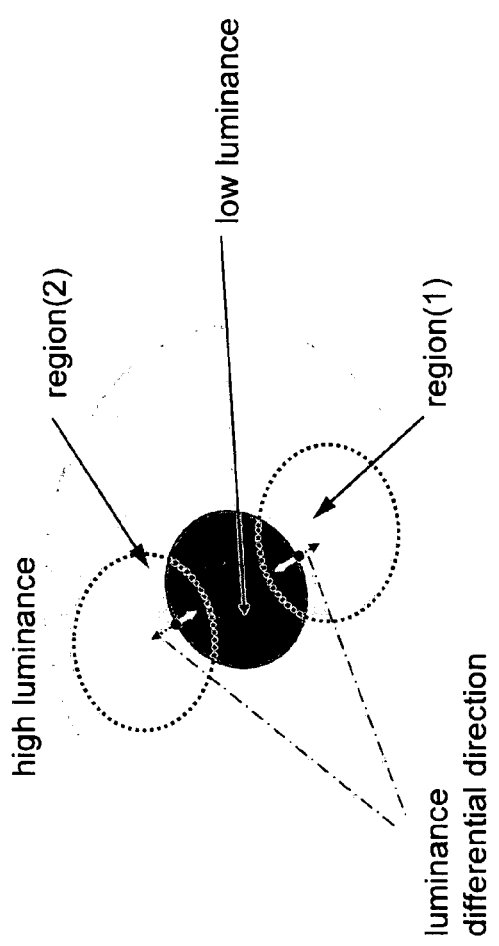
Fig. 79A
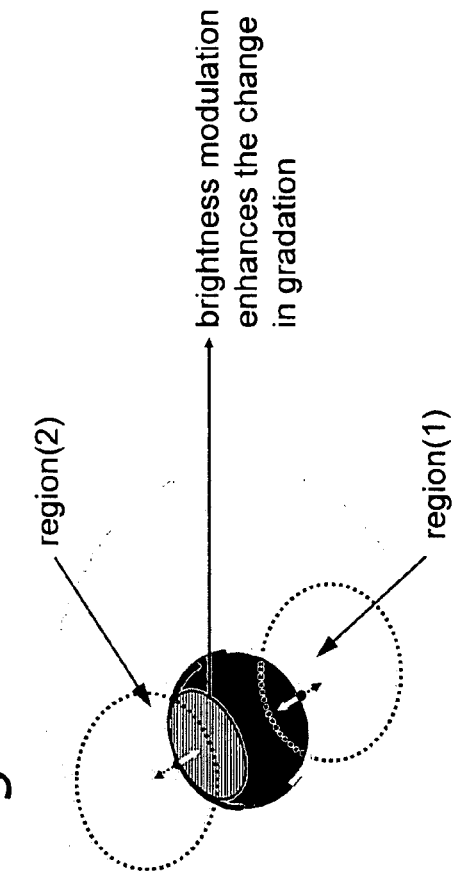
Fig. 79D

IMAGE PROCESSING DEVICE, IMAGE PROCESSING METHOD, PROGRAM, STORAGE MEDIUM AND INTEGRATED CIRCUIT

BACKGROUND OF THE INVENTION

1. Field of the Invention

The present invention relates to image processing devices, image processing methods, programs, storage media, and integrated circuits for enhancing the feeling of depth and the sense of three dimensions of an image by adding shadow or light to a two-dimensional image.

2. Description of the Related Art

There has been a strong call by users for technology that increases the "feeling of depth" and the "sense of three dimensions" of displayed video in order to display more natural video on the screen of a large screen FPD (flat panel display) device, for example. In response, three-dimensional televisions and the like that utilize the binocular parallax of humans have been proposed, but it has been pointed out that special dedicated glasses are often required, that there is a large degree of dependence on the image, and that the special devices that are required increase costs. At the present time, one of the selling points of large screen display devices is their technology of achieving a three-dimensional effect in the displayed image (video) by smoothing the gradation characteristics or the color characteristics in the display image.

It is clear that humans utilize not only binocular parallax but also monocular information such as color information, saturation, brightness, contrast (color information contrast and brightness information contrast), shadows, gradient of texture, and relative size, in order to perceive depth and three dimensions in two-dimensional images.

One conventional technology that utilizes such monocular information is the technology of creating a three-dimensional image by detecting the lighting direction and then adding to the input image a filtered image (shading image) that corresponds to the lighting direction that has been detected (for example, see JP 2003-196639A).

FIG. 85 is a block diagram that shows the configuration of this conventional image processing device (three-dimensional device) 9000.

First, when an input image (input image signal) is input to a creation portion 5001 of the image processing device 9000, a plurality of filters with a filter coefficient that have been readied in order to detect a lighting direction are applied to the input image signal to create filtered images (shading images). The image processing device 9000 determines that the light (lighting) is coming from a filter direction that corresponds to the filter coefficient with the smallest average difference between the pixel value of the filter processed image and that of the input image. In the image quality improvement portion 5002, the filtered image that corresponds to the lighting direction that has been determined is subjected to noise removal processing (processing by a noise removal portion 5003) and dispersal processing in all four directions (in the image) (processing by a shake portion 5004). Next, the gain rate that is obtained by a gain adjustment portion 5005 is multiplied with the filtered image, and the output that is obtained from this multiplication is added to the input image by an adding portion 5006. The output of the adding portion 5006 is processed by a mapping portion 5007 and output from the image processing device 9000. The image processing device 9000 outputs the image obtained in this manner, creating a three-dimensional image. It should be noted that in the image processing device 9000, filters for extracting borders in a plurality of directions have been readied as the filters that correspond to the various lighting directions. Further, it is possible to add three dimensionalness by diffusing the value of the filtered image in all directions (on the image). It should be noted that in the image processing device 9000 it is expected that the detection processing is performed under the assumption that the light (lighting) is coming from a single direction, and thus the coefficients of the filters that correspond to these directions are prepared in advance.

In the above conventional technology, it is necessary to detect the light direction in the image, and the precision of that detection has a large impact. Further, because it is presumed that light is coming from only one direction, the conventional technology cannot be suitably adopted when there are a plurality of lights, which is often the case in natural images. In other words, with the conventional technology, not only is it not possible to detect a plurality of lighting directions (the lighting directions due to a plurality of lights (light sources)), there is also a risk that the precision with which the light is detected will significantly worsen if the lighting direction partially changes. Thus, with the conventional technology there is a high degree of dependence on the image, and particularly in natural images, it is often the case that a suitable effect cannot be attained. There are other issues as well, such as the need to prepare lighting detection filters in advance.

The present invention was arrived at in light of these issues with the conventional technology, and it is an object thereof to achieve an image processing device, an image processing method, a program, a storage medium, and an integrated circuit that do not require detection of the lighting direction as in the conventional technology and that by appropriately adding shadow to the image can achieve an increase the feeling of depth and the feeling of three dimensions in a processed image, regardless of the distribution of the lighting in the image (even if there are multiple lights). Another object of the invention is to provide an image processing device, an image processing method, a program, a storage medium, and an integrated circuit that appropriately add light to an image in order to further increase the feeling of depth and the feeling of three dimensions in the processed image.

SUMMARY OF THE INVENTION

A first aspect of the invention is an image processing device that includes a brightness information calculation portion, a normal direction estimation portion, and a corrected gradation derivation portion. The brightness information calculation portion calculates the brightness information of an image signal that is input and that can form a two-dimensional image made from pixels. The normal direction estimation portion estimates a normal direction for each pixel, or each region made of a plurality of pixels, from the brightness information in order to give a feeling of depth to the two-dimensional image that is formed by the image signal, and obtains a normal direction vector that is a three-dimensional vector for each pixel or for each region based on the normal direction that is estimated. The corrected gradation derivation portion finds a correction amount of the brightness information based on the normal direction vector that is obtained by the normal direction estimation portion, and corrects the brightness information of the image signal based on the correction amount of the brightness information.

With this image processing device, the normal direction estimation portion estimates the normal direction for each pixel or each region made of a plurality of pixels based on the brightness information, and obtains a normal direction vector that is a three-dimensional vector for each pixel or for each region based on the normal direction that is estimated. The corrected gradation derivation portion finds a correction amount for the brightness information based on the normal direction vector that is obtained by the normal direction estimation portion, and corrects the brightness information of the image signal based on the correction amount of the brightness information. Consequently, with this image processing device, a three-dimensional normal direction vector is found from a two-dimensional image and this can be used to execute three-dimensional processing, and thus it is possible to effectively increase the feeling of depth and the feeling of three dimensions in the processed image.

A second aspect of the invention is the first aspect of the invention, further including an output portion that outputs the image signal whose brightness information has been corrected by the corrected gradation derivation portion in a predetermined format.

Thus, it is possible to output the image that is processed by the image processing device in a predetermined format and display it on a display device.

Here, "predetermined format" refers to the format relating to the image to be displayed on the display device, and for example, image (video) format types (for example, the JPEG image format, the BMP image format, and the MPEG and NTSC video formats) correspond to this.

A third aspect of the invention is the first aspect of the invention, in which the corrected gradation derivation portion sets at least one virtual light source and determines a light source position of the virtual light source, and corrects the brightness information of the image signal based on the normal direction vector and the positional relationship between the pixel position of the pixel and the light source position.

A fourth aspect of the invention is the first aspect of the invention, in which the corrected gradation derivation portion sets at least one virtual light source and finds a light source direction vector, which is a three-dimensional vector that has a direction toward the virtual light source, for each pixel or for each region, and corrects the brightness information of the image signal based on the normal direction vector and the light source direction vector.

Thus, with this image processing device, it is possible to correct the brightness information of the image signal by setting at least one virtual light source, and thus it is possible to effectively increase the feeling of depth and the feeling of three dimensions in the processed image without requiring the detection of the lighting direction like in the conventional art, and regardless of the distribution of the lighting within the image (such as in the case of multiple lights).

The present invention was arrived at in light of the issues with the conventional technology, and it is an object thereof to provide image processing devices, image processing methods, programs, recording media, and integrated circuits that can effectively increase the feeling of depth and the feeling of three dimensions in the processed image by suitably adding shadow to the image, without requiring the detection of the lighting direction like in the conventional art, and regardless of the distribution of the lighting within the image (such as in the case of multiple lights). It is also an object of the invention to provide image processing devices, image processing methods, programs, recording media, and integrated circuits that can further increase the feeling of depth and the feeling of three dimensions in the processed image by suitably adding light to the image.

A fifth aspect of the invention is the fourth aspect of the invention, in which the corrected gradation derivation portion corrects the brightness information of the image signal by adding shadow to the pixel value of the pixel.

Thus, it is possible to effectively add shadow to the image processed by the image processing device. It should be noted that the "addition of shadow" is processing for reducing the component value that indicates the brightness of the pixel value of a predetermined pixel in the image data in order to increase the feeling of three dimensions (including processing that is equivalent to processing for lowering the luminance).

A sixth aspect of the invention is the fourth aspect of the invention, in which the corrected gradation derivation portion corrects the brightness information of the image signal by adding light to the pixel value of the pixel.

Thus, it is possible to effectively add light to the image processed by the image processing device. It should be noted that the "addition of light" is processing for increasing the component value that indicates the brightness of the pixel value of a predetermined pixel in the image data in order to increase the feeling of three dimensions (including processing that is equivalent to processing for increasing the luminance).

A seventh aspect of the invention is the first aspect of the invention, in which the normal direction estimation portion determines the normal direction vector from the values of the three direction components, these being a first direction component value that is the value of the component of a first direction and a second direction component value that is the value of the component of a second direction, which serve as two-dimensional coordinate information for determining a pixel position of the pixel on the two-dimensional image, and a third direction component value that is a value of a component of a third direction that is not included on a plane that is formed by the two-dimensional image.

Here, the first direction is for example the x-axis direction (x direction) in an XYZ space, the second direction is the y-axis direction (y direction) in an XYZ space, and the third direction is the z-axis direction (z direction) in an XYZ space. It should be noted that the first direction, the second direction, and the third direction are not parallel to one another.

An eighth aspect of the invention is the seventh aspect of the invention, in which the normal direction estimation portion sets the third direction component value to a first value that is a predetermined value, and for a plurality of pixels sets the third direction component value to the same value as the first value and determines the normal direction value for each pixel or for each region.

Thus, it is possible to easily determine the normal direction vector, that is, the three-dimensional vector, from the information of a 2D image. It should be noted that it is also possible to determine the normal direction vector by setting the third direction component value to the same value as the first value in all pixels making up the two-dimensional image.

A ninth aspect of the invention is the seventh aspect of the invention, in which the normal direction estimation portion determines the first direction component value of the normal direction vector based on a differential value for the first direction of the pixel value of the pixel.

Thus, since the value of the first direction component of the normal direction vector for sections with a large change in the first direction becomes large, and the angle formed by the two-dimensional image plane and the three-dimensional curve that is determined by the normal direction vector becomes large, it is possible to effectively add shadow or add light.

It should be noted that here, "differential" is a concept that encompasses derivative, and for example, is inclusive of computation for finding the difference between the pixel value of a pixel of interest and the pixel value of a pixel that is adjacent to the pixel of interest.

Further, the "differential value for the first direction" is for example the differential (derivative) value for the x-axis direction in an XYZ space, that is, the partial derivative for the x component.

A tenth aspect of the invention is the seventh aspect of the invention, in which the normal direction estimation portion determines the second direction component value of the normal direction vector based on a differential value for the second direction of the pixel value of the pixel.

Thus, since the value of the second direction component of the normal direction vector for sections with a large change in the second direction becomes large, and the angle formed by the two-dimensional image plane and the three-dimensional curve that is determined by the normal direction vector becomes large, it is possible to effectively add shadow or add light.

It should be noted that here, the "differential value for the second direction" is for example the differential (derivative) value for the y-axis direction in an XYZ space, that is, the partial derivative for the y component.

An eleventh aspect of the invention is the seventh aspect of the invention, in which the normal direction estimation portion determines the first direction component value of the normal direction vector based on a differential value of the first direction of the pixel value of the pixel, and determines the second direction component value of the normal direction vector based on a differential value of the second direction of the pixel value of the pixel, and the corrected gradation derivation portion finds the correction amount of the brightness information based on the modulated normal direction vector, and corrects the brightness information of the image signal based on the correction amount of the brightness information.

Thus, since the value of the first direction component and the value of the second direction component of the normal direction vector for sections with a large change in the first direction and in the second direction become large, and the angle formed by the two-dimensional image plane and the three-dimensional curve that is determined by the normal direction vector becomes large, it is possible to effectively add shadow or add light.

Here, for example in a case where the first direction component is the x component in an XYZ space and the second direction component is the y component in an XYZ space, it is preferable to use the differential dx of the first direction component and the differential dy of the second direction component and have the normal direction vector be (−dx,−dy,c) (where c is a constant) in a three-dimensional vector display.

A twelfth aspect of the invention is the eleventh aspect of the invention, in which the correction amount of the brightness information changes along with a change in the first direction component value or the second direction component value of the normal direction vector.

A thirteenth aspect of the invention is the first aspect of the invention, in which the normal direction estimation portion obtains a modulated normal direction vector by modulating the normal direction vector, and the corrected gradation derivation portion finds a correction amount of the brightness information based on the modulated normal direction vector and corrects the brightness information of the image signal based on the correction amount of the brightness information.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

A fourteenth aspect of the invention is the seventh aspect of the invention, in which the normal direction estimation portion obtains a modulated normal direction vector by modulating the normal direction vector, and the corrected gradation derivation portion finds a correction amount of the brightness information based on the modulated normal direction vector and corrects the brightness information of the image signal based on the correction amount of the brightness information.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

A fifteenth aspect of the invention is the fourteenth aspect of the invention, in which the normal direction estimation portion obtains the modulated normal direction vector by modulating the normal direction vector based on a differential value for the first direction of the pixel value of the pixel.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

A sixteenth aspect of the invention is the fourteenth aspect of the invention, in which the normal direction estimation portion obtains the modulated normal direction vector by modulating the normal direction vector based on a differential value for the second direction of the pixel value of the pixel.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

A seventeenth aspect of the invention is the fourteenth aspect of the invention, in which the normal direction estimation portion obtains the modulated normal direction vector by modulating the normal direction vector based on a differential value for the first direction and the second direction of the pixel value of the pixel.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

An eighteenth aspect of the invention is the fourteenth aspect of the invention, in which the normal direction estimation portion calculates a brightness contrast amount based on the brightness information of a pixel of interest, which is the pixel that is targeted for processing in the image signal, and the brightness information of pixels surrounding the pixel of interest, obtains the modulated normal direction vector by changing the third direction component value of the normal direction vector based on the brightness contrast amount.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

A nineteenth aspect of the invention is the fourteenth aspect of the invention, in which the normal direction estimation portion calculates a brightness contrast amount based on the brightness information of a pixel of interest, which is the pixel that is targeted for processing in the image signal, and the brightness information of the pixels surrounding the pixel of interest, calculates a first visual depth amount that indicates a degree of perception of visual depth based on the brightness contrast amount, and obtains the modulated normal direction vector by changing the first direction component value and the second direction component value of the normal direction vector based on the first visual depth amount.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

With this image processing device, the visual depth amount (first visual depth amount) is defined taking into consideration the effect of the sense of brightness due to the brightness contrast, which is one visual effect, and the normal direction is found from that visual depth amount. By doing this, it is possible to achieve normal estimation that has been corrected in accordance with the visual psychology that an object is perceived brighter and closer to the user the higher the brightness and the greater the brightness contrast effect.

A twentieth aspect of the invention is the fourteenth aspect of the invention, in which the normal direction estimation portion calculates a color contrast amount based on color information of a pixel of interest, which is the pixel that is targeted for processing in the image signal, and the color information of pixels surrounding the pixel of interest, calculates a second visual depth amount that indicates a degree of perception of visual depth based on the color contrast amount, and obtains the modulated normal direction vector by changing the first direction component value and the second direction component value of the normal direction vector based on the second visual depth amount.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector, and thus it is possible to effectively add shadow or add light.

It has been pointed out that in terms of visual psychology, we feel that an object projects forward (is closer in the direction toward the user viewing the image) the greater its vividness. Thus, with this image processing device, the visual depth amount (second visual depth amount) is defined taking into consideration the effect due to the color contrast on a depth amount that is defined by a function of only the luminance of the target section, and the normal direction is found from that visual depth amount. By doing this, it is possible to achieve normal estimation that has been corrected in accordance with the visual psychology that an object is perceived brighter and more vivid, and also closer to the user, the greater the brightness and the color contrast effect.

A 21st aspect of the invention is the fourteenth aspect of the invention, in which the normal direction estimation portion calculates a brightness contrast amount based on the brightness information of a pixel of interest, which is the pixel that is targeted for processing in the image signal, and the brightness information of pixels surrounding the pixel of interest, and calculates a first visual depth amount that indicates a degree of perception of visual depth based on the brightness contrast amount, calculates a color contrast amount based on color information of a pixel of interest, which is the pixel that is targeted for processing in the image signal, and the color information of pixels surrounding the pixel of interest, and calculates a second visual depth amount that indicates a degree of perception of visual depth based on the color contrast amount, and obtains the modulated normal direction vector by changing the first direction component value and the second direction component value of the normal direction vector based on the first visual depth amount and the second visual depth amount.

A 22nd aspect of the invention is the fourth aspect of the invention, in which the normal direction estimation portion obtains a modulated normal direction vector by modulating the normal direction vector, and the corrected gradation derivation portion finds a correction amount of the brightness information based on the modulated normal direction vector and the light source direction vector, and corrects the brightness information of the image signal based on the correction amount of the brightness information.

Thus, even if the angle formed by the two-dimensional image plane and the three-dimensional curve that is determined by the normal direction vector is small, it is possible to increase the angle formed by the two-dimensional image plane and the three-dimensional curve that is determined by the modulated normal direction vector. Further, it is also possible to suitably determine whether to add shadow or to add light based on the positional relationship between the light source direction vector and the three-dimensional curve determined by the modulated normal direction vector, and thus it is possible to effectively add shadow or add light in the image processed by the image processing device.

In particular, with this image processing device, it is possible to effectively add shadow or add light (and in particular, it is possible to effectively give a sense of roundness and fullness to the processed image) to pixels (or regions) that are in a flat part of the two-dimensional image and that have little change in gradation value (pixel value).

A 23rd aspect of the invention is the 22nd aspect of the invention, in which the normal direction estimation portion modulates the normal direction vector based on an angle $\alpha$, that is formed between the normal direction vector and the light source direction vector.

Thus, it is possible to effectively add shadow or add light to images that are processed by the image processing device.

A 24th aspect of the invention is the 23rd aspect of the invention, in which the corrected gradation derivation portion increases the correction amount of the brightness information as the angle $\alpha$ becomes larger.

Thus, it is possible to effectively add shadow or add light to images that are processed by the image processing device.

In particular, with this image processing device, it is possible to effectively add shadow or add light to pixels (or regions) that are in a flat part of the two-dimensional image and that have little change in gradation value (pixel value).

A 25th aspect of the invention is the 23rd aspect of the invention, in which the corrected gradation derivation portion increases the correction amount of the brightness information as the angle $\alpha$ becomes larger, in a case where the angle $\alpha$ is larger than α0, which is the angle that is formed by the normal vector and the light source direction vector of the two-dimensional image, and equal to or less than a first threshold angle α1, and decreases the correction amount as the angle α becomes larger in a case where the angle α is larger than the first threshold angle α1.

Thus, it is possible to effectively add shadow or add light to images that are processed by the image processing device.

In particular, with this image processing device, it is possible to effectively add shadow or add light to pixels (or regions) that are in a flat part of the two-dimensional image and that have little change in gradation value (pixel value).

A 26th aspect of the invention is the 25th aspect of the invention, in which the corrected gradation derivation portion corrects the brightness information of the image signal with the correction amount by adding shadow to the pixel value of the pixel.

A 27th aspect of the invention is the thirteenth aspect of the invention, further including an input portion that can input information for determining a characteristic by which to modulate the normal direction vector.

Thus, the user can input information for determining a characteristic by which to modulate the normal direction vector, and with this image processing device it is possible to achieve image processing that is preferred by the user.

A 28th aspect of the invention is the fourth aspect of the invention, in which the corrected gradation derivation portion corrects the brightness information of the image signal based on the scalar product of the light source direction vector and the normal direction vector.

Thus, the positional relationship between the light source direction vector and the three-dimensional curve that is determined by the modulated normal direction vector can be readily ascertained from the scalar product of the light source direction vector and the normal direction vector, and it is possible to suitably determine whether to add shadow or to add light. Thus, it is possible to effectively add shadow or add light in images that are processed on the image processing device.

Here, for example in a case where the first direction component is the x component in an XYZ space and the second direction component is the y component in an XYZ space, the differential dx of the first direction component in the target pixel i(x,y,z) and the differential dy of the second direction component in the target pixel i(x,y,z) are used to set the normal direction vector Hi of the target pixel i(x,y,z) equal to (−dx,−dy,c) (where c is a constant), and under the assumption that the light source direction vector is a vector that has a direction from the target pixel i(x,y,z) toward the light source position, it is determined that the target pixel i(x,y,z) has a higher probability of being in a region that is struck by light from the light source the smaller the angle (the closer to 0 degrees) between the normal direction vector and the light source direction vector, and the degree of light addition is increased (or the degree of shadow addition is decreased), and it is determined that the target pixel i(x,y,z) has a higher probability of being in a region that is not struck by light from the light source the larger the angle (the closer to 180 degrees) between the normal direction vector and the light source direction vector, and the degree of shadow addition is increased (or the degree of light addition is decreased).

A 29th aspect of the invention is the fourth aspect of the invention, in which the corrected gradation derivation portion corrects the brightness information of the image signal by applying the light source direction vector and the normal direction vector to a mathematical model or lookup table to obtain a shadow-enhanced image signal and then synthesizing the shadow-enhanced image signal with the image signal.

Thus, it is possible to appropriately determine whether or not to add shadow depending on the positional relationship between the light source direction vector and the three-dimensional curved surface that is determined by the modified normal direction vector, and as a result it is possible to effectively add shadow or add light in images processed by the image processing device.

It should noted that here, "mathematical model" refers to a mathematical model with which it is possible to calculate the brightness information of a pixel of interest from the three-dimensional data for the light source and the three-dimensional data for the pixel of interest (target pixel), and for example it may be the Phong model, the model by Torrance and Sparrow, or a model used in computer graphics (CG).

Further, here the "lookup table" refers to a reference table that holds data for outputting data that correspond to the computation results of the mathematical model in response to the input of data based on the light source direction vector and the normal direction vector.

A 30th aspect of the invention is the fourth aspect of the invention, in which the corrected gradation derivation portion corrects the brightness information of the image signal by adopting the light source direction vector and the normal direction vector in a mathematical model or lookup table to obtain a light-enhanced image signal and then synthesizing the light-enhanced image signal with the image signal.

Thus, it is possible to appropriately determine whether or not to add light depending on the positional relationship between the light source direction vector and the three-dimensional curved surface that is determined by the modified normal direction vector, and as a result it is possible to effectively add light or add shadow in images processed by the image processing device.

A 31st aspect of the invention is the fourth aspect of the invention, in which the corrected gradation derivation portion corrects the brightness information of the image signal by adopting the light source direction vector and the normal direction vector in a mathematical model or lookup table to obtain a shadow-enhanced image signal and a light-enhanced image signal, and then synthesizing the shadow-enhanced image signal and the light-enhanced image signal with the image signal.

Thus, it is possible to appropriately determine whether or not to add shadow or to add light depending on the positional relationship between the light source direction vector and the three-dimensional curved surface that is determined by the modified normal direction vector, and as a result it is possible to effectively add light or add shadow to images processed by the image processing device.

A 32nd aspect of the invention is the first aspect of the invention, in which the normal direction estimation portion finds a smoothed normal direction vector that is obtained by smoothing the normal direction vector in the space direction, and the corrected gradation derivation portion corrects the brightness information of the image signal based on the smoothed normal direction vector.

Thus, it is possible to inhibit fluctuation in the normal direction vector due to noise, for example, and it is possible to execute stable correction of the image signal.

Here, "smoothing in the space direction" refers to performing smoothing in the three-dimensional space in which the normal direction vector is defined, and for example corresponds to obtaining a normal direction vector by averaging the normal direction vector of the pixel of interest and the normal direction vector of pixels adjacent to the pixel of interest (this corresponds to the "smoothed normal direction vector").

A 33rd aspect of the invention is the first aspect of the invention, in which the normal direction estimation portion finds a smoothed normal direction vector that is obtained by smoothing the normal direction vector in the time direction, and the corrected gradation derivation portion corrects the brightness information of the image signal based on the smoothed normal direction vector.

Thus, stable correction of the image signal can be performed even when the normal direction vector changes in the time direction. In particular, when handling continuous images (that is, video) on the image processing device, flickering on video between images (between frames) due to sudden changes in the normal direction vector, for example, can be inhibited.

Here, "smoothing in the time direction" refers to obtaining a normal direction vector by averaging a plurality of normal direction vectors in the image signal at different times (this corresponds to the "smoothed normal direction vector").

The 34th aspect of the invention is an image processing method that has a brightness information calculation step, a light source positioning step, a difference calculation step, a normal direction vector calculation step, a light source direction vector calculation step, and a correction step. In the brightness information calculation step, the brightness information of an image signal that is input and that can form a two-dimensional image made from pixels is calculated. In the light source positioning step, the coordinates $(c1,c2,c3)$ (where $c1$, $c2$, and $c3$ are real numbers) of a light source position are set. In the difference calculation step, a difference x between the brightness information of the pixel at a predetermined coordinate position $(p1,p2)$ (where $p1$ and $p2$ are real numbers) on the plane formed by the two-dimensional image and the brightness information of a pixel that is adjacent in the x direction on the plane, and a difference y between the brightness information of the pixel at the predetermined coordinate position $(p1,p2)$ and the brightness information of a pixel that is adjacent in the y direction on the plane, are calculated. In the normal direction vector calculation step, a normal direction vector (said difference x, said difference y, $c3$) from the difference x and the difference y that are calculated in the difference calculation step are calculated. In the light source direction vector calculation step, the light source direction vector $(c1-p1, c2-p2, c3)$ is calculated based on the light source position and the pixel position of the pixel $(p1, p2)$. In the correction step, the brightness information of the pixel is corrected based on the normal direction vector and the light source direction vector.

The 35th aspect of the invention is the 34th aspect, in which in a case where the light source position is at an infinite parallel position with respect to the pixel position of the pixel, such as sunlight, then the coordinate $(c1,c2,c3)$ of the light source position is a value that has a predetermined size in the direction of the infinite parallel position, which is the light source position.

Thus, it is possible to achieve image processing through this image processing method both in the case of a point light source and in the case of a parallel light source.

The 36th aspect of the invention is an image processing method that has a brightness information calculation step, a normal direction estimation step, and a corrected calculation derivation step. In the brightness information calculation step, the brightness information of an image signal that is input and that can form a two-dimensional image made from pixels is calculated. In the normal direction estimation step, the normal direction for each pixel or for each region made of a plurality of pixels is estimated from the brightness information in order to give a feeling of depth to the two-dimensional image that is formed by the image signal, and a normal direction vector that is a three-dimensional vector is obtained for each pixel or for each region based on the normal direction that is estimated. In the corrected calculation derivation step, correction amount of the brightness information is found based on the normal direction vector that is obtained in the normal direction estimation step, and correcting the brightness information of the image signal based on the correction amount of the brightness information.

Thus, it is possible to achieve an image processing method that demonstrates the same effects as the first aspect of the invention.

A 37th aspect of the invention is a program for causing a computer to function as a brightness information calculation portion, a normal direction estimation portion, and a corrected gradation derivation portion. The brightness information calculation portion calculates the brightness information of an image signal that is input and that can form a two-dimensional image made from pixels. The normal direction estimation portion estimates a normal direction for each pixel, or each region made of a plurality of pixels, from the brightness information in order to give a feeling of depth to the two-dimensional image that is formed by the image signal, and obtains a normal direction vector that is a three-dimensional vector for each pixel or for each region based on the normal direction that is estimated. The corrected gradation derivation portion finds a correction amount of the brightness information based on the normal direction vector that is obtained by the normal direction estimation portion, and corrects the brightness information of the image signal based on the correction amount of the brightness information.

Thus, it is possible to achieve a program that demonstrates the same effects as the first aspect of the invention.

A 38th aspect of the invention is a computer-readable storage medium on which is stored a program for causing a computer to function as a brightness information calculation portion, a normal direction estimation portion, and a corrected gradation derivation portion. The brightness information calculation portion that calculates brightness information of an image signal that is input and that can form a two-dimensional image made from pixels. The normal direction estimation portion estimates a normal direction for each pixel, or each region made of a plurality of pixels, from the brightness information in order to give a feeling of depth to the two-dimensional image that is formed by the image signal, and obtains a normal direction vector that is a three-dimensional vector for each pixel or for each region based on the normal direction that is estimated. The corrected gradation derivation portion that finds a correction amount of the brightness information based on the normal direction vector that is obtained by the normal direction estimation portion, and corrects the brightness information of the image signal based on the correction amount of the brightness information.

Thus, it is possible to achieve a computer-readable storage medium that demonstrates the same effects as the first aspect of the invention.

A 39th aspect of the invention is an integrated circuit that includes a brightness information calculation portion, a normal direction estimation portion, and a corrected gradation derivation portion. The brightness information calculation portion calculates brightness information of an image signal that is input and that can form a two-dimensional image made from pixels. The normal direction estimation portion estimates a normal direction for each pixel, or each region made of a plurality of pixels, from the brightness information in order to give a feeling of depth to the two-dimensional image that is formed by the image signal, and obtains a normal direction vector that is a three-dimensional vector for each pixel or for each region based on the normal direction that is estimated. The corrected gradation derivation portion that finds a correction amount of the brightness information based on the normal direction vector that is obtained by the normal direction estimation portion, and corrects the brightness information of the image signal based on the correction amount of the brightness information.

Thus, it is possible to achieve an integrated circuit that demonstrates the same effects as the first aspect of the invention.

A 40th aspect of the invention is the second aspect of the invention, further including a user mode selection portion that allows a processing mode to be selected by user command, and a display portion that displays the output from the output portion as an image.

Thus, with this image processing device it is possible for the user to select a processing mode. In particular, the user can select a processing mode while viewing the processed image that is displayed on the display portion, and thus with this image processing device it is possible to achieve image processing that is based on the user's desired image processing characteristic.

The 41st aspect of the invention is the 40th aspect of the invention, in which the user mode selection portion allows selection of at least a processing mode that includes information relating to a strength of correction of the brightness information.

Thus, with this image processing device it is possible for the user to select the strength of correction of the brightness information and change the strength of brightness information correction on the image processing device. For example, in this image processing device it is possible to provide a "strong mode," a "moderate mode," and a "weak mode" as processing modes for setting the strength of correction of the brightness information, and allow the user select any one of those modes so as to achieve brightness information correction that is desired by the user.

A 42nd aspect of the invention is an image processing device that includes a brightness information calculation portion that derives brightness information from an image signal that forms a two-dimensional image, a normal direction estimation portion that obtains a three-dimensional vector value for each pixel or for each region, and a corrected gradation derivation portion that corrects a luminance value of the pixel or the region based on the three-dimensional vector value.

With this image processing device, a three-dimensional normal direction vector is found from a two-dimensional image and is used to achieve three-dimensional processing, and thus it is possible to effectively increase the feeling of depth and the feeling of three dimensions in the processed image.

Definitions

It should be noted that in the invention of this application, unless specifically noted otherwise, the following term definitions shall be used.

"Pixel" refers to the smallest unit element making up an image.

"Pixel value" refers to the value of the pixel (unique value for each pixel) that includes the value of at least one color component in a desired color space such as RGB or YCrCb (in the case of a YCrCb space, also includes the luminance component (Y component)).

"Image data" refers to group data of a plurality of pixels each having a pixel value (group data of pixel values or group data of signals corresponding to pixel values), and is the group data of any number of pixels that can form a two-dimensional image that can be displayed on a plane.

"Pixel position" refers to the coordinate position (x,y) of a pixel in the two-dimensional image that is formed by the image data. In other words, the pixel position refers to the coordinate position (x,y) on the two-dimensional image plane that is formed by the image data.

"Region position" is the position of pixels that represent a region (a group of a plurality of adjacent pixels in which the number of pixels is fewer than the number of pixels that make up the image data).

"Sense of three dimensions" refers to the feeling that is picked up by humans (sensed by humans) visually with the feeling that the image data that are displayed have depth or width rather than being planar.

"Addition of shadow" refers to the process of reducing the component value that indicates the brightness of the pixel value in predetermined pixels of the pixel data (including processing that is equivalent to the process of lowering the luminance value) in order to increase the feeling of three dimensions.

"Addition of light" refers to the process of increasing the component value that indicates the brightness of the pixel value in predetermined pixels of the pixel data (including processing that is equivalent to the process of increasing the luminance value) in order to increase the feeling of three dimensions.

"Brightness information" is typically the component value that indicates the brightness of a pixel or a region, and typically is the luminance value. It should be noted that the concept of "brightness information" is inclusive of a component value that substantially corresponds to the luminance value in the color space that is defined.

"Brightness modulation" refers to changing the brightness information for a pixel or a region (a region made of a plurality of pixels), and is achieved by simultaneously or separately performing at least one of shadow addition and light addition.

"Device" is a concept that includes devices, integrated circuits, processors, and computers.

"Three-dimensional vector" is a vector made from the three directions (x direction, y direction, z direction) of the two directions including the first direction (x direction) and the second direction (y direction) on the two-dimensional image plane (the plane on which the pixel position is defined) formed by a plurality of pixels, and a third direction (z direction) that indicates the direction of a point not present on this xy plane (two-dimensional image plane), and also the size (x direction component, y direction component, z direction component) of these directions (x direction, y direction, z direction).

"Three-dimensional vector value" is the three-dimensional data made from the first component value (x direction component), the second component value (the y direction component) and the third component value (z direction component) that indicates the size of the each of the first through third directions (x direction, y direction, z direction) of the three-dimensional vector discussed above. Three-dimensional data is a concept that is inclusive of data that have been converted to a format that a suited for the device and being held, as well as the data of the various component values held separately.

"Set a virtual light source" is the assumed setting, holding, and derivation of a coordinate position within or outside of the region that can be taken by the x and y coordinates in the coordinate system that makes up the image data. The coordinate of the virtual light source has a component in the z direction, and is held as a three-dimensional vector value. It is also possible for the coordinates of the virtual light source to allow the predetermined vector up to a pixel to be processed that has coordinates included in the x,y plane discussed above to be derived. That is, it is also possible for the coordinates of the virtual light source to allow the derivation of a predetermined vector between the coordinate position of the virtual light source that has been set and the coordinate position of the pixel targeted for processing that is included in the x,y plane.

It should be noted that the concept of "setting a virtual light source" is not limited to assuming (setting) a point light source (that is, a light source whose coordinate position is a single point) as the virtual light source, and also includes setting a plurality of virtual light sources (including the case of being used to presume a parallel light for the pixel of a coordinate position that is to be processed; that is, including the case of setting a parallel light source).

With the invention it is possible to provide image processing devices, image processing methods, programs, recording media, and integrated circuits that can increase the feeling of depth and the feeling of three dimensions in the processed image by suitably adding shadow to the image, without requiring the detection of the lighting direction like in the conventional art, and regardless of the nature of the light distribution within the image (even in the case of multiple lights).

With this invention it is also possible to provide image processing devices, image processing methods, programs, recording media, and integrated circuits that can further increase the feeling of depth and the feeling of three dimensions in the processed image by suitably adding light to the image.

BRIEF DESCRIPTION OF THE DRAWINGS

FIG. 10 schematically shows an overview of the normal estimation processing in the image processing method according to the first embodiment of the invention.

FIG. 12 shows an overview of the overall light approximation model that is used in the image processing method according to the first embodiment of the invention.

FIG. 33 schematically shows the effect of the image processing method according to the fourth embodiment of the invention.

FIG. 42 is a conceptual diagram that schematically illustrates normal direction estimation in the image processing method according to the eighth embodiment of the invention.

FIG. 45 schematically illustrates the normal direction estimation of the image processing method according to the ninth embodiment of the invention.

FIG. 53 is a conceptual diagram that schematically shows normal direction estimation in the image processing method according to the eleventh embodiment of the invention.

FIG. 59 is a schematic illustration that expresses calculation of the amount of angle modulation by method 1 in the image processing method according to the twelfth embodiment of the invention.

FIG. 61 shows the meaning of the control coefficients wd1 and wd2 in the image processing device according to the twelfth embodiment of the invention.

FIG. 63 illustrates the conversion from an angle modulation amount to a brightness modulation amount in the image processing device according to the twelfth embodiment of the invention.

FIG. 64 schematically illustrates the effect of the image processing method according to the twelfth embodiment of the invention.

FIG. 70 schematically illustrates the effect of the image processing method according to the thirteenth embodiment of the invention.

FIG. 71 schematically illustrates the effect of the image processing method according to the thirteenth embodiment of the invention.

FIG. 74 schematically illustrates the effect of the image processing method according to the fourteenth embodiment of the invention.

FIG. 75 schematically illustrates the effect of the image processing method according to the fourteenth embodiment of the invention.

FIG. 78 schematically illustrates the effect of the image processing method according to the fifteenth embodiment of the invention.

FIG. 79 schematically illustrates the effect of the image processing method according to the fifteenth embodiment of the invention.

DETAILED DESCRIPTION OF THE PREFERRED EMBODIMENTS

Figure 1:
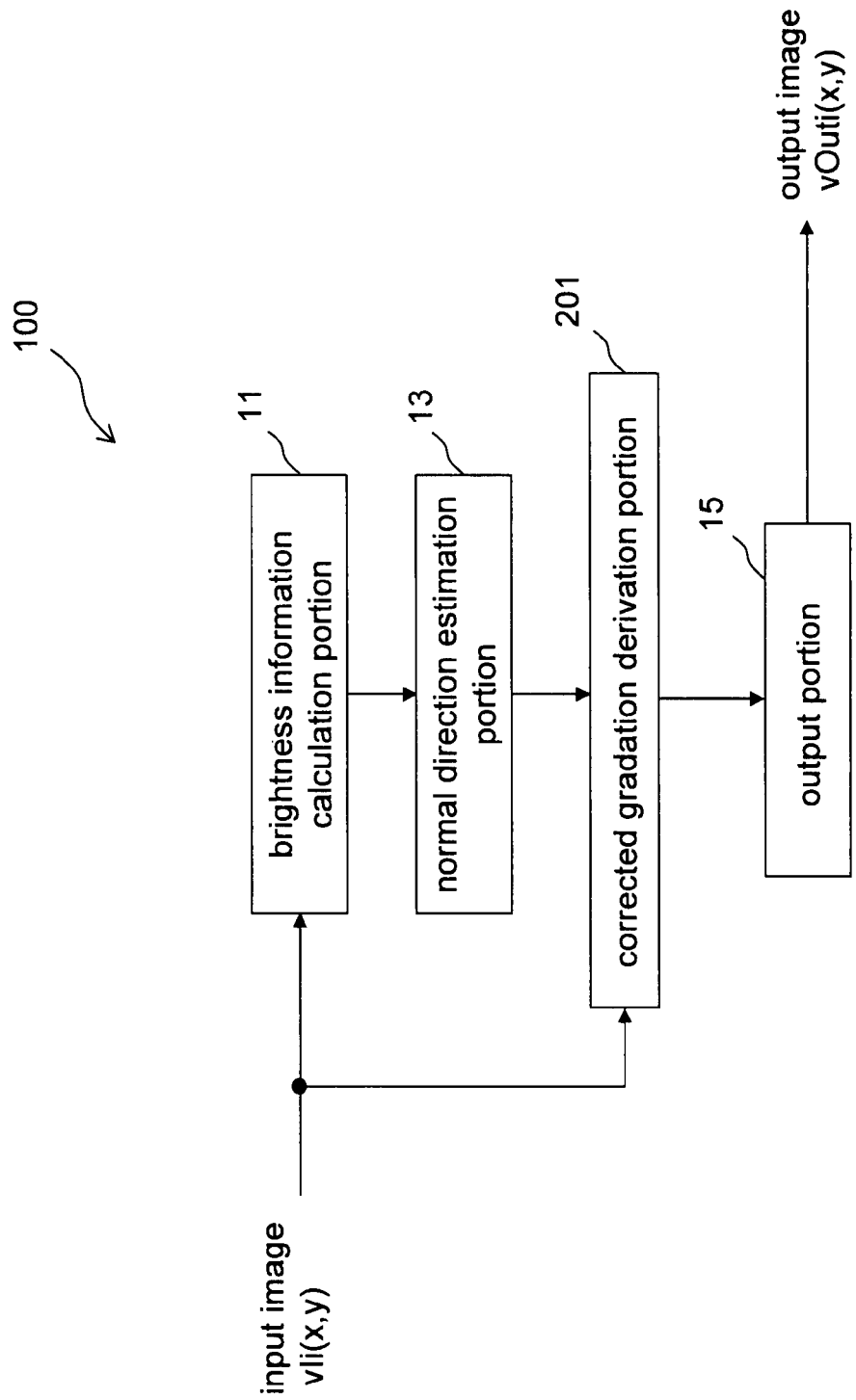
FIG. 1 is a block diagram showing the configuration of the image processing device according to the first embodiment of the invention.

Below, first through seventeenth embodiments of the invention are described.

The first embodiment describes an image processing device and an image processing method that achieve an increase in the feeling of depth by correcting the brightness information based on the brightness information of an image signal that has been input and normal information that has been estimated.

The second embodiment describes an image processing device and an image processing method that achieve an increase in the feeling of depth by enhancing shadow in the image based on the edge information and the normal information that has been estimated.

The third embodiment describes an image processing device and an image processing method that can increase the feeling of depth through the minor addition of light to a predetermined region of the image based on the edge information and the estimated normal information.

The fourth embodiment describes an image processing device and an image processing method that create an image with a further increase in the feeling of depth by combining both characteristics, that is, the effect of shadow addition and light addition, by suitably synthesizing the shadow enhanced image that was obtained in the example of the second embodiment and the light enhanced image that was obtained in the example of the third embodiment.

The fifth embodiment describes an image processing device and an image processing method in which in addition to the fourth embodiment, filter processing is performed on the brightness information and that difference is added to the processed image.

The sixth embodiment describes an image processing device and an image processing method for holding only brightness change amount in each process rather than creating a shadow enhanced image and creating a light enhanced image as in the fifth embodiment.

The seventh embodiment describes an image processing device and an image processing method for correcting the normal direction vector with the edge amount, in the normal estimation of the second through sixth embodiments.

The eighth embodiment describes an image processing device and an image processing method for correcting the normal direction vector with the brightness contrast amount, in the normal estimation of the second through sixth embodiments.

The ninth embodiment describes an image processing device and an image processing method which in the normal estimation of the second through sixth embodiments, define a visual depth amount in consideration of the effect of the sense of brightness that is due to the brightness contrast, which is one visual effect, and then find the normal direction from that visual depth amount.

The tenth embodiment describes an image processing device and an image processing method which in the normal estimation of the second through sixth embodiments, define a visual depth amount in consideration of the effect due to the color contrast that occurs on the depth amount that is defined as a function of only the luminance of a target section, and then find the normal direction from that visual depth amount.

The eleventh embodiment describes an image processing device and an image processing method which in the normal estimation of the second through sixth embodiments, define a visual depth amount in consideration of the effect due to the brightness contrast and the effect due to the color contrast that occurs on the depth amount that is defined as a function of only the luminance of a target section, and then find the normal direction from that visual depth amount.

The twelfth embodiment describes an image processing device and an image processing method in which the gradation is modulated near the halftone in the image by modulating the angle that is formed between a predetermined normal direction that has been calculated and a light source that has been set and then modulating the curve normal direction to modulate the brightness through that angle modulation.

The thirteenth embodiment describes an image processing device and an image processing method that combine the shadow addition processing that characterizes the second embodiment with the task of modulating the gradation of a predetermined section in the image through brightness modulation that is based on modulation of the angle formed by a predetermined normal direction and the light source, which characterizes the twelfth embodiment.

The fourteenth embodiment describes an image processing device and an image processing method that combine the light addition processing that characterizes the third embodiment with the task of modulating the gradation of a predetermined section in the image through brightness modulation that is based on modulation of the angle formed by a predetermined normal direction and the light source, which characterizes the twelfth embodiment.

The fifteenth embodiment describes an image processing device and an image processing method that combine the processing of adding shadow and light that characterizes the fourth embodiment with the task of modulating the gradation of a predetermined section in the image through brightness modulation that is based on modulation of the angle formed by a predetermined normal direction and the light source, which characterizes the twelfth embodiment.

The sixteenth embodiment describes an image processing device and an image processing method that add the operation of performing smoothing processing in the time direction using the normal direction information from the frame image p time units prior to the current time up to the frame image of the current time, to the normal direction vector estimation that is performed in target region units of the second through fifteenth embodiments.

The seventeenth embodiment describes an image processing device and an image processing method in which a user selects a processing mode for the correction level, for example, using an example from the first through sixteenth embodiments as the image processing portion.

The embodiments of the invention are described below using the drawings.

First Embodiment

Figure 2:
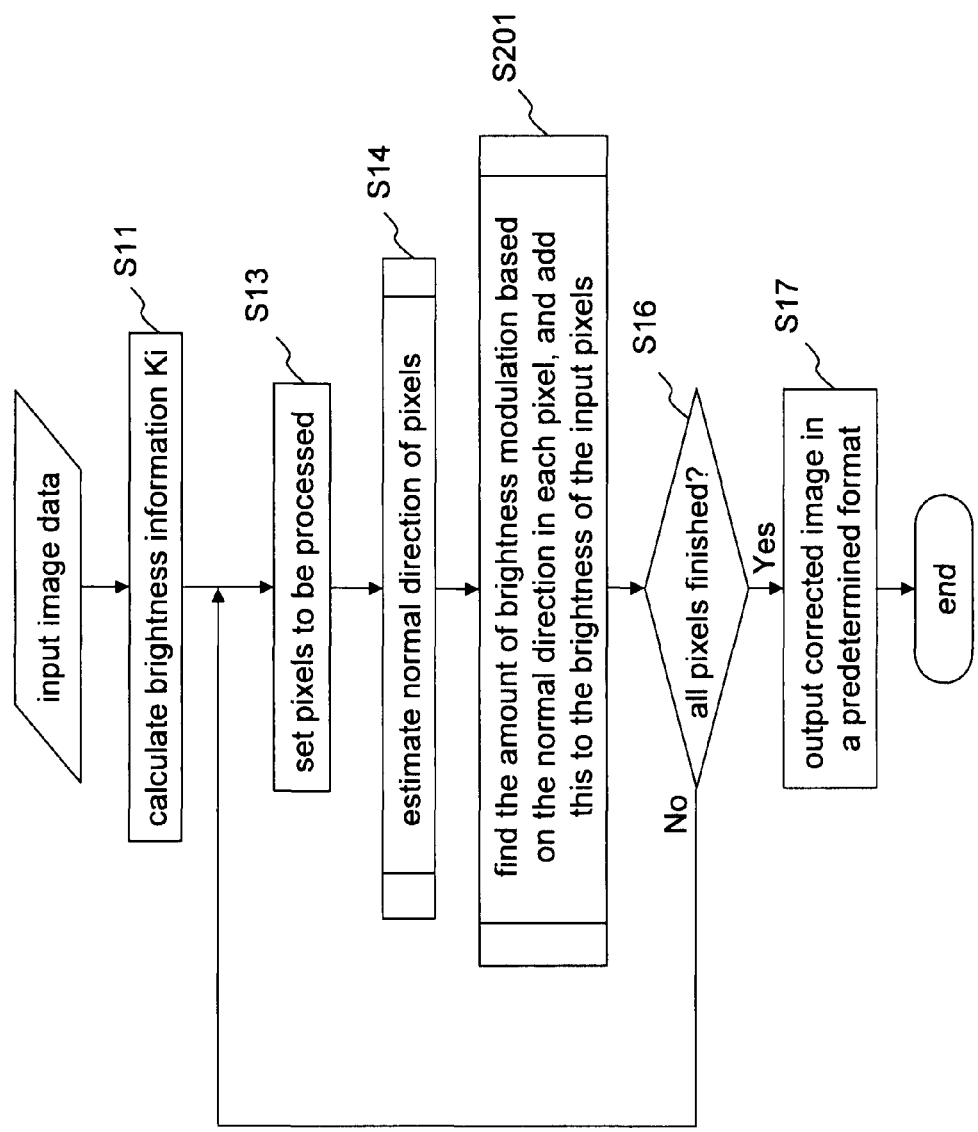
FIG. 2 is a flowchart of the image processing method of the image processing device according to the first embodiment of the invention.
Figure 3:
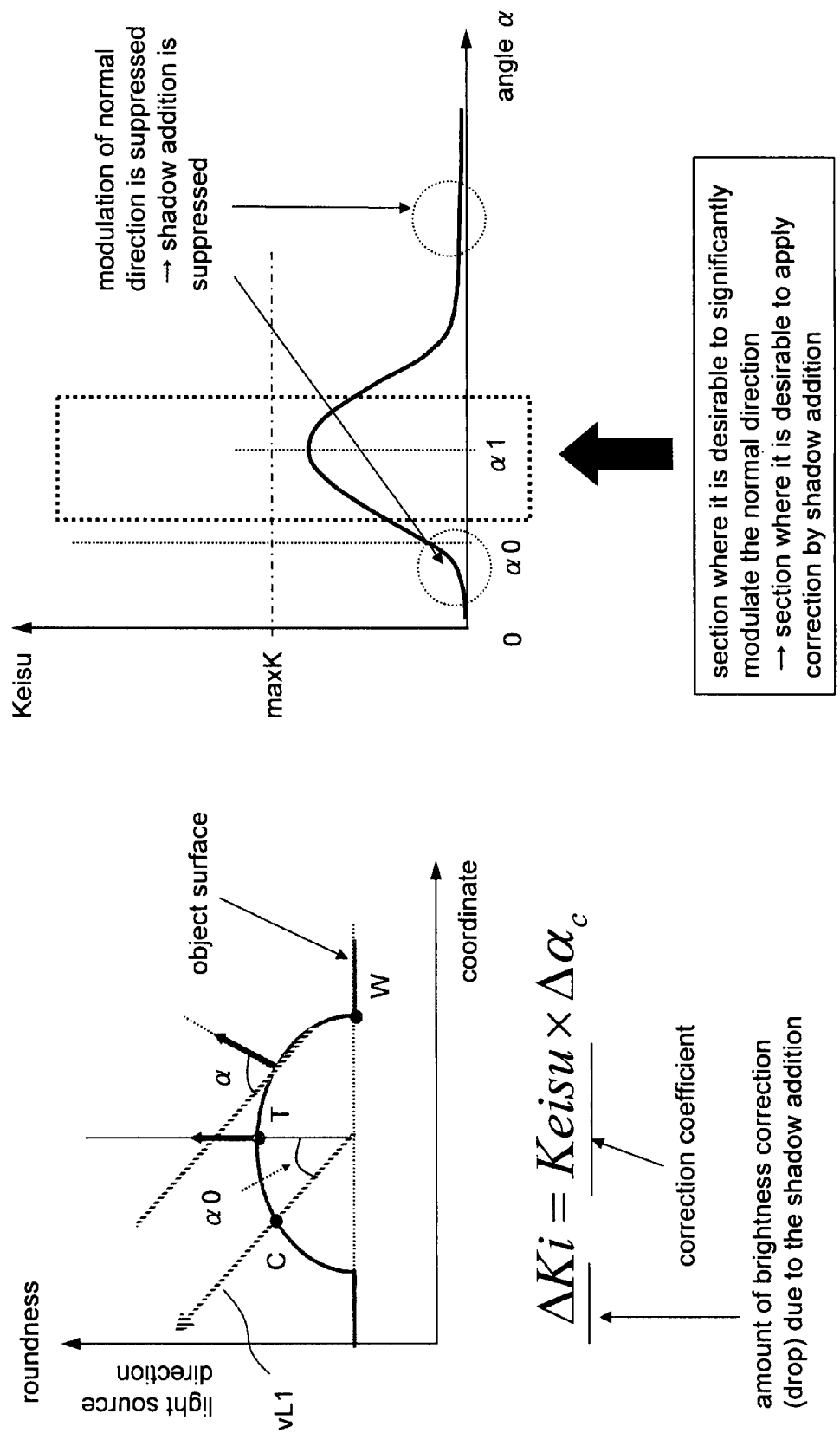
FIG. 3 is an explanatory diagram for describing the operation of the image processing device according to the first embodiment of the invention.

An image processing method and an image processing device of the first embodiment are described using FIGS. 1 through 3.

<1.1: Configuration of the Image Processing Device>

FIG. 1 shows the configuration of an image processing device 100 according to this embodiment.

The image processing device 100 is primarily made of a brightness information calculation portion 11 that calculates the brightness information of an image signal vIi(x,y) that has been input, a normal direction estimation portion 13 that estimates the normal direction for giving a feeling of depth to the image that is formed by the image signal, a corrected gradation derivation portion 201 that calculate the amount of correction (correction amount) of the brightness information based on the normal that has been estimated by the normal direction estimation portion 13 and corrects the brightness information of the input image vIi(x,y), and an output portion 15 that converts the image signal that is obtained with the corrected gradation derivation portion 201 (the image signal whose brightness has been modulated) into a predetermined image data format and outputs the result.

The brightness information calculation portion 11 inputs an image signal vIi(x,y) that can form a two-dimensional image, calculates the brightness information of the image signal vIi(x,y) that has been input, and outputs the calculated brightness information to the normal direction estimation portion 13.

The normal direction estimation portion 13 receives the brightness information that has been calculated by the brightness information calculation portion 11, and estimates the normal direction for giving a feeling of depth to the image that is formed by the image signal. Specifically, it calculates the normal direction vector (normal direction vector information) ("normal direction vector" may also be referred to as "normal vector"; the same applies hereinafter), which is a three-dimensional vector that indicates the normal direction. The normal direction estimation portion 13 outputs the normal direction vector information that has been calculated to the corrected gradation derivation portion 201.

The corrected gradation derivation portion 201 inputs the input image signal vIi(x,y) and the normal direction vector information that has been calculated by the normal direction estimation portion 13, calculates the correction amount of the brightness information of the input image signal vIi(x,y) based on the normal direction vector information and corrects the brightness information of the input image vIi(x,y), and outputs the corrected image signal to the output portion 15.

The output portion 15 inputs the image signal that has been corrected by the corrected gradation derivation portion 201, and converts the image signal that has been obtained by the corrected gradation derivation portion 201 (the image signal whose brightness has been modulated) into a predetermined image data format and outputs this as an output image signal vOuti(x,y).

<1.2: Operation of the Image Processing Device>

Next, the operation of the image processing device 100 will be described.

First, the processing of the normal direction estimation portion 13 (1.2.1) and the processing of the corrected gradation derivation portion 201 (1.2.2) are described.

(1.2.1: Processing of the Normal Direction Estimation Portion 13)

The normal direction estimation portion 13 performs processing to create a three-dimensional vector value for each pixel (pixel making up the two-dimensional image formed by the input image signal vIi(x,y)) at a predetermined pixel position (position on the two-dimensional image of the pixel making up the two-dimensional image formed by the input image signal vIi(x,y)). That is, the normal direction estimation portion 13 creates a normal direction vector for pixels having a predetermined pixel position.

Normal direction estimation is processing that is included in the processing for giving a two-dimensional image a sense of three dimensions.

The normal direction is the direction indicated by the three-dimensional vector from the predetermined position (x,y) that is set for each pixel or each region at the predetermined position (x,y) on the plane of the two-dimensional image, and the normal direction vector that indicates the normal direction is used as a three-dimensional vector value in an image processing device or computer, for example.

The three-dimensional vector value of the normal direction changes based on the amount of change between the luminance of the target pixel and the pixels adjacent to the target pixel (or the pixels in a predetermined direction, for example). The three-dimensional vector with this three-dimensional vector value is the normal direction vector.

The tangent plane at the pixel position (x,y) whose normal is the normal direction vector can be determined for each pixel based on the normal direction vector. Then, by linking the tangent planes that have been determined for each pixel based on the normal direction vector, for all pixels, it is possible to create (presume) a three-dimensional curved surface.

The normal direction indicates the forward direction of the three-dimensional curve when the predetermined pixel position (x,y) on the two-dimensional image plane is expressed by a three-dimensional curve (the three-dimensional curve that is defined by the tangent plane at the pixel position (x,y) whose normal is the normal direction vector), and indicates that the three-dimensional curve bulges outward in that direction. Specifically, for example, in the case of FIG. 10, the direction that is shown by the normal direction vector Hi (x,y) and expressed by Formula 1 is the normal direction.

The image data that make up a natural image are image data that form a two-dimensional image, and thus are different from computer graphics (CG) data, which have three-dimensional information, and the image data have only two-dimensional information (x,y) for a given position.

Thus, to add a feeling of three dimensions to a two-dimensional image, it is necessary to set a height (a component outside the two-dimensional image plane (z component)) at the predetermined pixel position in the two-dimensional image.

More specifically, the normal direction is the direction that is expressed by the three-dimensional vector that is expressed by adding height information as a third component value (z component value) to the two component values of a two-dimensional image (the x component value and the y component value). This three-dimensional vector is the normal direction vector.

Here, "estimating the normal" means estimation of the three-dimensional vector (normal direction vector) for three-dimensionally expressing a predetermined pixel or region, and in devices and processors, for example, it is possible to derive, set, and hold the three-dimensional vector value for each predetermined pixel or region.

Specifically, as the change in brightness between the target pixel and the pixels adjacent to the target pixel increases, the three-dimensional curve at the target pixel is defined such that it is perpendicular to the XY plane in which the image data lie (it is defined such that the angle between the XY plane and the tangent plane at the target pixel in the three-dimensional curve approaches a right angle (90 degrees)), and it is estimated that the first component value (x component value) or the second component value (y component value) of the normal direction vector of the target pixel becomes larger.

On the other hand, a predetermined value is set for the third component value (z component value) of the normal direction vector, which does not lie in the two-dimensional image plane that includes the target pixel. It should be noted that the third component value (z component value) of the normal vector of the target pixel can also be set to a predetermined value that has been chosen in advance, or alternately it can be set in such a manner that it changes in accordance with the change in brightness between the target pixel and the pixels adjacent to the target pixel. In this case, the third component value (z component value) is set to a smaller value the greater the difference in brightness between the target pixel and the pixels adjacent to the target pixel.

It should be noted that in the image processing device 100 and the image processing method that is achieved by the image processing device 100, the vector that has been defined as the normal direction (normal direction vector) is held and set as the three-dimensional data (having three components) derived or set for each pixel position (or region position). In normal direction estimation, the three-dimensional data (the three-dimensional data of the normal direction vector) are each set, derived, and held in correspondence with the pixel position or the region position for each pixel or each region.

Thus, the normal direction estimation portion 13 executes normal direction estimation based on the brightness information Ki(x,y) that is obtained by the brightness information calculation portion 11.

(1.2.2: Processing of the Corrected Gradation Derivation Portion 201)

As discussed above, the corrected gradation derivation portion 201 performs processing to change the pixel value of a pixel (or pixels within a region) whose position is expressed in two dimensions so that humans perceive the image data three dimensionally (here, "change" is a concept that includes the case of not performing processing and using the unchanged value as is; same below). Specifically, the corrected gradation derivation portion 201 uses a calculated predetermined normal direction (normal direction vector) to modulate the brightness of a target section.

Brightness modulation is the changing of the gradation of a predetermined region in order to express a two-dimensional image in three dimensions as discussed above. Specifically, this processing is performed on the pixel value (color component value such as RGB, YCC (YCbCr) (including the color component values from the various color spaces)) of a predetermined region or pixel.

Here, to "change the gradation" refers to changing the distribution or trend of the value of predetermined pixels or a value that indicates the brightness that is obtained from that value (such as the luminance value) (this is inclusive of changing the grayscale value).

With the brightness modulation that is performed by the corrected gradation derivation portion 201, shadow or light is added to a predetermined region in accordance with the change in the three-dimensional vector value (three-dimensional vector value of the normal direction vector) that has been defined as the normal direction, in order to change the grayscale of that predetermined region.

Specifically, the corrected gradation derivation portion 201 changes the brightness such that the change in brightness of the pixel value in the predetermined region due to the addition of shadow or the addition of light becomes larger as the first component value (x component value) or the second component value (y component value) increases in the normal direction vector of the predetermined region.

The corrected gradation derivation portion 201 also changes the brightness such that the amount of change in brightness of the pixel value due to the addition of shadow or the addition of light becomes smaller in the predetermined region as the third component value (z component value) in the normal direction vector of the predetermined region increases.

Further, the corrected gradation derivation portion 201 can change the amount of brightness change such that the amount of change in the brightness of the pixel value due to the addition of shadow or the addition of light increases up to a predetermined value as the first component value (x component value) or the second component value (y component value) in the normal direction vector of the predetermined region increases, and when the brightness change amount reaches that predetermined value, the amount of change in the brightness becomes increasingly smaller. In this case, it is also possible for the corrected gradation derivation portion 201 to carry out this change such that the amount of brightness change of the pixel value due to the addition of shadow or the addition of light increases up to the predetermined value as the third component value (z component value) of the normal direction vector of the predetermined region increases, and when the amount of brightness change reaches that predetermined value, the amount of brightness change becomes increasingly smaller.

With the brightness modulation that is performed by the corrected gradation derivation portion 201, the brightness of the pixel value due to the addition of shadow or the addition of light is changed in the direction shown by the first component value (x component value) as the first component value (x component value) of the normal direction vector of the predetermined region increases. Similarly, the brightness of the pixel value due to the addition of shadow or the addition of light is changed in the direction shown by the second component value (y component value) as the second component value (y component value) of the normal direction vector of the predetermined region increases.

On the other hand, the corrected gradation derivation portion 201 changes the brightness of the pixel value due to the addition of shadow or the addition of light in the two-dimensional vector direction shown by the direction of change of the first component value (x component value) and the direction of change of the second component value (y component value), as the first component value (x component value) and the second component value (y component value) of the normal direction vector of the predetermined region increase.

Further, in the case of adding shadow, the corrected gradation derivation portion 201 changes the brightness such that the change in brightness of the pixel value due to shadow increases as the predetermined light source vector ("light source vector" may also be referred to as "light source direction vector"; same hereinafter) and the normal direction vector become opposite directions. In the case of adding light, the corrected gradation derivation portion 201 changes the brightness such that the change in brightness of the pixel value due to light increases as the predetermined light source vector and the normal direction vector become the same direction.

In the case of adding shadow, it is also possible for the corrected gradation derivation portion 201 to change the brightness such that the amount of brightness change in the pixel value due to shadow increases as the angle formed between the predetermined light source vector and the normal direction vector increases up to a predetermined angle, and then gradually reduce the amount of brightness change in the pixel value due to shadow as the angle formed between the predetermined light source vector and the normal direction vector becomes larger than the predetermined angle and the normal direction vector comes to point in the direction opposite the light source vector. Specifically, the corrected gradation derivation portion 201 can perform the addition of shadow by performing control such as that shown in the right diagram of FIG. 3. It should be noted that in the right diagram of FIG. 3, the horizontal axis is the angle α that is formed by the normal direction (the normal direction vector) and the light source direction (the light source vector), and the vertical axis is a correction coefficient Keisu for determining the amount of brightness correction.

In the case of adding light, it is also possible for the corrected gradation derivation portion 201 to change the brightness such that the amount of brightness change in the pixel value due to light increases as the angle formed between the predetermined light source vector and the normal direction vector decreases down to a predetermined angle, and then gradually reduce the amount of brightness change in the pixel value due to light as the angle formed between the predetermined light source vector and the normal direction vector becomes smaller than the predetermined angle and the normal direction vector comes to point in the same direction the light source vector.

Here, the light source vector pointing in the same direction as the three-dimensional vector defined by the normal direction (the normal direction vector) indicates that the angle α that is formed by the two vectors is 0 degrees≦α≦αth≦90 degrees, where αth is the predetermined angle, and as the angle α approaches 0 degrees the vectors point in increasingly the same direction.

The light source vector pointing in the opposite direction as the three-dimensional vector defined by the normal direction (the normal direction vector) indicates the angle α that is formed by the two vectors is αth≦90 degrees≦α≦180 degrees, and as the angle α approaches 180 degrees the vectors point in increasingly the opposite direction. As will be discussed later, as the predetermined angle αth it is possible to use an angle α0 that is formed by the light source vector and the three-dimensional vector that has been defined as the normal direction of the XY plane (two-dimensional image plane) in which the image is included.

By performing brightness modulation as the above, the corrected gradation derivation portion 201 can effectively add shadow or light to sections on the two-dimensional image that have a relatively uniform brightness in which the grayscale changes more gently than it does near borders. Thus, it is possible to give an effective gradation change to sections that have a relatively uniform brightness in which the grayscale of the two-dimensional image changes gently.

With the processing described above, it is also possible to add shadow or light to the area near a border. 2D image data make up a natural image have only 2D information (x,y) and do not also have a 3D direction (z direction), and thus it has not been possible to perceive the height (depth in the 3D direction (z direction)). However, through the above processing the image processing device 100 can change the grayscale in sections of a two-dimensional image that have a relatively uniform brightness and lack significant change, and thus it is possible to obtain a two-dimensional image in which the effect of increasing the feeling of three dimensions for the viewer has been attained.

(1.2.3: Specific Operation of the Image Processing Device 100)

FIGS. 1 through 3 are used to describe the specific operation of the image processing device 100 based on the above.

First, the brightness information calculation portion 11 obtains brightness information Ki(x,y) from the image signal vIi(x,y) that has been input to the image processing device 100. The normal direction estimation portion 13 then estimates the normal direction based on the brightness information Ki(x,y).

Here, vector data (group data made of a plurality of data), which have a small letter modifier of "v," such as the image signal vIi(x,y), show that a target pixel i(x,y) has a plurality of types of information (data). For example, it is possible for the image signal vIi(x,y) to be information that has a total of three types of information (data), these being luminance data Y and chroma data Cb and Cr, for a pixel i(x,y) to be processed (pixel of interest i), and it may also be information that expresses a RGB color space for the pixel that has a total of three types of information (data), these being information (data) on the R component, information (data) on the G component, and information (data) on the B component, or information that expresses a separate color space such as the information (data) of a plurality of components based on that color space.

Specifically, the normal direction estimation portion 13 obtains a normal direction vector vHi(x,y) from the brightness information Ki(x,y). Here, the normal direction vector vHi(x,y) is obtained for each pixel. Thus, it is possible to use the normal direction vector vHi(x,y) in pixel units as it is, or it is possible to perform filter processing (smoothing) for each normal component of the normal direction vector vHi(x,y) in pixel units in order to extract the normal in grayscale sections that are nearly flat but that change gently on the image that is formed by the image signal vIi(x,y) (it is possible to perform filter processing (smoothing) on each of the x component, the y component, and the z component of the normal direction vector).

The corrected gradation derivation portion 201 uses the normal direction vector vHi(x,y) to modulate the brightness through the addition of shadow in predetermined sections. The graph on the right in FIG. 3 shows the relationship between the angle α that is formed by the light source vector and the normal direction vector, and the correction coefficient Keisu. The correction coefficient Keisu is adopted in the formula shown in the lower left part of FIG. 3 in order to find the brightness correction (drop) amount $\varDelta$ Ki due to the addition of shadow.

FIG. 3 schematically shows how the method of brightness modulation discussed above is controlled by the angle α (the angle α formed by the light source vector and the normal direction vector) of portions where it is desirable to modulate the shading (desirable to change the degree of shadow added), and the nature of this processing is the same as in the method of brightness modulation discussed above.

Through the processing on the corrected gradation derivation portion 201, the modulation amount $\varDelta$ Ki(x,y) of the brightness information Ki(x,y) of the target pixel is found based on the angle α formed by the light source vector vL(x, y) that has been and the normal direction vector vHi(x,y). The vector from the pixel i(x,y) toward the light source that has been set is used as the light source vector. Here, a light source vector due to a parallel light source at the upper left (the direction shown by vL1 in the left diagram of FIG. 3) is set as the light source vector vL(x,y). It should be noted that this is not a limitation for the light source vector vL(x,y), and it may also be another light source vector that indicates a light source direction that has been designated by a user or a light source vector that indicates an optimum light source direction that has been estimated by a method such as that of the twelfth embodiment.

In the above description, "determining" the light source is the process of determining the values (information) including the coordinates (at least the x component value and the y component value) of the spot that should be the light source for a predetermined position in the image data within the device. It should be noted that the predetermined position is not always a single position, and it may also be a plurality of positions. In other words, it is not necessary for the coordinates of the light source to be coordinates for a single point, and they may also be a plurality of coordinates (that is, this corresponds to a case in which there are a plurality of light sources). The predetermined position that has been determined ultimately becomes a position that is recognized by a person as the spot in the image that is output by the image processing device 100 where the light source should be present.

As shown in the right diagram of FIG. 3, the normal direction at the angle α of the section in which it is desirable to modulate the shadow is changed in order to modulate the brightness through the addition of shadow (cause brightness modulation based on the angle formed by the light source direction and the normal direction). Specifically, the correction coefficient Keisu, which is a coefficient for controlling the brightness modulation amount $\varDelta$ Ki, is changed based on the angle α between the light source direction and the normal direction. As shown in the right diagram of FIG. 3, the angle α is controlled so that the value of the correction coefficient Keisu increases from near the point where the angle α becomes the angle α0 between the light source direction and the normal direction (the normal direction of the two-dimensional image plane that is formed by the input image signal vIi(x,y)) in the flat section in which it is desirable to modulate the shadow. Then, this peaks at a certain angle (angle α1 in the right diagram of FIG. 3) and from there as the angle α becomes bigger the value of the correction is coefficient Keisu reduced so that it becomes increasingly closer to 0. By doing this, the modulation of shadow near border portions is suppressed. The brightness modulation amount $\varDelta$ Ki in this case is:

$$\varDelta Ki = Keisu \times \varDelta \alpha c \quad (a1)$$

Here, $\varDelta$ αc is a predetermined standard fluctuation amount and is a positive constant.

It should be noted that here is shown brightness modulation due to the addition of shadow, and thus the brightness information OKi(x,y) after correction is:

$$OKi(x,y) = Ki(x,y) - \varDelta Ki \quad (a2)$$

This value becomes the brightness information OKi(x,y) that is output from the corrected gradation derivation portion 201. It should be noted that the color information that is output from the corrected gradation derivation portion 201 is not changed from the color information of the input signal vIi(x,y), and the chroma information Cri(x,y) and Cbi(x,y) of the input image are output from the corrected gradation derivation portion 201 as they are. In other words, the chroma information OCbi(x,y) and OCri(x,y) that are output from the corrected gradation derivation portion 201 are Cbi(x,y) and Cri(x,y), respectively. It should be noted that other than this, it is also possible to use the improvement ratio of the brightness information Ratio=OKi(x,y)/Ki(x,y) from the processed brightness information OKi(x,y), the brightness information Ki(x,y) of the input image, and the chroma information Cri (x,y) and Cbi(x,y) of the input image in order to find the chroma improvement ratio RatioCrCb, and then multiply the chroma information Cri(x,y) and Cbi(x,y) with the chroma improvement ratio RatioCrCb (the RatioCrCb may be the same value as the brightness information improvement ratio Ratio) and output the result of this multiplication as the chroma information OCbi(x,y) and OCri(x,y) from the corrected gradation derivation portion 201.

The output portion 15 transforms the processed image vOi(x,y) of each pixel Pi that has been obtained with the corrected gradation derivation portion 201 (in the above case, the vector data vOi(x,y) is OKi(x,y), OCbi(x,y) and OCri(x, y); here, the vector data refers to a plurality of data, and for example corresponds to the data made of the brightness information data and the chroma information data) according to an image format that can be handled by the device being used and outputs the resulting processed image data.

Thus, the image processing device 100 finds the amount of brightness modulation that occurs due to changing (including changing the correction coefficient Keisu with the angle α) the normal direction (that is, the angle α) of sections where it is desirable to modulate the shading (in FIG. 3, relatively flat sections where the grayscale changes gently, rather than sections near borders), and then subtracts the brightness modulation amount that has occurred from the brightness information of the input image in order to add shadow, obtaining corrected brightness information.

It should be noted that by controlling the correction coefficient Keisu according to the brightness information Ki(x,y) in the right diagram of FIG. 3, it is possible to achieve more effective brightness modulation through the addition of shadow. For example, it becomes possible to monotonically reduce the value of maxK in accordance with an increase in the brightness information Ki(x,y). The correction coefficient Keisu that is shown as an example in the right diagram of FIG. 3 can also be determined by a mathematical model (for example, a Phong model, a model by Torrance and Sparrow, or a model used in CG). The correction coefficient Keisu may also be tabulated (made into a lookup table (LUT)) and then determined. It would also be possible to determine the correction amount based on such a table. At this time, if the maxK is to be controlled with the brightness information Ki, then a two-dimensional profile table (2D LUT (lookup table) whose two input values (reference values) are the angle α formed by the normal and the light source vector and the brightness information Ki, and whose output value is the correction amount $\Delta$Ki (it is also possible for the correction coefficient Keisu to serve as the output value) is referenced. It is also possible to combine the light source direction (light source vector) and the correction amount $\Delta$Ki (or the correction coefficient Keisu) to produce an LUT, and in this case, the LUT is a 3D LUT.

In the right diagram of FIG. 3, by making the correction coefficient Keisu a negative value it is possible to achieve grayscale modulation through the addition of light rather than the addition of shadow, and by increasing the brightness in a predetermined relatively flat region facing the light source it is possible to achieve the same effect.

As described above, with the image processing device 100 of this embodiment, brightness modulation through the addition of shadow is performed based on the angle that is formed between a predetermined normal direction (normal direction vector) that has been calculated and a light source direction (light source vector) that has been set, and thus it is possible to carry out grayscale modulation closer to halftone than a border in the image. As a result, with the image processing device 100 it is possible to modulate the brightness and enhance changes near the halftone (neat object flat sections or light shadow, for example, in which the brightness changes gently, rather than near an object border), where the grayscale changes gently, and in the image that has been processed by the image processing device 100, it is possible to achieve a three-dimensional effect that has a more natural roundness and sense of fullness rather than the flat three-dimensional effect that is felt when only the simple border contrast is sharp.

Second Embodiment

Using FIGS. 4 through 18, an image processing method and an image processing device that achieve an increase in the feeling of depth of an image through the addition of shadow are described as the second embodiment of the invention.

Figure 4:
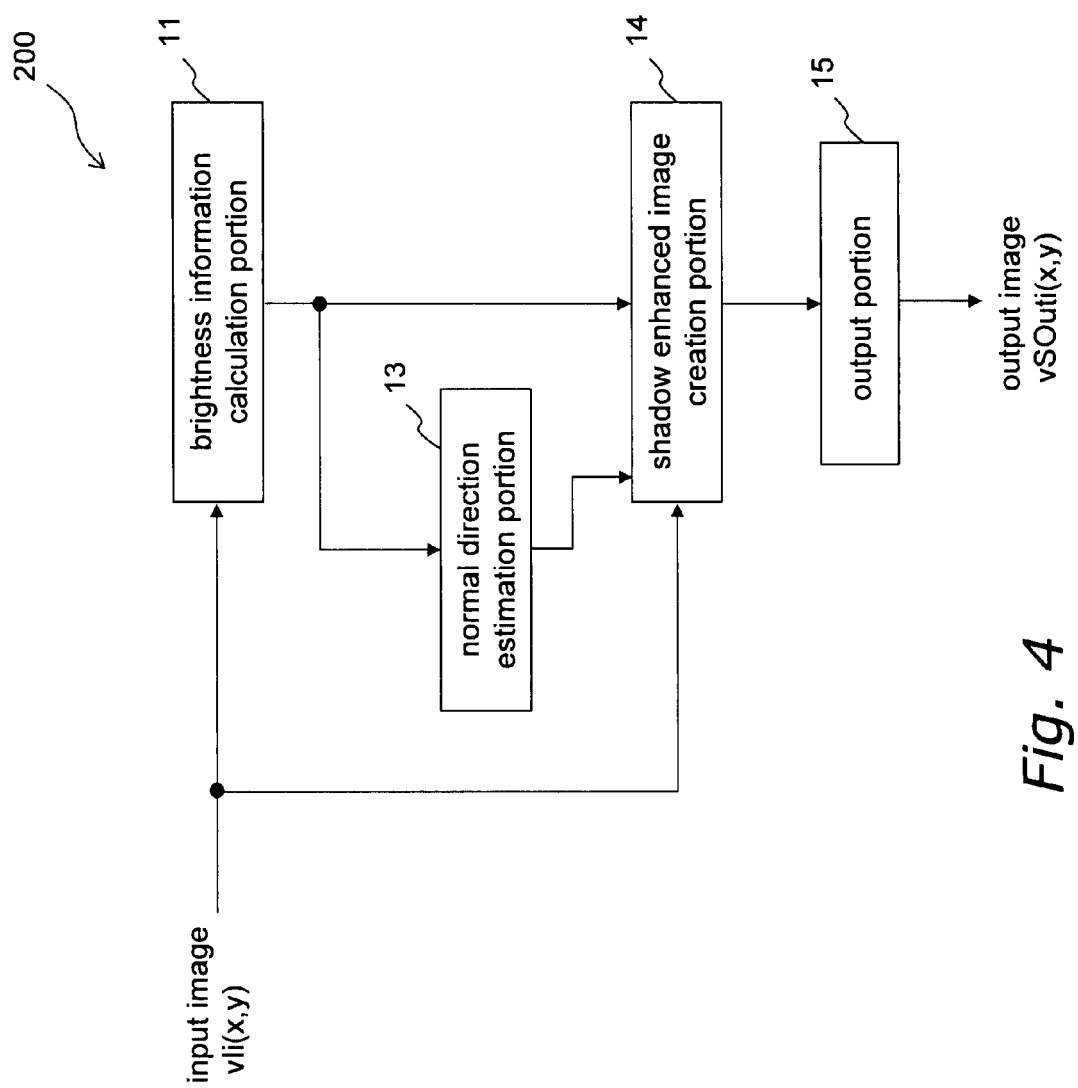
FIG. 4 is a block diagram that shows the configuration of the image processing device according to the first embodiment of the invention.
Figure 5:
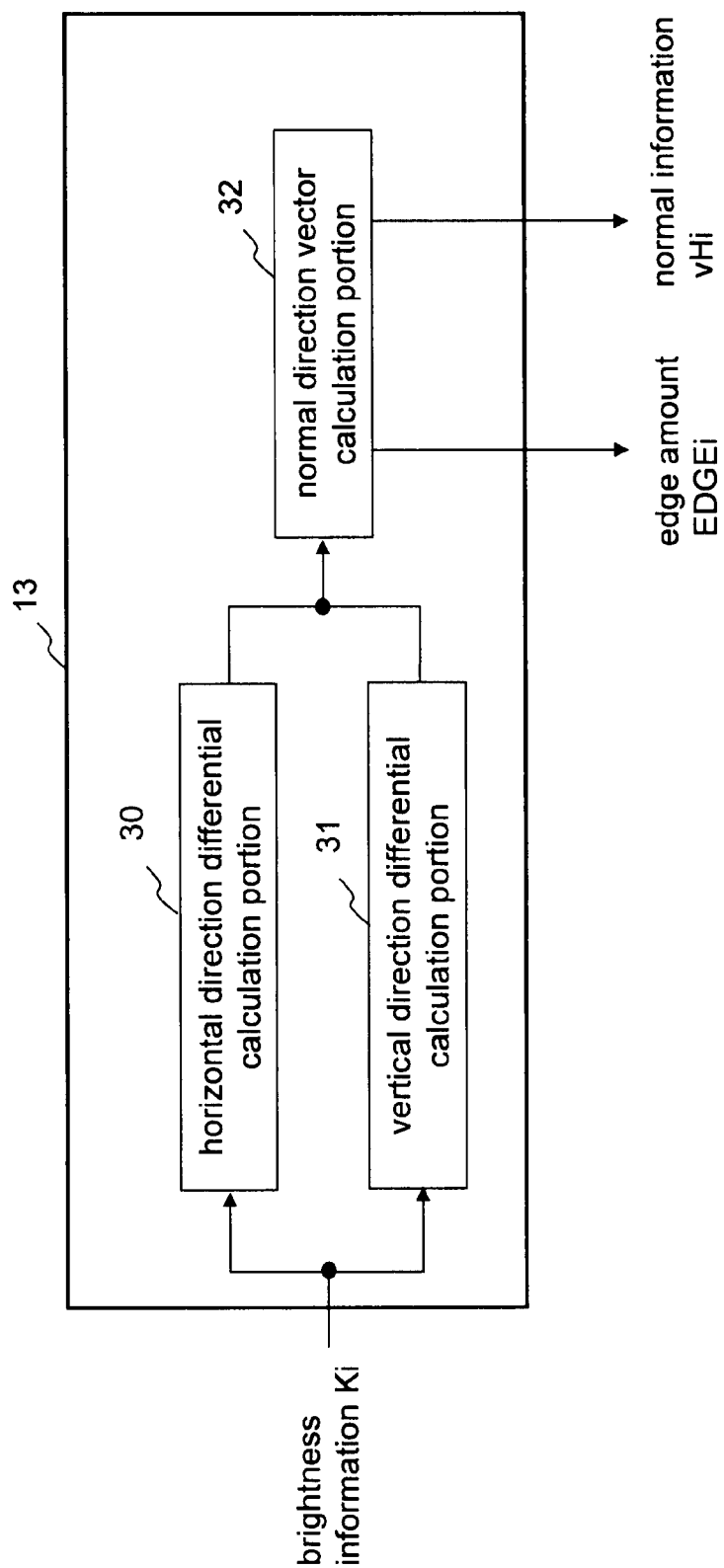
FIG. 5 is a block diagram that shows the configuration of the normal direction estimation portion in the image processing device according to the first embodiment of the invention.
Figure 6:
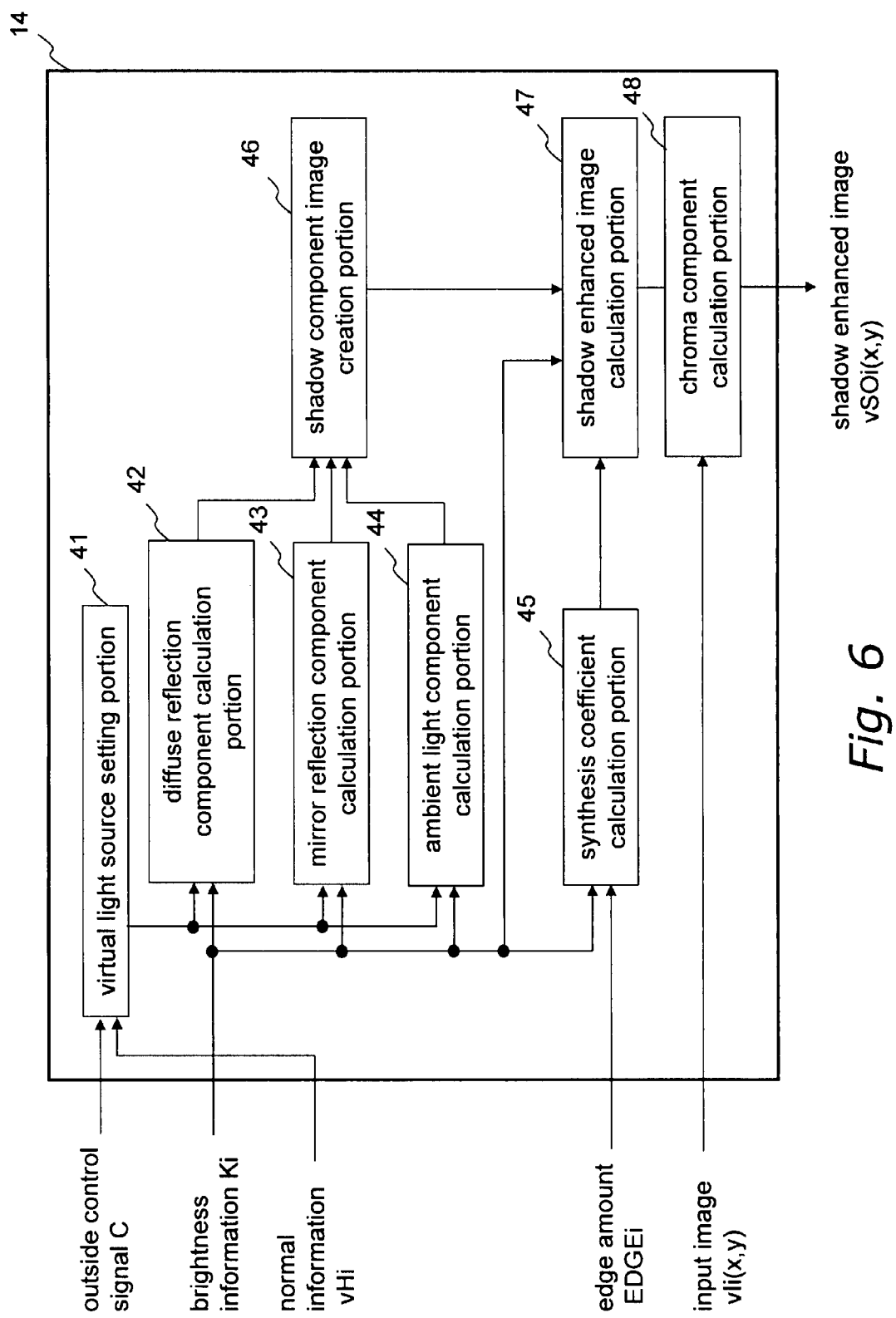
FIG. 6 is a block diagram that shows the configuration of the shadow enhanced image creation portion in the image processing device according to the first embodiment of the invention.

FIG. 4 shows the configuration of an image processing device 200 according to the second embodiment of the invention. FIG. 5 shows the configuration of the normal direction estimation portion 13, and FIG. 6 shows the configuration of a shadow enhanced image creation portion 14.

Figure 7:
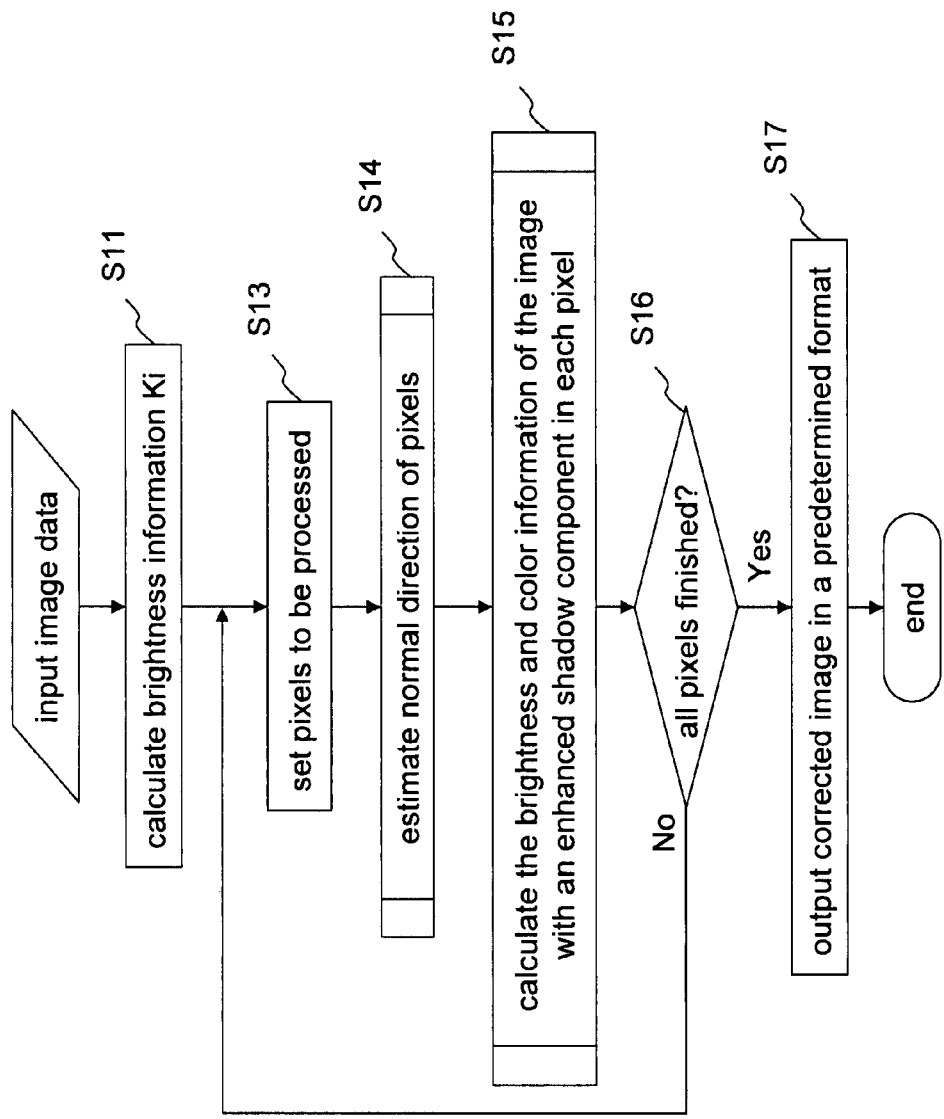
FIG. 7 is a process flowchart of the image processing method according to the first embodiment of the invention.
Figure 8:
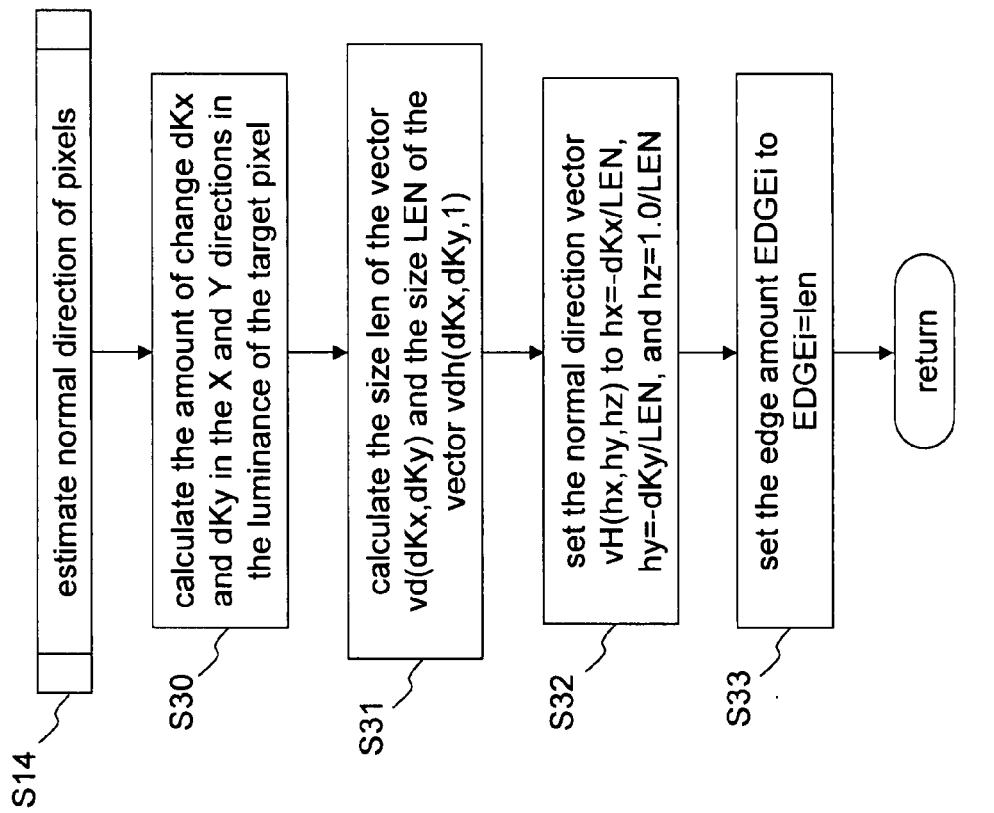
FIG. 8 is a flowchart of the normal direction estimation process in the image processing method according to the first embodiment of the invention.
Figure 9:
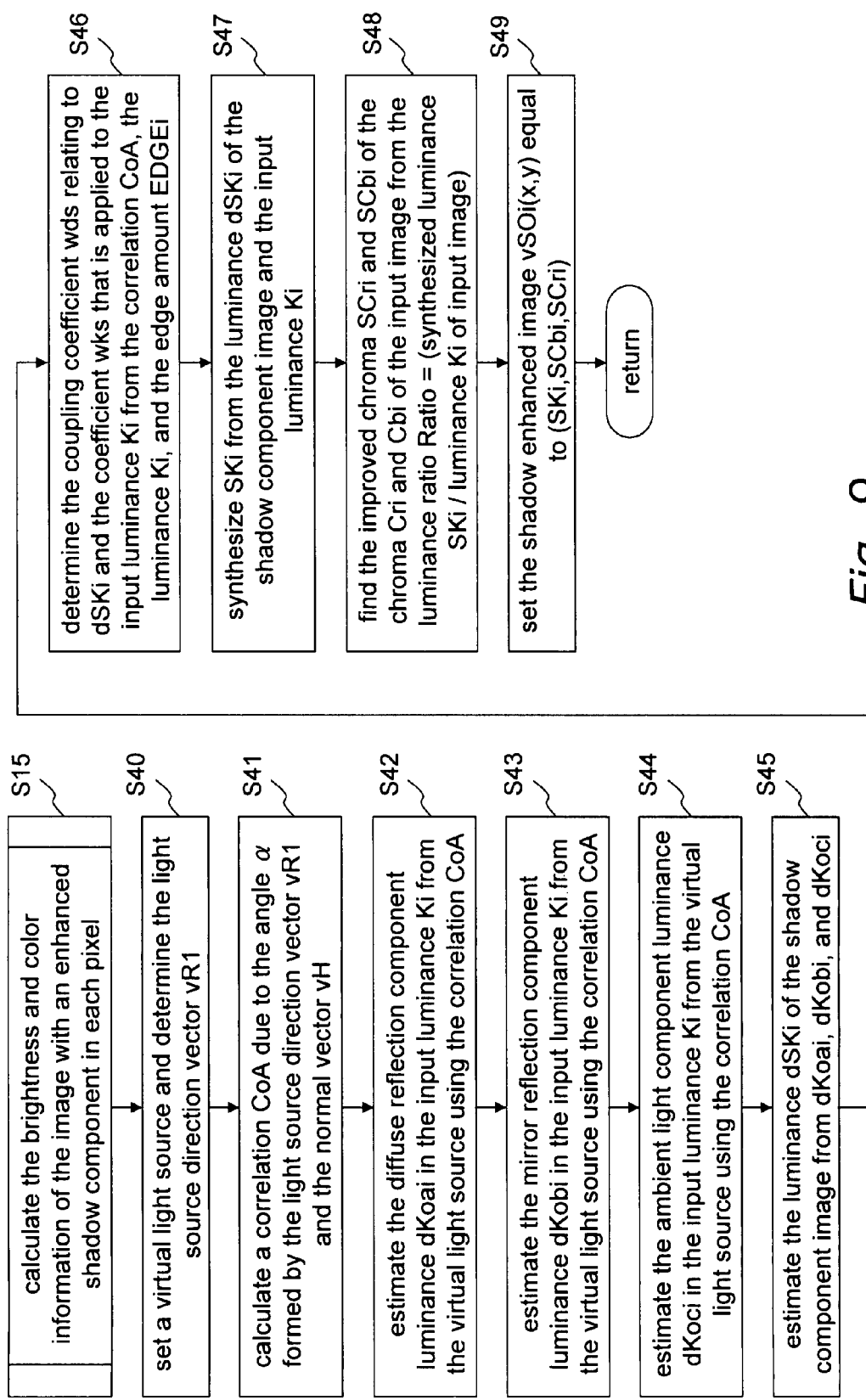
FIG. 9 is a flowchart of the shadow enhanced image creation process in the image processing method according to the first embodiment of the invention.

FIG. 7 shows a process flowchart of the image processing method according to the second embodiment of the invention. FIG. 8 shows a process flowchart of the normal direction estimation step in the image processing method according to the second embodiment of the invention. FIG. 9 shows a process flowchart of the shadow enhanced image creation step.

The invention is a device for correcting color information within an image by processing the image data, and for example can be installed in image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

<2.1: Configuration of the Image Processing Device>

The image processing device 200 is primarily made of a brightness information calculation portion 11 that calculates the brightness information Ki(x,y) of an image signal vIi(x,y) that has been input, a normal direction estimation portion 13 that calculates the normal information (normal direction vector) vHi(x,y) and the edge amount EDGEi(x,y) from the brightness information Ki(x,y) that has been calculated by the brightness information calculation portion 11, a shadow enhanced image creation portion 14 that performs processing for adding and enhancing shadow in the input image signal vIi(x,y) based on the normal direction vector vHi(x,y) and the edge amount EDGEi(x,y) that are obtained by the normal direction estimation portion 13 and the brightness information Ki(x,y) that has been calculated by the brightness information calculation portion 11, and an output portion 15 that converts the image signal that is obtained by the shadow enhanced image creation portion 14 into a predetermined image data format and outputs the result.

It should be noted that in this embodiment, sections that are the same as those of the previous embodiment are assigned the same reference numerals as before and are not described.

As shown in FIG. 5, the normal direction estimation portion 13 is primarily constituted by a horizontal direction differential calculation portion 30, a vertical direction differential calculation portion 31, and a normal direction vector calculation portion 32.

The horizontal direction differential calculation portion 30 receives the brightness information Ki(x,y) and differentiates the brightness information Ki(x,y) for the horizontal direction (x direction) (partial differentiation is performed for x), and the calculated differential is output to the normal direction vector calculation portion 32.

The vertical direction differential calculation portion 31 receives the brightness information Ki(x,y) and differentiates the brightness information Ki(x,y) for the vertical direction (y direction) (partial differentiation is performed for y), and the calculated differential is output to the normal direction vector calculation portion 32.

The normal direction vector calculation portion 32 calculates the edge amount EDGEi(x,y) and the normal information (normal direction vector) vHi(x,y) based on the differential in the horizontal direction that has been calculated by the horizontal direction differential calculation portion 30 and the differential in the vertical direction that has been calculated by the vertical direction differential calculation portion 31, and outputs the result to the shadow enhanced image creation portion 14. Here, the normal direction vector calculation portion 32 calculates the normal direction vector vHi (x,y) through the processing of Formula 1, for example.

The shadow enhanced image creation portion 14 adds shadow to and enhances shadow in the input image (signal) vIi(x,y) based on the brightness information Ki(x,y), the normal direction vector vHi(x,y), and the edge amount EDGEi (x,y) due to the brightness, creating a shadow enhanced image vSOi(x,y). The shadow enhanced image creation portion 14 then outputs the shadow enhanced image (signal) that has been created to the output portion 15.

It should be noted that if a Phong model is used, then the shadow enhanced image creation portion 14 is configured as shown in FIG. 6. In this case, the shadow enhanced image creation portion 14 is provided with a virtual light source setting portion 41 for setting a virtual light source based on an outside control signal C, a diffuse reflection component calculation portion 42 for calculating the diffuse reflection component based on the virtual light source that has been set, the brightness information Ki and the normal direction vector (normal information) vHi, a mirror reflection component calculation portion 43 for calculating the mirror reflection component based on the virtual light source that has been set, the brightness information Ki and the normal direction vector (normal information) vHi, and an ambient light component calculation portion 44 for calculating the ambient light reflection component based on the virtual light source that has been set, the brightness information Ki and the normal direction vector (normal information) vHi. The shadow enhanced image creation portion 14 is also provided with a shadow component image creation portion 46 for creating a shadow component image based on the diffuse reflection component that has been calculated by the diffuse reflection component calculation portion 42, the mirror reflection component that has been calculated by the mirror reflection component calculation portion 43, and the ambient light component that has been calculated by the ambient light component calculation portion 44, a synthesis coefficient calculation portion 45 for calculating a synthesis coefficient from the brightness information Ki and the edge amount EDGEi, a shadow enhanced image calculation portion 47 that creates a shadow enhanced image from the shadow component image based on the synthesis coefficient that has been calculated by the synthesis coefficient calculation portion 45 and the brightness information Ki, and a chroma component calculation portion 48 that calculates the chroma component from the input image vIi, then transforms the shadow enhanced image that has been output from the shadow enhanced image calculation portion into a shadow enhanced image vSOi taking into consideration the chroma component, and outputs the transformed shadow enhanced image vSOi.

<2.2: Operation of the Image Processing Device>

Next the operation of the image processing device 200 is described.

(2.2.1: Overview of the Processing).

An overview of the processing by the image processing device 200 is described with reference to the process flowcharts of FIGS. 7 through 9.

First, image data having the pixel value vIi(x,y) at the pixel i(x,y) are input to the image processing device 200. Here, (x,y) indicates the (horizontal pixel position, vertical pixel position) of a pixel i. The lower case v in front of the variable indicates vector data.

In the brightness information calculation portion 11 the data of the pixels making up the image data vIi(x,y) are converted to predetermined brightness information Ki(x,y). There are many possible examples for the brightness information, including the luminance Y of YCbCr space data made of the luminance Y and the chroma Cb and Cr or the lightness L of La*b* space data made of the lightness L and the colors a* and b*. Here, the luminance Y of YCbCr space data is calculated for the pixel i and is treated as the brightness information Ki(x,y).

The normal direction estimation portion 13 finds the normal direction vector for the depth curve to add to the image, and the edge amount EDGEi(x,y) of the brightness information in the pixel i(x,y). Because the image that is input is made of two-dimensional data, it lacks data in the depth direction for giving a feeling of depth or a sense of three dimensions. This is ordinarily called the problem of insufficiency and cannot be solved. The processing relating to the data in the depth direction that are insufficient that is performed in this invention is described using FIG. 10.

First, the normal direction is found for each pixel. In general, a user views a two-dimensional image on a screen from the front of the screen. Accordingly, a Z direction component hz(x,y) that is one normal direction vector vHi(x,y) is assumed in the direction perpendicular to the screen of the two-dimensional image and toward the user.

Next, the negative of the differential value of the X direction (horizontal direction) and the negative of the differential value of the Y direction (vertical direction) of the brightness information Ki(x,y) in the pixel i(x,y) are found, and set as the X component hx(x,y) and the Y component hy(x,y) in the normal direction vector in that pixel i(x,y).

That is, the normal direction vector vHi(x,y) is three-dimensional data (hx(x,y), hy(x,y), hz(x,y)).

The greater the change in the brightness information Ki(x, y) in the pixel i(x,y), the more a person will direct his focus there and feel a sense of distance. Accordingly, the amount of change dx in the horizontal direction (X direction) and the amount of change dy in the vertical direction (Y direction) of Ki(x,y) is found for the pixel i(x,y). Using these values, the horizontal direction component hx(x,y) and the vertical direction component hy(x,y) of the normal direction vector vHi(x, y) of the depth curve in the pixel i(x,y) are calculated by Formula 1.

Formula 1

$$Hi(x, y) = \begin{pmatrix} hx \\ hy \\ hz \end{pmatrix} = \begin{pmatrix} -dKx/LEN \\ -dKy/LEN \\ 1/LEN \end{pmatrix} \quad (1)$$

The normal direction vector calculation portion 32 calculates the EDGEi(x,y). For example, it finds the size of dKx and dKy at the pixel i(x,y) and takes these values as the edge amount EDGEi(x,y) of the pixel i(x,y). In other words, this becomes:

$$EDGEi(x,y) = ((dKx)^2 + (dKy)^2)^{0.5}$$

In Formula 1, LEN is the size of the normal direction vector vdHi(x,y)=(−dKx,−dKy,1), and the normalized components become the normal direction vector vHi(x,y) in Formula 1. That is, $LEN = ((dKx)^2 + (dKy)^2 + 1)^{0.5}$.

It should be noted that in Formula 1, when defining the normal direction vector vHi(x,y) (in Formula 1, this is not vector data but rather data regarding only the brightness information Ki, and thus Hi(x,y) is used), the normal direction vector in the section connecting a region with high brightness (luminance) and a region of low brightness (luminance) like shown in the left diagram of FIG. 10 becomes like the right diagram of FIG. 10. In this case, as schematically shown in the lower right diagram of FIG. 10, it is presumed that the region with high brightness is bulges outward toward the user. That is, the three-dimensional curve that is determined by this normal direction vector has a shape that is bulges outward in the direction toward the user.

The shadow enhanced image creation portion 14 receives the brightness information Ki(x,y), the normal direction vector vHi(x,y), and the edge amount EDGEi(x,y) due to the brightness, and creates an image with added/enhanced shadow. This processing is executed as shown in FIG. 9.

Figure 11:
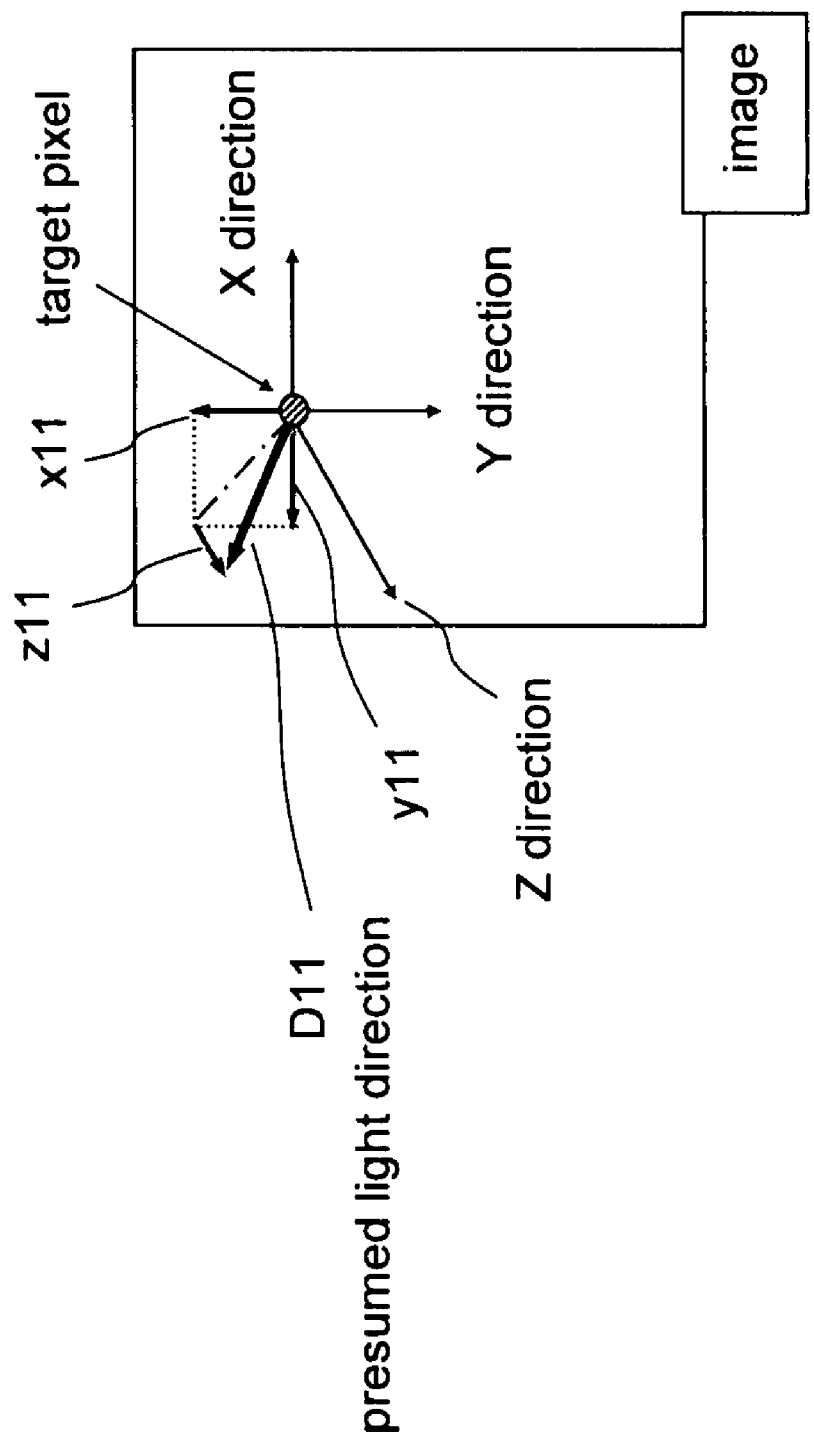
FIG. 11 schematically shows an overview of setting the light direction in the image processing method according to the first embodiment of the invention.

First, as shown in FIG. 11, a virtual light source (the virtual light source lies in the direction shown by D11 in FIG. 11) is assumed, and from there the light source direction vector vR1 (this corresponds to D11 in FIG. 11) on the image is determined. The aim here is the addition of shadow through the virtual light source. It should be noted that the light source direction vector vR1 is a vector obtained by synthesizing the x direction vector shown by x11, the y direction shown by y11, and the z direction vector shown by z11 in FIG. 11. That is, the light source direction vector vR1 is a three-dimensional vector whose x direction component is the component shown by x11, whose y direction component is the component shown by y11, and whose z direction component is the component shown by z11.

From visual psychology is has been shown that in general, people tend to strongly feel light from above (upper left). Accordingly, in the case shown in FIG. 11 as well, in order to add shadow due to a light source direction that is strongly felt by humans, a parallel light source light from the upper left is assumed and this is set as the light source direction vector vR1.

The brightness $dSKi(x,y)$ due to the illumination from the virtual light source from among the brightness information $Ki(x,y)$ of the current pixel (target pixel) $i(x,y)$ ($dSKi(x,y)$ shall be the brightness due to illumination from the virtual light source in the target pixel $i(x,y)$, from all the brightness information $Ki(x,y)$ of the target pixel $i(x,y)$) is estimated and extracted using an approximation model that approximates the brightness at the object curve in a case where a certain parallel light source has been set.

Here, if the brightness information $dSKi(x,y)$ due to the virtual light source direction vector vR1 that has been set is close to $Ki(x,y)$, then there is a high likelihood that the curve (object curve) (the normal direction vector) at the pixel $i(x,y)$ is pointing in the direction of the light source direction vector vR1, and thus it is unlikely to be necessary to add shadow.

However, if $dSKi(x,y)$ is much smaller than $Ki(x,y)$, then there is a high likelihood that the curve (object curve) (the normal direction vector) at the pixel $i(x,y)$ is pointing in a direction that is different from vR1, and thus there is an increased likelihood that it will be necessary to add shadow.

There are many possible methods and formulas that may serve as the approximation model, and for example it is possible to use the Phong model proposed by Phong, which is relatively simple and used often. In addition to this, it is also possible to adopt the model by Torrance and Sparrow or a model used in CG.

(2.2.2: Regarding a Case in which the Phong Model is Used)

FIG. 12 shows what components make up the brightness Ko of the pixel $i(x,y)$ for each pixel in a case where the model by Phong (hereinafter, called the Phong model) is used as the model for approximating the lighting.

First, in the Phong model, the brightness (luminance) of a particular point is approximated based on the diffuse reflection component, the mirror reflection component and the ambient light component.

When this is adopted in the calculation for the brightness $dSKi(x,y)$ at the pixel $i(x,y)$ due to the virtual light source of the invention, then, as shown in Formula 2, the approximation is expressed by the three components of the diffuse reflection component $dKoai(x,y)$, the mirror reflection component $dKobi(x,y)$, and the ambient light component $dKoci(x,y)$.

Formula 2

$$dSKi(x,y)=dKoai(x,y)+dKobi(x,y)+dKoci(x,y) \quad (2)$$

Each of the components in Formula 2 can be calculated from the angle $\alpha$ that is formed by the light source direction and the object surface normal (normal direction vector) or the object surface coefficient, for example.

Diffuse Reflection Component dKoa

Figure 13:
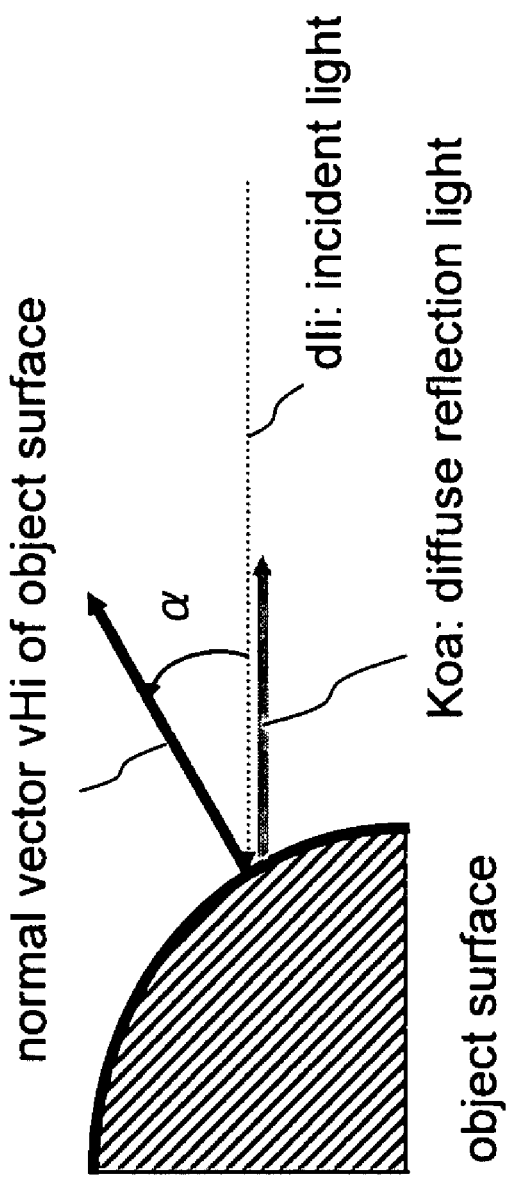
FIG. 13 schematically shows the diffuse reflection component in the light approximation model.

First, the diffuse reflection component dKoa is described using FIG. 13. If a is the angle that is formed by the light source direction vector vR1 (the vector in the direction opposite to the arrow dIi of FIG. 13) and the normal direction vector vHi of the object surface, then the diffuse reflection component dKoa is determined by $\cos \alpha$, which is the cosine of angle $\alpha$, and the object surface coefficient, for example. That is, in a case where a given light is incident on an object surface that lacks luster (that has tiny pits and bumps in its surface), the diffuse reflection component dKoa is the component that is defined by the assumption that the object diffusely reflects the light at the substantially the same strength in all directions. The diffuse reflection component dKoa is expressed in Formula 3 using $\cos \alpha$, the input luminance (brightness (luminance) due to the incident light) $dKi(x,y)$, and the diffusion coefficient ka of the object surface.

Formula 3

$$dKoai(x,y)=ka \times dKi(x,y) \times \cos \alpha \quad (3)$$

The diffuse reflection component dKoa (the diffuse reflection component of a target pixel $i(x,y)$ is $dKoai(x,y)$) has the property that it is brightest (the value of the diffuse reflection component dKoa is greatest) when the direction of the light source and the orientation of the normal of the surface match one another, and as either the light source direction (light source direction vector) or the normal (normal direction vector) of the object surface becomes larger (as angle $\alpha$ becomes larger) it becomes darker (the value of the diffuse reflection component dKoa becomes smaller). Here, the object coefficient ka is defined by a fixed value, and thus the diffuse reflection component dKoa is determined by $\cos \alpha$ and the incident brightness $dKi(x,y)$.

In this invention, the brightness $dKi(x,y)$ that is incident from the virtual light source is calculated as if the brightness information $Ki(x,y)$ has been input (incident). This is so as to extract the diffuse component dKoai that is calculated based on the direction from the virtual light source (that is, angle $\alpha$) in the brightness information $Ki(x,y)$ at the current point.

Mirror Reflection Component dKob

Figure 14:
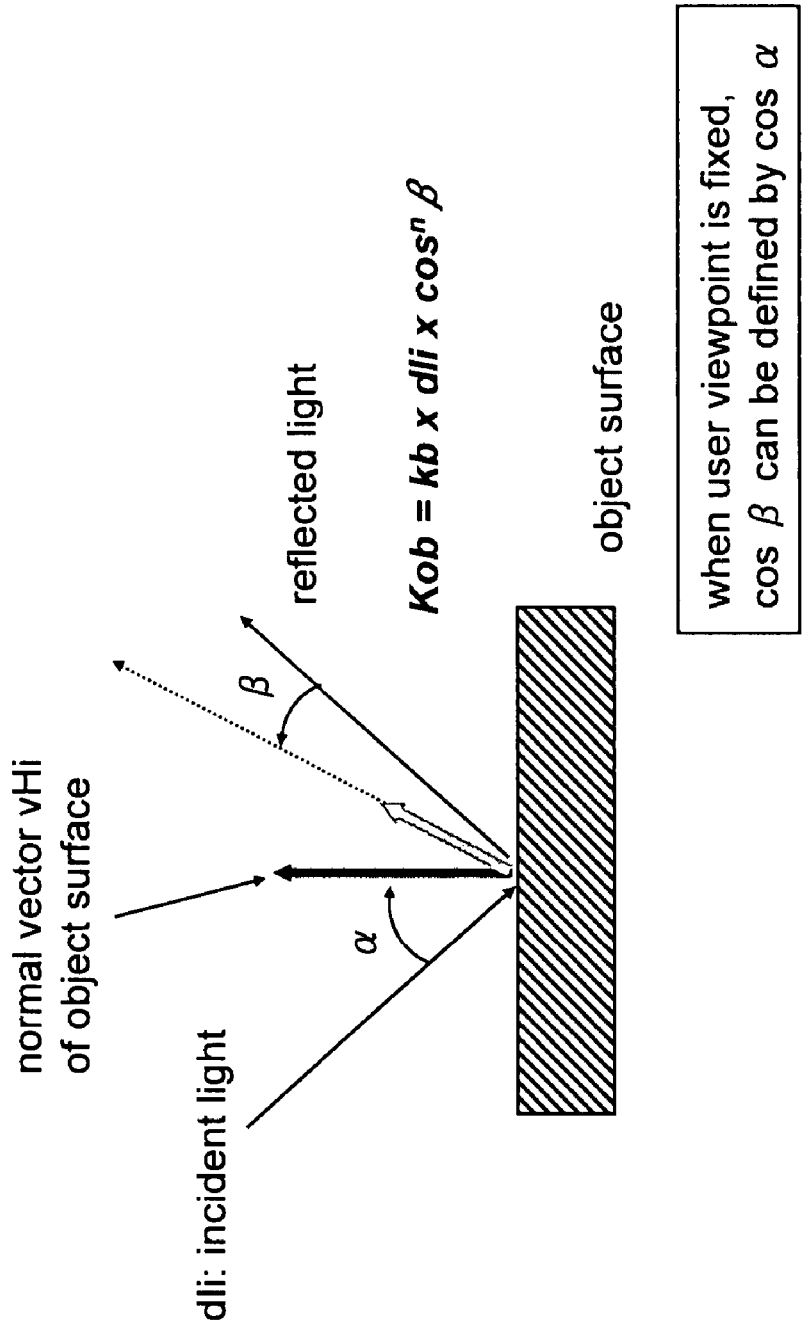
FIG. 14 schematically shows the mirror reflection component in the light approximation model.

Next, the mirror reflection component dKob is described using FIG. 14. The mirror reflection component dKob expresses the reflected light component that changes due to the quality of the surface of the object, and is the component that occurs due to the phenomenon of locally bright regions occurring when light strikes an object with a high reflectance, such as a mirror or a metal. That is, the mirror reflection component dKob indicates the reflection component in a specific direction that occurs when light strikes an object that has a uniform surface (mirror surface) that lacks pits and bumps.

The mirror reflection component dKob is determined by the object coefficient kb and the angle $\beta$ between the user line of sight and the direction of reflection, and is found by Formula 4. It should be noted that in Formula 4, n is a positive constant.

Formula 4

$$dKobi(x,y)=kb \times dKi(x,y) \times \cos^n \beta \quad (4)$$

However, in this invention, it is assumed that the user is observing from the direction perpendicular to the screen direction, and thus as $\cos \beta$ it is possible to use the cosine value $\cos \alpha$ of the angle $\alpha$ formed by the normal vector vHi of the object and the light source direction vector vR1 in order to find the mirror reflection component dKob. The object coefficient kb is defined as a fixed value. Thus, with Formula 4 the mirror reflection component dKob is determined by $\cos \alpha$ and the incident brightness $dKi(x,y)$. Here as well, the brightness $dKi(x,y)$ that is incident from the virtual light source is calculated as if the brightness information $Ki(x,y)$ has been input (incident). The mirror component dKobi of the current brightness information $Ki(x,y)$ that is calculated based on the direction from the virtual light source (that is, angle $\beta$) is extracted. It is clear from Formula 4 that the mirror reflection component dKob has the property of becoming extremely bright when the direction of the angle of reflection of the light and the line of sight match one another, and as the angle $\beta$ becomes smaller, the mirror reflection component dKob quickly declines.

Ambient Light Component dKoc

Figure 15:
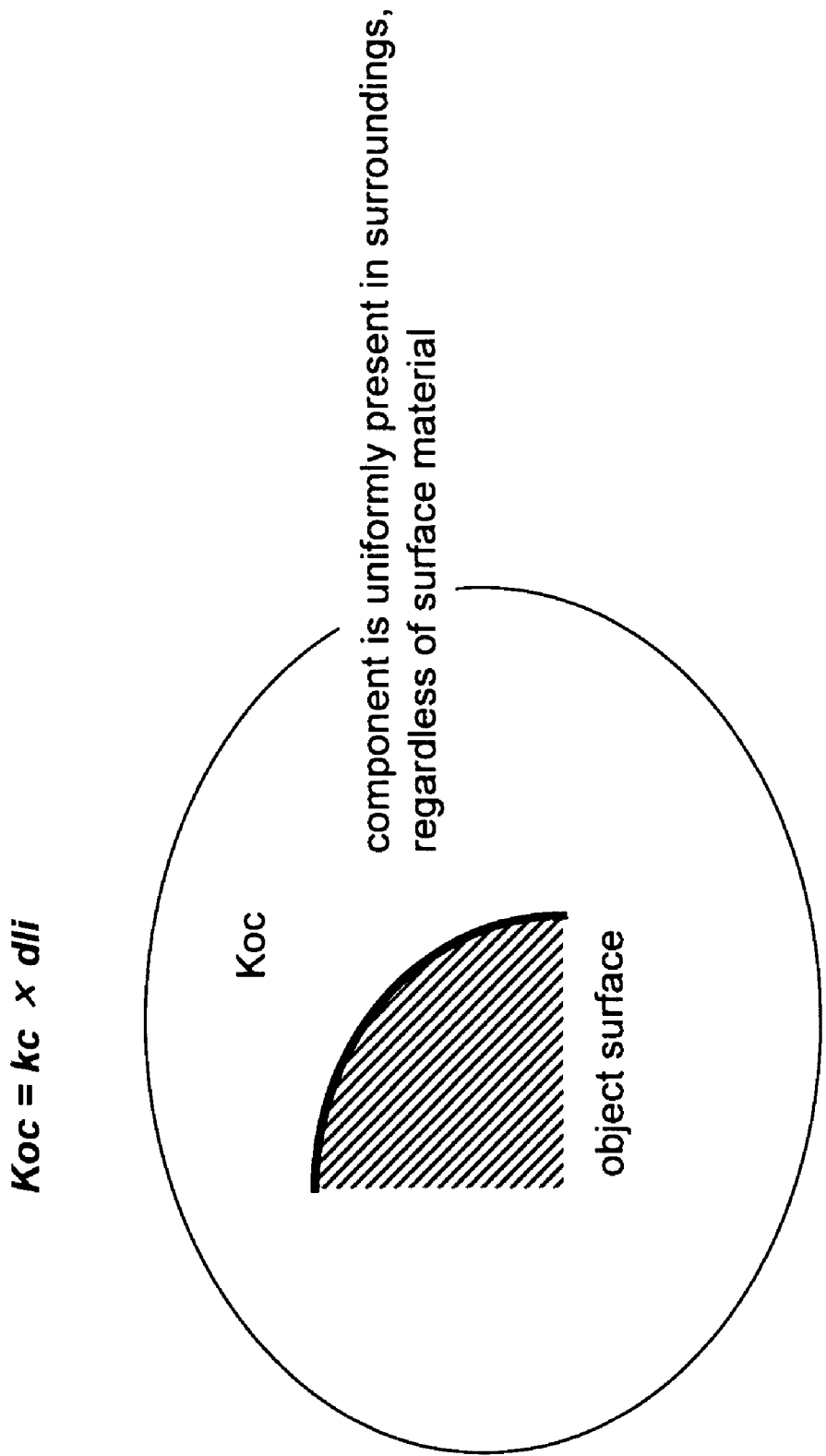
FIG. 15 schematically shows the ambient light component in the light approximation model.

Next, the ambient light component dKoc is described using FIG. 15. As shown in FIG. 15, the ambient light component dKoc corresponds to the surrounding light that gives a constant brightness to the entire image, and exists uniformly in the surroundings regardless of the surface material.

The ambient light component dKoci is expressed by Formula 5 using the surrounding coefficient kc and the input luminance (brightness (luminance) due to the incident light) dKi(x,y).

Formula 5

$$dKoci(x,y)=kc \times dKi(x,y) \quad (5)$$

It should be noted that aside from Formula 5, it is also possible to set the ambient light component dKoc to a fixed brightness. Here as well, like with the diffuse reflection component and the mirror reflection component, the brightness dKi(x,y) that is incident from the virtual light source is calculated as if the brightness information Ki(x,y) has been input (incident). Formula 5 is set so as to extract the ambient light component dKoci that is calculated based on the virtual light source dKi(x,y) in the brightness information Ki(x,y) at that point. It should be noted that in the case of a Phong model such as Formula 5, the ambient light component does not depend on the angle α that is formed with the virtual light source. However, as the ambient light component, it is also possible to consider the amount of fluctuation due to the angle α formed with the virtual light source.

Thus, in a case where the surface coefficient on the object, for example, is a fixed value, the strength of the brightness information Ki(x,y) of the target pixel i(x,y) based on the Phong model can be determined by the cosine cos α of the angle α formed by the normal direction vector of the object surface and the vector in the light source direction (the light source direction vector). It should be noted that in FIG. 9, it is sufficient for the "correlation CoA" to show the relation between the light source direction vector and the normal direction vector, and the cosine value cos α is one example thereof.

By substituting the above values into the Formula 2, the image processing device 200 finds the brightness information dSKi(x,y) due to the virtual light source direction vector vR1 that has been estimated from the current brightness information Ki(x,y).

Then, the image processing device 200 synthesizes the dSKi(x,y) and the input brightness Ki(x,y) to create an image vSOi(x,y) with enhanced shadow portions while retaining the light distribution of the input image.

However, the dSKi(x,y) that is found by the above processing is nothing more than an indication of the contribution to the current input brightness information Ki of the light that comes from a direction that feels strong to humans (contribution amount). That is to say, dSKi(x,y) has the characteristics shown in (1) and (2) below.

(1) Pixels with a large angle α formed by the normal direction vector and light source direction vector are treated as pixels on which light due to the virtual light source is not incident, the brightness dSKi(x,y) due to the virtual light source becomes much smaller than the brightness information Ki(x,y) that has been input (shadow enhancement).

(2) Pixels with a small angle α formed by the normal direction vector and light source direction vector are treated as pixels in which light due to the virtual light source is close to the actual lighting distribution, and the brightness dSKi(x, y) due to the virtual light source is a value that is smaller than the brightness information Ki(x,y) that has been input but is somewhat close to the brightness information Ki(x,y) that has been input.

Thus, dSKi(x,y) tends to fall below (take a smaller value) the brightness information Ki(x,y) of the original input image.

Accordingly, the image processing device 200 synthesizes these two (the dSKi(x,y) and the input brightness Ki(x,y)) to enhance shadow while retaining the light distribution of the input image.

Regarding Control of the Coupling Coefficient wks

There are many methods for controlling the coupling coefficient wks ($0.0 \leq wks \leq 1.0$) relating to the brightness information dSKi(x,y) of the pixel i(x,y) that has been extracted based on the virtual light source. Some methods for controlling the coupling coefficient wks are described below.

(S-1) wks is monotonically decreased with respect to the brightness information Ki(x,y) and is monotonically increased with respect to the edge information EDGEi(x,y).

By doing this, shadow enhancement in border sections with low luminance in the image can be performed appropriately, and there is less enhancement of sections that are not originally a shadow.

(S-2) wks is monotonically decreased with respect to the absolute value of the cosine value cos α of the angle α that is formed by the normal direction vector and the light source direction vector and is monotonically increased with respect to the edge information EDGEi(x,y). cos α is a value that shows the correlation between the normal direction vector and the light source direction vector, and when this value is small, it is likely that there is a three-dimensional surface (three-dimensional curved surface) that light from the virtual light source does not strike. Thus, by controlling wks in this way, it is possible to enhance shadows in portions of the border that the light of the virtual light source does not strike, and it is possible to add and enhance shadow in the area that corresponds to the shadow of the assumed three-dimensional curved surface (the three-dimensional curved surface that is determined by the normal direction vector).

(S-3) wks is monotonically decreased with respect to the absolute value of the cosine value cos α of the angle α that is formed by the normal direction vector and the light source direction vector and is monotonically increased with respect to the edge information EDGEi(x,y). It is also monotonically decreased with respect to the brightness information Ki(x,y).

By doing this, there is a three-dimensional surface (three-dimensional curved surface) that light from the virtual light source does not strike, and it is possible to enhance shadow in border portions that originally have a low brightness (low luminance). By controlling wks in this way, it is possible to add and enhance shadow in the portions that correspond to shadow on the assumed three-dimensional curved surface and that originally are dark regions (regions of low luminance).

Here, the example of (S-1) is adopted, but other methods may also be used. When the method of (S-1) is adopted, the brightness information SKi(x,y) after shadow enhancement is found by Formula 6.

Formula 6

$$SKi(x,y)=Ki(x,y) \times (1.0-wks \times SSt)+dSKi(x,y) \times wks \times SSt \quad (6)$$

In Formula 6, SSt is the shadow enhancement strength parameter, and can be a predetermined constant or a value that has been specified by the user.

Figure 16B:
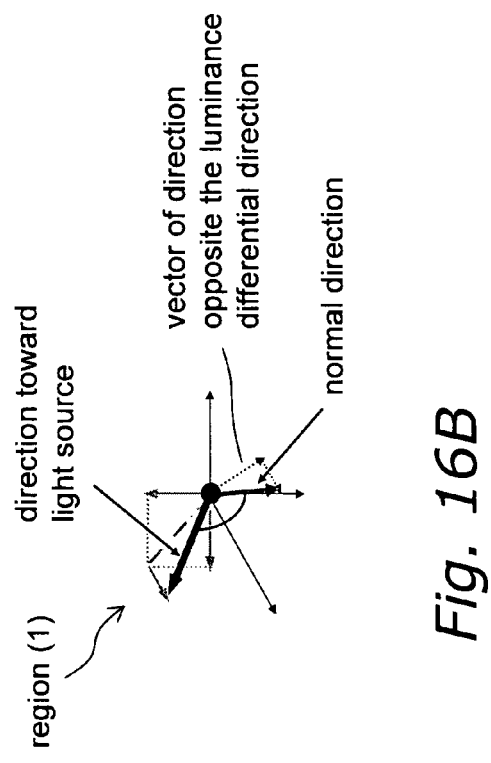
FIG. 16 shows an overview of the effect of shadow enhancement in the image processing method according to the second embodiment of the invention.
Figure 16C:
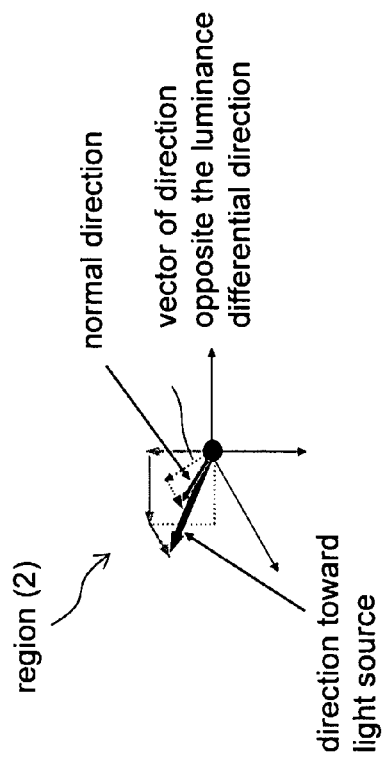
Figure 16A:
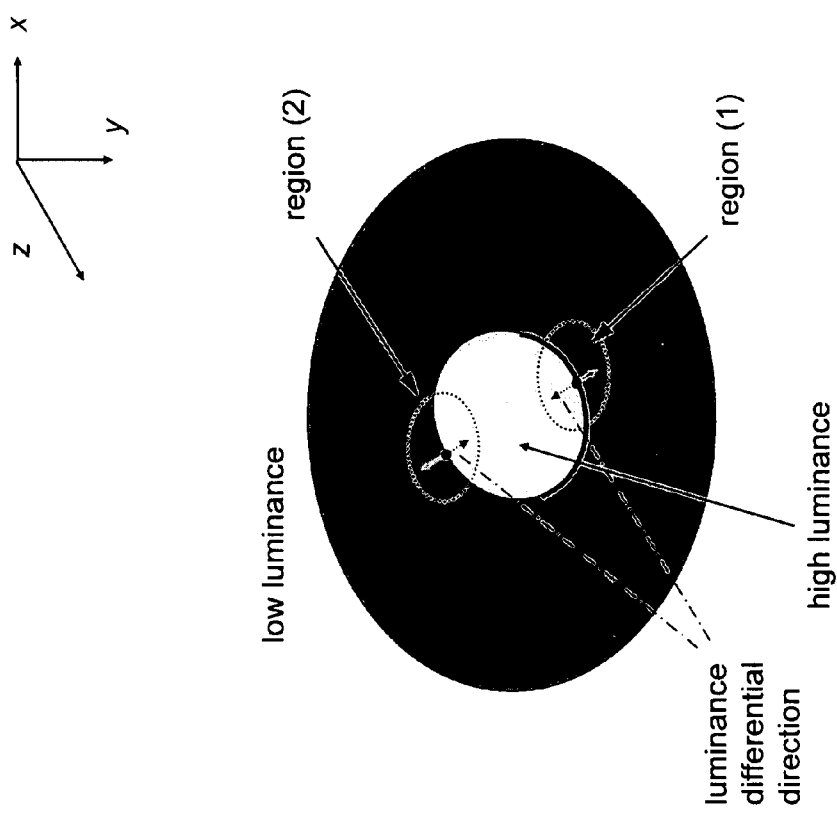
Figure 17B:
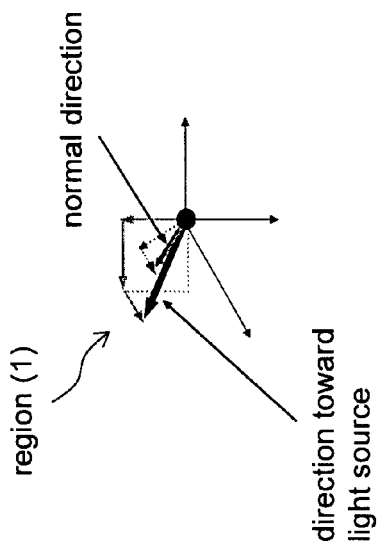
FIG. 17 shows an overview of a separate effect of shadow enhancement through the image processing method according to a second embodiment of the invention.

FIGS. 16 and 17 schematically show the results of this processing. Here, for the sake of simplifying the description, only the result with regard to the brightness is shown.

FIG. 16 shows a case in which the brightness of the center circle is higher than the brightness of the surrounding circle. FIG. 16 is an example in which a virtual light source that irradiates light from the upper left has been set.

In a region (1) at the lower right of the center circle in FIG. 16A, the light source direction and the normal direction are different. In this region (1), the light source direction vector vR1 and the normal direction vector vHi become significantly different (the angle formed by them becomes large) as shown in FIG. 16B, and thus a drop in luminance occurs at the border portion of the low brightness circle (the border portion on the low brightness side (dark side)) that is in contact with the high brightness circle in region (1), and shadow enhancement is executed.

In contrast to this, a region (2) in the upper left of the center circle in FIG. 16A has a light source direction and a normal direction that substantially match one another. In the region (2), as shown in FIG. 16C, the light source direction vector vR1 and the normal direction vector vHi approach the direction in which they match, and thus the drop in brightness (luminance) becomes smaller and the shadow enhancement also is small.

FIG. 17 shows a case in which the brightness of the center circle is lower than the brightness of the surrounding circle. FIG. 17 is an example in which a virtual light source that irradiates light from the upper left has been set.

Figure 17C:
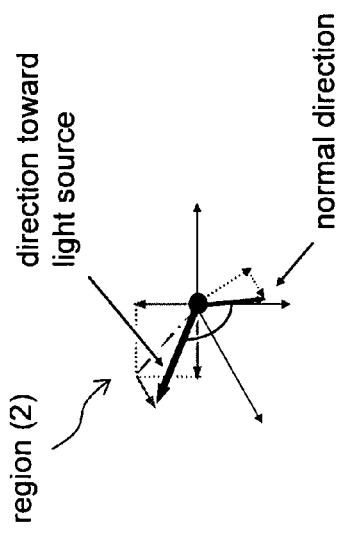
Figure 17A:
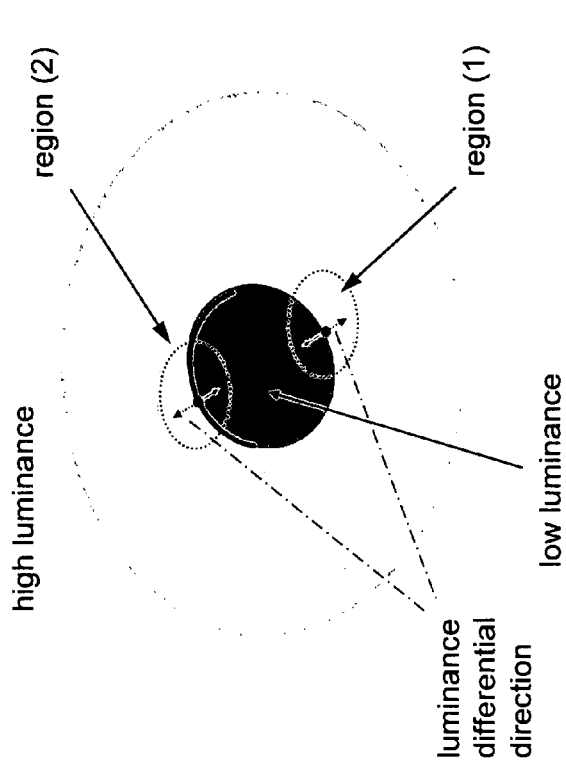

In the region (1) at the lower right of the center circle in FIG. 17A, the light source direction that has been set and the normal direction that has been calculated substantially match (the angle formed by the light source direction vector and the normal direction vector is small). Thus, in this region (1), as shown in FIG. 17 the light source direction vector vR1 and the normal direction vector vHi approach the direction in which they are matching (the angle formed by them is small), and thus the brightness drop in region (1) is small and the shadow enhancement also is small.

In contrast, in the region (2) at the upper left of the center circle in FIG. 17A, the light source direction that has been set and the normal direction that has been calculated are different (the angle formed by the light source direction vector and the normal direction vector is large). Thus, in this region (2), as shown in FIG. 17C, because the light source direction vector vR1 and the normal direction vector vHi are significantly different (the angle formed by the light source direction vector and the normal direction vector is large), a drop in luminance occurs at the border portion of the low brightness circle (on the low brightness side (dark side)) of region (2), and shadow enhancement is executed.

A chroma component calculation portion 48 finds the chroma information SCri(x,y) and SCbi(x,y) after shadow enhancement from the brightness information SKi(x,y) after shadow enhancement that has been obtained and the brightness information Ki(x,y) of the input image vIi(x,y).

Here also there are many methods. For example, there is the method of retaining the chroma of the input image in the manner of SCri(x,y)=Cri(x,y) and SCbi(x,y)=Cbi(x,y).

Next, the chroma improvement ratio RatioCrCb that is multiplied with the chroma Cri(x,y) and Cbi(x,y) of the input image vIi(x,y) is found as shown in FIG. 18 based on the ratio Ratio=SKi(x,y)/(Ki(x,y) (brightness improvement ratio) between the brightness information SKi(x,y) after shadow enhancement that has been obtained and the brightness information Ki(x,y) of the input image.

FIG. 18 is a schematic view relating to an example of the control of the chroma component calculation portion 48 in the image processing device 200.

Figures 18A, 18B:
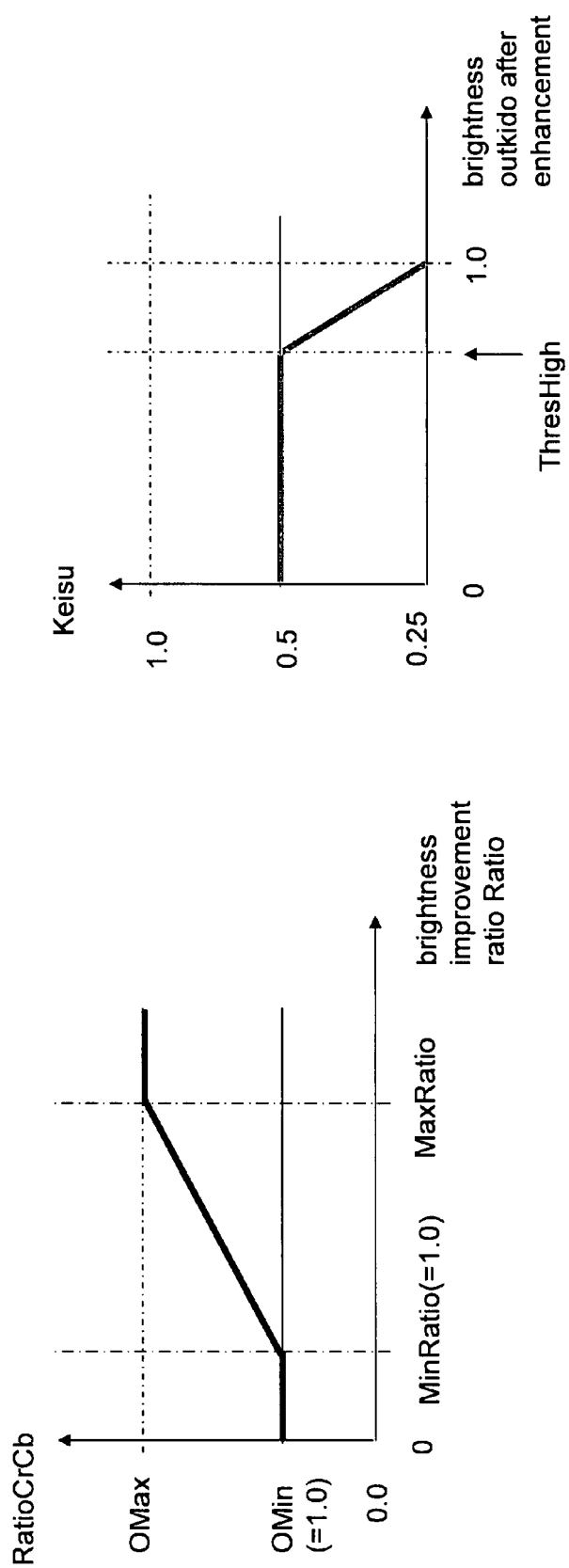
FIG. 18 is a schematic representation regarding an example of control of the chroma component calculation portion in the image processing device according to the second embodiment of the invention.

FIG. 18A shows an example (a chroma control function example) of control of the chroma ratio with respect to the ratio Ratio between the brightness information SKi(x,y) after shadow enhancement and the brightness information Ki(x,y) of the input image, in which the horizontal axis corresponds to the ratio Ratio between the brightness information SKi(x,y) after shadow enhancement and the brightness information Ki(x,y) of the input image, and the vertical axis corresponds to the chroma ratio that is obtained. The characteristic that is exhibited by FIG. 18A is defined by Formula 7.

FIG. 18B shows an example of control of the slope coefficient Keisu in the chroma control function with the brightness information Ski(x,y) after shadow enhancement (=outkido). This can be defined as in Formula 8.

It should be noted that outkido in FIG. 18 and Formulas 7 and 8 is:

outkido=Ski

Each of MinRatio, MaxRatio, OMin, OMax, and ThresHigh is a predetermined positive constant, and ordinarily MinRatio=1.0 and OMin=1.0. Further, ThresHigh<1.0.

It should be noted that in these formulas it is assumed that the brightness information is $0 \leqq Ki \leqq 1.0$.

Formula 7

$$RatioCrCb = \begin{pmatrix} O\text{Min Ratio} < \text{Min}Ratio \\ (\text{Ratio} - \text{Min}Ratio) \times Keisu + O\text{Min others} \\ O\text{Max Ratio} > \text{Max}Ratio \end{pmatrix} \quad (7)$$

Formula 8

$$Keisu = \begin{pmatrix} 0.5 \ outkido < ThresHigh \\ -0.5/(1.0 - ThresHigh) \times (outkido - ThresHigh) + 0.5 \ others \end{pmatrix} \quad (8)$$

The processing of multiplying the chroma ratio RatioCrCb that is obtained in FIG. 18 and by Formula 7 and Formula 8 with the chroma Cri(x,y) and Cbi(x,y) of the target pixel i(x,y) of the input image in order to find the chroma information SCri(x,y) and SCbi(x,y) after shadow enhancement is executed by the chroma component calculation portion 48. Thus, with the image processing device 200, it is possible to have the effect of suppressing over-improvement by keeping down the strength of the chroma improvement ratio with respect to the brightness improvement ratio Ratio.

Further, the image processing device 200 has the effect of inhibiting the phenomenon of saturation on the highlighted side (in the high luminance component) by inhibiting the slope coefficient Keisu the more that the improved brightness information Ski is highlighted (becomes a high brightness (high luminance)) as in Formula 8.

Lastly, the output portion 15 transforms the shadow enhanced image vSOi=(SKi(x,y), SCbi(x,y), SCri(x,y)) of each pixel i(x,y) that has been obtained with the shadow enhanced image creation portion 14 in accordance with an image format that can be handled by the device being used and outputs the resulting processed image data.

Thus, with the image processing device 200 it is possible to add shadow to and enhance shadow in a predetermined region by creating a shadow enhanced image without estimating the distribution of the lighting in the image and without having a significant impact on the distribution of the lighting in the image, and it is also possible to achieve an increase in the feeling of depth of the image with a simple configuration.

Third Embodiment

Using FIGS. 19 through 24, the third embodiment of the invention is described with regard to an image processing method and an image processing device 300 that achieve an increase in the feeling of depth of an image through the addition of light.

Figure 19:
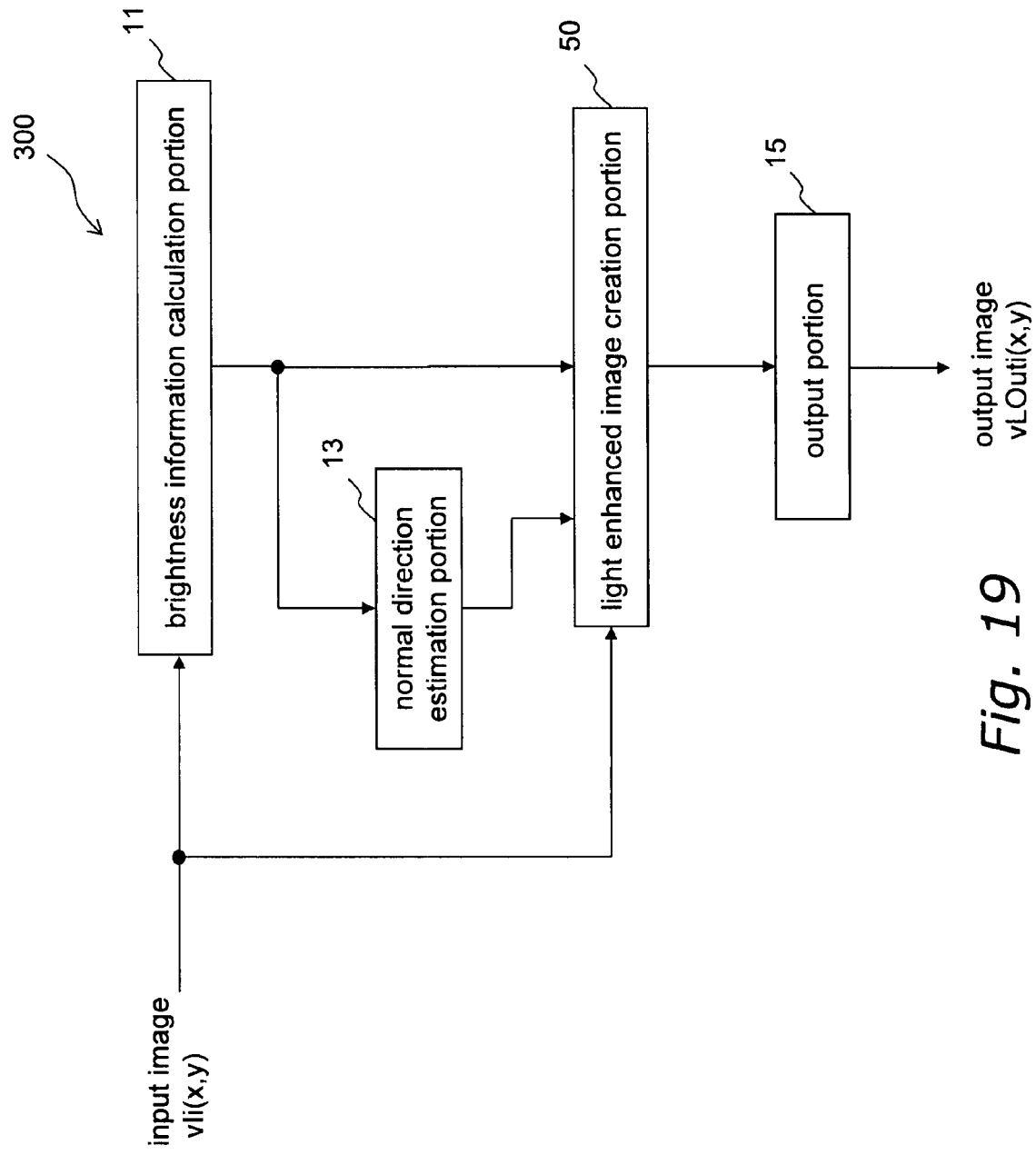
FIG. 19 is a block diagram that shows the configuration of the image processing device according to a third embodiment of the invention.
Figure 20:
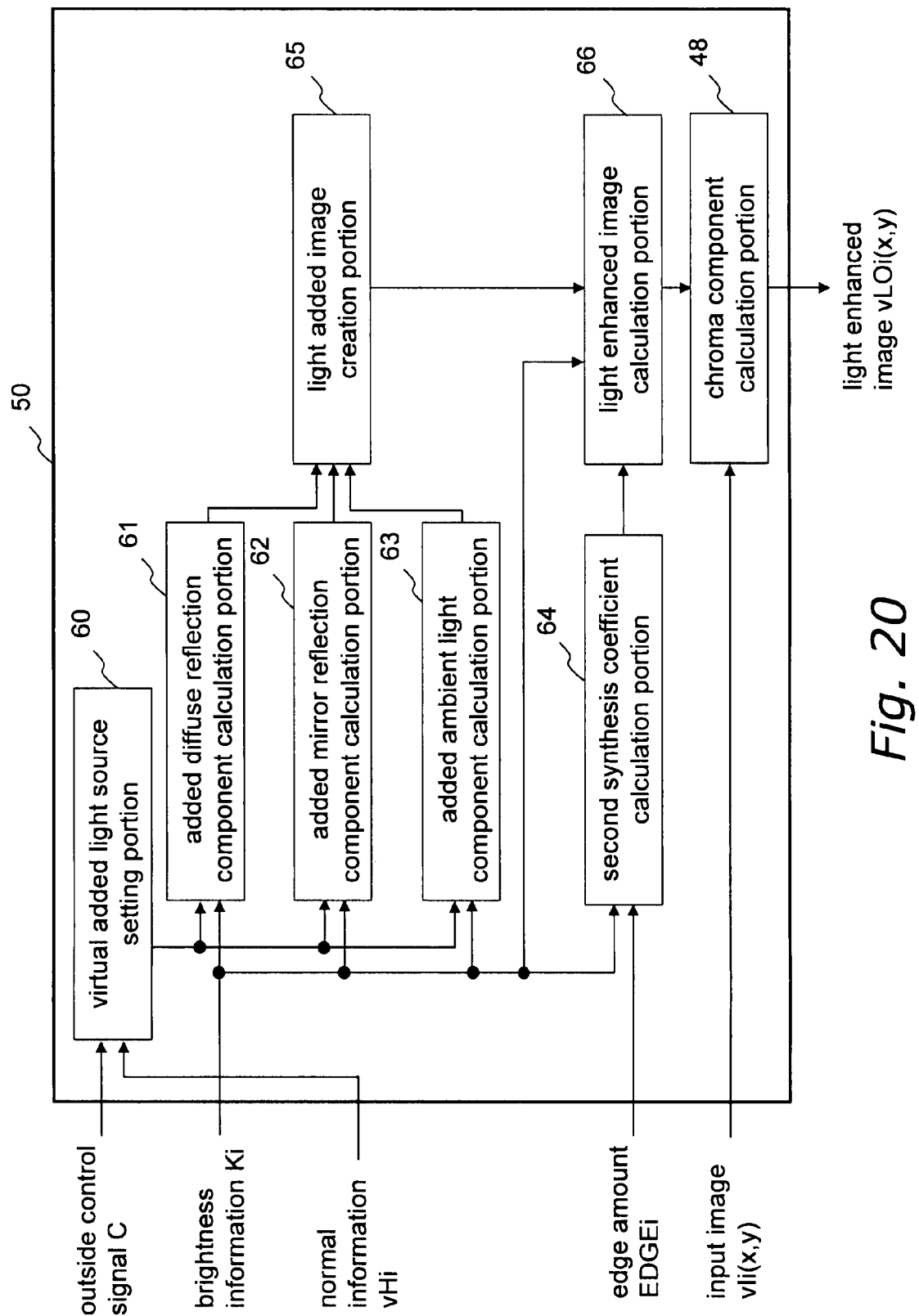
FIG. 20 is a block diagram that shows the configuration of the light enhanced image creation portion in the image processing device according to the third embodiment of the invention.

FIG. 19 shows the configuration of an image processing device 300 according to this embodiment. FIG. 20 shows the configuration of a light enhanced image creation portion 50 in the image processing device 300.

Figure 21:
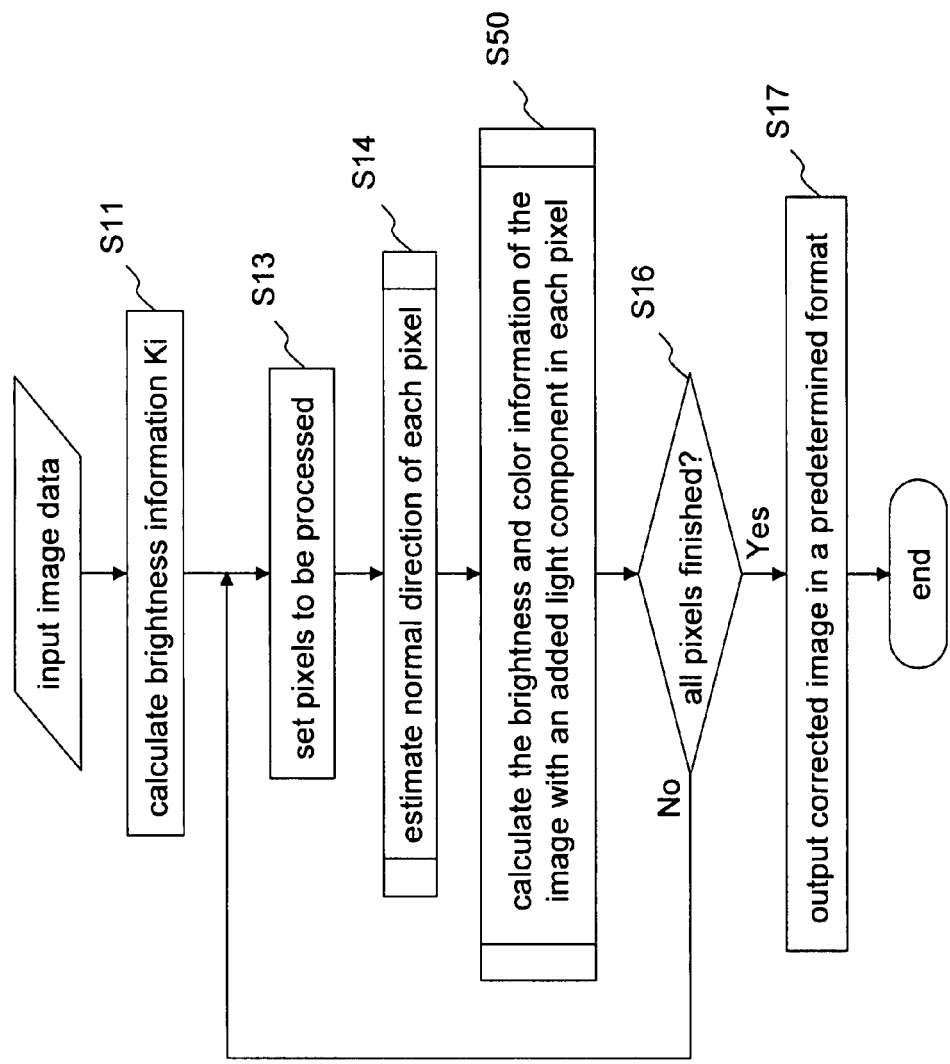
FIG. 21 is a process flowchart of the image processing method according to the third embodiment of the invention.
Figure 22:
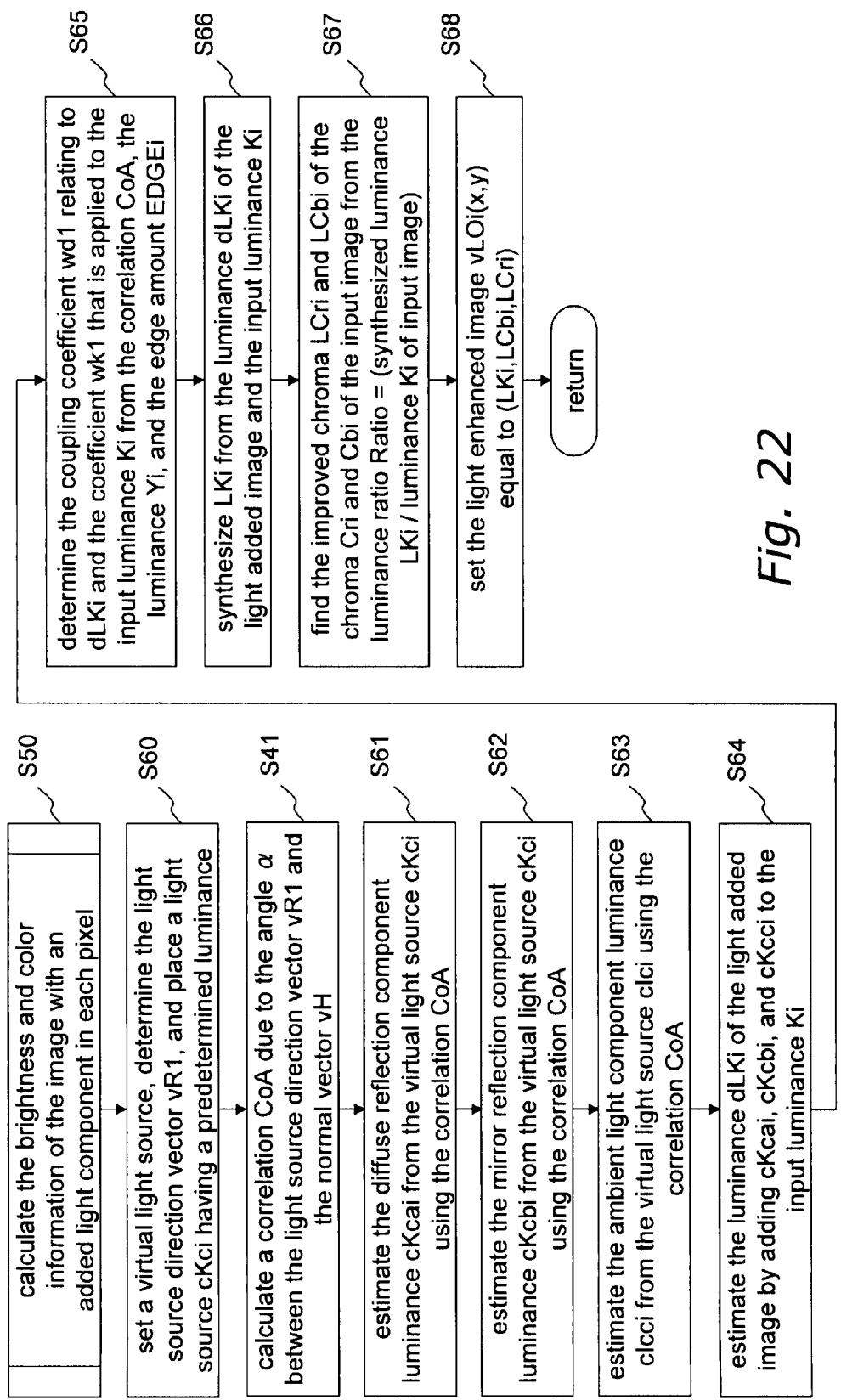
FIG. 22 is a flowchart of the light enhanced image creation process in the image processing method according to the third embodiment of the invention.

FIG. 21 shows a process flowchart of the image processing method according to this embodiment. FIG. 22 shows a process flowchart of the light enhanced image creation step.

The invention is a device for correcting color information within an image by processing the image data, and for example can be installed in image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

<3.1: Configuration of the Image Processing Device>

The image processing device 300 according to the third embodiment has the same configuration as the image processing device 200 according to the second embodiment, except that the shadow enhanced image creation portion 14 of the image processing device 200 has been substituted with the light enhanced image creation portion 50.

It should be noted that in the image processing device 300 according to this embodiment, sections that are the same as those of the previous embodiments are assigned the same reference numerals as before and are not described.

The light enhanced image creation portion 50 adds light to and enhances light in the input image (signal) vIi(x,y) based on the brightness information Ki(x,y), the normal direction vector vHi(x,y), and the edge amount EDGEi(x,y) due to the brightness, creating a light enhanced image vLOi(x,y), and outputs this to the output portion 15. It should be noted that if a Phong model is used, then the light enhanced image creation portion 50 is configured as shown in FIG. 20.

<3.2: Operation of the Image Processing Device>

An overview of the processing in the image processing device 300 is described with reference to the process flowcharts of FIG. 21 and FIG. 22.

First, image data having the pixel value vIi(x,y) at a pixel i(x,y) are input to the image processing device 300. Here, (x,y) indicates the (horizontal pixel position, vertical pixel position) of a pixel i. The lower case v in front of the variable indicates a vector.

The processing of the brightness information calculation portion 11 and the normal direction estimation portion 13 is the same as in the previous embodiment, and thus will not be described.

The light enhanced image creation portion 50 receives the brightness information Ki(x,y), the normal direction vector vHi(x,y), and the edge amount EDGEi(x,y) due to the brightness, and creates an image with added and enhanced light. This processing is executed as shown in FIG. 21.

First, like in the previous embodiment, a virtual light source is assumed, and the light source direction vector vR1 from there to the image is determined. Then, a weak virtual light component cKci(x,y) from that direction is assumed, with the aim of adding light due to that virtual light-added component. It should be noted that like in the previous embodiments, the virtual light component is assumed to be due to a parallel light source light from the upper left, and is set as the light source direction vector vR1. That is, it is presumed that there is a virtual light source that is upper left with respect to the screen.

At this time, there are many possible methods for setting the brightness information cKci(x,y) of the light component, and here this is set by multiplying the brightness information Ki(x,y) of the input pixel i(x,y) with a predetermined light addition coefficient AddLight. By doing this, it is possible to suppress the addition of brightness to that pixel i other than the brightness information Ki of the target pixel i(x,y), and leads to the inhibition of brightness saturation. It should be noted that the light addition coefficient AddLight may be a positive constant that has been readied in advance, or it may be a value that has been set by user input.

First, the light-added image when the virtual light component cKci(x,y)=AddLight×Ki(x,y) is created. At this time, like in the previous embodiments, a Phong model is used. In addition to this, there is also the model by Torrance and Sparrow and models used in CG, and it is also possible to adopt these.

The brightness information dLKi(x,y) of the light component that is added to the pixel i(x,y) due to the virtual light source component cKci(x,y) is expressed by an added diffuse reflection component cKcai(x,y), an added mirror reflection component cKcbi(x,y), an added ambient light component cKcci(x,y) and the brightness information Ki(x,y) of the input image as shown in Formula 9.

Formula 9

$$dLKi(x,y)=cKcai(x,y)+cKcbi(x,y)+cKcci(x,y)+Ki(x,y) \quad (9)$$

The added diffuse reflection component cKcai(x,y), the added mirror reflection component cKcbi(x,y), and the added ambient light component cKcci(x,y) can be found by Formula 3, Formula 4, and Formula 5, respectively, by setting dKi(x,y)=cKci(x,y). This processing is executed by an added diffuse reflection component calculation portion 61, an added mirror reflection component calculation portion 62, and an added ambient light component calculation portion 63, shown in FIG. 20.

A light added image creation portion 65 finds the brightness information dLKi(x,y) of the light added image based on the virtual light component cKci 'x,y) in the pixel i(x,y) using Formula 9.

Then, an image vLOi(x,y) with an enhanced light component is created by synthesizing dLKi(x,y) and the input brightness Ki(x,y) while retaining the distribution of the light in the input image. With the image processing device 300, by performing this processing a weak virtual light component that comes from a direction that is strongly felt by humans can be added to produce a fuller impression and create a light-enhanced image.

The brightness information dLKi(x,y) has the characteristics shown in (1) and (2) below.

(1) Light due to the virtual light source component cKci does not come to pixels with a large angle α formed by the normal direction vector and the light source direction vector, and thus in these pixels the brightness dLKi(x,y) is substantially identical to the input brightness Ki(x,y) and the amount of light added is small.

(2) Light due to the virtual light source component cKci arrives at pixels i(x,y) with a small angle α formed by the normal direction vector and the light source direction vector. Thus, in these pixels the brightness dLKi(x,y) is slightly higher than the brightness Ki(x,y) that has been input, and the pixels become light enhanced.

Because the brightness information dLKi(x,y) has these characteristics, it tends to rise above the brightness Ki(x,y) of the original input image. Accordingly, by synthesizing these two (dLKi(x,y) and the input brightness Ki(x,y)), light enhancement is performing while maintaining the brightness of the input image to a certain degree.

Regarding Control of the Coupling Coefficient wk1

There are many methods for controlling the coupling coefficient wk1 ($0.0 \leq wk1 \leq 1.0$) relating to the brightness information dLKi(x,y) of the pixel i(x,y) that has been extracted based on the virtual light source. The method for controlling the coupling coefficient wk1 is described below.

(L-1) wk1 is monotonically increased with respect to the brightness information Ki(x,y) and is monotonically increased with respect to the edge information EDGEi (x,y).

By doing this, light enhancement can be performed in high luminance border portions, and there is less enhancement of portions not originally light.

(L-2) wk1 is monotonically increased with respect to the absolute value of the cosine value cos α of the angle α that is formed by the normal direction vector and the light source direction vector and is monotonically increased with respect to the edge information EDGEi(x,y). cos α is a value that shows the correlation between the normal direction vector and the light source direction vector, and when this value is large, it is likely that there is a three-dimensional surface (three-dimensional curved surface) that light from the virtual light source strikes sufficiently. Thus, by controlling wk1 in this way, it is possible to enhance light at the border in portions that are struck by the light of the virtual light source.

(L-3) wk1 is monotonically increased with respect to the absolute value of the cosine value cos α of the angle α that is formed by the normal direction vector and the light source direction vector, and is monotonically decreased with respect to the edge information EDGEi(x,y). By dong this, it is possible to enhance light in flat portions such as those that are sufficiently struck by the light from the virtual light source.

(L-4) wk1 is monotonically increased with respect to the absolute value of the cosine value cos α of the angle α that is formed by the normal direction vector and the light source direction vector, and is monotonically decreased with respect to the edge information EDGEi(x,y). It is also monotonically increased with respect to the brightness information Ki(x,y). By doing this, there is a three-dimensional surface (three-dimensional curved surface) that is sufficiently struck by light from the virtual light source, and it is possible to enhance light in flat portions that originally have a high brightness (high luminance flat portions). That is, these are portions that correspond to the flat portion on a presumed curved surface (three-dimensional curved surface that is determined by the normal direction vector), and by adding light to and enhancing light in an originally bright region (high luminance region), it is possible to make this region have an impression.

Here, the example of (L-1) is adopted, but other methods may be used also. If the method of (L-1) is adopted, then the brightness LKi(x,y) after light enhancement is found by Formula 10.

Formula 10

$$LKi(x,y)=Ki(x,y)\times(1.0-wk1\times LSt)+dLKi(x,y)\times wk1\times LSt \quad (10)$$

In Formula 10, LSt is the light enhancement strength parameter, and can be a predetermined constant or a value that has been specified by the user.

FIGS. 23 and 24 schematically show the results of this processing.

FIG. 23 shows the tendency of the processed image with respect to the result example 1 that is schematically shown in the second embodiment. This drawing is an example in which a virtual light source that irradiates light from the upper left has been set.

FIG. 23 shows a case in which the brightness of the center circle is higher than the surroundings.

Figure 23B:
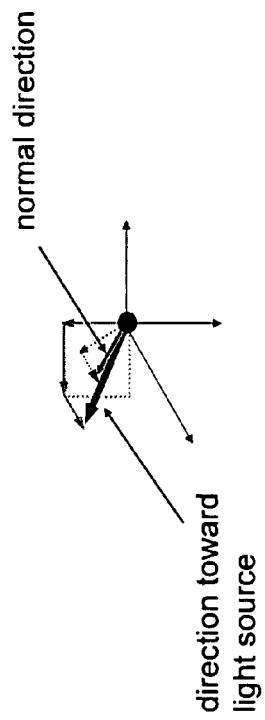
FIG. 23 schematically shows the effect of light enhancement in the image processing method according to the third embodiment of the invention.
Figure 23C:
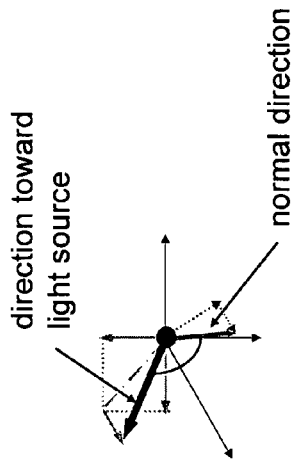
Figure 23A:
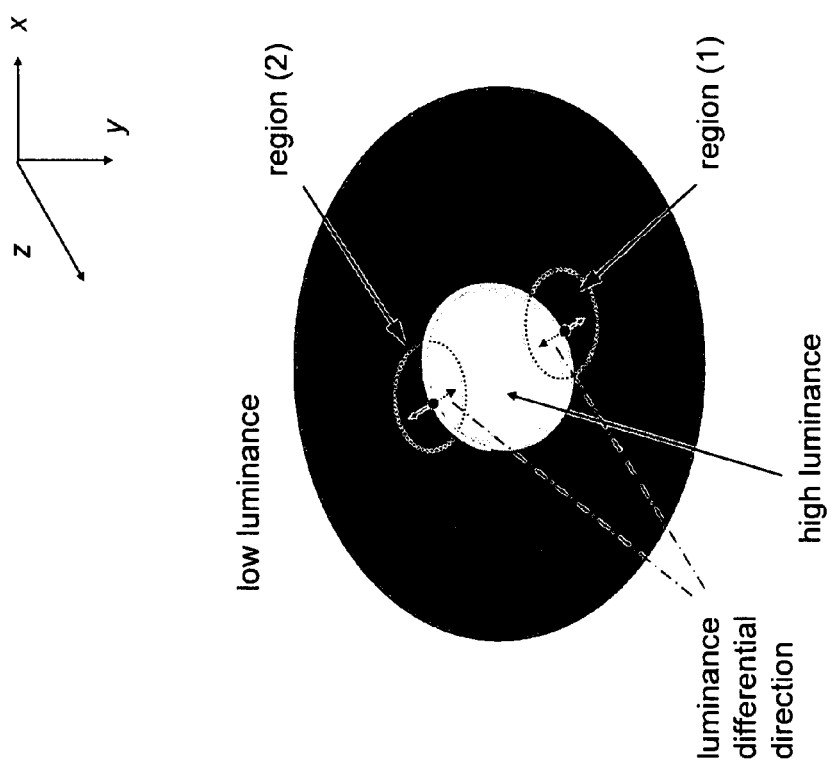

As shown in FIG. 23A, in the region (1) on the lower right of the center circle, the light source direction that has been set and the normal direction that has been calculated are different. Thus, in region (1), as shown in FIG. 23B, there is a large difference between the light source direction vector vR1 and the normal direction vector vHi (the angle that is formed is large), and thus the light added by the virtual light component cKci(x,y) becomes small and the light enhancement is small.

In contrast to this, as shown in FIG. 23A, a region (2) in the upper left of the center circle has a light source direction that has been set and a normal direction that has been calculated are substantially matching (the angle formed by the light source direction vector and the normal direction vector is small). Thus, as shown in FIG. 23C, in the region (2) the light source direction vector vR1 and the normal direction vector vHi approach the direction in which they match, and thus the addition of light is executed at the border portion of the bright circle in the center (the high brightness side (bright side)), raising the brightness of the border portion and thereby carrying out light enhancement.

Figure 24B:
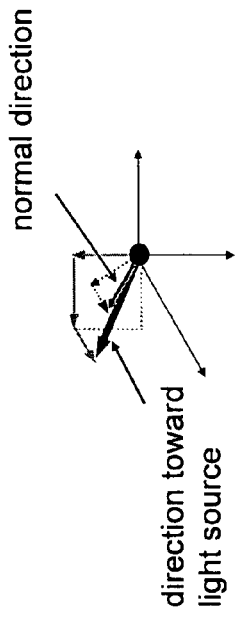
FIG. 24 schematically shows the effect of light enhancement in the image processing method according to the third embodiment of the invention.
Figure 24C:
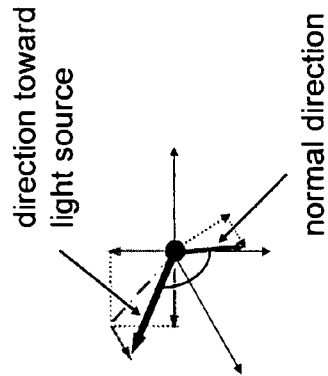
Figure 24A:
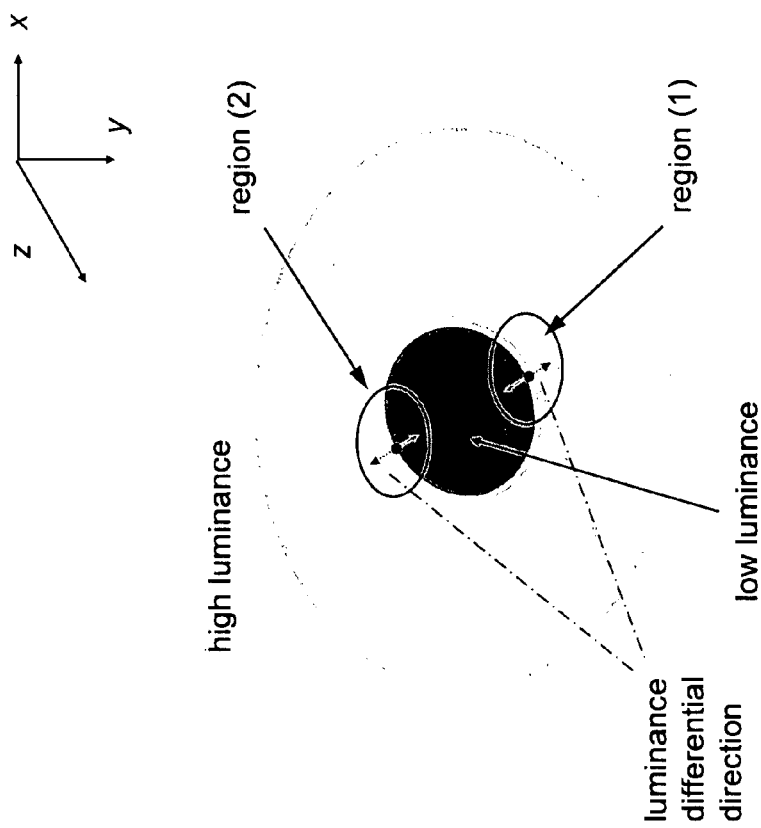

FIG. 24 shows a case in which the brightness of the center circle is lower than the brightness of the surrounding circle. Here also, this is an example in which a virtual light source that irradiates light from the upper left has been set. In the region (1) at the lower right of the center circle in FIG. 24A, there is little deviation between the light source direction that has been set and the normal direction that has been calculated (the angle formed by the light source direction vector and the normal direction vector is small). Thus, the light source direction vector vR1 and the normal direction vector vHi approach the direction in which they are matching as shown in FIG. 24B, and thus in this region (1), the addition of light is executed at the border portion of the bright circle that is in contact with the low luminance circle in the center (the high brightness side (bright side)), raising the brightness of the border portion and thereby carrying out light enhancement.

In contrast, in the region (2) at the upper left of the center circle in FIG. 24, the light source direction that has been set and the normal direction that has been calculated tend to be different (the angle formed by the light source direction vector and the normal direction vector is large). Thus, as shown in FIG. 24C, the light source direction vector vR1 and the normal direction vector vHi are significantly different (the angle formed by the light source direction vector and the normal direction vector is large), and thus in region (2) the addition of light is small and light enhancement also is small.

The chroma component calculation portion 48 finds the chroma information LCri(x,y) and LCbi(x,y) after light enhancement from the brightness information LKi(x,y) after light enhancement that has been obtained and the brightness information Ki(x,y) of the input image vIi(x,y). This is the same as in the previous embodiment.

Lastly, the output portion 15 transforms the light enhanced image vLOi=(LKi(x,y), LCbi(x,y), LCri(x,y)) of each pixel i(x,y) that has been obtained with the light enhanced image creation portion 50 in accordance with an image format that can be handled by the device being used and outputs the resulting processed image data.

Thus, with the image processing device 300, it is possible to add light to and enhance light in a predetermined region by creating a light enhanced image without estimating the distribution of the lighting in the image and without having a significant impact on the distribution of the lighting in the image, and it is also possible to achieve an increase in the feeling of depth of the image with a simple configuration.

Fourth Embodiment

Using FIGS. 25 through 34, an image processing method and an image processing device 400 that utilize shadow enhancement and light enhancement in order to perform correction in order to increase the feeling of depth of an image are described as a fourth embodiment of the invention.

Figure 25:
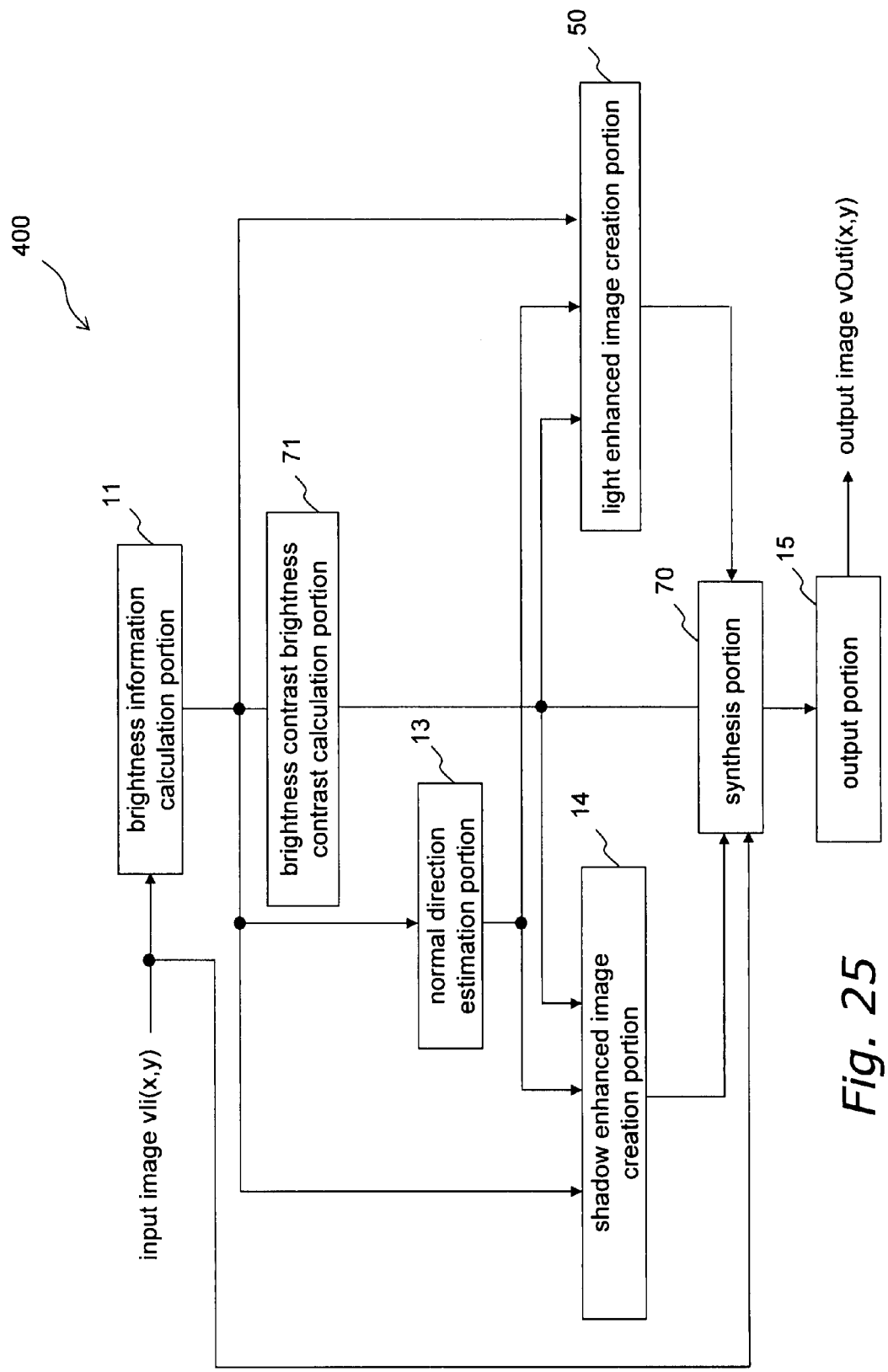
FIG. 25 is a block diagram that shows the configuration of the image processing device according to a fourth embodiment of the invention.

FIG. 25 shows the configuration of the image processing device 400 according to this embodiment.

As shown in FIG. 25, the image processing device 400 is primarily constituted by the brightness information calculation portion 11, a brightness contrast calculation portion 71, the normal direction estimation portion 13, the shadow enhanced image creation portion 14, the light enhanced image creation portion 50, a synthesis portion 70, and the output portion 15.

Figure 26:
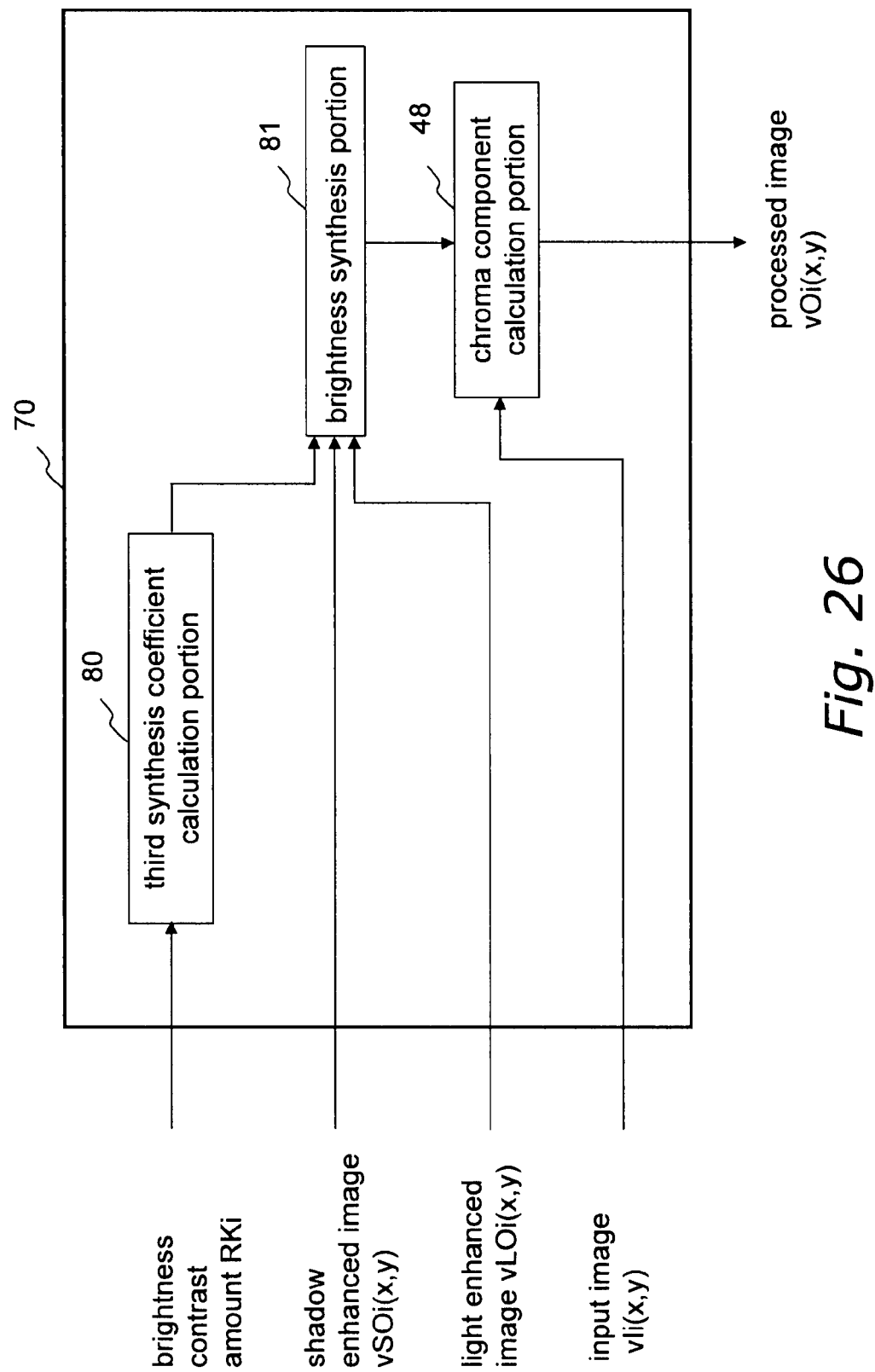
FIG. 26 is a block diagram that shows the configuration of the synthesis portion in the image processing device according to the fourth embodiment of the invention.

FIG. 26 shows the configuration of the synthesis portion 70. As shown in FIG. 26, the synthesis portion 70 is primarily made of a synthesis coefficient calculation portion 80, a brightness synthesis portion 81, and the chroma component calculation portion 48.

Figure 27:
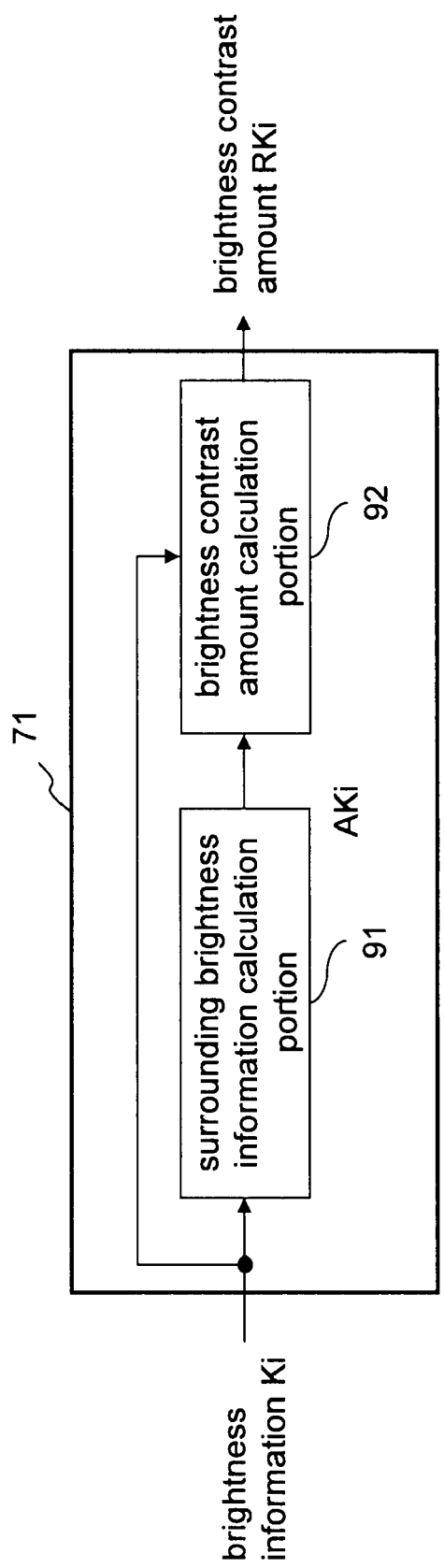
FIG. 27 is a block diagram that shows the configuration of the brightness contrast calculation portion in the image processing device according to the fourth embodiment of the invention.

FIG. 27 shows the configuration of the brightness contrast calculation portion 71. As shown in FIG. 27, the brightness contrast calculation portion 71 is primarily made of a surrounding brightness information calculation portion 91 and a brightness contrast amount calculation portion 92.

Figure 28:
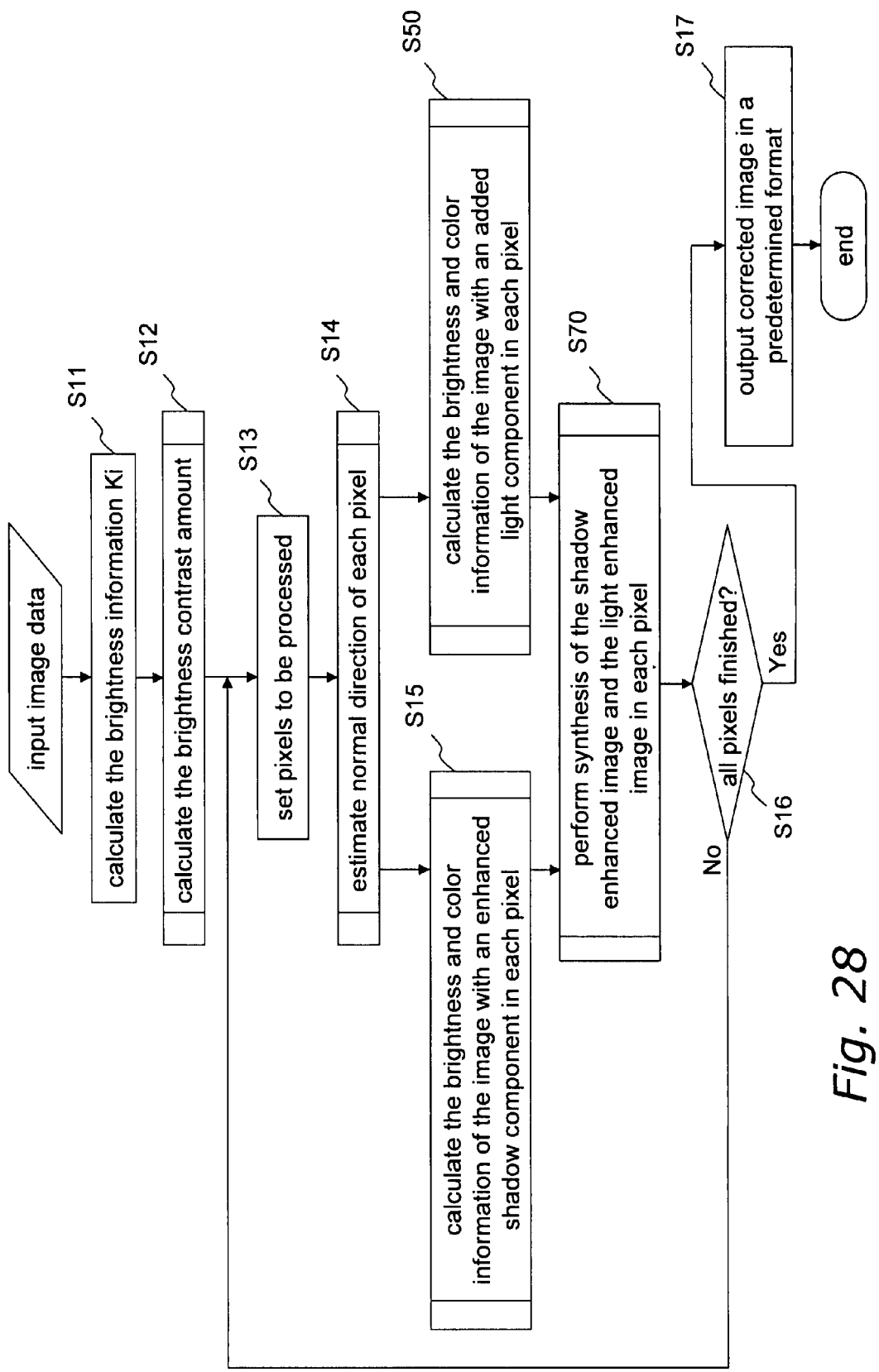
FIG. 28 is a process flowchart of the image processing method according to the fourth embodiment of the invention.
Figure 29:
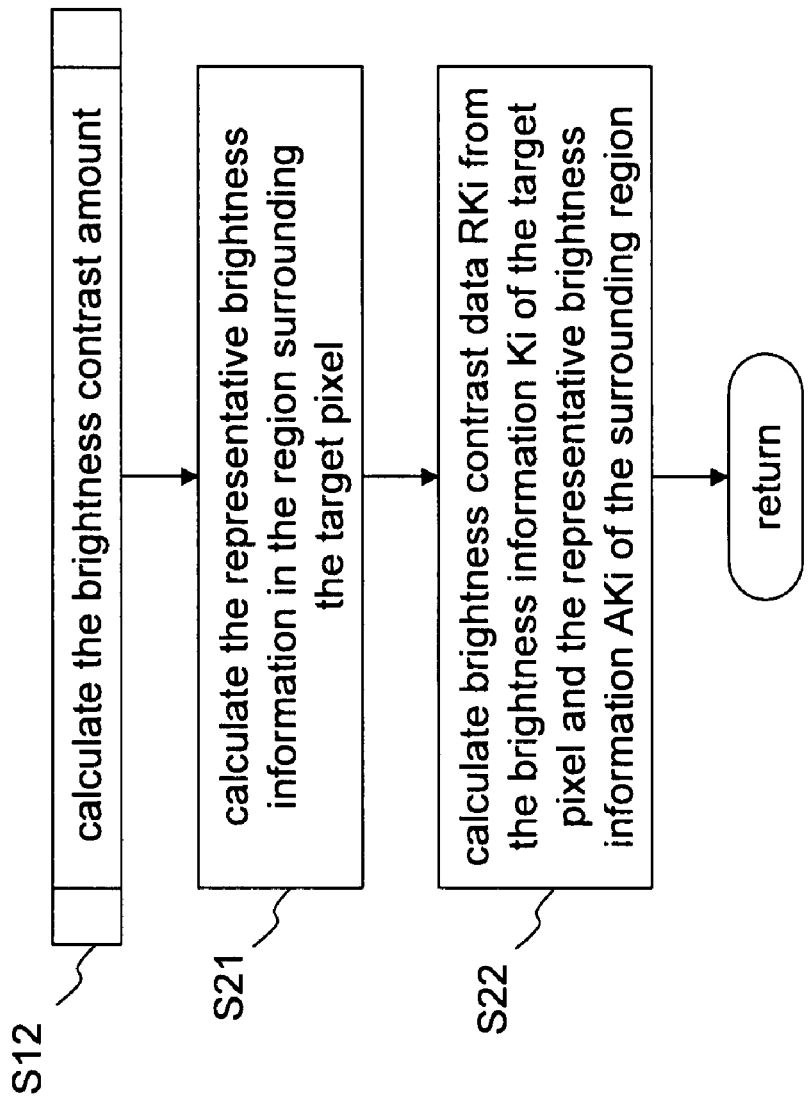
FIG. 29 is a process flowchart of the brightness contrast amount calculation process in the image processing method according to the fourth embodiment of the invention.
Figure 30:
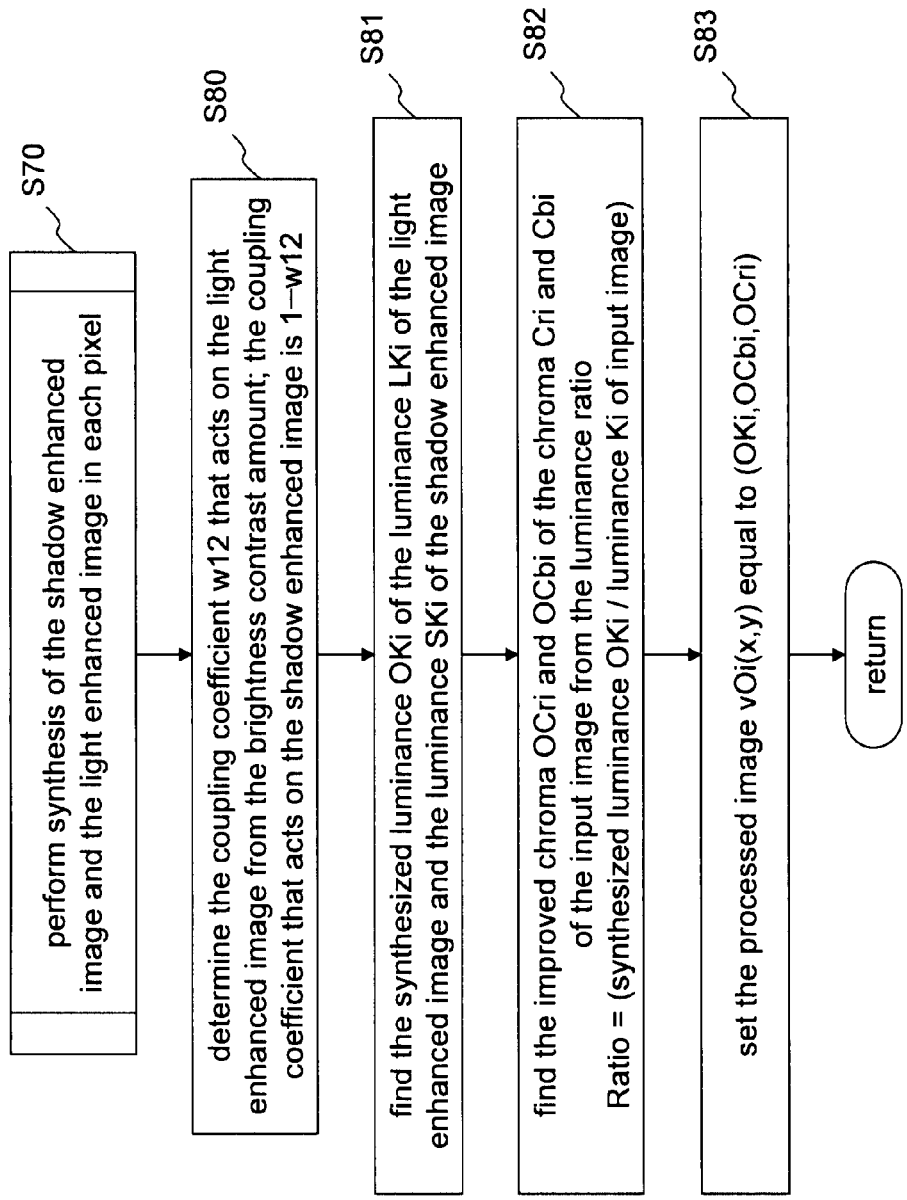
FIG. 30 is a flowchart of the synthesis process in the image processing method according to the fourth embodiment of the invention.

FIG. 28 shows a process flowchart of the image processing method according to this embodiment. FIG. 29 shows a process flowchart of the brightness contrast amount calculation process. FIG. 30 shows a process flowchart of the step of synthesizing the shadow enhanced image and the light enhanced image.

The invention is a device for correcting color information within an image by processing the image data, and for example can be installed in image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device 400 and the image processing method of this embodiment are characterized in that the shadow enhanced image that was obtained in the second embodiment and the light enhanced image that was obtained in the third embodiment are synthesized to achieve the effect of having both the shadow addition effect and the light addition effect, which are the features of these two embodiments, and by doing so create an image with an even greater feeling of depth.

The flow of processing is shown below based on the process flowcharts of FIGS. 28 through 30.

Image data are input to the image processing device 400, and the data of each pixel are converted to predetermined brightness information $Ki(x,y)$. The brightness contrast calculation portion 71 calculates the brightness contrast amount $RKi(x,y)$ based on the brightness information $Ki(x,y)$.

Figure 31:
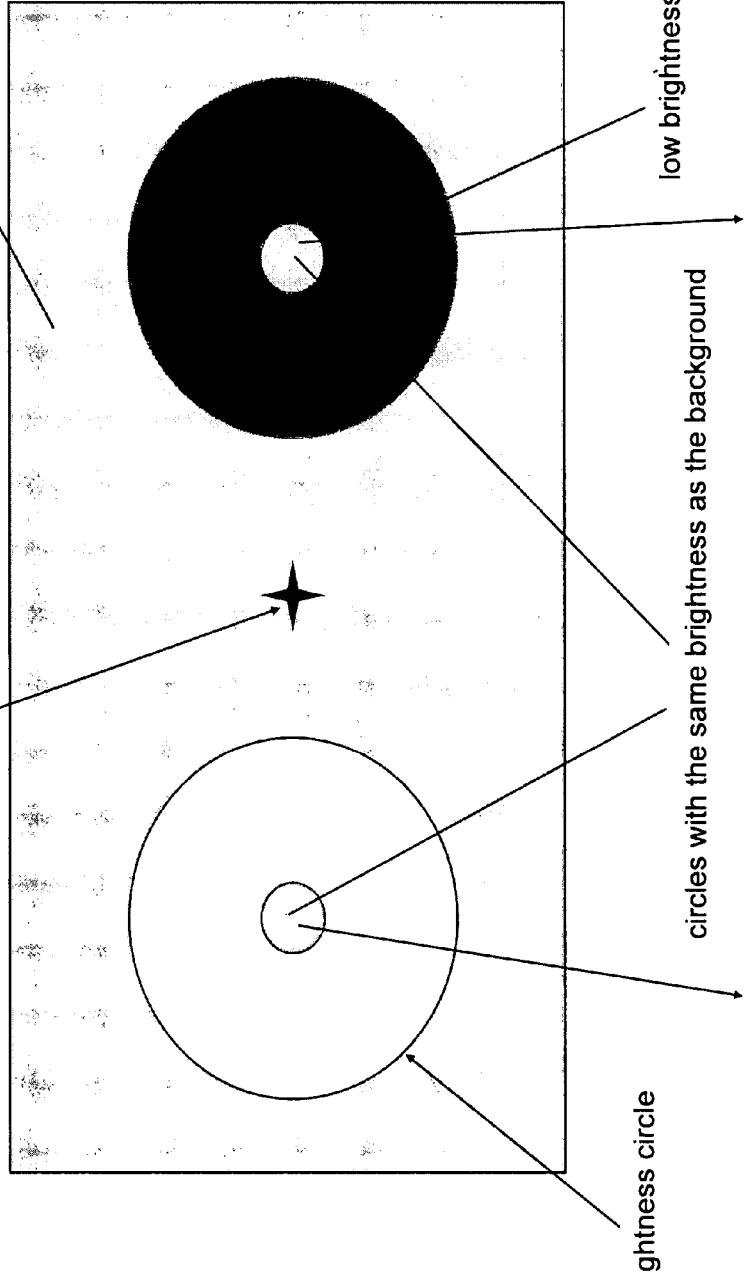
FIG. 31 schematically illustrates the brightness contrast in the image processing method according to the fourth embodiment of the invention.

The brightness contrast calculation portion 71 finds information that indicates a brightness characteristic that corresponds to a visual characteristic for the brightness information $Ki(x,y)$. There are many conceivable possibilities for the information that serves as the brightness characteristic, but in order to achieve correction that is closer to human vision, it is preferable to use information that corresponds to the visual characteristics of humans. There are many possibilities for the visual characteristics of humans, and here the brightness contrast characteristic is used. FIG. 31 is a diagram for describing this characteristic. With regard to this value (the brightness contrast amount), it is known that color contrast for a color occurs for brightness information as well, and the brightness contrast amount is obtained by assigning a numerical value to that degree. For example, consider an example of large circle with low brightness that in its center has a small center circle with a higher brightness than its surroundings. In this case, it is evident from the psychology of vision that humans tend to perceive the center portion of the large circle as brighter than its actual brightness. This phenomenon occurs due to the brightness contrast characteristic, and occurs when a target object is surrounded by a different brightness and the brightness of that object is affected by the brightness of its surroundings.

In other words, when an object is surrounded by a brightness that is higher than its own, the brightness of the object is felt to be lower. Conversely, when an object is surrounded by a brightness that is lower than its own, the brightness of the object is felt to be higher.

Figure 32:
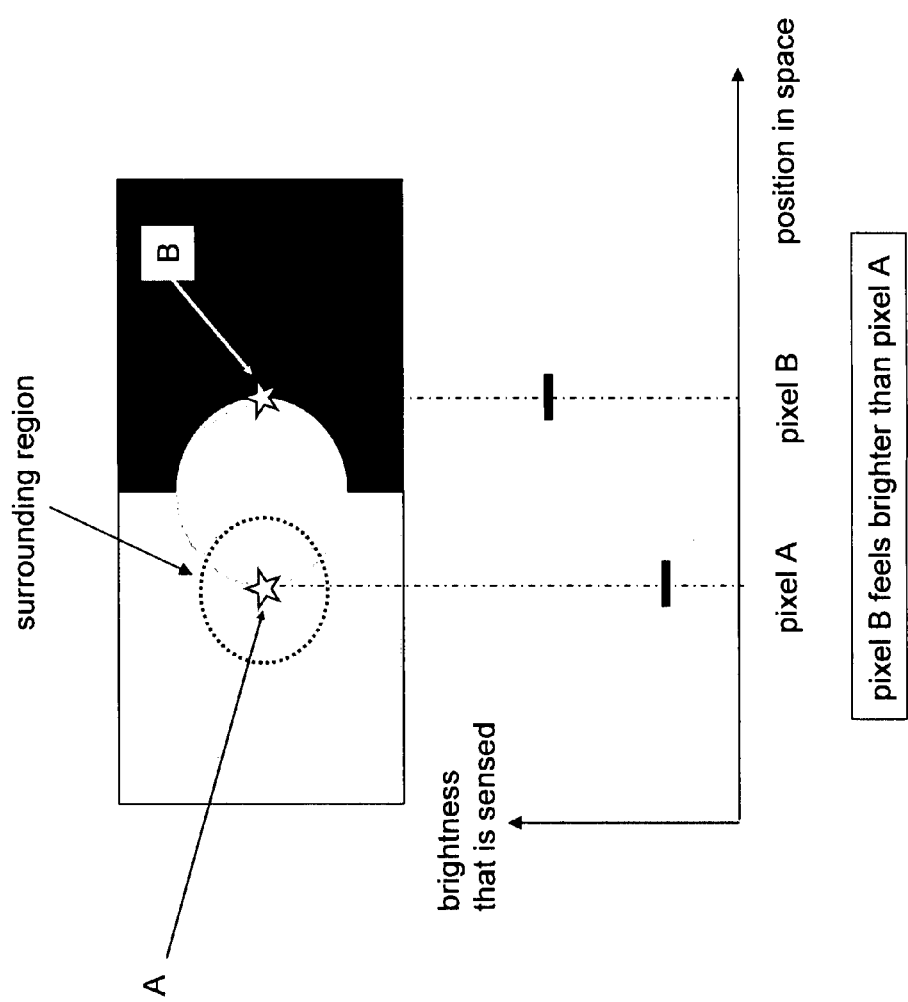
FIG. 32 schematically illustrates the brightness contrast in the image processing method according to the fourth embodiment of the invention.

The brightness contrast shall be described using FIG. 32. FIG. 32 is an explanatory diagram for considering the same brightness contrast at the border of a single circle.

The circle in the center has uniform brightness information. On the other hand, the left side of the rectangle is slightly brighter than the center circle, and the right side of the rectangle is much less bright (much darker) than the center circle. The brightness of the pixel A and the brightness of the pixel B located at the two stars on the border of the center circle in this case are confirmed. Pixel A and pixel B originally have the same brightness. However, pixel B is much brighter than the region around it, and thus the result of this contrast is that pixel B tends to be perceived as much brighter than its actual brightness. In contrast, pixel A is slightly less bright than the region around it, and thus due to the contrast effect the pixel A tends to be perceived as slightly darker than its actual brightness. This results in the phenomenon that the user perceives pixel B as brighter than pixel A.

In this invention, the brightness contrast amount $RYi(x,y)$ is found by the brightness contrast calculation portion 71. At this time, processing is performed using a pixel range (region) that encompasses approximately ⅙ to ⅓ of the image, which corresponds to the field of view of humans, as the surrounding region when finding the brightness contrast amount $Ryi(x,y)$. At this time, as the representative brightness $Aki(x,y)$ of the surroundings it is preferable that the weighted mean brightness within a pixel range $Qi$, which has a predetermined width that corresponds to the visual area of humans, is treated as the representative brightness $AKi(x,y)$ of the pixels around the target pixel $i(x,y)$, but in addition to this, it is also possible to target the pixels within the visual area to find a histogram for the brightness (luminance) of the pixels within that region (luminance histogram), and then from that luminance histogram take the most frequent luminance value, a representative luminance value that is obtained through clustering based on the statistical distribution within the visual area, or the mean luminance within the visual area, as the representative brightness $AKi$.

The brightness contrast amount $RKi(x,y)$ can be variously defined as (a) the ratio of the brightness information $Ki(x,y)$ to the brightness information $AKi(x,y)$ that represents the surroundings; or (b) the value that is obtained by subtracting the brightness information $AKi(x,y)$ that represents the surroundings from the brightness information $Ki(x,y)$ to be corrected.

It should be noted that many other definitions are possible, but here, in order to more clearly express the contrast, the ratio of the brightness information $Ki(x,y)$ to the brightness information $AKi(x,y)$ that represents the surroundings of (a) has been used.

Formula 11

$$RKi(x,y)=Ki(x,y)/AKi(x,y) \tag{11}$$

The surrounding brightness information calculation portion 91 finds the representative brightness $AK_i(x,y)$ of the surroundings, and the brightness contrast amount calculation portion 92 finds the brightness contrast amount $RK_i(x,y)$ through Formula 1.

The normal direction estimation portion 13 sets the normal direction vector $vH_i(x,y)$ in each pixel to $vH_i(x,y)=(hx,hy,hz)$.

The shadow enhanced image creation portion 14 creates a shadow enhanced image $vSO_i(x,y)$ in which the shadow component has been enhanced based on the brightness information $K_i(x,y)$, the normal direction vector $vH_i(x,y)$, and the edge information $EDGE_i(x,y)$ in the same manner as in the second embodiment.

The light enhanced image creation portion 50 creates a light enhanced image $vLO_i(x,y)$ to which light has been added based on the brightness information $K_i(x,y)$, the normal direction vector $vH_i(x,y)$, and the edge information $EDGE_i(x,y)$ in the same manner as in the third embodiment.

The two images that are obtained by the shadow enhanced image creation portion 14 and the light enhanced image creation portion 50 are synthesized by the synthesis portion 70 to create the final processed image.

The output portion 15 can output the corrected brightness information or the corrected chroma of each pixel $i(x,y)$ obtained by the synthesis portion 70 as is, but it is also possible for the output portion 15 to transform the corrected brightness information or the corrected chroma of each pixel $i(x,y)$ that has been obtained with the synthesis portion 70 in accordance with an image format that can be handled by the device being used and output the resulting processed image data.

It should be noted that here, the shadow enhanced image creation portion 14 and the light enhanced image creation portion 50 output the shadow enhanced image $vSO(x,y)$ and the light enhanced image $vLO(x,y)$, and these are utilized by the synthesis portion 70.

However, it is also possible for the shadow enhanced image creation portion 14 to output to the synthesis portion 70 the brightness information $SK_i(x,y)$ of the pixel $i(x,y)$ after shadow enhancement in the shadow enhanced image, and for the light enhanced image creation portion 50 to output to the synthesis portion 70 the brightness information $LK_i(x,y)$ of the pixel $i(x,y)$ after light enhancement in the light enhanced image, and for the synthesis portion 70 to use the brightness information $SK_i(x,y)$ and the brightness information $LK_i(x,y)$ to calculate the brightness information $OK_i(x,y)$ of the processed image $vO_i(x,y)$, and then use that value and the brightness information $K_i(x,y)$ and the chroma information $Cb_i(x,y)$ and $Cr_i(x,y)$ of the pixel $i(x,y)$ that are obtained from the input image $vI_i(x,y)$ to calculate the chroma $OCb_i(x,y)$ and $OCr_i(x,y)$ of the processed image of the pixel $i(x,y)$.

The synthesis portion 70 uses the brightness contrast amount $RK_i(x,y)$ to calculate the coupling coefficient $wl2$ ($0.0 \leq wl2 \leq 1.0$) that acts on the brightness information $LK_i(x,y)$ of the light enhanced image $vLO_i(x,y)$ of pixel $i(x,y)$. In this case, the coupling coefficient that acts on the brightness information $SK_i(x,y)$ of the light enhanced image $vLO_i(x,y)$ becomes $1.0-wl2$.

Controlling the Coupling Coefficient $wl2$

The are many conceivable methods for controlling the coupling coefficient $wl2$. Here, an example of one such method is described.

First, there is a possibility that the brightness within the shadow enhanced image $vSO_i(x,y)$ from the second embodiment may be slightly lower. On the other hand, there is a possibility that the brightness within the light enhanced image $vLO_i(x,y)$ from the third embodiment may be slightly higher.

Accordingly, if the brightness contrast amount $RK_i(x,y)$ in pixel $i(x,y)$ is much higher than 1.0, then by giving priority to the light enhanced image over the shadow enhanced image and bringing the brightness information $OK_i(x,y)$ of the processed image $vO_i(x,y)$ that has been obtained closer to the brightness information $K_i(x,y)$ of the input image $vI_i(x,y)$, it is possible to have a positive effect on the quality of the processed image. By doing this, as shown by $wl2=Func(RK_i(x,y))$, $wl2$ is set such that its value gently monotonically increases as $RK_i(x,y)$ increases. At this time, if the brightness information $K_i(x,y)$ of the pixel $i(x,y)$ is the same value as the representative brightness information $AK_i(x,y)$ of the surroundings, then the contrast amount $RK_i(x,y)=1.0$, but in this case the brightness information $LK_i(x,y)$ of the light enhanced image and the brightness information $SK_i(x,y)$ of the shadow enhanced image contribute equally to the processed image $vO_i(x,y)$ and thus $wl2$ is set such that it becomes 0.5.

This processing is carried out by a third synthesis coefficient calculation portion 80.

A brightness synthesis portion 81 synthesizes the brightness information of the two images as shown in Formula 12 using the coupling coefficient $wl2$ that is obtained by the third synthesis coefficient calculation portion 80, and finds the brightness information $Ok_i(x,y)$ of the processed image.

Formula 12

$$OK_i(x,y) = wl2 \times LK_i(x,y) + (1.0 - wl2) \times SK_i(x,y) \quad (12)$$

FIG. 33 is a schematic drawing for describing the tendency (condition) of the processed image with respect to the result example 1 that is schematically shown in the second embodiment and the third embodiment. FIG. 33 is an example in which a virtual light source that irradiates light from the upper left has been set, and shows a case in which the brightness of the center circle is higher than the surroundings. In the region (1) on the lower right of the center circle in FIG. 33A, the light source direction that has been set and the normal direction that has been calculated are different (the angle formed by the light source direction vector and the normal direction vector is large). For this reason, as shown in FIG. 33B, in the region (1), the effect of shadow enhancement occurs more strongly than the effect of light enhancement, because the light source direction vector $vR1$ and the normal direction vector $vHi$ are significantly different (the angle formed by the light source direction vector and the normal direction vector is large). That is, in region (1), a drop in luminance occurs at the low-luminance circle border (low-luminance side) that is in contact with the high-luminance circle, and shadow enhancement occurs.

In contrast to this, the region (2) in the upper left of the center circle in FIG. 33A has a light source direction that has been set and a normal direction that has been calculated are substantially matching (the angle formed by the light source direction vector and the normal direction vector is small). Thus, as shown in FIG. 33C, in the region (2) the light enhancement effect becomes occurs more strongly than the shadow enhancement effect approaching the direction in which the light source direction vector $vR1$ and the normal direction vector $vHi$ match. In other words, in region (2), the addition of light (rise in luminance) occurs at the high-luminance circle border (high-luminance side), and light enhancement occurs.

The result of this is that the image processing device 400 yields an image that feels as if the high-luminance circle portion in the center bulges forward.

Figure 34B:
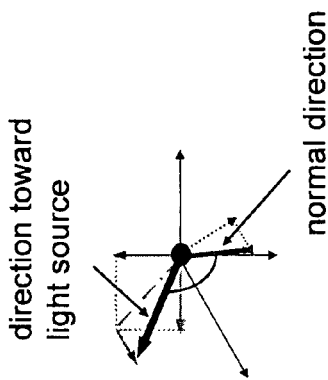
FIG. 34 schematically shows the effect of the image processing method according to the fourth embodiment of the invention.
Figure 34C:
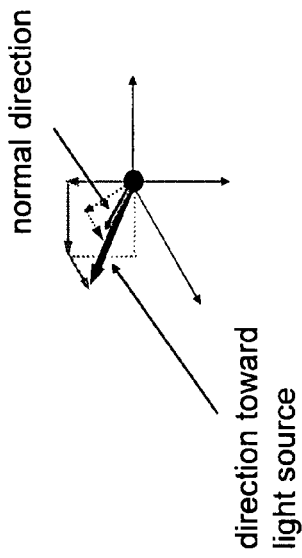
Figure 34A:
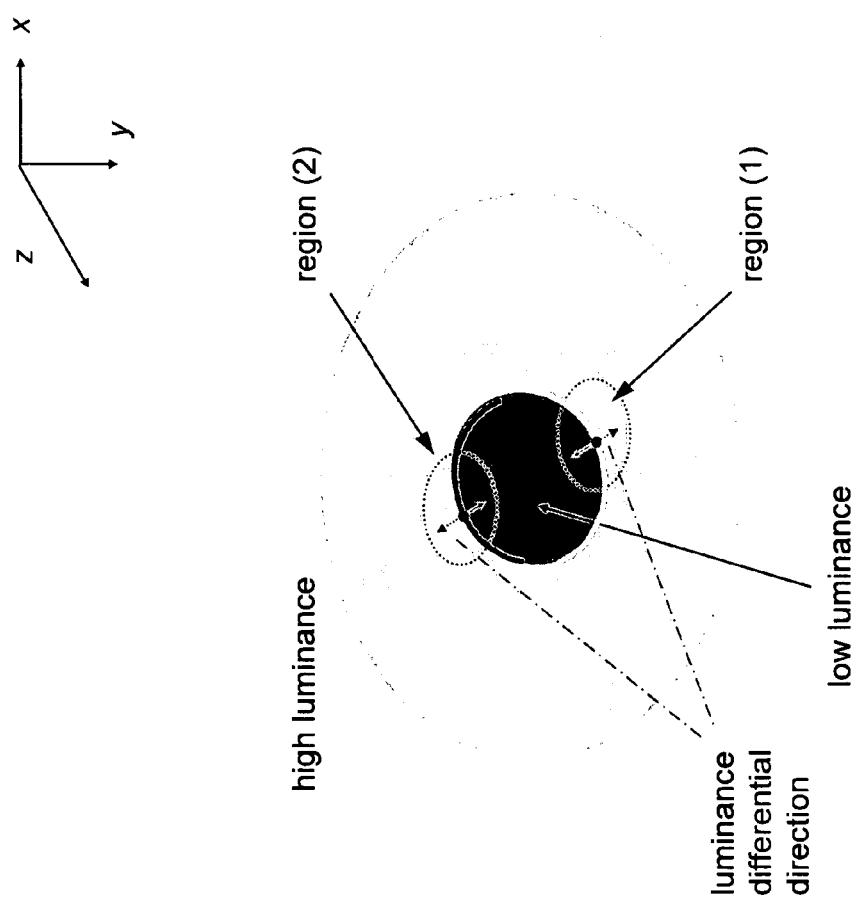

FIG. 34 is a schematic drawing for describing the tendency (condition) of the processed image with respect to the result example 2 that is schematically shown in the second embodiment and the third embodiment. FIG. 34 is an example in which a virtual light source that irradiates light from the upper left has been set, and shows a case in which the luminance of the center circle is lower than the surrounding region. In the region (1) on the lower right of the center circle in FIG. 34A, the light source direction that has been set and the normal direction that has been calculated are substantially matching (the angle formed by the light source direction vector and the normal direction vector is small). Thus, as shown in FIG. 34B, in region (1) the light enhancement effect occurs more strongly than the shadow enhancement effect approaching the direction in which the light source direction vector vR1 and the normal direction vector vHi match. In other words, in region (1), the addition of light (rise in luminance) occurs at the high-luminance circle border (high-luminance side) in contact with the low luminance circle, and light enhancement occurs.

In contrast to this, the region (2) in the upper left of the center circle in FIG. 34A the light source direction that has been set and the normal direction that has been calculated are different (the angle formed by the light source direction vector and the normal direction vector is large). Thus, in region (2), as shown in FIG. 34C, there is a large difference between the light source direction vector vR1 and the normal direction vector vHi (the angle formed by the light source direction vector and the normal direction vector is large) and thus the shadow enhancement effect occurs more strongly than the light enhancement effect. In other words, in region (2), a drop in luminance occurs at the low-luminance circle border (low-luminance side), and the enhancement of shadow occurs.

The result is that an image that feels as if the high-luminance circle portion in the center is slight depressed inward is obtained. This feeling of unevenness similarly occurs in the case of the second embodiment or the third embodiment, but with the image processing device 400 of this embodiment, these two different effects are combined to yield an image that has a more increased feeling of depth.

Next, the chroma component calculation portion 48 finds the chroma information $OCri(x,y)$ and $OCbi(x,y)$ of the processed image from the brightness information $OKi(x,y)$ of the processed image, the brightness information $Ki(x,y)$ of the input image, and the chroma information $Cri(x,y)$ and $Cbi(x,y)$ of the input image. Regarding this, like in the above embodiments the following two methods can be adopted.

(i) The chroma of the input image can be adopted as the chroma of the processed image, as in $OCbi(x,y)=Cbi(x,y)$ and $OCri(x,y)=Cri(x,y)$.

(ii) The brightness information improvement ratio $Ratio=OKi(x,y)/Ki(x,y)$ is used to find the chroma improvement ratio RatioCrCb, and then this is multiplied with the chroma $Cri(x,y)$ and $Cbi(x,y)$ of the input image to obtain $OCbi(x,y)$ and $OCri(x,y)$.

There are many other methods in addition to the above, but the chroma component calculation portion 48 calculates the chroma of the processed image in this way.

Lastly, the output portion 15 transforms the processed image $vOi(x,y)$ of each pixel $i(x,y)$ that has been obtained with the synthesis portion 70 according to the image format that can be handled by the device being used and outputs the resulting processed image data.

Thus, with the image processing device 400, the shadow enhanced image and the light enhanced image are synthesized to create an image that combines the effect of adding shadow and the effect of adding light, which are the characteristics of these, and thus it is possible to obtain an image that has a greater feeling of depth. Further, the image processing device 400 lowers the possibility that the brightness will drop slightly that existed with the method of the second embodiment and lowers the possibility that the brightness will slightly rise that existed with the method of the third embodiment, and can obtain an image that is excellent is terms of its picture quality as well.

Fifth Embodiment

Figure 35:
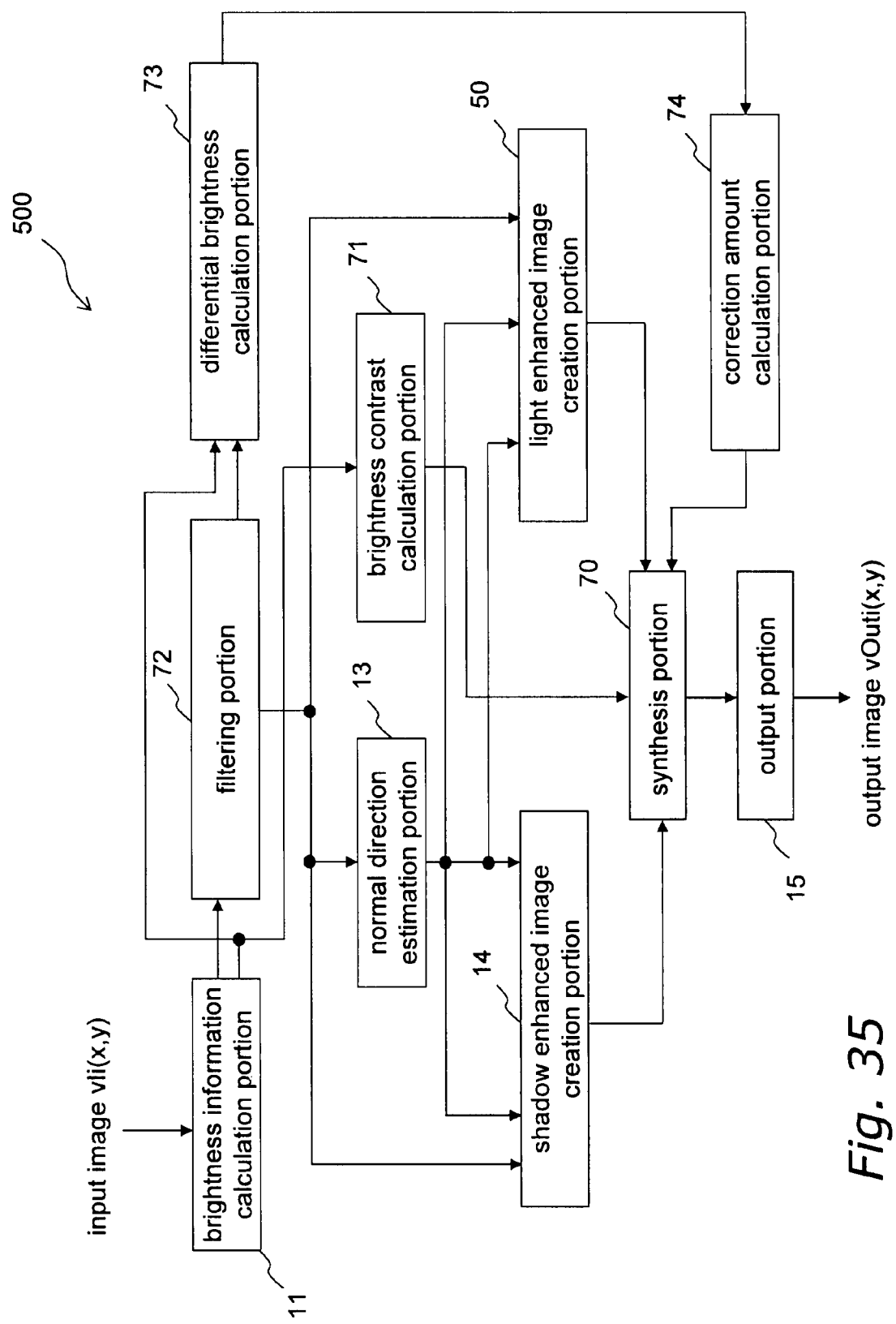
FIG. 35 is a block diagram that shows the configuration of the image processing device according to a fifth embodiment of the invention.

An image processing device 500 according to the fifth embodiment is shown in FIG. 35 and is described below.

The image processing device 500 is characterized by the image processing method and the image processing device of the fourth embodiment in which the normal direction vector is estimated from the brightness information value after filter processing, and a value that is proportional to the difference between the brightness information and the brightness information after filtering is added to the brightness information of the synthesized image after shadow enhancement and light enhancement.

The image processing device 500 shown in FIG. 35 is the same as that of the fourth embodiment except for a filtering portion 72, a difference brightness calculation portion 73, and a correction amount calculation portion 74, and thus identical components will not be described. The normal direction estimation portion 13, the shadow enhanced image creation portion 14, and the light enhanced image creation portion 50 execute the same processing as in the fourth embodiment, on the smoothed brightness $LKi(x,y)$ that is obtained by the filtering portion 72.

The filtering portion 72 performs a smoothing filter on the image on the brightness information $Ki(x,y)$ that is obtained by the brightness information calculation portion 11, and finds smoothed brightness information $LKi(x,y)$.

The purpose of this is to suppress the effect of shadow enhancement and light enhancement on weak borders and texture by keeping down the amount of change in the normal direction vector that occurs due to minute fluctuations in the luminosity in weak borders and in texture. Thus, the filter that is used by the filtering portion 72 is a smoothing filter that has a weight that corresponds to the size of the frequency that is removed (the cutoff frequency), and for example, a smoothing filter that has a Gaussian distribution corresponding to the distance len between the center pixel (target pixel) $i(x,y)$ and a pixel $j(s,t)$ within the filter in the weighting coefficient $g(s,t)$. It is also possible to use a bilateral filter in which a value that is obtained from the difference between the brightness $Ki(x,y)$ of the center pixel and the brightness $Kj(s,t)$ of a pixel within the filter is multiplied with the weighting coefficient $g(s,t)$, which has a Gaussian distribution with respect to the distance between the center pixel and the target pixel within the filter, and by doing so smooth the brightness while retaining a relatively large brightness (luminance) near the border on the image. It is possible for the filter size to be a fixed size (for example, 11 pixels×11 pixels, 5 pixels×5 pixels, or 7 pixels×7 pixels) that is suitable considering the texture size that is to be removed or the processing time, and it is also possible to provide a functional portion for determining the filter size from the frequency component of the texture of the target section and then smooth the brightness information based on that filter size. Further, the image is partitioned into block regions of a predetermined size, and the average brightness within each block is calculated. It is also possible to substitute the smoothed brightness with the mean brightness of the block containing the target pixel. It is also possible to perform the smoothing filter in block units, and to find the smoothed brightness of a target pixel through interpolation processing that uses the smoothed average brightness of the block containing the target pixel and the smoothed average brightness of the surrounding blocks.

The difference brightness calculation portion 73 finds the differential brightness subKi(x,y) between the smoothed brightness LKi(x,y) that has been obtained by the filtering portion 72 and the brightness Ki(x,y) through Formula 13.
Formula 13

$$subKi(x,y)=Ki(x,y)-LKi(x,y) \qquad (13)$$

It then adds to the processed image that is obtained by the synthesis portion 70 a value that is obtained by multiplying the differential brightness subKi(x,y) with a predetermined positive coefficient η, as a corrected high frequency component dOKi(x,y) (=η×subKi(x,y)).

By performing shadow and light enhancement on the smoothed brightness it is possible to inhibit overcorrection on weak borders and texture portions, but there is a risk that the high frequency component will drop due to this smoothing and produce a blurry processed image.

Accordingly, the correction amount calculation portion 74 can correct/add the high frequency component that has dropped due to smoothing in order to inhibit this negative effect.

Sixth Embodiment

Figure 36:
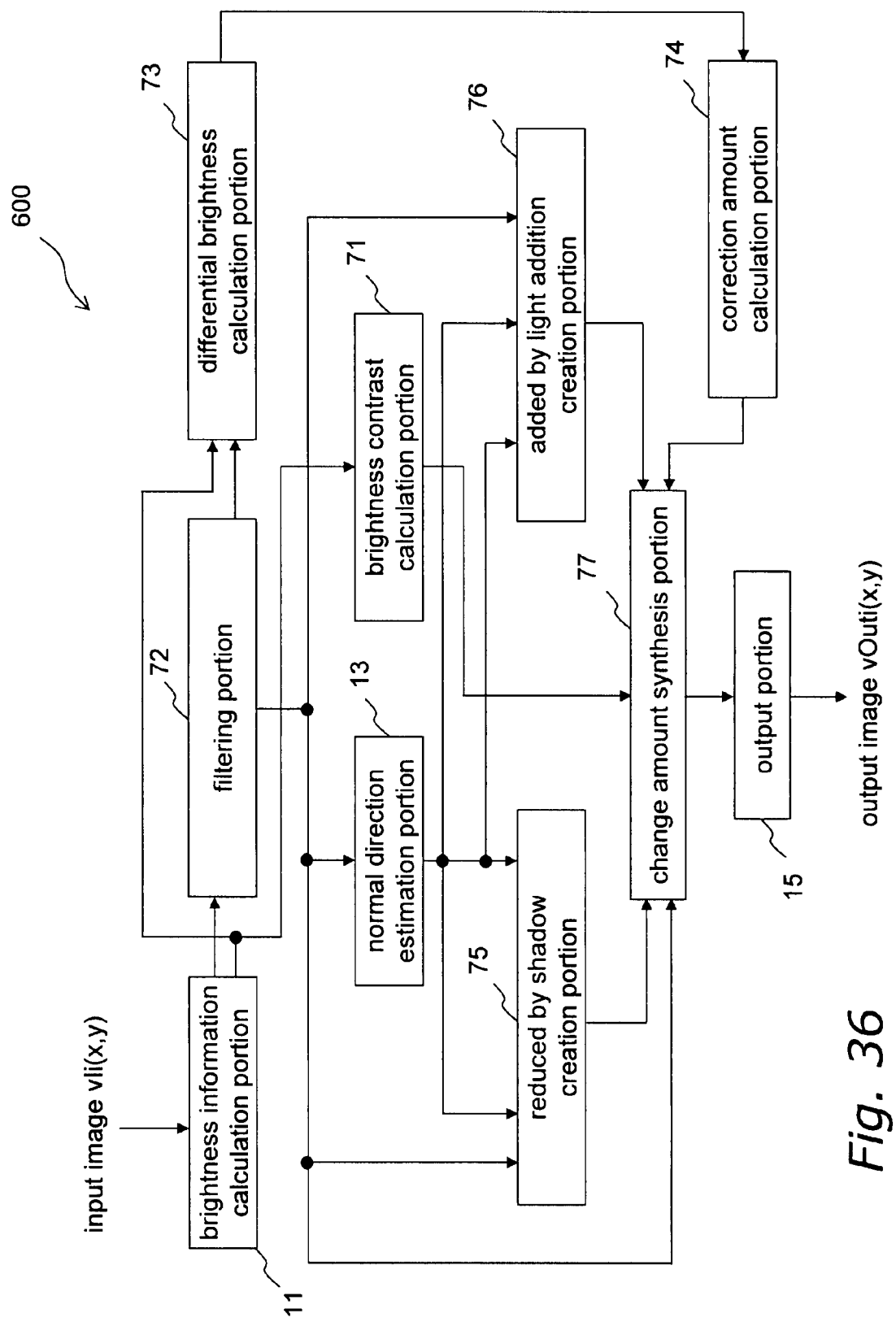
FIG. 36 is a block diagram that shows the configuration of the image processing device according to a sixth embodiment of the invention.

An image processing device 600 according to the sixth embodiment is shown in FIG. 36 and is described below.

The image processing device 600 is the image processing device 500 of the fifth embodiment of the present invention, in which only the amount of change is calculated for both the shadow enhanced image and the light enhanced image.

The image processing device 600 shown in FIG. 36 is the same as that of the fifth embodiment except for a reduced by shadow creation portion 75, a added by light addition creation portion 76, and a change amount synthesis portion 77, and thus identical components will not be described.

The normal direction estimation portion 13 executes processing based on the brightness information LKi(x,y) after smoothing that is obtained by the filtering portion 72. The reduced by shadow creation portion 75 and the added by light addition creation portion 76 receive the output of the normal direction estimation portion 13 and execute shadow addition processing and light addition processing, respectively.

The reduced by shadow creation portion 75 finds the difference between the smoothed brightness information LKi(x,y) and the value that is obtained by multiplying a strength SSt and a control coefficient wks with the brightness information dSKi(x,y) after shadow enhancement by the shadow enhanced image creation portion 14 of the fifth embodiment, and treats this value as the subtracted brightness information subdSKi(x,y) that occurs due to the addition of shadow.

The added by light addition creation portion 76 finds the difference between the smoothed brightness information LKi(x,y) and the value that is obtained by multiplying a strength LSt and a control coefficient wk1 with the brightness information dLKi(x,y) after the addition of light due to the virtual light source component cKci(x,y) by the light enhanced image creation portion 50 of the fifth embodiment, and treats this value as the added brightness information subdKi(x,y) that occurs due to the addition of light.

The change amount synthesis portion 77 finds the brightness information OKi(x,y) of the processed image in which these two values (the subtracted brightness information subdSKi(x,y) and the added brightness information subdKi(x,y)) have been added to the brightness information LKi(x,y), and executed processing for correcting with the correction amount dOKi(x,y) that has been obtained by the correction amount calculation portion 74.

By doing this, it is possible to eliminate the process of performing weighted synthesis with the smoothed brightness information LKi(x,y) at that point, which was executed by the shadow enhanced image creation portion 14 and the light enhanced image creation portion 50.

The change amount synthesis portion 77 finds the sum of the smoothed brightness LKi(x,y) and the values obtained by multiplying the reduced by shadow brightness information subdSKi(x,y) and the added by light addition brightness information subdLKi(x,y) with the weighting coefficients (1.0−wl2) and wl2 based on the brightness contrast amount RKi(x,y), respectively, and treats this as OKi(x,y). That is, the change amount synthesis portion 77 performs the processing shown in Formula 14 to create OKi(x,y).
Formula 14

$$OKi(x,y)=subdSKi(x,y) \times (1.0-wl2)+subdLKi(x,y) \times wl2+LKi(x,y) \qquad (14)$$

The change amount synthesis portion 77 then corrects OKi(x,y) with the correction amount dOKi(x,y) that has been obtained by the correction amount calculation portion 74.

In this case, the weighting coefficient wl2 may be the same as in the case of the previously described embodiments, but because there is the possibility that the amount of correction will be greater than in the previous embodiments, it is also possible to apply a predetermined positive coefficient σ(σ≦1.0) to $$subdSKi(x,y) \times (1-wl2)+subdLKi(x,y) \times wl2$$

and then add this to LKi(x,y).

The point here is the reduction in processing for shadow enhancement and light enhancement, and while here has been described application to the fifth embodiment, it is also possible to adopt the reduced by shadow creation portion 75, the added by light addition creation portion 76, and the change amount synthesis portion 77 of this processing in the fourth embodiment.

Seventh Embodiment

Figure 37:
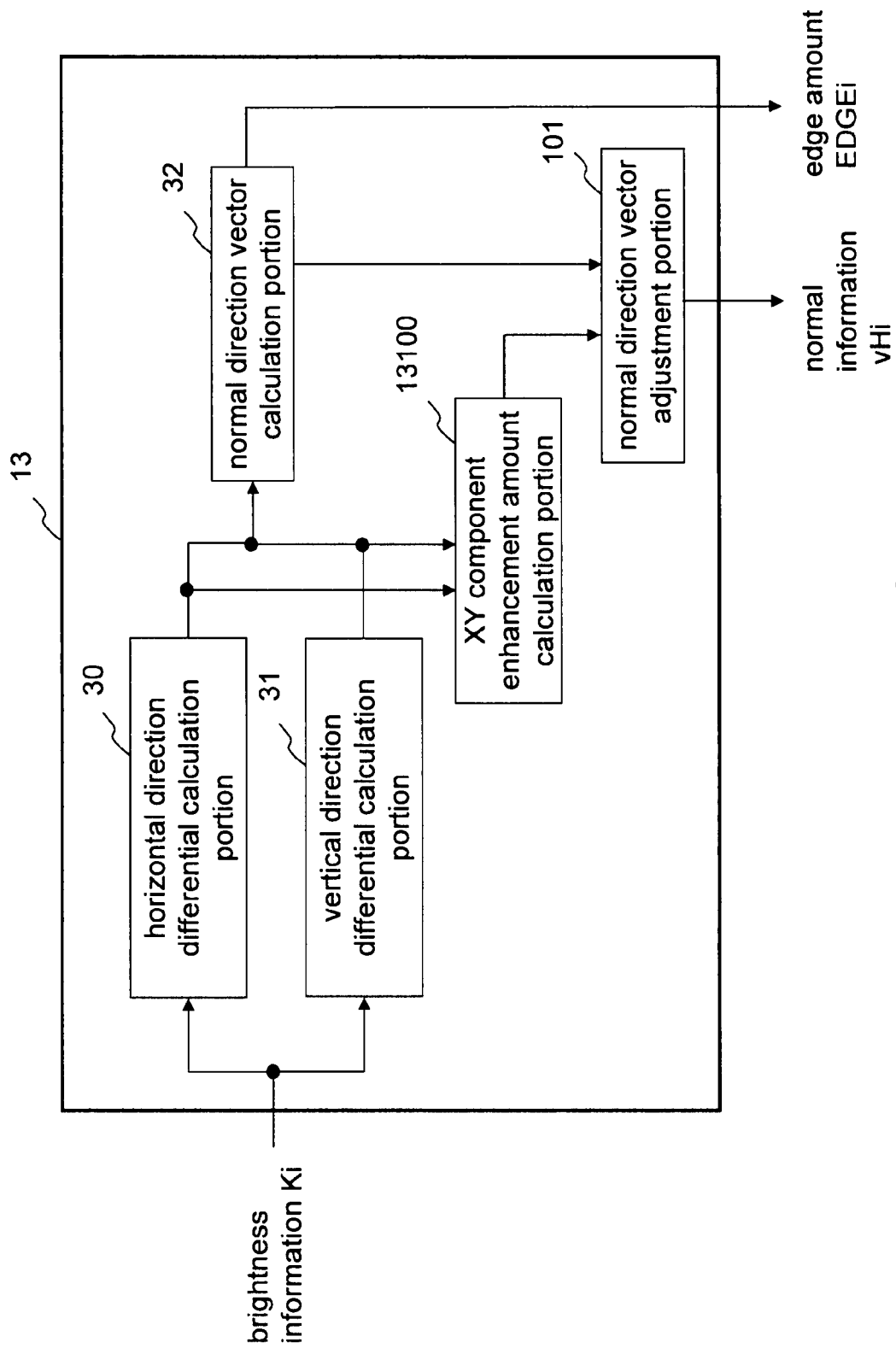
FIG. 37 is a block diagram that shows the configuration of the normal direction estimation portion in the image processing device according to a seventh embodiment of the invention.
Figure 38:
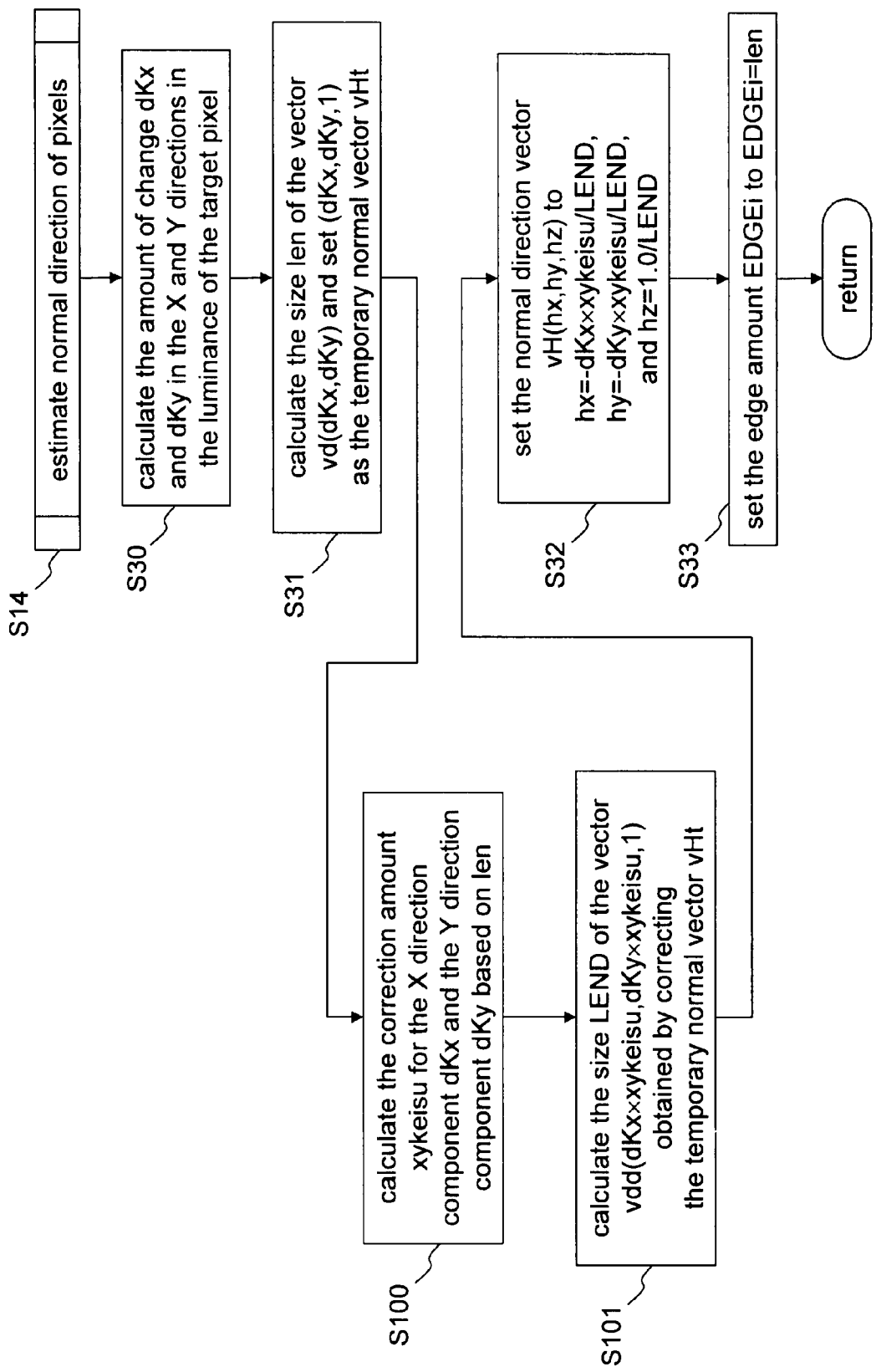
FIG. 38 is a flowchart of normal direction estimation in the image processing method according to the seventh embodiment of the invention.
Figure 39:
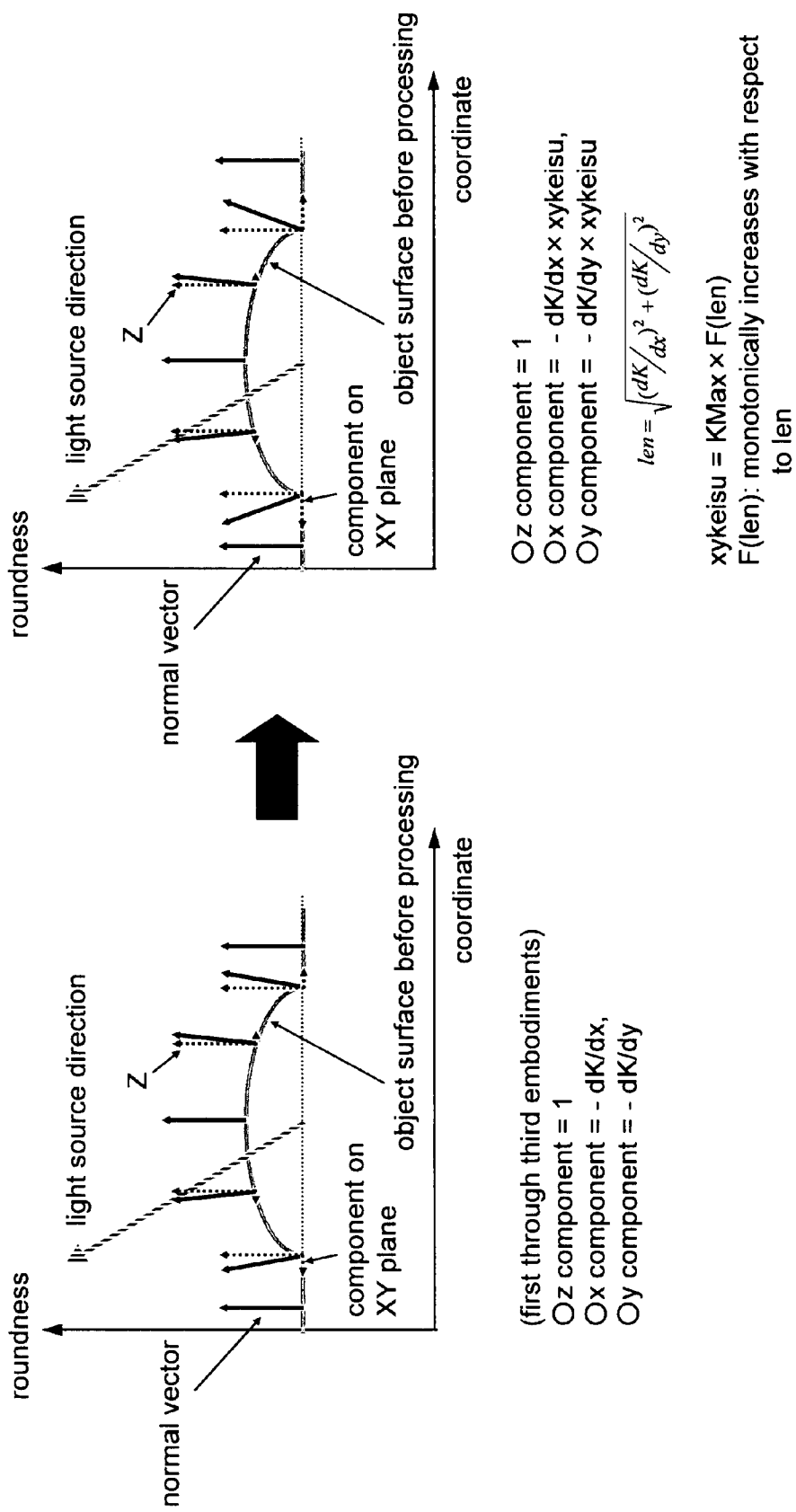
FIG. 39 is a conceptual diagram that schematically illustrates normal direction estimation in the image processing method according to the seventh embodiment of the invention.

The image processing method and the image processing device of the seventh embodiment that are shown in FIGS. 37 through 39 shall be described.

The inventive aspect of this embodiment fixes the negative impact of the drop in the change of the normal direction that occurs when the difference is small in both the x direction and the y direction in the normal direction estimation portion 13 of the image processing methods and the image processing devices of previous methods, and increases the change in the normal direction by further controlling the size of the x and y direction components or the size of the z direction component with a function which has the size of the edge amount as a variable. This feature characterizes the inventive aspect of this embodiment.

FIG. 37 is a block diagram that shows the configuration of the normal direction estimation portion 13 according to this embodiment. As shown in FIG. 37, the normal direction estimation portion 13 of this embodiment has the additional effects of an XY component enhancement amount calculation portion 13100 and a normal direction vector adjustment portion 101.

FIG. 38 is shows a flowchart of the processing on the normal direction estimation portion 13. Processing other than this is the same as in previous embodiments, and thus will not be described.

First, the amount of change dKx and dKy in the X direction and the Y direction of the brightness information (for example, the luminance) Ki(x,y) of a target pixel i(x,y) is found (S30). The vector vd (dKx,dKy) with these sizes as components corresponds to the edge vector, and its size len becomes the edge amount. Based on this value, a temporary normal direction vector vHti(x,y,z)=dKx,dKy,1) is set.

Next, a correction coefficient xykeisu for correcting the X direction component dKx and the Y direction component dKy is found (S100), and the normal direction vector vHi(x,y,z) is found by correcting the X and Y components of the temporary normal direction vector vHti(x,y,z) with this value, but here, in order to normalize the size of the normal direction vector vHi (set its size to 1), first the size LEND of the vector vdd (dKx×xykeisu,dKy×xykeisu,1) is found.

The vector obtained by normalizing the size of the vector vdd with LEND becomes the adjusted normal direction vector vHi(x,y). This is shown in Formula 15. It should be noted that it is not absolutely necessary to normalize the size of the normal direction vector to 1.

This processing is described using FIG. 39.

The left diagram of FIG. 39 schematically shows the normal direction vector of the second embodiment through the fourth embodiment. In this case, one issue that can be raised is that the XY direction differential of the brightness information Ki(x,y) is frequently small, and in such a case the change in the normal direction may not be particularly large, even near borders.

In the inventive aspect of this embodiment, as shown in the right diagram of FIG. 39, a coefficient xykeisu for controlling the X and Y components of the normal direction vector vHi, which has been set with the different differential amounts in the X and Y directions, with the edge amount is found, and change is applied to the normal direction by controlling the X and Y components. In particular, the inventive aspect of this embodiment is characterized in that the X and Y components are kept larger near borders and the X and Y components are reduced in flat portions, and by doing this, as shown in the right diagram of FIG. 39, a normal direction vector vHi that can more effectively express a sense of three dimensions in a cross sectional view is found. There are various conceivable possibilities for the control coefficient xykeisu, and as one example, Formula 16 is used in this invention.

Formula 15

$$Hi(x, y) = \begin{pmatrix} hx \\ hy \\ hz \end{pmatrix} = \begin{pmatrix} -dKx \times xykeisu / LEND \\ -dKy \times xykeisu / LEND \\ 1 / LEND \end{pmatrix} \quad (15)$$

Formula 16

$$xytkeisu = 1 + xy\text{Max} \times \exp\left(\frac{-len^2}{xydelta^2}\right) \quad (16)$$

In Formula 16, xyMax is a positive constant that expresses the maximum value of the control coefficient, and xydelta is a positive coefficient that expresses the degree of variance of the control coefficient. As xydelta, it is possible to use the maximum value of the edge amount len in the image. By using the xykeisu shown in Formula 16, the xykeisu fluctuates within 1 to 1+xyMax, and increases the value of the X and Y components in accordance with the edge amount starting from the X and Y components in the temporary normal direction vector vHti (the "temporary normal direction vector" may be called the "temporary normal vector"; same hereinafter). It should be noted that it is possible to use Formula 17 instead of Formula 16.

In the case of Formula 17, when the edge amount is small, the X and Y components of the normal direction vector approach 0, and this indicates the normal of a more flat portion. In this case, there is the possibility that the sense of three dimensions will increase by making the difference between the normal direction of the border portion and the normal direction of the flat portion larger than in Formula 16, but on the other hand, there is also a risk that tiny fluctuations may have an impact and cause the normal direction to shake too much.

Formula 17

$$xytkeisu = xy\text{Max} \times \exp\left(\frac{-len^2}{xydelta^2}\right) \quad (17)$$

It should be noted that aside from the coefficient xykeisu for controlling the X and Y components with the edge amount, it is also possible to adjust the normal direction vector that can efficiently express a greater sense of three dimensions by controlling the Z component instead of the X and Y components. In this case, the coefficient for controlling the Z component is increased as the edge amount len becomes larger.

Thus, the inventive aspect of this embodiment is the improvement of the negative effects that the change of the normal direction becomes smaller when the differential amounts of both the x component and the y component are small in normal direction estimation, and the increase in the change in the normal direction by controlling the size of the x and y direction components or the size of the z direction component with a function that includes the size of the edge amount as a variable. In particular, the inventive aspect of the invention is an improvement in the tendency that it is difficult for the three-dimensional curve that is determined by the normal direction vector to assume a convex shape, due to the normal direction vector near weak borders on the image to not significantly changing from the vector in the vertical direction in the image plane because both the x and y direction component values are smaller than the component value of the z direction.

Eighth Embodiment

Figure 40:
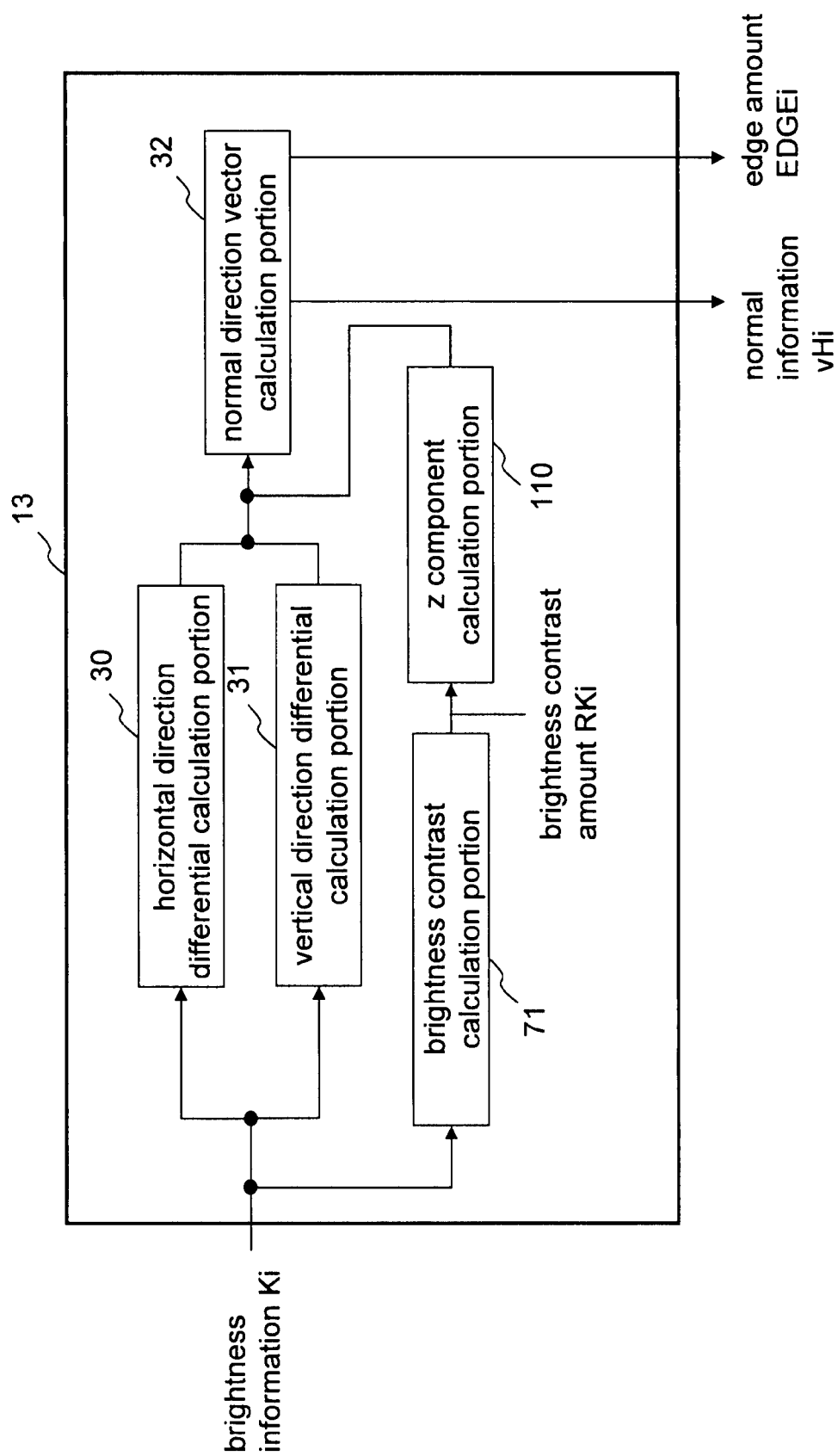
FIG. 40 is a block diagram that shows the configuration of the normal direction estimation portion in the image processing device according to an eighth embodiment of the invention.
Figure 41:
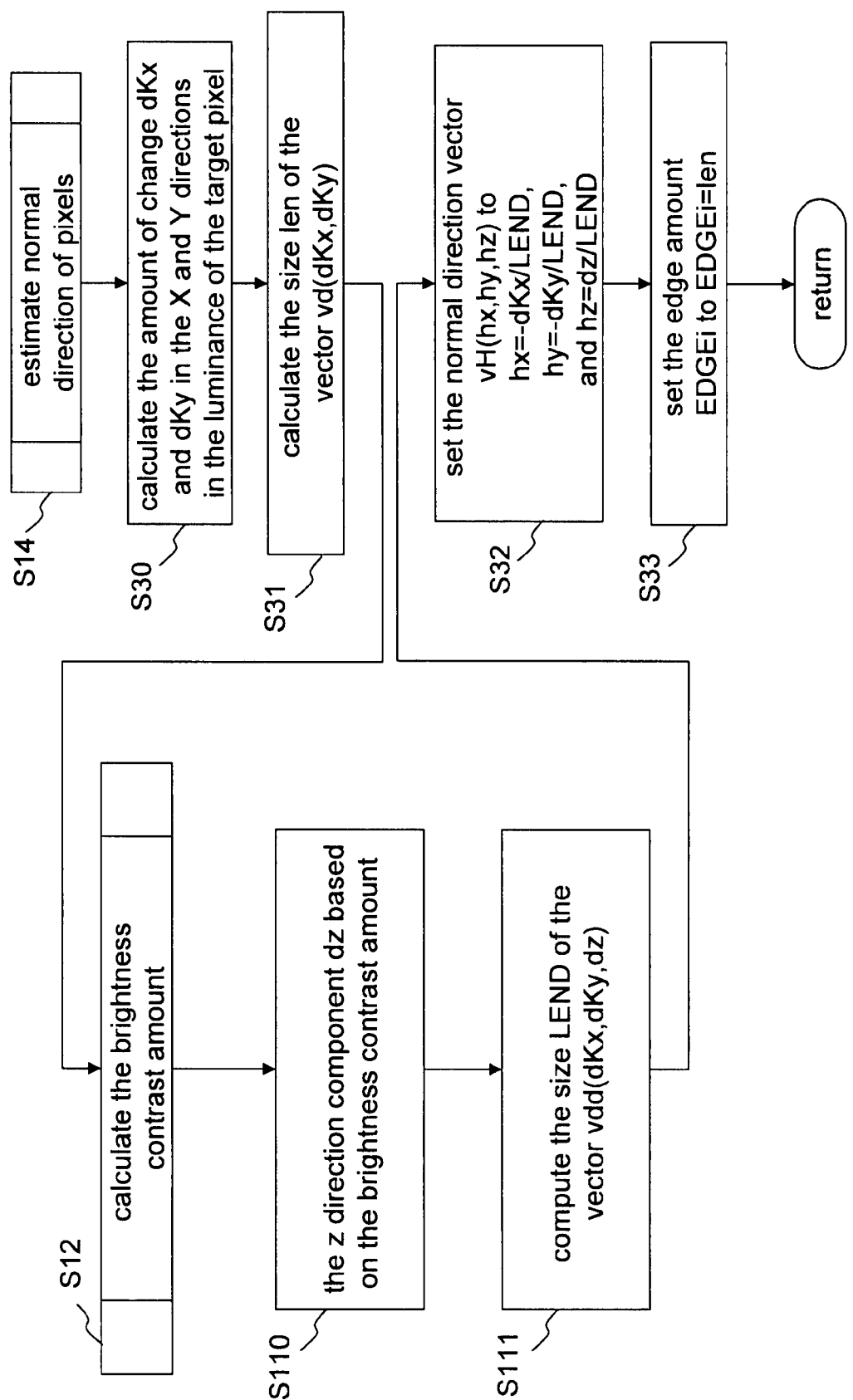
FIG. 41 is a flowchart of normal direction estimation in the image processing method according to the eighth embodiment of the invention.

The image processing method and the image processing device of the eighth embodiment that is shown in FIGS. 40 through 42 shall be described.

The inventive aspect of this embodiment fixes the negative impact of the drop in the change of the normal direction that occurs when the difference is small in both the x direction and the y direction in the normal direction estimation portion 13 of the image processing methods and the image processing devices of the second through sixth embodiments, and increases the change in the normal direction by further controlling the size of the x and y direction components or the size of the z direction component with a function which has the size of the brightness contrast amount RKi as a variable. This feature characterizes the inventive aspect of this embodiment.

FIG. 40 is a block diagram that shows the configuration of the normal direction estimation portion 13 of this embodiment. As shown in FIG. 40, the normal direction estimation portion 13 differs from previous embodiments in that it is further provided with a brightness contrast calculation portion 71 and a Z component calculation portion 110. The brightness contrast calculation portion 71 here performs that same processing as the brightness contrast calculation portion 71 in the fourth embodiment, and can be used in the fourth, fifth, and sixth embodiments as well.

In the second and third embodiments, the brightness contrast calculation portion 71 is added to the normal direction estimation portion 13.

FIG. 41 shows a flowchart of the processing of the normal direction estimation portion 13 of this embodiment. Aside from this processing, the normal direction estimation portion 13 is the same as those in the second through sixth embodiments, and thus will not be described.

First, the changes dKx and dKy in the X direction and the Y direction of the brightness information (luminance, for example) $Ki(x,y)$ of a target pixel $i(x,y)$ are found (S30). The vector vd (dKx,dKy) having these sizes as components corresponds to the edge vector, and the size len becomes the edge amount (S31).

Next, the ratio between the brightness information $Ki(x,y)$ of the target pixel $i(x,y)$ and the surrounding representative brightness information $AKi(x,y)$ that is representative of the brightness information of the surrounding pixels, which was described in the fourth embodiment, is found as the brightness contrast amount $RKi(x,y)$ (S12). Using this value $RKi(x,y)$, the Z component of the normal direction vector $vHi(x,y)$ is found.

Concept Behind z Direction Calculation

The concept behind calculation of the z direction is shown schematically in FIG. 42.

The XY components of the normal direction vector that is set for a cross section that bulges at the coordinates in FIG. 42A are set with the X and Y direction differential amounts of the corresponding brightness information. In contrast, as in FIG. 42B, the brightness contrast amount $RKi(x,y)$ that is obtained is used to determine the Z component as shown in FIG. 42C. Since it can be thought that the pixel is in a globally flat region the closer RKi is to 1, the Z component stays 1.

On the other hand, the greater RKi is from 1 it may be thought that the pixel is farther from a globally flat region and approaches a border region. Consequently, the normal direction vector $vHi(x,y)$ that is obtained by reducing the Z component in accordance with the absolute value of (RKi−1.0) expresses the characteristic of the border. The inventive aspect of this embodiment was arrived at using this thinking.

With the inventive aspect of this embodiment, it is possible to improve the problem that the change in the normal direction becomes small when the differential is small in both the x direction and the y direction in normal direction estimation process of the second through sixth embodiments by correcting the normal direction vector with the brightness contrast amount, and it is possible to obtain a normal direction vector that more effectively expresses a sense of three dimensions. In particular, with the inventive aspect of this embodiment, by using the brightness contrast amount rather than the pixel edge amount in order to control the Z component of the normal direction vector, the impact due to minor changes in the brightness becomes small and it is possible to achieve effective normal estimation that is stable and is not easily affected by changes in the brightness due to the outside light or transmission.

Ninth Embodiment

Figure 43:
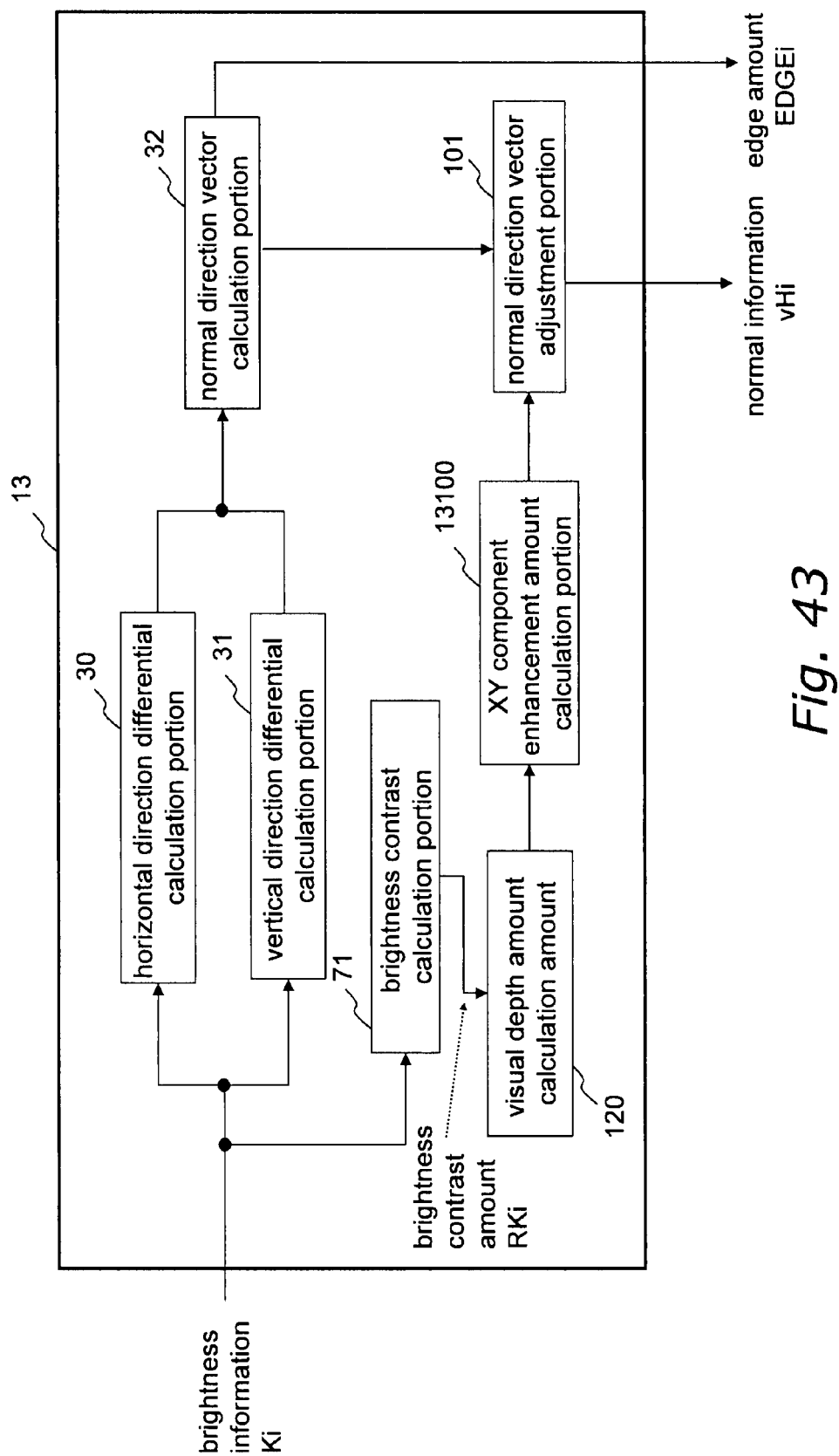
FIG. 43 is a block diagram that shows the configuration of the normal direction estimation portion in the image processing device according to a ninth embodiment of the invention.
Figure 44:
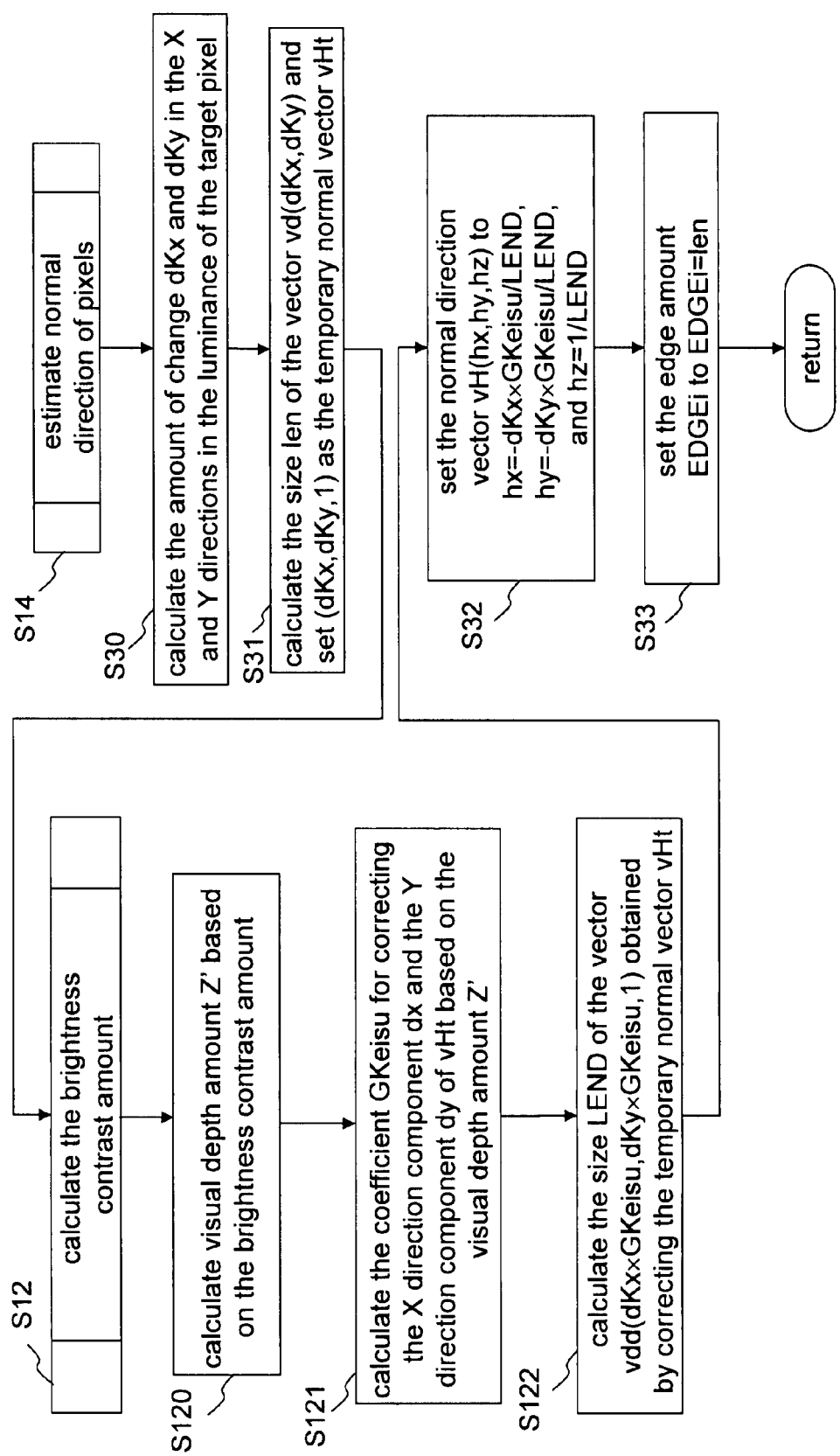
FIG. 44 is a flowchart of normal direction estimation in the image processing method according to the ninth embodiment of the invention.

The image processing method and the image processing device of the ninth embodiment that are shown in FIGS. 43 through 45 shall be described.

FIG. 43 is a block diagram that shows the configuration of the normal direction estimation portion 13 according to this embodiment. FIG. 44 shows the procedure of the normal direction estimation method according to this embodiment. The other sections are the same as described in previous embodiments and thus are not described here.

The normal direction estimation method of the image processing method of this embodiment is described using FIG. 43 and FIG. 44.

As regards the inventive aspect of this embodiment, a visual depth amount Zd that combines the brightness contrast amount $RKi(x,y)$ is defined, and the normal direction vector $vHi(x,y)$ in the target pixel $i(x,y)$ is found based on Zd. The inventive aspect of this embodiment is characterized by this feature.

First, the normal direction estimation portion 13 of this embodiment finds the amount of change dKx and dKy (differential amount of the X direction, differential amount of the Y direction) in the X and Y directions of the brightness information of a target pixel $i(x,y)$, and finds the size len of the vector vd (dKx,dKy). This len becomes the edge amount EDGEi, and is used in subsequent functional portions.

Next, the normal direction estimation portion 13 according to this embodiment finds the brightness contrast amount $RKi(x,y)$, and combines this value (the brightness contrast amount $RKi(x,y)$) with the brightness information $Ki(x,y)$ to find a visual depth amount Zd.

There are many ways to define the visual depth amount. Here, as shown in Formula 18, it is expressed by $Gk(K(x,y), AK(x,y))$. In Formula 18, the subscript i that indicates a value of a pixel i has been removed. $AKi(x,y)$ indicates the surrounding mean brightness information (for example, the mean value of the brightness information of the pixels surrounding the target pixel $i(x,y)$ corresponds to this).

Formula 18

$$Zd=K(x,y)(1+gK(RK(x,y))=Gk(K(x,y),AK(x,y))) \quad (18)$$

The formula shows that the larger the visual depth amount Zd, the closer the distance to the viewer, and also shows that gK is a function of the brightness contrast amount RK.

In general, (1) it has been pointed out that humans perceive the distance to an object based on the brightness information. (2) It has also been pointed out that if the brightness of a section of interest is higher than the brightness of the surroundings, then the psychological effect in humans is that the section of interest is felt brighter.

In other words, it can be said that of sections with the same brightness, the section that is brighter than its surroundings is felt closer by the viewer.

In consideration of (1) and (2) above, the visual depth amount that is defined by Formula 18 has been derived by defining a feeling of depth that better fits with human vision.

FIG. 45 numerically shows how the normal direction vector $vHi(x,y)$ is calculated from the visual depth amount Zd.

Zd in Formula 18 is a function of $K(x,y)$ and $AK(x,y)$, and these two values are functions of the pixel position $i(x,y)$. Thus, Zd is placed in the z component of the three-dimensional space for the normal direction vector, and the least value dz of that z is found. Here, the surrounding brightness information $AK(x,y)$ corresponds to the average brightness of a region that is approximately ⅓ to ¼ or ⅙ the size of the overall image region within the image, which is the region (viewing area) within the image that corresponds to the field of vision. In other words, the surrounding brightness information $AK(x,y)$ corresponds to the average brightness within a locally wide surrounding region that corresponds to the viewing area, and the amount of change $\partial(AK)/\partial x$ for the x coordinate and the amount of change $\partial(AK)/\partial y$ for the y coordinate each can be treated as 0.

The result is that the normal direction vector vHi(x,y) (=(hx,hy,hz)) is that shown in Formula 19.

Formula 19

$$Hi(x, y) = \begin{pmatrix} hx \\ hy \\ hz \end{pmatrix} = \begin{pmatrix} -\frac{\partial G_k}{\partial K} \cdot \frac{\partial K}{\partial x} \\ -\frac{\partial G_k}{\partial K} \cdot \frac{\partial K}{\partial y} \\ 1 \end{pmatrix} = \begin{pmatrix} -dKx \times GKeisu/LEND \\ -dKy \times GKeisu/LEND \\ 1/LEND \end{pmatrix} \quad (19)$$

Thus, with the processing of this embodiment, the control coefficient GKeisu for correcting the X direction component and the Y direction component of the normal direction vector shown in the second through sixth embodiments based on the visual depth amount Zd is found to equal ∂(Gk)/∂K. As shown in Formula 18, this value can be found as the amount of change in the value Gk that is obtained by the brightness K(x,y) and the brightness contrast amount RK(x,y) with respect to the brightness K (x,y).

The vector vdd (−dKx×Gkeisu,−dKy×Gkeisu,1) becomes the normal direction vector that has not been normalized after correction with the control coefficient, and in the invention of this embodiment, the various components are normalized based on the size LEND to find the normal direction vector vHi(x,y).

It should be noted that there are many definitions for the gK of Formula 18, and one example thereof is shown in Formula 20. In Formula 20, A is a positive constant that expresses the degree of improvement.
Formula 20

$$gK(RK(x,y)) = RK(x,y)^A \quad (20)$$

Thus, with the inventive aspect of the embodiment it is possible to improve the problem of reduced fluctuation of the normal direction that occurs when the difference is small in both the x direction and the y direction in normal direction estimation of the second through sixth embodiments. In particular, with the inventive aspect of this embodiment, a visual depth amount is defined taking into consideration the effect that occurs due to the brightness contrast, on a depth amount that is defined by a function of only the luminance of the target section in the second through sixth embodiments, and by finding the normal direction from that visual depth amount, it is possible to achieve normal estimation that has been corrected in accordance with the psychology of vision that causes a region (pixel) to feel closer to the user the more that region (pixel) is on a bright image with a high brightness contrast.
Formula 21

$$Zd = K(x,y) \cdot gK(RK(x,y)) = Gk(K(x,y), AK(x,y)) \quad (21)$$

It should be noted that in addition to Formula 18, it is also possible to define the visual depth amount Zd as shown in Formula 21 as the product of the brightness K(x,y) and gK(RK(x,y)), which is a function of the brightness contrast amount RK(x,y), or using a nonlinear transformation function whose variables are K(x,y) and RK(x,y).

Tenth Embodiment

The image processing method and the image processing device of the tenth embodiment that are shown in FIGS. 46 through 50 shall be described.

Figure 46:
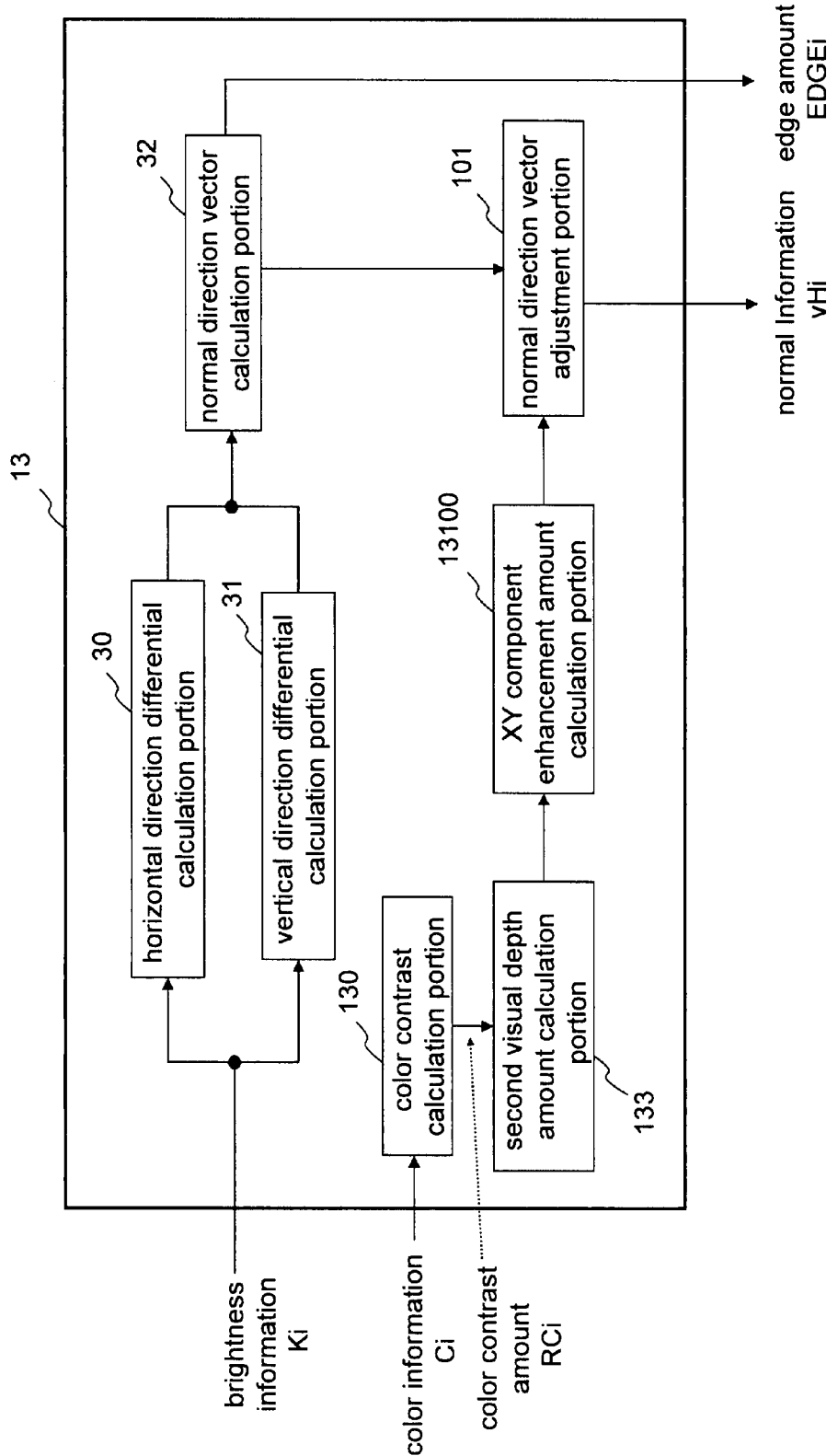
FIG. 46 is a block diagram that shows the configuration of the normal direction estimation portion in the image processing device according to a tenth embodiment of the invention.
Figure 47:
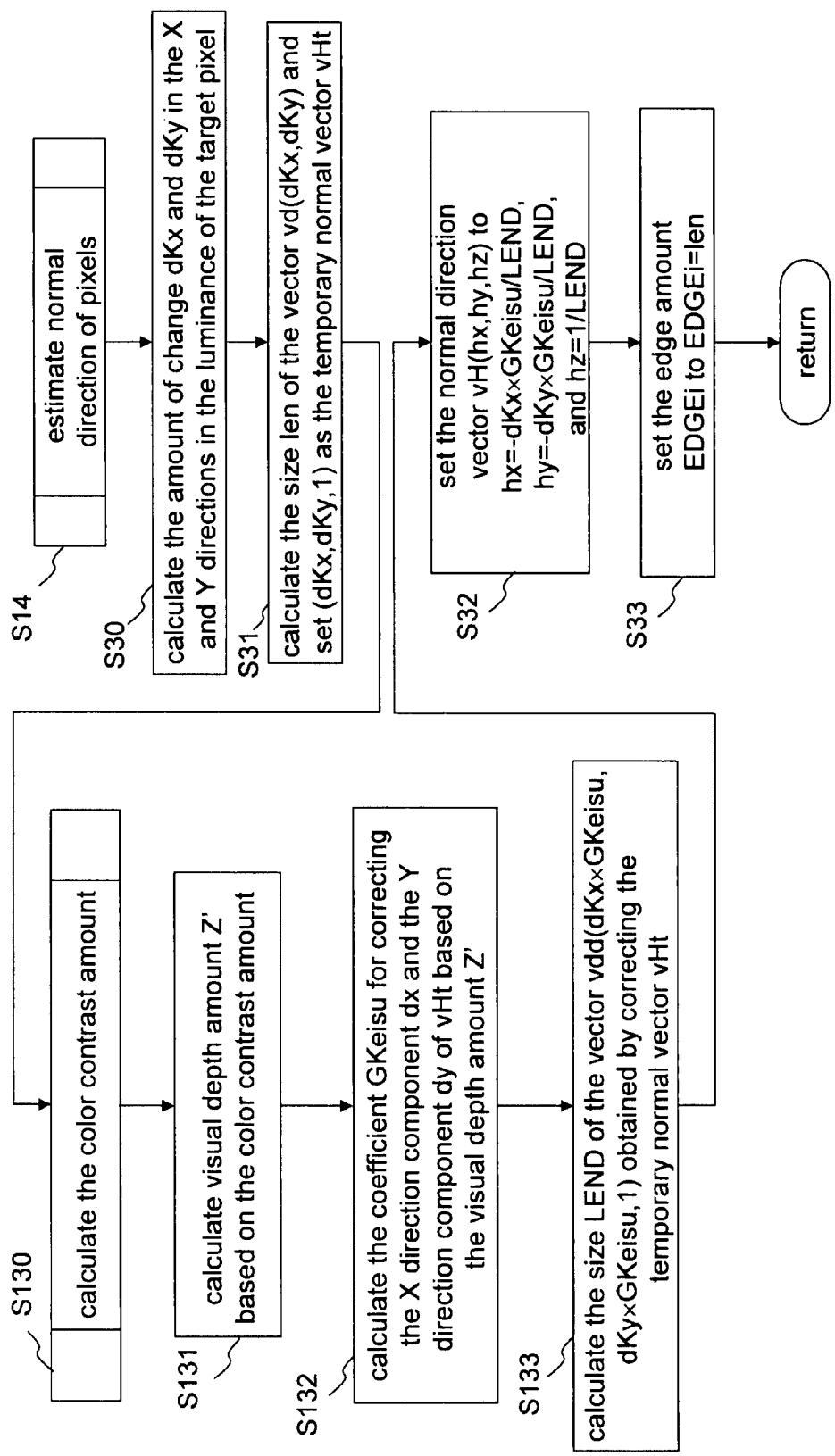
FIG. 47 is a flowchart of normal direction estimation in the image processing method according to the tenth embodiment of the invention.

FIG. 46 is a block diagram that shows the configuration of the normal direction estimation portion 13 according to this embodiment. FIG. 47 shows the procedure of the normal direction estimation method according to this embodiment. Other sections are the same as those described in previous embodiments and thus are not described.

The inventive aspect of this embodiment defines a visual depth amount Zd that is a combination with the color contrast amount RCi(x,y), and the normal direction vector vHi(x,y) in the target pixel i(x,y) is found based on Zd.

Figure 48:
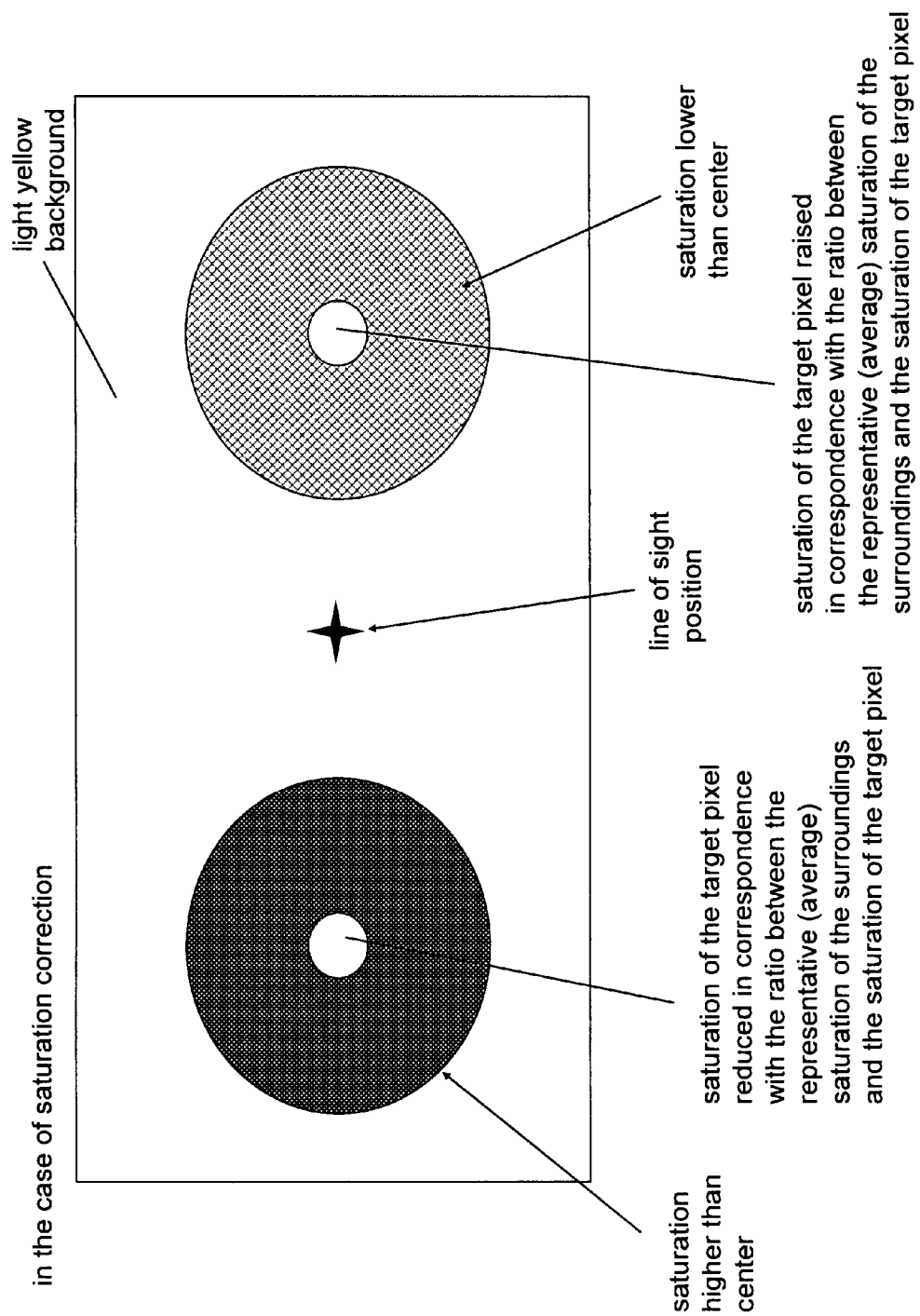
FIG. 48 is a diagram that schematically shows the saturation contrast, which is an example of the color contrast, in the image processing method according to the tenth embodiment of the invention.
Figure 49:
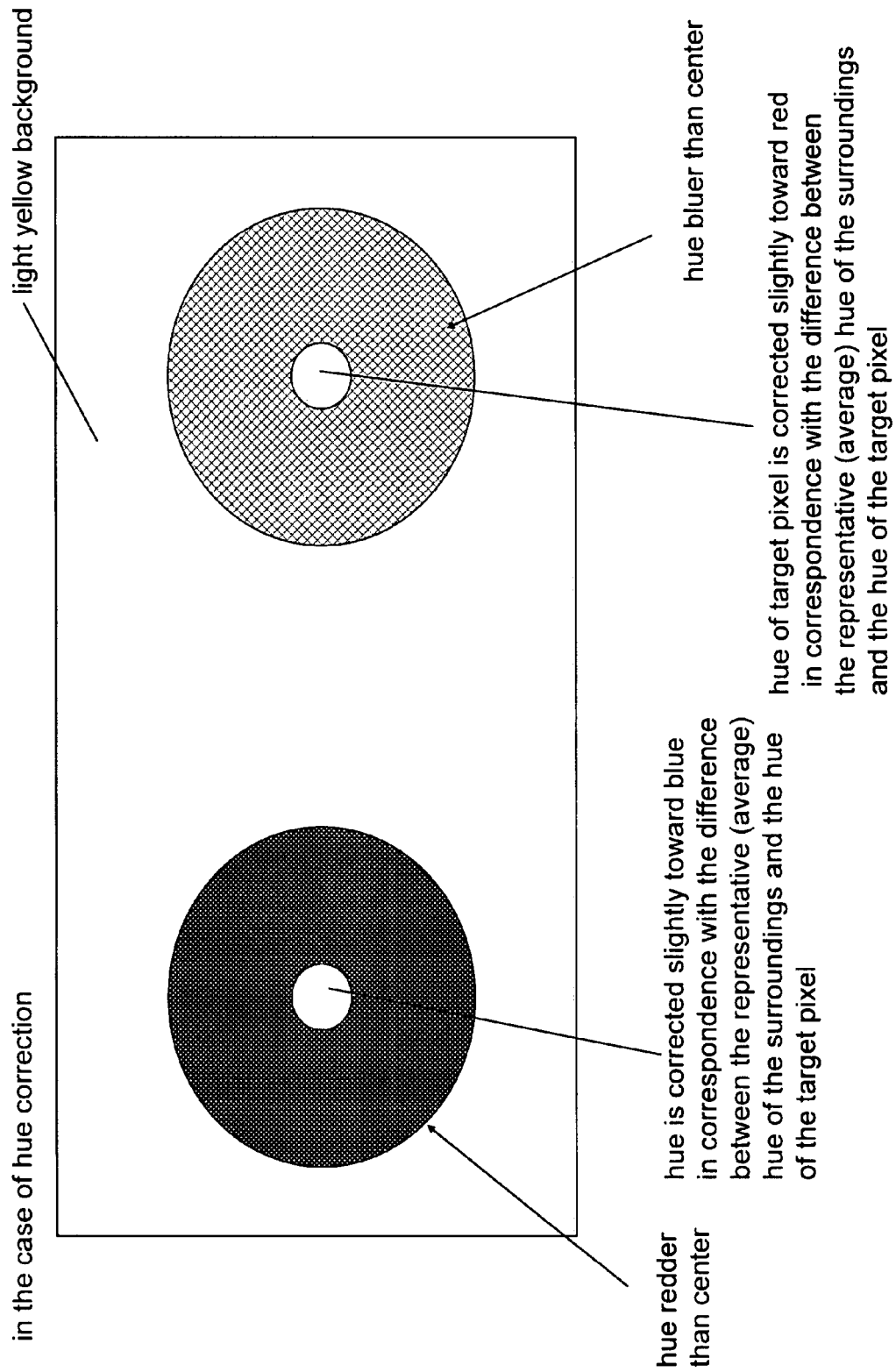
FIG. 49 is a diagram that schematically shows the hue contrast, which is an example of the color contrast, in the image processing method according to the tenth embodiment of the invention.

FIGS. 48 and 49 schematically show the concept of the color contrast characteristic. In FIG. 48, a red and a blue circle with an open center portion are pictured on a gray background. It should be noted that the center region of these two circles is the same gray color as the background. When a person views these circles by focusing on the point of sight shown by the star mark in FIG. 48, that person tends to perceive the center of the red circle as slightly blue, and tends to perceive the center of the blue circle as slightly red. This phenomenon has been elucidated from the psychology of vision, and occurs due to the color contrast characteristic. The color contrast characteristic refers to the effect on the saturation or the hue of a target object when the area around the target object is surrounded by a different saturation or hue. The characteristics shown in (1) and (2) are evident.

(1) In a case where a target object is surrounded by a hue that is different from its own hue, it is perceived that a color complementary to the hue of the surroundings has been added to the target object.

(2) In a case where the saturation surrounding a target object is higher than the saturation of the target object, the target object is felt to have a lower saturation. Conversely, in a case where the saturation surrounding a target object is lower than the saturation of the target object, the target object is felt to have a higher saturation.

In this invention, image correction that gives an impression that is close to human vision (an image (video) that when viewed feels natural based on human visual characteristics) is performed using the color contrast characteristic to correct the pixel color information. For example, if the saturation Vi(x,y) of the color information vCi (vector data of Ci) serves as the target for correction Ci(x,y), then as schematically illustrated by FIG. 48, it is conceivable that by performing saturation correction it will be possible to facilitate an impression that resembles human vision. In other words, in a case where a target pixel i(x,y) is in the center of a circle as in the left circle of FIG. 48, and the saturation Vi(x,y) of the target pixel i(x,y) is lower than a representative saturation AVi(x,y) (for example, the (weighted) mean of the saturation of the surrounding pixels) of a (plurality of pixels that surround the target pixel i(x,y), then by reducing the saturation Vi(x,y) of the target pixel i(x,y) it is possible to achieve favorable correction of the image (color information correction). Conversely, if, as in the right circle, the saturation Vi(x,y) of the target pixel i(x,y) is higher than the representative saturation Avi(x,y) of a (plurality of) pixels surrounding the target pixel i(x,y), then by raising the saturation Vi(x,y) of the target pixel i(x,y) it is possible to achieve favorable correction of the image (color information correction). By performing the above processing it is possible to achieve image (video) correction (color information correction) that is favorable for the visual characteristics of humans. As the representative saturation Vi(x,y) of the pixels surrounding the target pixel i(x,y), it is preferable for the weighted mean saturation within a pixel region Qi, which has a predetermined width that corresponds to the viewing area of humans, to serve as the representative saturation of the pixels surrounding the target pixel i(x,y), but in addition to this, with the pixels within the visual area serving as the target, it is also possible to find a histogram for the saturation of pixels in that region (saturation histogram), and then take the most frequently appearing saturation value, the representative saturation that is obtained by clustering based on the statistical distribution within the visual area, or the mean saturation within the visual area, as the representative saturation Vi(x,y). In this way, if color information correction based on the saturation is performed, then by saving the color information aside from the saturation of each pixel i(x,y), it is possible to maintain the balance of the image and achieve color information correction that is natural in terms of its visual characteristics.

If the hue Hi(x,y) of the color information vCi serves as the target for correction Ci(x,y), then, as schematically shown in FIG. 49, by performing hue correction it is likely possible to facilitate an impression that is resembles human vision. In other words, in a case where a target pixel i(x,y) is in the center of a circle as in the left circle of FIG. 49, and the representative hue AHi(x,y) (for example, the (weighted) mean of the hue of the surrounding pixels) of a (plurality of) pixels surrounding the target pixel i(x,y) is redder (the hue is closer to the red direction) than the hue Hi(x,y) of the target pixel i(x,y), then by moving the hue Hi(x,y) of the target pixel i(x,y) toward blue it is possible to achieve favorable image correction (color information correction). At this time, the color information other than the hue is saved (not changed). With regard to the hue, by keeping down the amount of movement (amount of change) in the hue in order to suppress adverse effects that occur in the image due to sudden changes in the hue, it is possible to maintain the image balance (color balance) as much as possible. In other words, by keeping down the amount of movement (amount of change) in the hue, it is possible to prevent the color of the image from becoming unnatural in terms its visual characteristics. Conversely, as shown in the right circle, if the hue Hi(x,y) of the target pixel i(x,y) is more blue (the hue is closer toward blue) than the representative hue AHi(x,y) of the pixels surrounding the target pixel i(x,y), then by moving the hue Hi(x,y) of the target pixel i toward red, it is possible to achieve good image correction (color information correction). As the representative hue AHi(x,y) of the pixels that surround the target pixel i(x,y), it is preferable for the weighted mean hue within a pixel region Qi that has a predetermined width that corresponds to the visual area of humans to serve as the representative hue of the pixels surrounding the target pixel i(x,y), but in addition to this, with the pixels within the visual area serving as the target, it is also possible to find a histogram for the hue of the pixels in that region (hue histogram), and then from that hue histogram take the most frequent hue value, the representative hue that is obtained by clustering based on the statistical distribution within the visual area, or the mean hue within the visual area, as the representative hue AHi. It should be noted that here a case in which color information correction is performed by moving the hue Hi in a predetermined direction is described, but it is also possible to move (change) the hue by changing the chroma Cb and Cr in a YCbCr space. In this case, qualitatively, the blue component appears by increasing the chroma Cb component, and the red component appears by increasing the chroma Cr component.

The normal direction estimation portion 13 in the image processing device of this embodiment is described using FIG. 46 and FIG. 47.

First, the normal direction estimation portion 13 of this embodiment finds the amount of change dKx and dKy (differential amount of X direction, differential amount of Y direction) in the X and Y directions of the brightness information of a target pixel i(x,y), and finds the size len of the vector vd (dKx,dKy). This len becomes the edge amount EDGEi, and is used in subsequent functional portions.

Next, the normal direction estimation portion 13 according to this embodiment finds the color contrast amount RCi(x,y), and combines this value (the color contrast amount RCi(x,y)) with the brightness information Ki(x,y) to find the visual depth amount Zd.

There are many ways to define the visual depth amount. Here, as shown in Formula 22, it is expressed by Gv(K(x,y), AV(x,y)). In Formula 22, the saturation contrast amount RVi(x,y) is selected as the color contrast amount RCi(x,y), and the subscript i that indicates that the value is of a pixel has been removed. AVi(x,y) indicates the surrounding mean saturation information.

Formula 22

$$Zd = K(x,y)(1+gV(RV(x,y))) = G_c(K(x,y), AV(x,y)) \quad (22)$$

The formula shows that the larger the visual depth amount Zd, the closer the distance to the viewer, and also shows that gV is a function of the saturation contrast amount RV.

In general, (1) it has been pointed out that humans perceive the distance to an object based on the brightness information. (2) It has also been pointed out that humans tend to show a high interest in vivid colors, and if the color (saturation or hue, for example) of a section of interest is higher than the color of the surroundings (for example, the saturation is high (the color is vivid)), then the color of the section of interest is felt more strongly vivid.

In other words, it can be said that with sections of the same brightness, the section that is more vivid than its surroundings is felt closer by the viewer.

In consideration of (1) and (2) above, the visual depth amount that is defined by Formula 22 has been derived by defining a feeling of depth that agrees with human vision.

Figure 50:
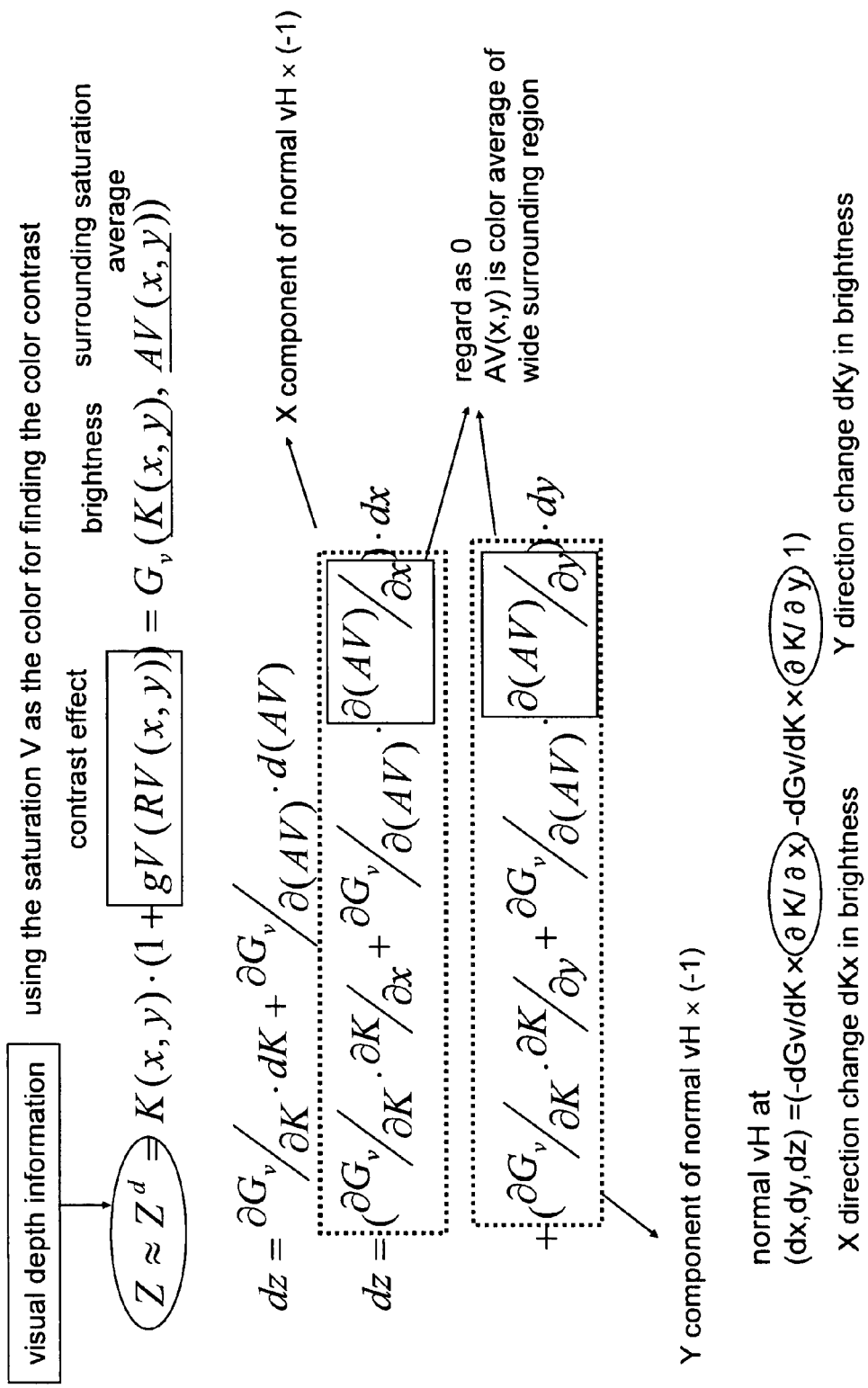
FIG. 50 schematically illustrates normal direction estimation in the image processing method according to the tenth embodiment of the invention.

FIG. 50 numerically shows how the normal direction vector vHi(x,y) is calculated from the visual depth amount Zd.

Zd in Formula 22 is a function of K(x,y) and AV(x,y), and these two values are functions of the pixel position i(x,y). Thus, Zd is placed in the z component in the three-dimensional space for the normal direction vector, and the least value dz of that z is found. Here, the surrounding saturation AV(x,y) corresponds to the average saturation of a region that is approximately ⅓ to ¼ or ⅙ the size of the overall image region within the image, which is the region (viewing area) within the image that corresponds to the field of vision. In other words, the surrounding saturation AV(x,y) corresponds to the average saturation within a locally wide surrounding region that corresponds to the viewing area, and thus ∂(AV)/∂x and ∂(AV)/∂y each can be treated as 0.

The result is that the normal direction vector vHi(x,y) (=(hx,hy,hz)) becomes that shown in Formula 23.

Formula 23

$$Hi(x,y) = \begin{pmatrix} hx \\ hy \\ hz \end{pmatrix} = \begin{pmatrix} -\frac{\partial G_v}{\partial K} \cdot \frac{\partial K}{\partial x} \\ -\frac{\partial G_v}{\partial K} \cdot \frac{\partial K}{\partial y} \\ 1 \end{pmatrix} = \begin{pmatrix} -dKx \times GKeisu/LEND \\ -dKy \times GKeisu/LEND \\ 1/LEND \end{pmatrix} \quad (23)$$

Thus, with the processing of this embodiment, the control coefficient GKeisu for correcting the X direction component and the Y direction component of the normal direction vector shown in the second through sixth embodiments is found to equal ∂(Gt)/∂K based on the visual depth amount Zd. As shown in Formula 22, this value can be found as the amount of change in the value Gv that is obtained with the brightness K(x,y) and the color contrast amount RV(x,y) with respect to the brightness K(x,y).

Next, the vector vdd (−dKx×Gkeisu,−dKy×Gkeisu,1) becomes the normal direction vector that has not been normalized after correction with the control coefficient, and in the inventive aspect of this embodiment, the various components are normalized based on the size LEND to find the normal direction vector vHi(x,y).

It should be noted that there are many ways to define gV in Formula 22, and Formula 24 shows one such example. In Formula 24, A is a positive constant that expresses the degree of improvement.

Formula 24

$$gV(RV(x,y))=RV(x,y) \quad (24)$$

Thus, with the inventive aspect of the embodiment it is possible to improve the problem of reduced change in the normal direction that occurs when the difference is small in both the x direction and the y direction in the normal direction estimation of the second through sixth embodiments. In particular, with the inventive aspect of this embodiment, a visual depth amount is defined taking into consideration the effect that occurs due to the color contrast on the depth amount as defined by a function of only the luminance of the target section in the second through sixth embodiments, and by finding the normal direction from that visual depth amount, it is possible to achieve normal estimation that has been corrected in accordance with the psychology of vision that causes regions with a brighter color contrast effect to feel more vivid and brighter and also to feel closer to the user.

Formula 25

$$Zd=K(x,y) \cdot gV(RV(x,y))=G_v(K(x,y),AV(x,y)). \quad (25)$$

It should be noted that in addition to Formula 22, it is also possible to define the visual depth amount Zd as shown in Formula 25 as the product of the brightness K(x,y) and gV(RV(x,y)), which is a function of the color contrast amount RV(x,y), or using a nonlinear transformation function whose variables are K(x,y) and RV(x,y).

Eleventh Embodiment

Figure 51:
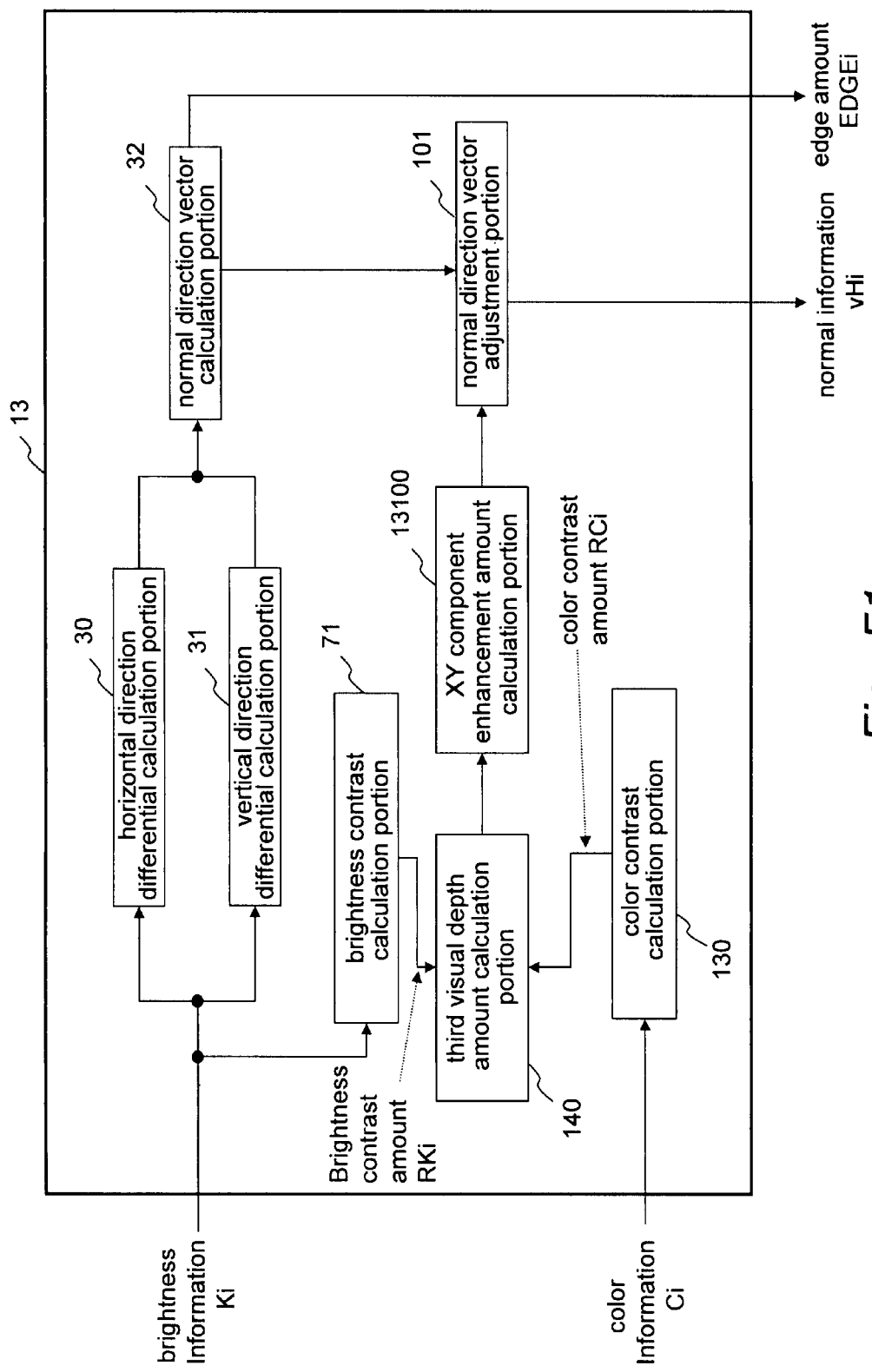
FIG. 51 is a block diagram that shows the configuration of the normal direction estimation portion in the image processing device according to an eleventh embodiment of the invention.
Figure 52:
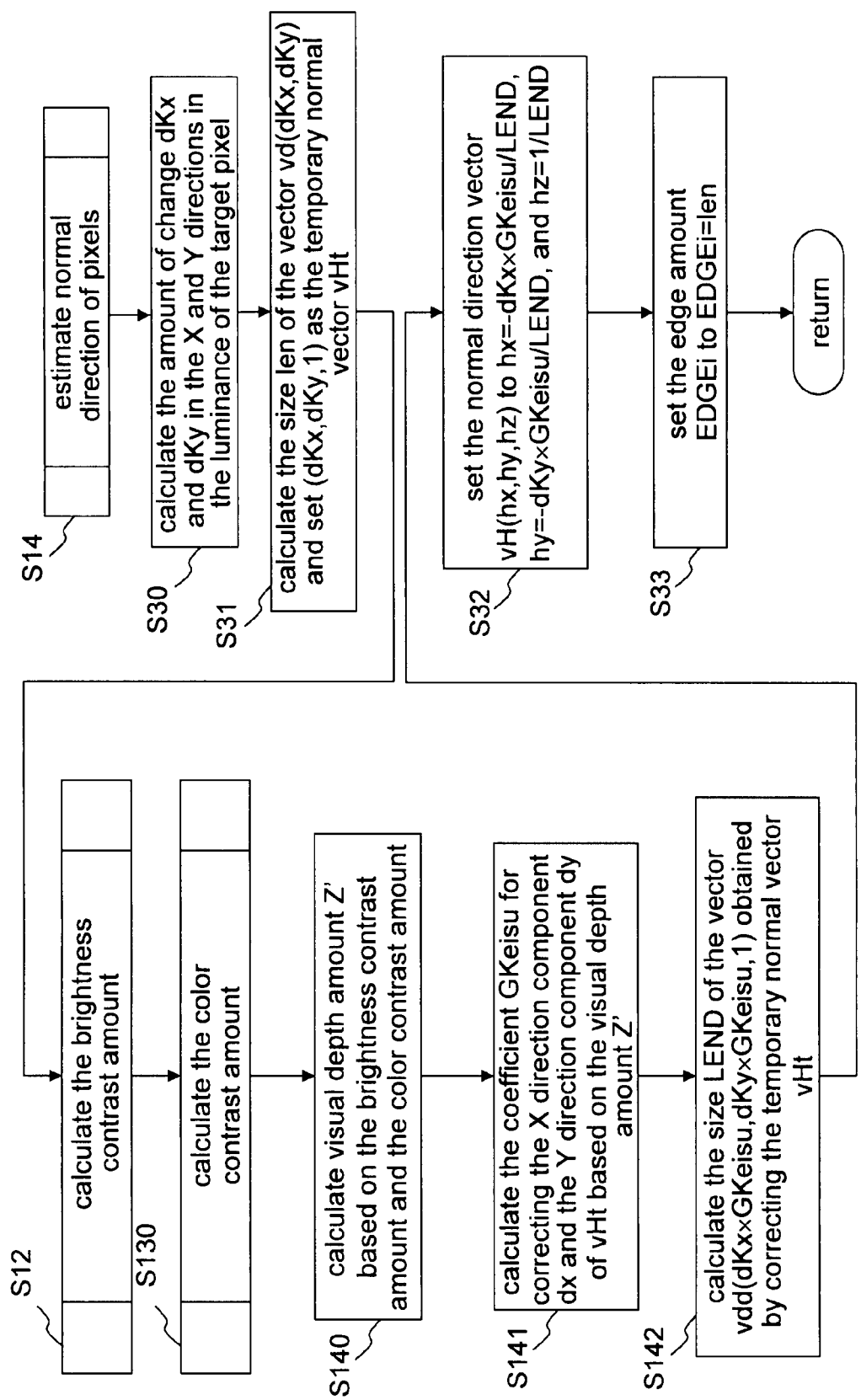
FIG. 52 is a flowchart of normal direction estimation in the image processing method according to the eleventh embodiment of the invention.

The image processing method and the image processing device of the eleventh embodiment shown in FIGS. 51 through 53 shall be described. FIG. 51 is a block diagram that shows the configuration of the normal direction estimation portion 13 in this embodiment. FIG. 52 shows the procedure of the normal direction estimation method according to this embodiment. Other sections are the same as those described in previous embodiments and thus are not described.

The normal direction estimation method in the image processing method of this embodiment is described based on FIG. 51 and FIG. 52.

The inventive aspect of this embodiment is that the normal direction vector vHi(x,y) of the target pixel i(x,y) is found based on a visual depth amount Zd that combines the brightness contrast amount RKi(x,y) in the ninth embodiment and the color contrast amount RCi(x,y) in the tenth embodiment.

First, the normal direction estimation portion 13 finds the amount of change dKx and dKy (differential amount of X direction, differential amount of Y direction) in the X and Y directions of the brightness information of a target pixel i(x,y), and finds the size len of the vector vd (dKx,dKy). This len becomes the edge amount EDGEi, and is used in subsequent functional portions.

Next, the normal direction estimation portion 13 finds the brightness contrast amount RKi(x,y) and the color contrast amount RCi(x,y), and combines these two values with the brightness information Ki(x,y) to obtain the visual depth amount Zd.

There are many ways to define the visual depth amount. Here, as shown in Formula 26, it is expressed by Gt(K(x,y), AK(x,y),AV(x,y)), in which the ninth and tenth embodiments are linearly connected. In Formula 26, the saturation contrast amount RVi(x,y) is selected as the color contrast amount RCi(x,y), and the subscript i that indicates that the value is of a pixel has been removed. AKi(x,y) indicates the surrounding mean brightness information, and AVi(x,y) indicates the surrounding mean saturation information.

Formula 26

$$Zd = \alpha \cdot K(x, y) \cdot (1 + gK(RK(x, y)) + \\ \beta \cdot K(x, y) \cdot (1 + gV(RV(x, y))) \\ = G_t(K(x, y), AK(x, y), AV(x, y)) \quad (26)$$

The formula shows that the larger the visual depth amount Zd, the closer the distance to the viewer, and also shows that gK is a function of the brightness contrast amount RK and that gV is a function of the saturation contrast amount RV. α and β are predetermined constants.

In general, as shown in the ninth embodiment and the tenth embodiment, it has been pointed out that (1) humans perceive the distance to an object based on the brightness information. It has also been pointed out that (2) humans feel that a section of interest is even brighter when the brightness of the section of interest is higher than the brightness of the surroundings, and also that (3) humans tend to show a high interest in vivid colors, and if the color (saturation or hue, for example) of a section of interest is higher than the color of the surroundings (for example, the saturation is high (the color is vivid)), then the color of the section of interest is felt more strongly vivid. In other words, it can be said that among sections of the same brightness, sections that are more vivid than their surroundings are felt closer by the viewer.

In consideration of (1) through (3) above, the visual depth amount that is defined by Formula 26 has been derived by defining a feeling of depth that better fits with human vision.

FIG. 53 numerically shows how the normal direction vector vHi(x,y) is calculated from the visual depth amount Zd.

Zd in Formula 26 is a function of K(x,y), AK(x,y) and AV(x,y), and these three values are functions of the pixel position i(x,y). Thus, Zd is placed in the z component in the three-dimensional space for the normal direction vector, and the least value dz of z is found. Here, the surrounding brightness information AK corresponds to the average brightness of a region that is approximately ⅓ to ¼ or ⅙ the size of the overall image region within the image, which is the region (viewing area) within the image that corresponds to the field of vision. In other words, the surrounding brightness information AK(x,y) corresponds to the average brightness within a locally wide surrounding region that corresponds to the viewing area, and the fluctuation amount ∂(AK)/∂x for the x coordinate and the fluctuation amount ∂(AK)/∂y for the y coordinate each can be treated as 0.

Similarly, the surrounding saturation AV corresponds to the average saturation of a region that is approximately ⅓ to ¼ or ⅙ the size of the overall image region within the image, which is the region (viewing area) within the image that corresponds to the field of vision. In other words, the surrounding saturation information AV(x,y) corresponds to the average saturation within a locally wide surrounding region that corresponds to the viewing area, and thus $\partial(AV)/\partial x$ and $\partial(AV)/\partial y$ each can be treated as 0.

The result is that the normal direction vector vHi(x,y) (=(hx,hy,hz)) becomes that shown in Formula 27.

Formula 27

$$Hi(x, y) = \begin{pmatrix} hx \\ hy \\ hz \end{pmatrix} = \begin{pmatrix} -\frac{\partial G_t}{\partial K} \cdot \frac{\partial K}{\partial x} \\ -\frac{\partial G_t}{\partial K} \cdot \frac{\partial K}{\partial y} \\ 1 \end{pmatrix} = \begin{pmatrix} -dKx \times GKeisu/LEND \\ -dKy \times GKeisu/LEND \\ 1/LEND \end{pmatrix} \quad (27)$$

Thus, with the processing of this embodiment, the control coefficient GKeisu for correcting the X direction component and the Y direction component of the normal direction vector shown in the second through sixth embodiments is found to equal $\partial(Gt)/\partial K$ based on the visual depth amount Zd.

Next, the vector vdd (−dKx×Gkeisu,−dKy×Gkeisu, 1) becomes the normal direction vector that has not been normalized after correction with the control coefficient, and in the inventive aspect of this embodiment, the various components are normalized based on that size LEND to find the normal direction vector vHi(x,y).

It should be noted that there are many definitions for gK and gV in Formula 26, and one example thereof is shown in Formula 28. In Formula 28, A and p are positive constants that express the degree of improvement.

Formula 28

$$gK(RK(x,y))=RK(x,y)^\lambda$$

$$gV(RV(x,y))=RV(x,y) \quad (28)$$

Thus, with the inventive aspect of the embodiment it is possible to improve the problem of reduced fluctuation of the normal direction that occurs when the difference is small in both the x direction and the y direction in normal direction estimation according to the second through sixth embodiments. In particular, with the inventive aspect of this embodiment, a visual depth amount that takes into consideration the effect that occurs due to the brightness contrast and the effect that occurs due to the color contrast in the depth amount as defined by a function of only the luminance of a target section in the second through sixth embodiments is defined, and by finding the normal direction from that visual depth amount, it is possible to achieve normal estimation that has been corrected in accordance with the psychology of vision that has a user feel an object more brightly and vividly the brighter the brightness contrast effect and the higher the color contrast effect, and also to feel closer to the user.

Formula 29

$$Zd=K(x,y)\cdot gK(RK(x,y))\cdot gV(RV(x,y))=G_t(K(x,y),AK(x,y),AV(x,y)). \quad (29)$$

It should be noted that in addition to Formula 26, it is also possible to define the visual depth amount Zd as shown in Formula 29 as the product of the brightness K(x,y), gK(RK(x,y)), which is a function of the brightness contrast amount RK(x,y), and gV(RV(x,y)), which is a function of the color contrast amount RV(x,y), or using a nonlinear transformation function whose variables are K(x,y), RK(x,y) and RV(x,y).

Twelfth Embodiment

The image processing method and an image processing device 1200 according to the twelfth embodiment, which are shown in FIGS. 54 to 67, are described.

<12.1: Configuration of the Image Processing Device>

Figure 54:
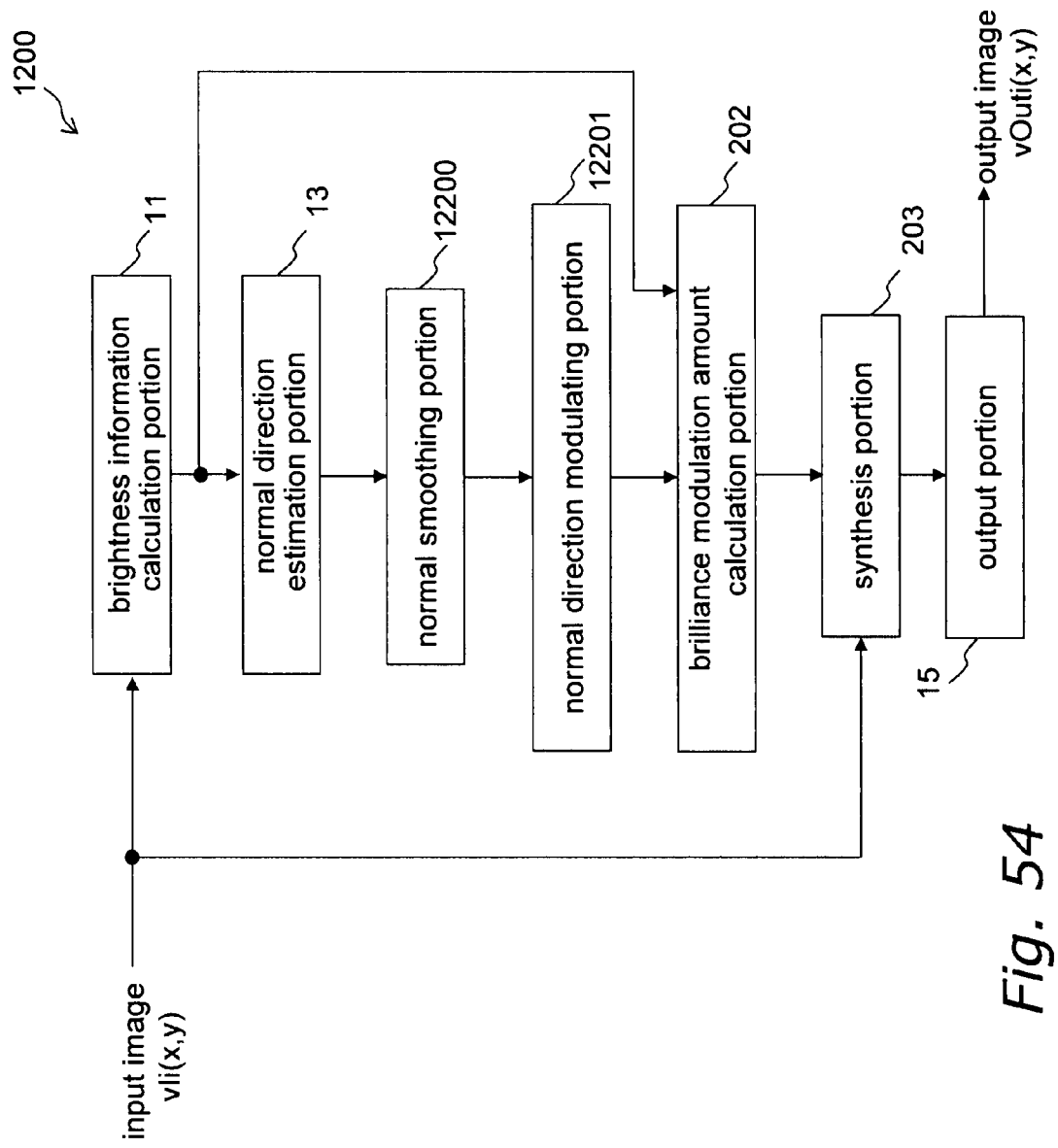
FIG. 54 is a block diagram that shows the configuration of the image processing device according to a twelfth embodiment of the invention.

FIG. 54 shows the configuration of the image processing device 1200 according to this embodiment.

The image processing device 1200 is primarily made of a brightness information calculation portion 11 that calculates the brightness information of an image signal vIi(x,y) that has been input, a normal direction estimation portion 13 that estimates the normal direction for giving a feeling of depth to the image, a normal smoothing portion 12200 for obtaining a predetermined normal direction from the normal direction that has been estimated by the normal direction estimation portion 13, a normal direction modulating portion 12201 that modulates the predetermined normal direction that has been obtained by the normal smoothing portion 12200, a brilliance modulation amount calculation portion 202 that calculates the modulation of the brightness information from the normal direction that has been modulated by the normal direction modulating portion 12201 and then calculates the amount of brilliance modulation (the amount of brightness modulation) for correcting the brightness information of the input image, a synthesis portion 203 that synthesizes the brilliance modulation amount with the input image signal to obtain a brightness-modulated image, and an output portion 15 that converts the brightness-modulated image signal that has been obtained by the synthesis portion 203 into predetermined image data and outputs the result.

It should be noted that in this embodiment, sections that are the same as those of the previous embodiments are assigned the same reference numerals as before and are not described.

As regards the inventive aspect of this embodiment, the angle that is formed by the predetermined normal direction that has been calculated (the normal direction vector) and the light source direction that has been set (light source normal vector) is modulated to execute modulation in the curved surface normal direction and thereby perform brightness modulation, which occurs due to modulation of the angle. The inventive aspect according to this embodiment is characterized in this feature.

<12.2: Operation of the Image Processing Device>

The operation of the image processing device 1200 is described next using the drawings.

Figure 55:
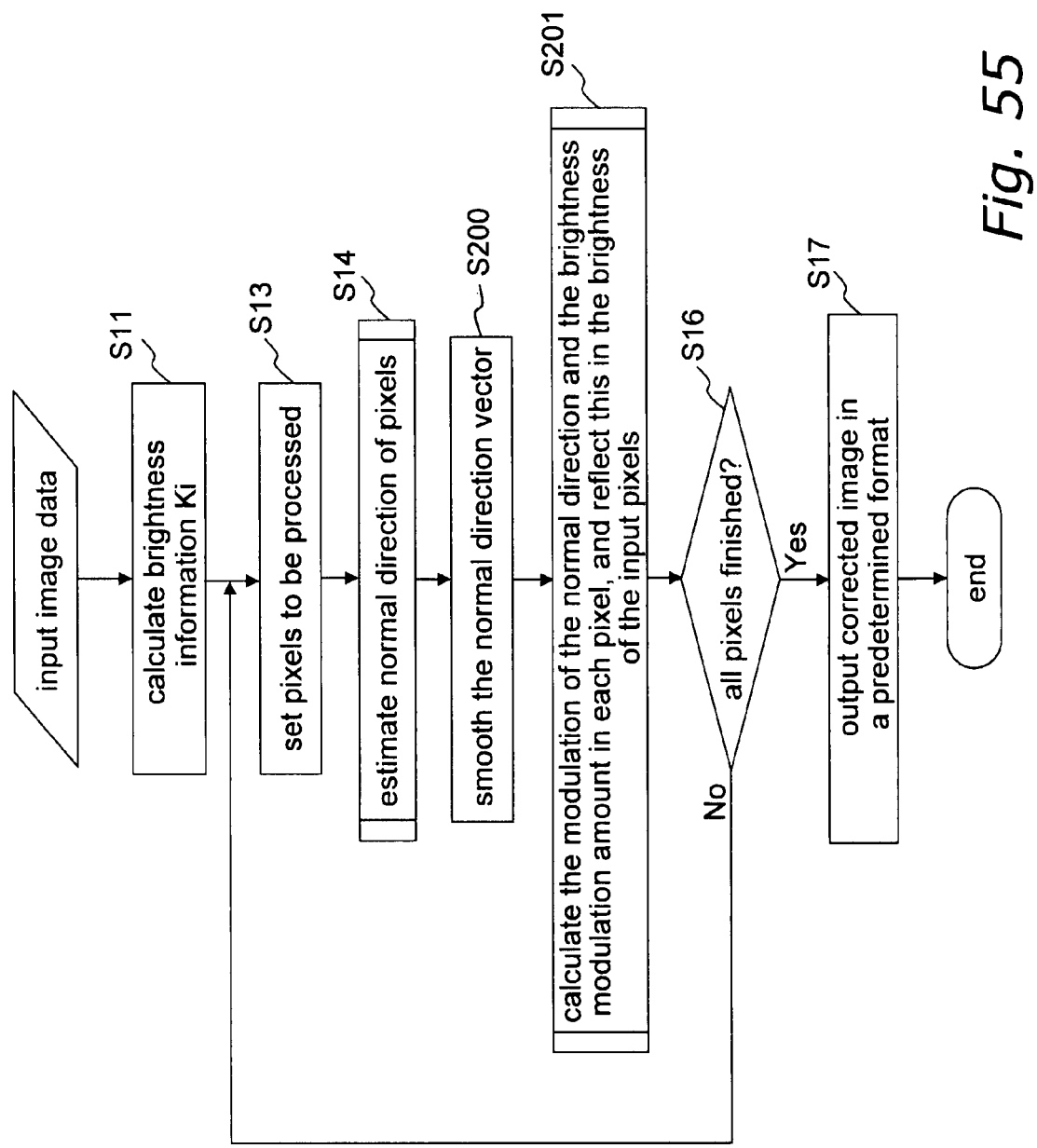
FIG. 55 is a flowchart of the image processing method according to the twelfth embodiment of the invention.
Figure 56:
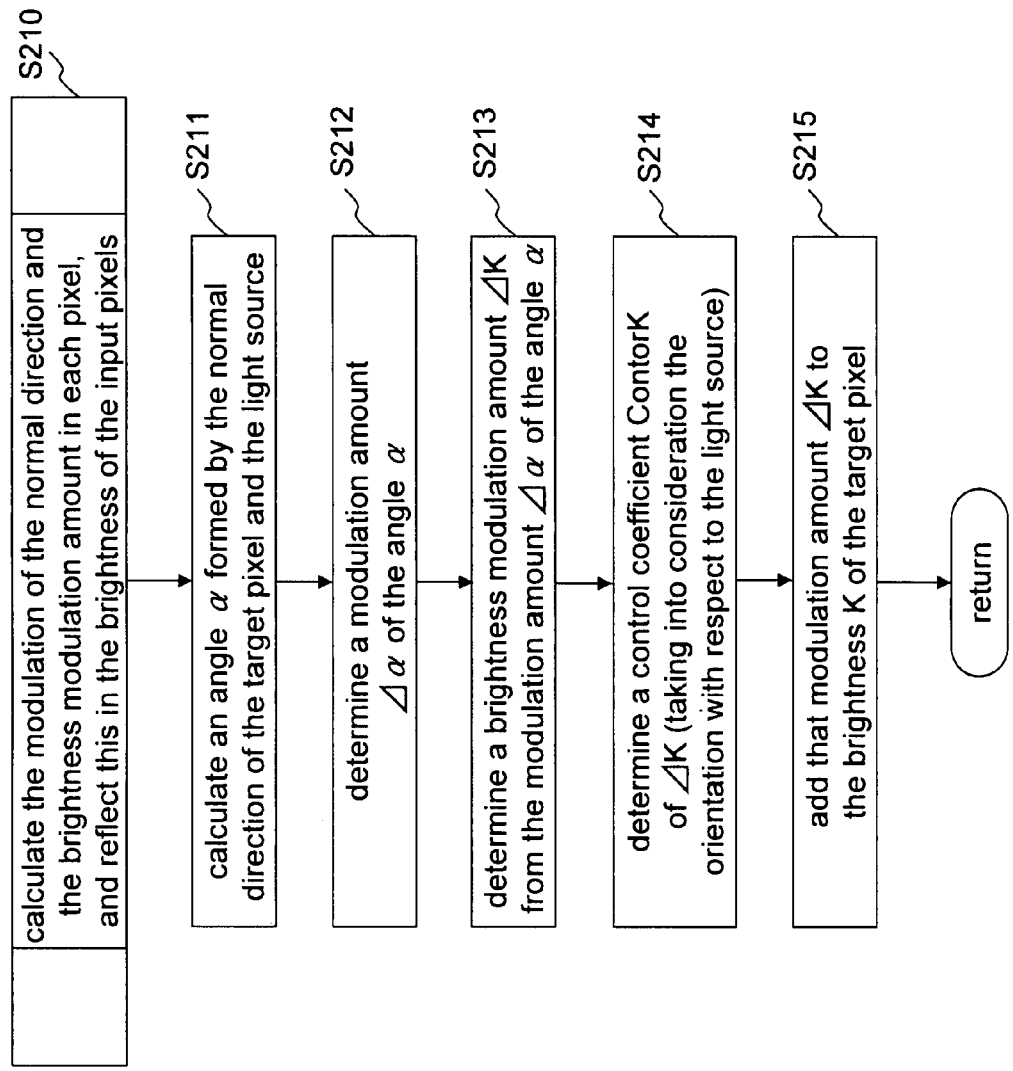
FIG. 56 is a flowchart of the brightness modulation process in the image processing method according to the twelfth embodiment of the invention.

The content of the processing is described primarily using FIGS. 54 to 56.

First, estimation of the normal direction is carried out using the same method as described in the previous embodiments, based on the brightness information Ki(x,y) that has been obtained by the brightness information calculation portion 11. Here, the normal vHi(x,y) is obtained in pixel units, and is significantly affected by fluctuations in the pixel value. When the normal is used as is in the subsequent processing, a large fluctuation occurs in the normal at border portions in the image, and processing tends to be executed focusing on those sections.

However, with the inventive aspect of this embodiment, the goal is to perform shadow modulation due to the normal at sections that are near a flat part of the image and have a grayscale that changes gently (near the half tone) rather than shadow modulation on the border portions of the image, and thus it is not favorable to use of the normal direction vector as it is.

Accordingly, in the inventive aspect of this embodiment, filter processing (smoothing) is performed on each normal component of the normal direction vector vHi(x,y) so as to weaken the fluctuation at border portions and extract a normal direction vector that changes more globally. There are many techniques for the filter processing at this time. For example, there is the smoothing filter of the fifth embodiment, which gives the weighting coefficient g(s,t) a Gaussian distribution with respect to the distance len between the center pixel (target pixel) i(x,y) and a pixel j(s,t) within the filter. However, in this case, there is a tendency for fluctuation of the normal at border portions to be severely inhibited, and thus by using a hybrid filter in which the weighting coefficient g(s,t) with a Gaussian distribution with respect to the distance between the center pixel (target pixel) and the pixels within the filter is multiplied with a coupling coefficient value kweight that is obtained from the difference between the brightness Ki(x,y) of the center pixel and the brightness Kj(s,t) of the pixels within the filter, the various components of the normal vHi are smoothed while maintaining an at least somewhat large brightness (luminance) near borders on the image. Formula 30 is an example of the weighting coefficient for the luminance. BKeisu is a predetermined positive constant that controls the distribution of kweight.
Formula 30

$$k\text{weight} = \exp(-BKeisu \times delK^2)$$

$$delK = (Ki(x,y) - Kj(s,t)) \tag{30}$$

In addition to this, it is also possible to smooth the components of the normal vHi by causing a linear change. Further, although kweight is controlled based on the luminance difference, it can also be similarly inhibited by the difference between the component values (=hxi,hyi,hzi) of the normal vHi(x,y) of the target pixel i(x,y) and the corresponding component values (=hxj,hyj,hzj) of the normal vHj(s,t) of a pixel within the filter.

Figure 60:
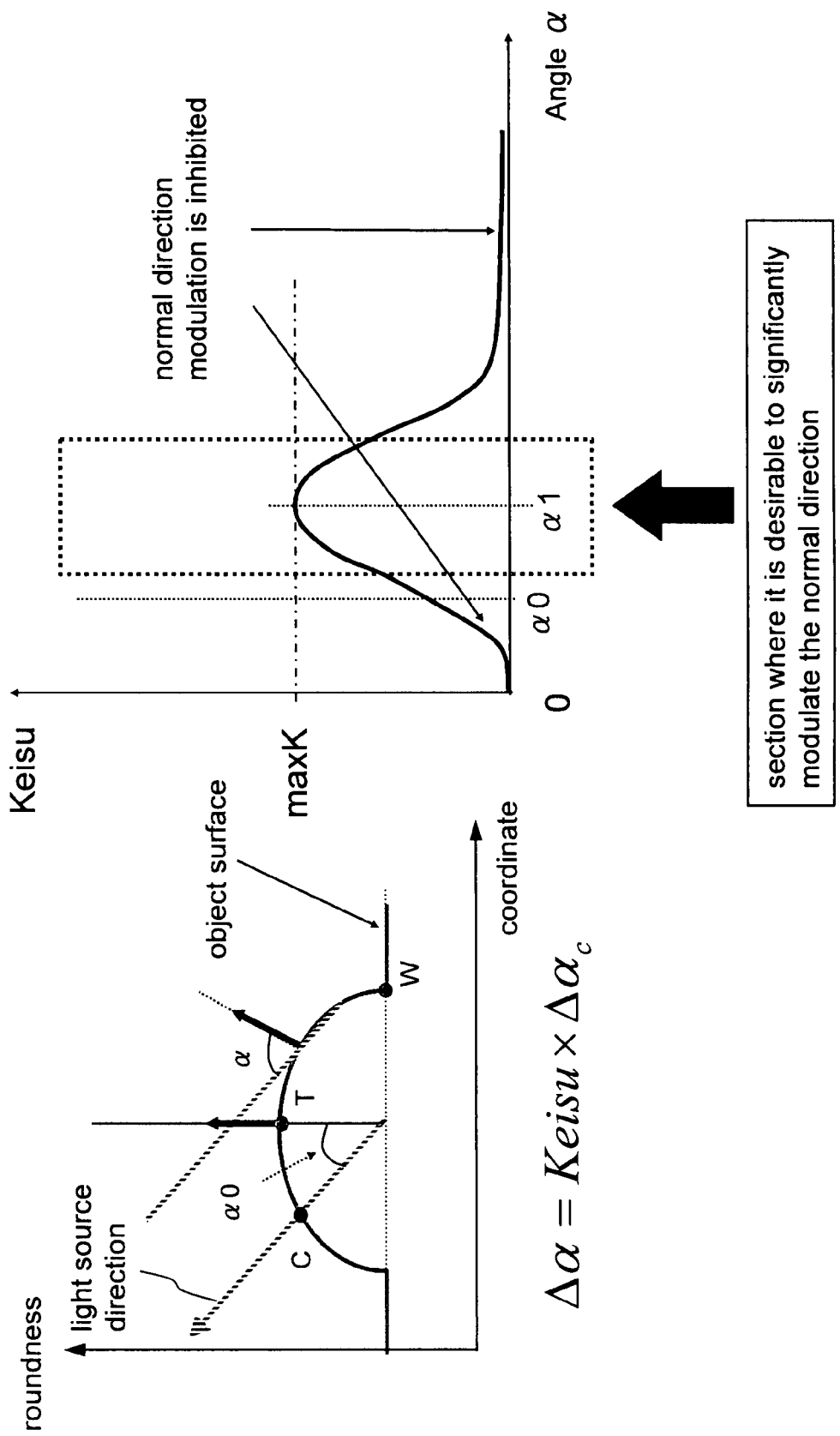
FIG. 60 is a schematic illustration that expresses calculation of the amount of angle modulation by method 2 in the image processing method according to the twelfth embodiment of the invention.

The shadow of a predetermined section is modulated using the normal direction vector vHi(x,y) in the pixel i(x,y) after filter processing thus obtained. This processing is achieved by finding $\triangle a$ for modulating the angle $\alpha$ of the target pixel based on that angle $\alpha$, which is formed by the light direction vector vL(x,y) that has been set and the normal direction vector vHi(x,y), and then finding the brightness modulation amount $\triangle Ki(x,y)$ that occurs due to the angle modulation amount $\triangle \alpha$. The light source vector is displayed with the vector from the pixel i(x,y) toward the light source that has been set, and here the light source vector is set as vL(x,y) assuming that there is a parallel light source present in the upper left. There are many methods for determining the angle modulation amount $\triangle a$, and in this embodiment the method 1 based on FIGS. 57 through 59 and the method 2 based on FIG. 60 are used. Hereinafter, method 1 and method 2 are described using the drawings. It should be noted that in FIGS. 57 through 59 and FIG. 60, the unit of the angle can be degrees or radians.

Method 1 (Angle Modulation Amount $\triangle a$ Determination Method 1)

Method 1 is a method of dividing a region on the image into three sections according to the angle $\alpha$.

The angle formed by the light source vector vL(x,y) and the normal direction vector at a flat portion on the image shall be $\alpha 0$. FIG. 57 illustrates a case in which angle $\alpha$ is smaller than $\alpha 0$ and the z component hz of the normal direction vector vHi is smaller than the z component lz of the light direction vector vL (here, the normal direction vector and the light direction vector shall be the same size (the normal direction vector and the light direction vector shall be normalized vectors); same hereinafter).

Figures 57A, 57B:
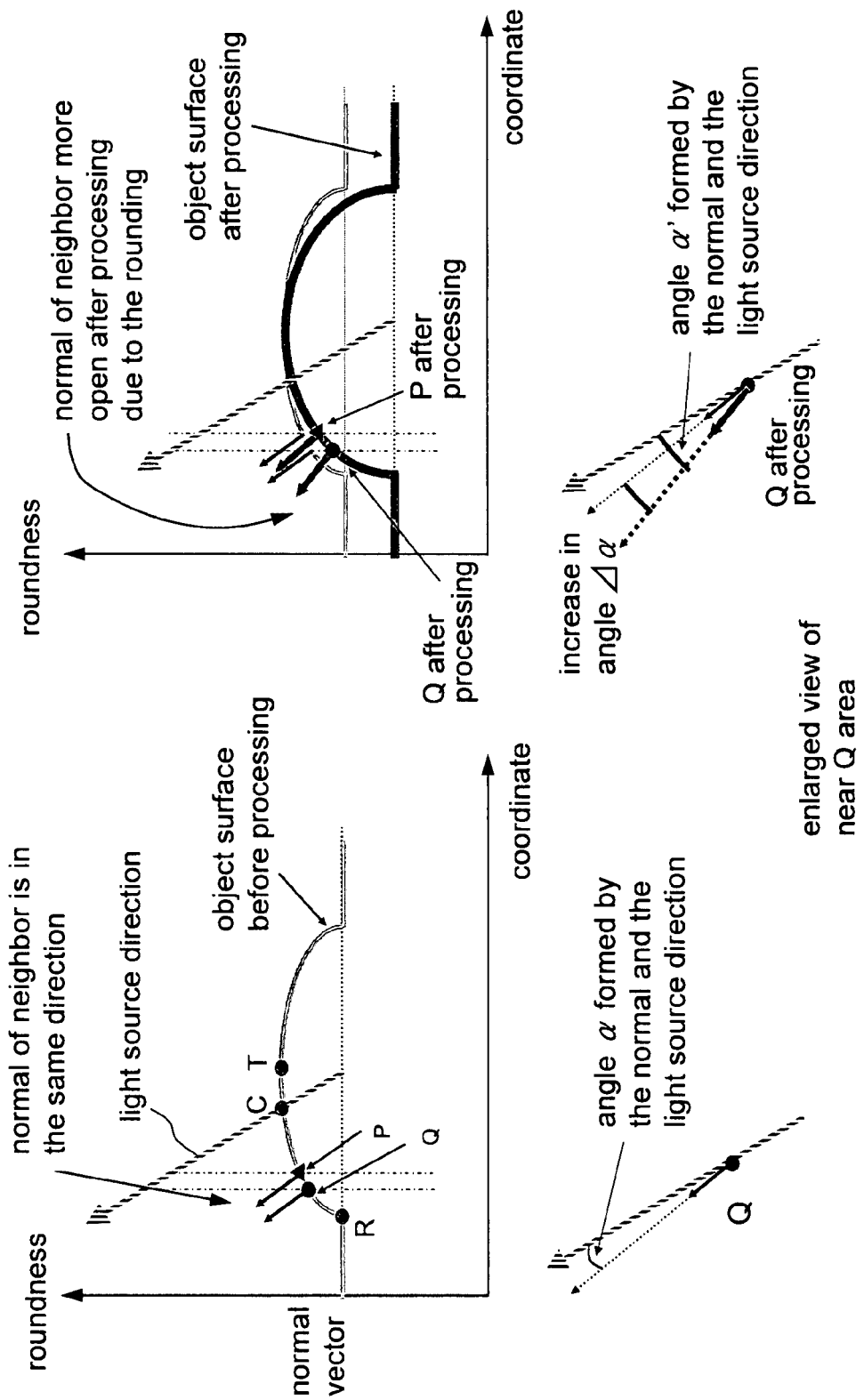
FIG. 57 is a schematic illustration that expresses calculation of the amount of angle modulation by method 1 in the image processing method according to the twelfth embodiment of the invention.

FIG. 57A schematically shows a cross section prior to processing in which the horizontal axis is the coordinate and the vertical axis is the roundness (a cross section of the three-dimensional curved surface that is determined by the normal direction vector). The diagram below is a magnification of the neighbor Q to the target point P, and clearly illustrates the relationship between the light source direction and the normal direction at the neighbor Q. Point P and point Q (neighbor Q) are near one another and thus the directions of the two normals are the same. Let us consider a case in which roundness is added to the point P (roundness is added to the three-dimensional curve near point P), and as shown in FIG. 57B, the direction of the normal at the neighbor Q after processing has moved to a direction that deviates from the light source. In other words, as shown in the magnified view below FIG. 57B, the angle $\alpha'$ between the light source direction and the normal direction at point Q after roundness has been added to the three-dimensional curve is larger than $\alpha$, and the angle modulation amount $\triangle \alpha$ is a positive change. In this region, the greater the distance from an angle $\alpha$ of 0, that is, the point C where the normal direction and the light source direction are the same direction, the more the normal direction vector in that section (the normal direction vector after angle modulation) points toward point R in FIG. 57A. In this case, the amount of modulation $\triangle \alpha$ of angle $\alpha$ also monotonically increases in the positive direction according to the change in roundness (change in roundness of the three-dimensional curve). Further, angle $\alpha=0$ indicates a point C where the light source direction and the normal direction are the same, and thus the amount of angle modulation $\triangle \alpha$ at that point is 0.

Figures 58A, 58B:
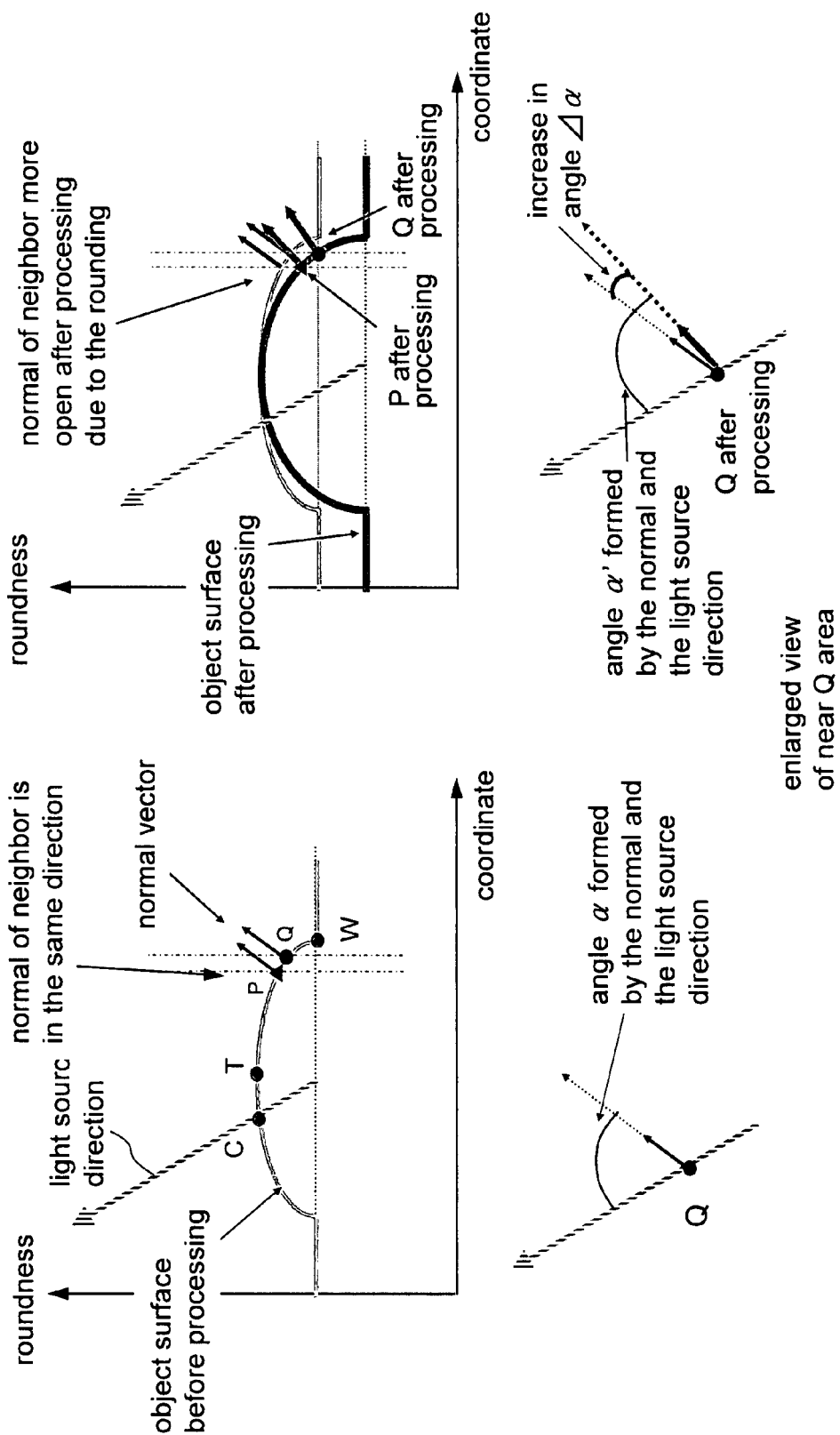
FIG. 58 is a schematic illustration that expresses calculation of the amount of angle modulation by method 1 in the image processing method according to the twelfth embodiment of the invention.

FIG. 58 shows a case in which angle $\alpha$ is larger than $\alpha 0$, and illustrates an example in which the normal points in the direction opposite the light source. The normal at the neighbor Q in FIG. 58A points in a direction that is more open than the light source direction, in the case of FIG. 58B, in which the three-dimensional circle has been given roundness at point P. In other words, as shown in the magnified views near point Q in the diagram below FIG. 58A and the diagram below FIG. 58B, like in the case of FIG. 57 the angle d between the light source direction and the normal direction at point Q after roundness has been added to the three-dimensional curve is larger than $\alpha$, and the amount of angle modulation $\triangle \alpha$ becomes a positive change. In this region, the more the angle $\alpha$ diverges from $\alpha 0$, the more the normal direction vector in that section (the normal direction vector after angle modulation) points toward point W in FIG. 58A. In this case, the amount of modulation $\triangle \alpha$ of angle $\alpha$ also monotonically increases in the positive direction according to the change in roundness (change in roundness of the three-dimensional curve). Further, the amount of angle modulation at angle $\alpha 0$ corresponds to the amount of angle modulation at the flat portion (section at the vertex T of FIG. 58A), and to maintain the brightness here the angle modulation amount $\triangle \alpha$ is equal to 0.

On the other hand, FIG. 59 shows a case in which the angle $\alpha$ is less than $\alpha 0$ and the z component hz of the normal vHi is larger than the z component lz of the light source vL. This case is different from the case of FIGS. 57 and 58, and in the case of FIG. 59A in which roundness was added to the three-dimensional curved surface at section P, the direction of the normal at the neighbor Q approaches the light source direction. In other words, as shown in the magnified views near point Q in the diagram below FIG. 59A and the diagram below FIG. 59B, the angle $\alpha$ formed by the light source direction and the normal direction near point Q changes toward a smaller angle due to the roundness of the three-dimensional surface, and the amount of angle modulation $\triangle \alpha$ also changes to a negative value. From this movement of the angle modulation amount and the condition that the angle modulation amount is 0 when angle $\alpha=0$ in FIG. 57 and the angle modulation amount at angle $\alpha 0$ in FIG. 58 is 0, in this region $\triangle \alpha$ at first monotonically decreases with respect to an increase in the angle α and then becomes a minimum change amount $\triangle \alpha d$ at the point in this region with the predetermined angle αd (0<αd<α0, and for example αd=α0/2), and as angle α increases from there toward angle α0, $\triangle \alpha$ changes in a monotonically increasing manner toward 0. This is determined from the condition that angle α=0 in FIG. 57, that is, $\triangle \alpha$=0 in the section where the light source direction matches the normal direction, the condition that angle α0=0 in FIG. 59, that is, $\triangle \alpha$=0 in the flat section (section where the normal has a z component only), and the condition that $\triangle \alpha$ changes continuously in a gentle manner (the differential values at α=0 and α=α0 match).

Figure 62C:
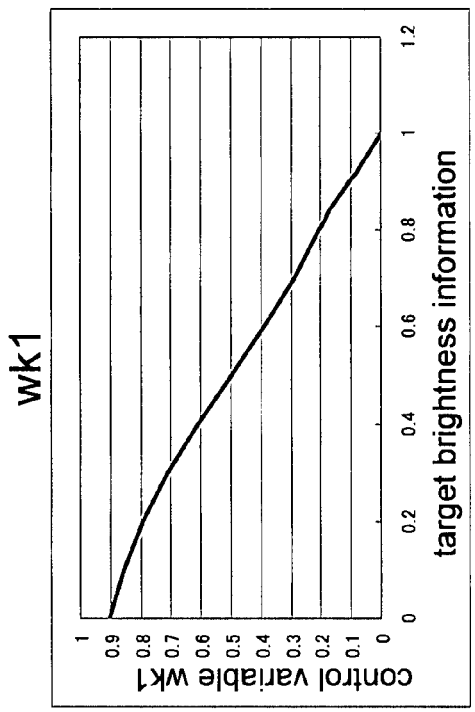
FIG. 62 shows an example of the control coefficients in the image processing device according to the twelfth embodiment of the invention.
Figure 62A:
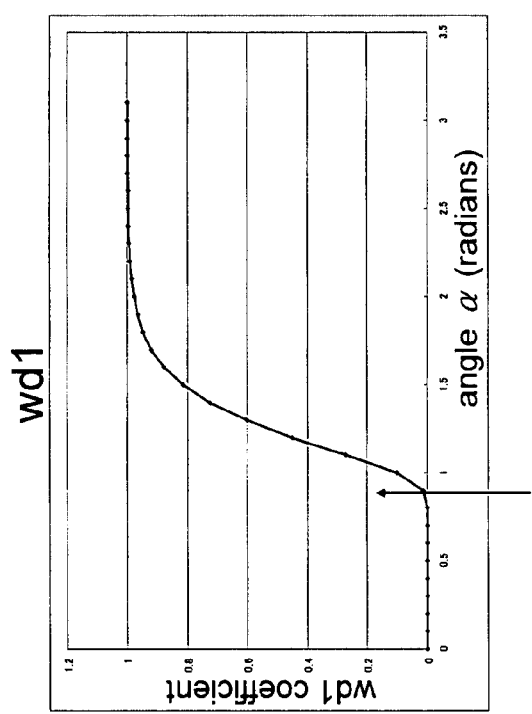
Figure 62B:
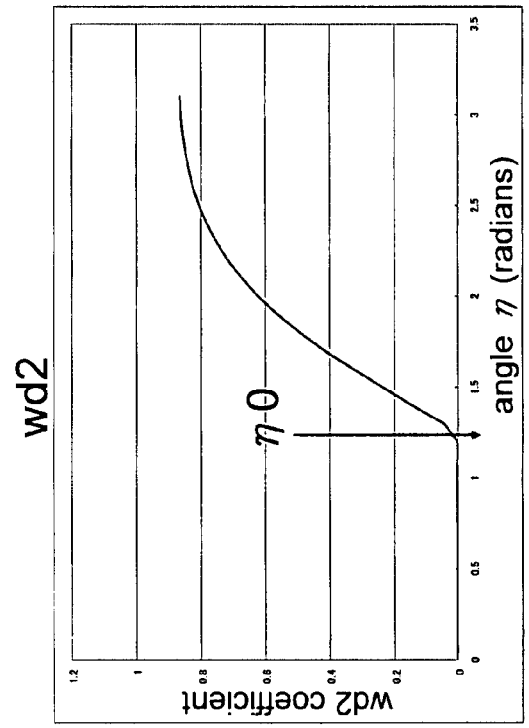

With the image processing device 1200, the angle modulation amount $\triangle \alpha$ is controlled by two control coefficients wd1 and wd2 as shown in FIG. 61 and FIG. 62.

As shown in FIG. 61A, control coefficient wd1 is a control coefficient for determining whether a pixel is on the light source side or the shadow side based on the angle α between the light source direction and the normal direction.

As shown in FIG. 61B, control coefficient wd2 is a control coefficient for determining whether a pixel is on the light source side or the shadow side based on the angle η formed by the incidence vector on the XY plane (2D image plane) of the light source vector and the incidence vector on the XY plane (2D image plane) of the normal direction vector.

An example of control coefficient wd1 and control coefficient wd2 is shown in Formula 31 and Formula 32.

In Formula 31 and Formula 32, SSS1 and SSS2 are predetermined positive constants that control the sloping of the correction coefficients. Further, α0d is expressed by α0d=α0−δα0, and corresponds to a value slightly shifted from the angle that is formed by the normal direction and the light source direction in the flat section of the image. η0 in Formula 31 is a positive constant expressed by η0=π×0.5−δη0 (radians), and δη0 is a tiny positive constant. When the angle η between the vector where the normal direction vector of the target pixel has been projected onto the XY plane and the vector where the light source vector has been projected onto the XY plane is greater than 90 degrees (π×0.5 radians), there is a high likelihood that that light source vector does not strike the target pixel. Considering this, 90 degrees (π×0.5 radians) is a conceivable candidate for the determination angle η0 of the angle η between the vector where the normal direction vector of the target pixel has been projected onto the XY plane and the vector where the light source vector has been projected onto the XY plane. In this embodiment, to give some leeway to the angle region in which brightness modulation is executed from 90 degrees (π×0.5 radians), the value obtained by subtracting the tiny angle δη0 is set as the determination angle η0. It should be noted that it is also possible for δα0=0. It is also possible to use δη0=0. The control coefficients wd1 and wd2 can also be defined through expressions other than Formula 31 and Formula 32.

Formula 31

$$wd1 = \begin{cases} 2.0/(1.0 + \exp(SSS1 \times (\cos \alpha - \cos \alpha_{0d}))) - 1.0 & \alpha \geq \alpha_{0d} \\ 0.0 & \text{others} \end{cases} \quad (31)$$

Formula 32

$$wd2 = \begin{cases} 2.0/(1.0 + \exp(SSS2 \times (\cos \eta - \cos \eta_0))) - 1.0 & \eta \geq \eta_0 \\ 0.0 & \text{others} \end{cases} \quad (32)$$

As shown in FIGS. 57 through 59, the control coefficients wd1 and wd2 of Formula 31 and Formula 32 are determined under the assumption that the angle modulation amount $\triangle \alpha$ is controlled only from the standpoint of adding roundness to the three-dimensional curve surface, and in practice, further control is necessary due to the relationship between the light source and the target pixel (the number of factors to control increases). Thus, wd1 takes on a value that is close to 0 if the target pixel is on the light source side, and wd1 approaches 1 the more the target pixel is on the shadow side. This can be determined based on whether or not the angle α is smaller than a predetermined reference value, and in the image processing device 1200 it is determined based on the relationship in size between the angle α and the angle α0 in the flat section. That is, wd1 is small when α<α0, and when α≦α0 the control coefficient wd1 monotonically increases as the angle α increases.

On the other hand, wd2 is a control coefficient for determining whether a target pixel is on the light source side with the angle η. This is because if α0<45 degrees then even if α>α0, there is a possibility that the target pixel is on the light source side (there is a chance that the target pixel on the three-dimensional curve is located in a section that is lower than the point on the three-dimensional curve where the light source vector and the normal vector match (a section lower in the z direction).

wd2 approaches 0 when it has been determined that the target pixel is on the light source side in a case where η is smaller than the predetermined reference value η0. Conversely, if η>η0 then it is determined that the target pixel is on the shadow side and wd2 is monotonically increased toward 1 in accordance with η.

With the image processing device 1200, control is performed in line with these two control coefficients as well as based on a control coefficient wk1 that corresponds to the size of the brightness information Ki(x,y) of the target pixel i(x,y). The control coefficient wk1 inhibits sudden drops due to the angle modulation $\triangle \alpha$ in sections where the brightness information is high, and as shown in FIG. 62C, it monotonically decreases with respect to the brightness information Ki(x,y).

The coefficient tkeisu that is determined by the product of these three control coefficients is applied to the angle modulation $\triangle \alpha$ to determine an angle modulation amount $\triangle \alpha t$ as in Formula 33. It should be noted that the control coefficients wd1 and wd2 are controlled by the angles α and η, but it is also possible to control these with the cosine value cos α of angle α and the cosine value cos η of angle η. In this case, the reference values α0 and η0 are the cosine values of those angles.

Formula 33

$$tkeisu = wd1 \times wd2 \times wk1$$

$$\Delta \alpha_t \times \Delta \alpha \times tkeisu \quad (33)$$

With the image processing device 1200, the angle modulation amount $\triangle \alpha t$ that is obtained in Formula 33 is adopted in the formula shown in FIG. 63 in order to calculate the brightness modulation amount $\triangle Ki(x,y)$. Here, the diffuse reflection component and the mirror reflection component both are functions of cos α, and thus if a negative occurs due to this differential and $\triangle \alpha t$ is positive as shown in FIGS. 57 and 58 (the normal direction vector moves in the direction away from the light source direction vector (the angle α formed between the normal direction and the light source direction becomes larger)), then the brightness modulation amount $\triangle Ki(x,y)$ changes to a negative value and shadow modulation occurs.

Conversely, in the case of FIG. 59, if $\triangle \alpha t$ is negative (the normal direction vector moves in the direction toward the light source direction vector (the angle α formed between the normal direction and the light source direction becomes smaller)), then the brightness modulation amount $\varDelta Ki(x,y)$ changes to a positive value and light modulation occurs. It should be noted that the ambient light component is listed in FIG. 63 but ordinarily it does not depend on the angle α and thus the increase in the ambient light component due to the angle modulation amount $\varDelta \alpha$ is 0.

Method 2 (Angle Modulation Amount $\varDelta \alpha$ Determination Method 2)

Method 2 is described next.

In contrast to method 1 that was described using FIGS. 57 to 59, with method 2 shown in FIG. 60, the angle α that is formed by the light source direction and the normal direction is not is divided by the case, and as shown in the right diagram of FIG. 59, the angle modulation amount $\varDelta \alpha$ of a section where it is desirable to modulate the shadow is increased.

In this case, fkeisu for determining the angle modulation amount is controlled as follows.

fkeisu (=Keisu) (in FIG. 60, Keisu) is increased as the angle α that is formed by the light source direction and the normal direction becomes larger from near the angle α0 that is formed by the light source direction and the normal direction in a flat portion of the image, and after peaking at a certain angle (α1 in the right diagram of FIG. 60) fkeisu is reduced and approaches 0 at point W. The angle modulation amount $\varDelta a$ in this case is expressed by Formula 34. $\varDelta abase$ is a predetermined reference change amount, and is a positive constant.

Formula 34

$$\Delta\alpha = fkeisu \times \Delta\alpha_{base} \quad (34)$$

In this method, the angle modulation $\varDelta \alpha$ changes in the positive direction from α=0 according to angle α, but like in method 1 it is also possible to make the amount of modulation between α=0 and α=α0 a negative value. The condition is that the angle modulation amount $\varDelta \alpha$ is determined such that it changes continuously and gently.

The angle modulation amount $\varDelta \alpha$ of the angle α thus obtained is, like in method 1, controlled by the two coefficients wd1 and wd2 as illustrated in FIGS. 61 and 62.

With the image processing device 1200, control is performed based on these two control coefficients as well as a control coefficient wk1 that corresponds to the size of the brightness information Ki(x,y) of the target pixel i(x,y).

The coefficient tkeisu that is determined by the product of these three control coefficients is applied to the angle modulation $\varDelta \alpha$ to determine an angle modulation amount $\varDelta \alpha t$ as in Formula 33.

Next, the brightness modulation amount $\varDelta Ki(x,y)$ is found from the angle modulation amount $\varDelta \alpha$ like in method 1 in accordance with FIG. 63. It should be noted that in both method 1 and method 2, the control coefficients wd1 and wd2 are controlled by the angles α and η, but it is also possible to control these with the cosine value cos α of angle α and the cosine value cos η of angle η. In this case, the reference values α0 and η0 are the cosine values of those angles.

FIGS. 64 and 65 schematically show an example of shadow modulation with method 2.

The inventive aspect of this embodiment is characterized in that modulation is focused on the normal at portions that are flat and that have a gentle gradation rather than sections that are near borders on the image. Compared to the second and third embodiments, the regions (1) and (2) in FIGS. 64 and 65 are wider. Smoothing the normal direction vector causes the normal direction vector at a border portion to deviate from the XY plane (the two-dimensional image plane), whereas the normal direction vector in a gentle, flat portion conversely draws closer the XY plane (the two-dimensional image plane). Thus, shadow is more effectively modulated than in the second embodiment and the third embodiment, particularly in sections that lie in the direction from the border toward a flat portion, rather than near the border. The size of the regions (1) and (2) in FIG. 64 expresses this. Thus, as shown in FIGS. 64 and 65, grayscale modulation (shadow modulation) also is executed in a such a manner that it starts to appear from near the border toward the flat portion in which the grayscale changes more gently (the meshed region in FIGS. 64 and 65).

FIG. 64 shows the tendency (condition) of the image processed by the image processing device 1200, with respect to the result example 1 that is schematically shown in the second embodiment and the third embodiment. This drawing is an example in which a virtual light source that irradiates light from the upper left has been set, and shows a case in which the center section has a higher luminance than the surrounding region. As shown in FIG. 64A, in region (1) on the lower right of the center circle the light source direction that has been set and the normal direction that has been calculated are different. As shown in FIG. 64B, in region (1) there is a difference between the light source direction vector vR1 and the normal direction vector vHi (the angle that is formed is large) and thus shadow modulation due to modulation of the brightness occurs in section that changed gently in the low-luminance circle on the outside. In other words, in region (1), the two effects of improving the sense of roundedness through the modulation of shadow in section that change gently from the center of the outer low-luminance circle toward the outer circumference.

In contrast to this, as shown in FIG. 64A, in region (2) at the upper left of the center circle the light source direction that has been set and the normal direction that has been calculated are substantially the same direction (the angle formed by the light source direction vector and the normal direction vector is small). Thus, as shown in FIG. 64C, in region (2) the light source direction vector vR1 and the normal direction vector vHi approach the same direction, and as a result, shadow modulation through modulation of the brightness is suppressed.

The result of the above is that the image processing device 1200 obtains an image in which the high-luminance circle portion in the center projects outward toward the front and in which there is a sense of bulging in the flat luminance section of the low-luminance circle.

FIG. 65 shows the tendency (condition) of the image processed by the image processing device 1200, with respect to the result example 2 that is schematically shown in the second embodiment and the third embodiment. This drawing is an example in which a virtual light source that irradiates light from the upper left has been set, and shows a case in which the center section has a lower luminance than the surrounding region. As shown in FIG. 65A, in region (1) on the lower right of the center circle the light source direction that has been set and the normal direction that has been calculated are substantially the same direction. Thus, as shown in FIG. 65B, in region (1) the angle formed by the light source direction vector vR1 and the normal direction vector vHi is small and shadow modulation through modulation of the brightness does not occur.

Figure 65B:
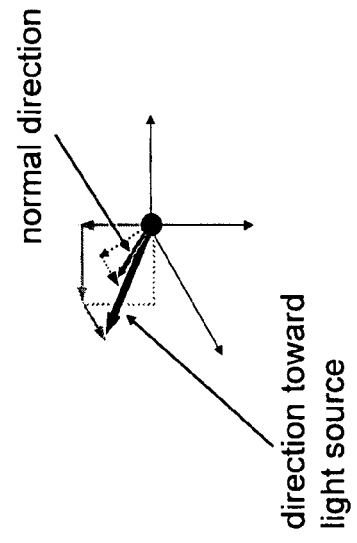
FIG. 65 schematically illustrates the effect of the image processing method according to the twelfth embodiment of the invention.
Figure 65C:
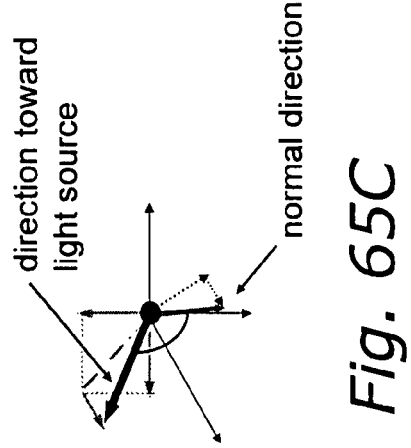
Figure 65A:
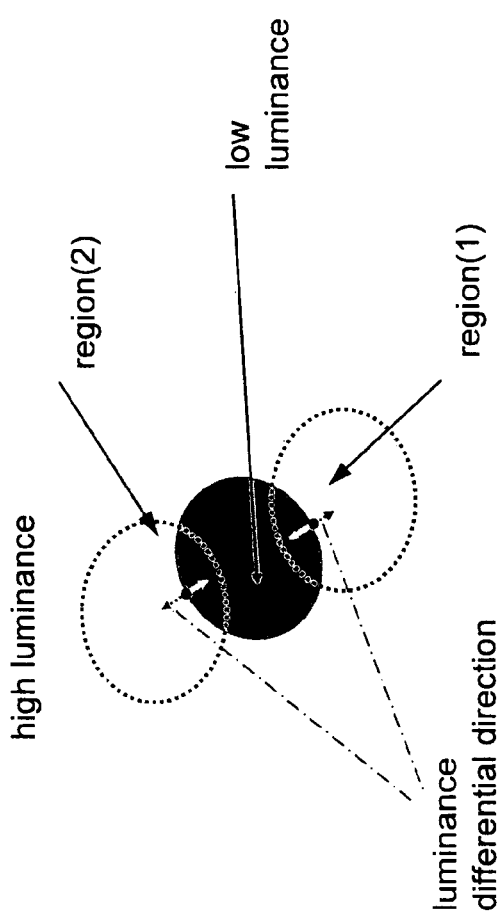
Figure 65D:
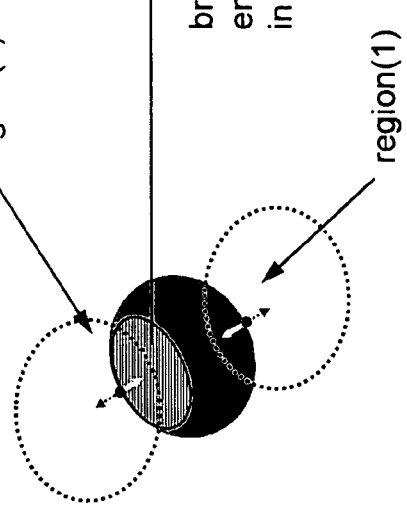

In contrast to this, as shown in FIG. 65A, in region (2) at the upper left of the center circle the light source direction that has been set and the normal direction that has been calculated are different (the angle formed by the light source direction vector and the normal direction vector is large). Thus, as shown in FIG. 65C, in region (2) the light source direction vector vR1 and the normal direction vector vHi are different (the angle formed by the light source direction vector and the normal direction vector is large) and thus brightness modulation (shadow modulation) occurs in the section of the low-luminance center circle that changes gently toward the outer circumference. That is, in region (2), the effect of shadow modulation occurs from the border portion of the center circle toward the center. As a result, in the case of FIG. 65, the image that is obtained gives the feeling that the low-luminance circle portion in the center is slightly depressed gently from the front.

In the case of method 1, qualitatively the same processing is obtained, but in the region of FIG. 59, in which angle $\alpha$ is $\alpha \leq \alpha 0$ and the z component hz of the normal direction vector is larger than the z component of the light source vector, the angle modulation amount $\Delta \alpha$ becomes negative, and thus the corresponding brightness modulation amount $\Delta$Ki(x,y) becomes positive. However, that effect is reduced by the control coefficient wd1 due to the relationship with the light source direction, and as a result a tiny light modulation (light addition) effect also occurs on the side facing the light source.

Through the above processing the brilliance modulation amount calculation portion 202 calculates the brilliance modulation amount (brightness modulation amount) for correcting the brightness information of the input image.

The synthesis portion 203 then synthesizes the input image vIi(x,y) and the brilliance modulation amount (brightness modulation amount) that has been calculated by the brilliance modulation amount calculation portion 202.

The image signal that has been synthesized by the synthesis portion 203 is output to the output portion 15.

The output portion 15 then converts the image signal that has been synthesized by the synthesis portion 203 in correspondence with the image formats that can be handled by the device being used, and outputs the result as output image data vOuti(x,y).

Thus, with the inventive aspect of this embodiment, the angle that is formed by a predetermined normal direction that has been calculated and the light source direction that has been set, which is the direction toward the light source, is modulated in order to modulate the normal direction of the three-dimensional curved surface, and by performing brightness modulation through this angle modulation it is possible to modulate the gradation near the halftone in the image.

As a result, with the inventive aspect of this embodiment, it is possible to modulate the brightness and modulate the change near the halftone where the gradation changes gently (not near the object borders but rather near flat sections of the object or near thin shadows in which there is a gentle change in the brightness), and it is possible to give a sense of three dimensions that has a more natural sense roundness and bulging, instead of the flat three-dimensional feeling that is produced when sharpness is added simply to the border contrast.

It should be noted that in the normal smoothing portion 12200 the BKeisu was fixed, but it is also possible to vary the BKeisu in accordance with the brightness information distribution or the edge amount distribution in the filter. For example, if compared to a predetermined reference value ThEDGE the dispersion value DelEDGE of the edge amount EDGEi in the filter size is DelEDGE>ThEDGE, then by increasing BKeisu under the assumption that there are many strong borders, it is possible to achieve smoothing that better preserves edges.

On the other hand, if DelEDGE<ThEDGE, then by reducing BKeisu under the assumption that there are few strong borders, it is possible to further increase the degree of smoothing.

With the normal smoothing portion 12200 it is also possible to make the filter size variable. In this case as well, if DelEDGE>ThEDGE, then by reducing the filter size under the assumption that there are many strong borders, it is possible to achieve smoothing that better preserves edges.

On the other hand, if DelEDGE<ThEDGE, then by increasing the filter size under the assumption that there are few strong borders, it is possible to further increase the degree of smoothing.

Further, it is also possible to partition the image into block regions of a predetermined size and the average normal direction vector of each block is calculated, and make a substitution for the average normal direction vector of the block that includes the target pixel. It is also possible to perform the smoothing filter in block units, and to find the smoothed normal direction vector of the target pixel through interpolation using the average normal direction vector that has been smoothed of the block that includes the target pixel and the average normal direction vector that has smoothed of the surrounding blocks.

In if $\alpha 0 > 45$ degrees in the angle modulation, then wd2 becomes unnecessary in both method 1 and method 2 (wd2=1.0). For example, in the case of method 2, by adding wd1 to Formula 34 to find Keisu by Keisu=wd2×fkeisu, it is possible to find a new angle modulation amount $\Delta \alpha$ for angle $\alpha$.

Formula 35

$$\Delta \alpha = fkeisu \times wd1 \times \Delta \alpha_{base} = Keisu \times \Delta \alpha_{base} \quad (35)$$

In this case, the angle modulation $\Delta \alpha$ and the brightness modulation amount $\Delta$Ki(x,y) are controlled with the control coefficient wk1 of the brightness information Ki(x,y) and its correction coefficient Keisu, and by preparing an angle modulation function, angle modulation table (LUT, etc.) or profile that has been determined in advance from the angle $\alpha$ and the brightness information Ki(x,y), it is possible to achieve gradation modulation (shadow modulation or light modulation) in a desired section.

Figure 67:
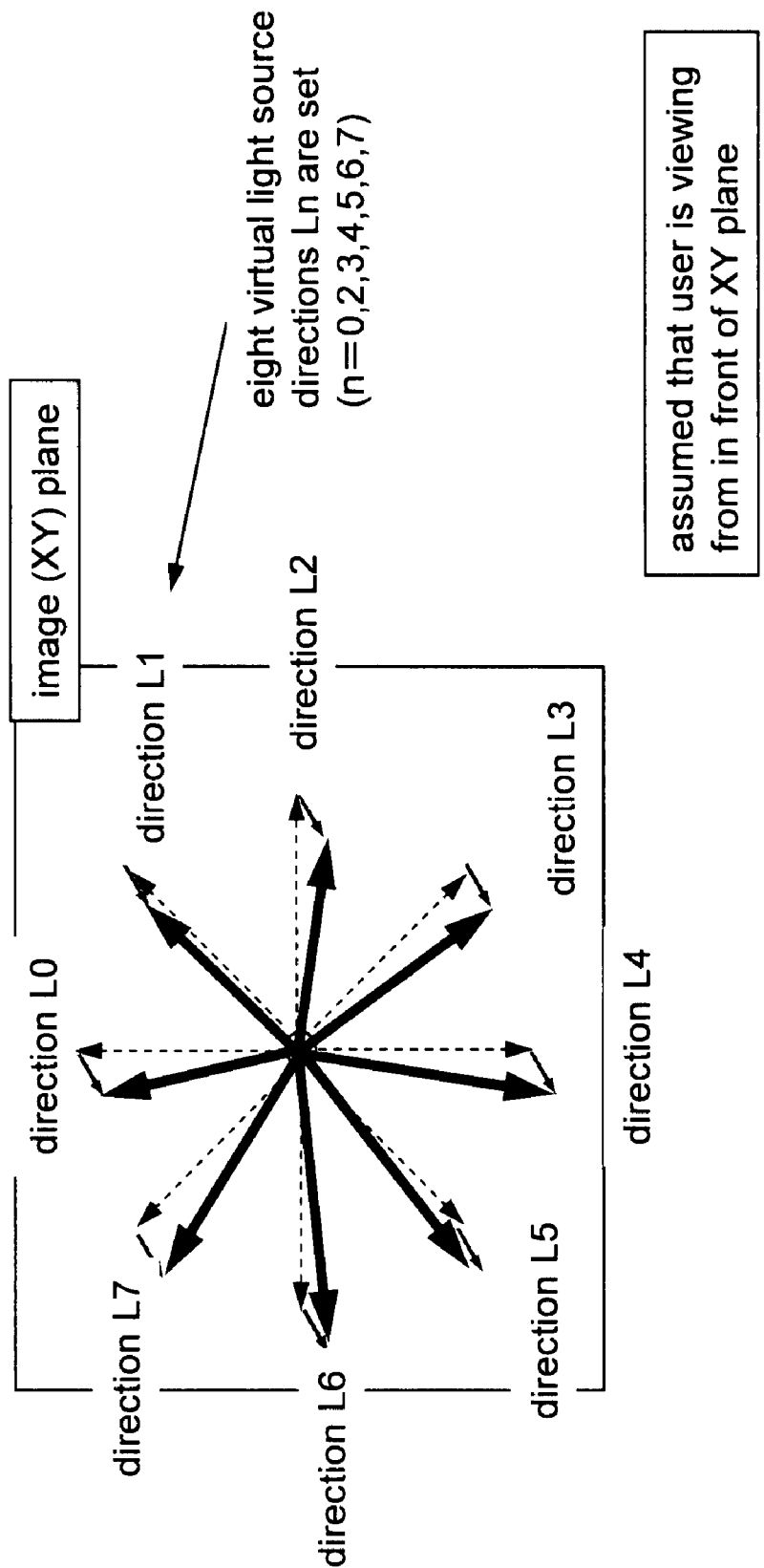
FIG. 67 shows the light source direction in the image processing device according to the twelfth embodiment of the invention.

It was presumed that the light source has been set, but for example, in FIG. 54 it is also possible to add an optimal light source estimation portion for estimating the light source direction that creates an optimal image after the normal smoothing portion 12200 (between the normal direction modulating portion 12201 and the brilliance modulation amount calculation portion 202). In this case, the normal direction modulating portion 12201 for finding the angle modulation amount can extract a pixel in which to stress angle modulation with respect to the angle $\alpha$ that is formed by the normal direction vector vHi and each light source vector Ln (n=0,1,2, . . . , LNum) of a plurality of light source directions that have been prepared as shown in FIG. 67. First, a pixel in which to stress angle modulation is extracted for each light source, and then setting is performed such that the optimal light source is in the direction with the most pixels that satisfy the evaluation function Eval(Ln) that is expressed in terms of the brightness information Kib(x,y) before processing and the brightness information Kia(x,y) after processing of that pixel i(x,y), or is in the center direction of the upper order NNN (NNN<Lnum), so that by executing the processing after the normal direction modulating portion 12201 it is possible to execute more effective brightness modulation.

Figure 66:
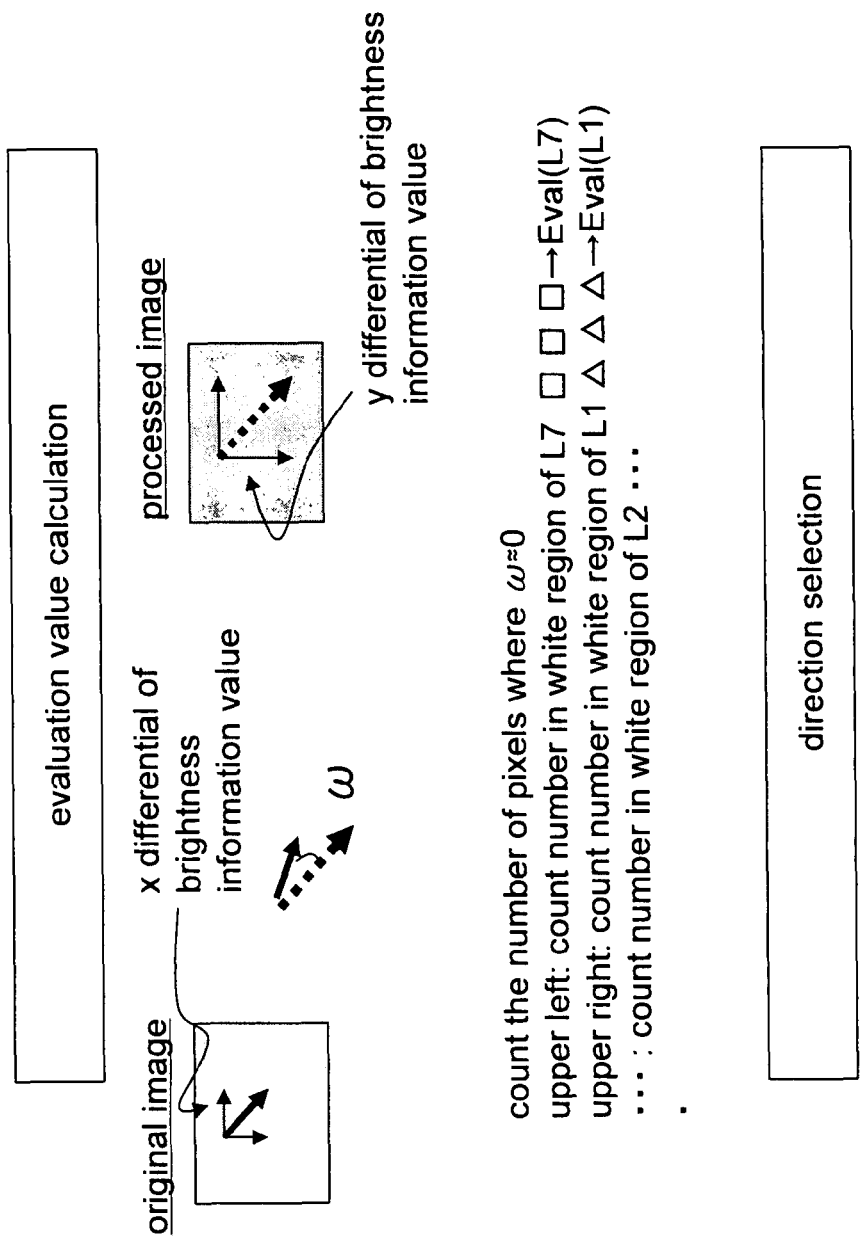
FIG. 66 shows an example of the evaluation function for optimal light source estimation in the image processing device according to the twelfth embodiment of the invention.

A conceivable example of the evaluation function Eval is shown in FIG. 66. However, as the evaluation function Eval it is also possible to use the mean value of the squared error between the brightness information before processing and the brightness information after processing of the pixel that has been extracted in each light source direction, or the value that is obtained through conversion based on the difference between the brightness information before processing and the brightness information after processing.

Thirteenth Embodiment

The image processing method and the image processing device 1300 of this embodiment that are shown in FIGS. 68 through 71 are described.

Figure 68:
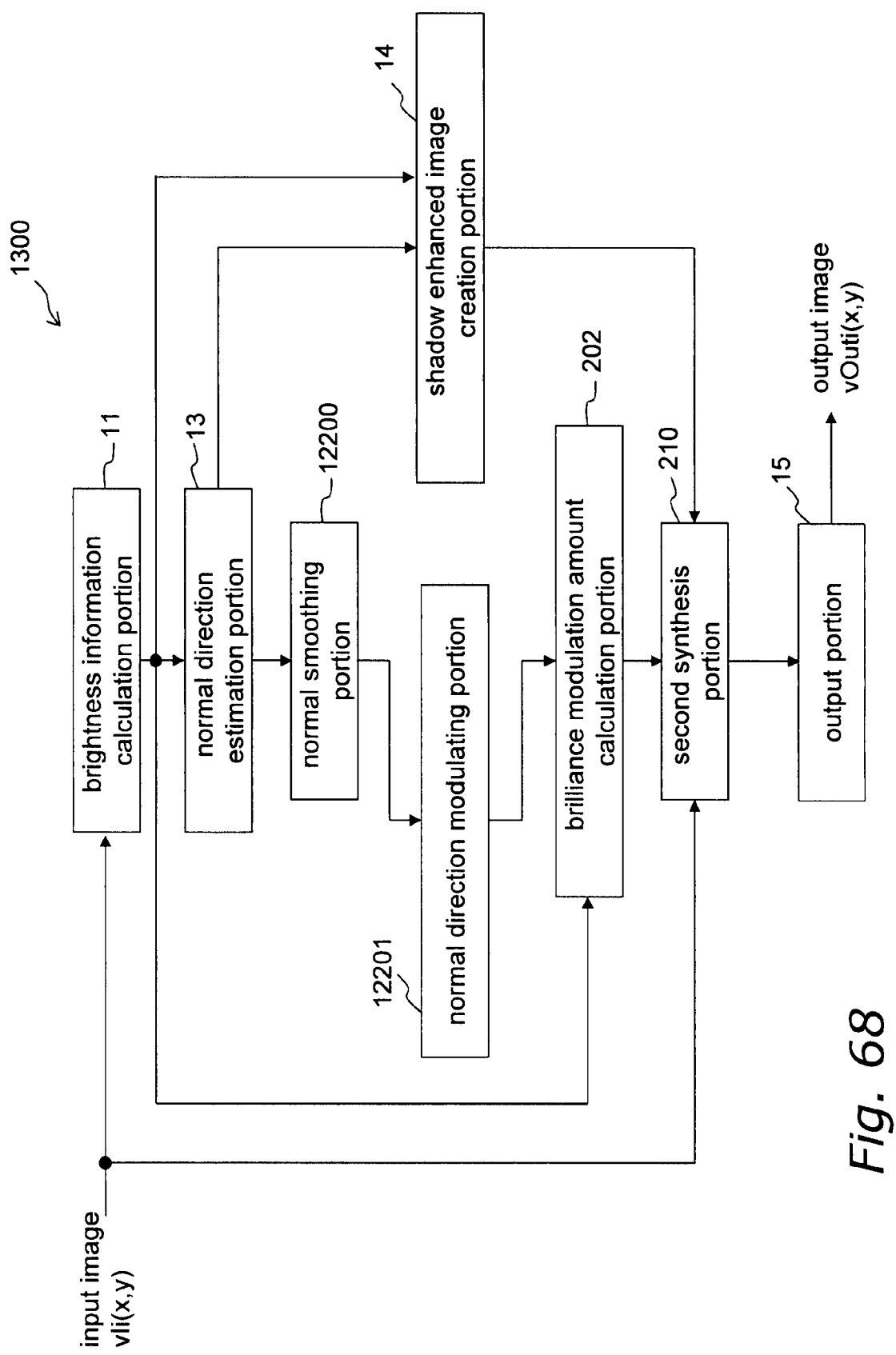
FIG. 68 is a block diagram that shows the configuration of the image processing device according to a thirteenth embodiment of the invention.
Figure 69:
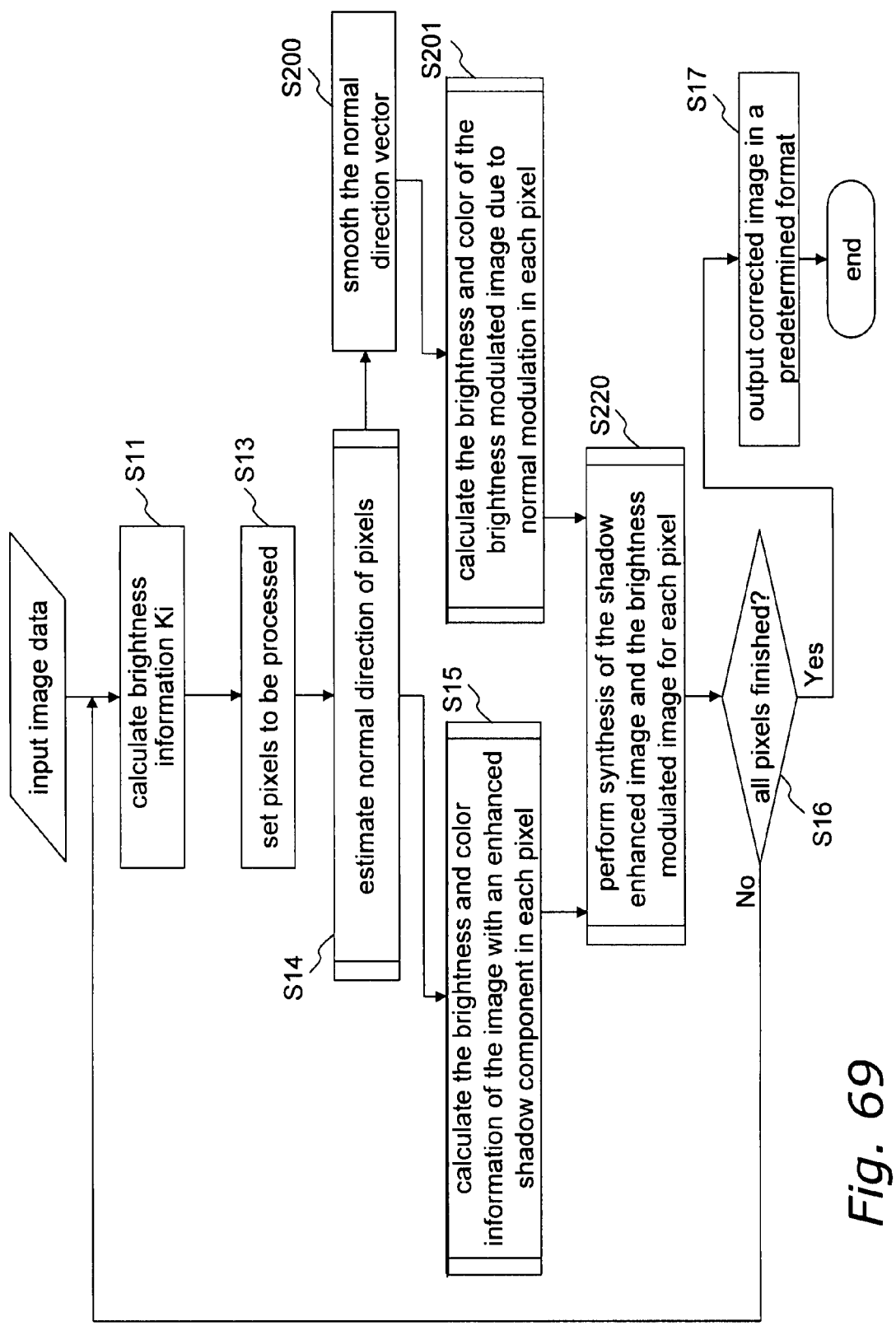
FIG. 69 is a flowchart of the image processing method according to the thirteenth embodiment of the invention.

FIG. 68 is a block diagram that shows the configuration of the image processing device 1300 of the thirteenth embodiment. FIG. 66 shows a flowchart of the processing (image processing method) of the image processing device 1300.

It should be noted that in this embodiment, sections that are the same as those of the previous embodiment are assigned the same reference numerals as before and are not described.

As shown in FIGS. 65 and 66, here a second synthesis portion 210 synthesizes the brightness information SKi(x,y) in the pixel i(x,y) of a shadow-enhanced image that is obtained by the shadow enhanced image creation portion 14 in the second embodiment, and the brightness information FKi(x,y)=Ki(x,y)+dFKi(x,y) of the brightness modulated image that is obtained from the brightness information Ki(x, y) of the input image and the brilliance modulation amount dFKi(x,y) of the brightness information Ki(x,y) that is obtained by the brilliance modulation amount calculation portion 202 in the twelfth embodiment. It is also possible for the brightness information OKi(x,y) of the final processed image that is obtained by the second synthesis portion 210 at this time to be simply synthesized like in Formula 36. This is because there is little overlap between the sections in which the two effects are added.

Formula 36

$$OKi(x,y)=FKi(x,y)+SKi(x,y) \quad (36)$$

It is also possible for FKi(x,y) to be controlled by a control coefficient wfs, and in this case, the control coefficient wfs is controlled with the brightness contrast amount RKi(x,y) of the target pixel i(x,y).

Formula 37

$$wfs=\exp(-(RKi(x,y)-1.0)^2/wfsdelta^2) \quad (37)$$

In Formula 37, wfsdelta is a predetermined positive constant that indicates the degree of varianace of wfs, which changes with a Gaussian distribution. In this case, the brightness information OKi(x,y) of the processed image that is ultimately obtained is obtained by:

Formula 38

$$OKi(x,y)=wfs\times FKi(x,y)+(1.0-wfs)\times SKi(x,y) \quad (38)$$

Here, when RKi(x,y) is near 1 it is likely that the target pixel i(x,y) is included in a section that is flat and that changes gently, and thus the control coefficient wfs for the brightness information FKi(x,y) after brightness modulation is increased. On the other hand, when RKi(x,y) is near 0 or is much larger than 1 it is likely that the target pixel i(x,y) is present near a border, and thus the control coefficient (1.0−wfs) that acts on the brightness information SKi(x,y) after shadow enhancement is increased. By performing control in this manner it is possible to more effectively balance the two effects.

FIG. 70 shows the tendency (condition) of the image processed by the image processing device 1300, with regard to the result example 1 that is schematically shown in the second embodiment and the third embodiment. This drawing is an example in which a virtual light source that irradiates light from the upper left has been set, and shows a case in which the center section has a higher luminance than the surrounding region. As shown in FIG. 70A, in region (1) on the lower right of the center circle the light source direction that has been set and the normal direction that has been calculated are different (the angle formed by the light source direction vector and the normal direction vector is large). Thus, in region (1), as shown in FIG. 70B, there is a difference between the light source direction vector vR1 and the normal direction vector vHi (the angle formed by the light source direction vector and the normal direction vector is large) and thus the shadow enhancement effect occurs near borders. Additionally, shadow modulation due to modulation of the brightness occurs in portions that changed gently in the low-luminance outside circle. In other words, in region (1), the two effects of improving the sense of contrast through shadow enhancement at borders, and improving the sense of bulging due to shadow modulation in portions that change gently toward the outer circumference from the center of the low-luminance outside circle, occur.

In contrast to this, in region (2) at the upper left of the center circle in FIG. 70A, the light source direction that has been set and the normal direction that has been calculated are substantially the same direction (the angle formed by the light source direction vector and the normal direction vector is small). Thus, as shown in FIG. 70C, in region (2) the light source direction vector vR1 and the normal direction vector vHi approach the same direction, and as a result, the effect of shadow modulation in border portions does not occur. With regard to brightness modulation as well, shadow modulation also is suppressed by pointing the normal in the same direction as the light source direction.

The result of the above is that an image in which the high-luminance circle portion in the middle projects toward the front and which produces a sense of bulging at the luminance flat portion in the low-luminance circle is obtained.

FIG. 71 shows the tendency (condition) of the image processed by the image processing device 1300, with respect to the result example 2 that is schematically shown in the second embodiment and the third embodiment. This drawing is an example in which a virtual light source that irradiates light from the upper left has been set, and shows a case in which the center section has a lower luminance than the surrounding region. In region (1) on the lower right of the center circle in FIG. 71A, the light source direction that has been set and the normal direction that has been calculated are substantially the same direction (the angle formed by the light source direction vector and the normal direction vector is small). Thus, in region (1), as shown in FIG. 71B, the angle formed by the light source direction vector vR1 and the normal direction vector vHi is small and thus shadow enhancement effect does not occur. With regard to brightness modulation as well, having the light source direction and the normal direction point in the substantially the same direction also suppresses shadow modulation as well.

In contrast to this, in region (2) at the upper left of the center circle shown in FIG. 71A, the light source direction that has been set and the normal direction that has been calculated are different (the angle formed by the light source direction vector and the normal direction vector is large). Thus, as shown in FIG. 71C, in region (2) the light source direction vector vR1 and the normal direction vector vHi are different (the angle formed by the light source direction vector and the normal direction vector is large) and thus the effect of shadow enhancement occurs near borders. Further, brightness modulation (shadow modulation) also occurs in portions in the low-luminance center circle that gently change toward the outer circumference. That is, in region (2), the effect of improving the sense of contrast through shadow enhancement at borders and a shadow modulation effect from the border portion of the center circle toward the center occur.

As a result, in the case of FIG. 71, the image that is obtained has the feeling that the low-luminance circle portion in the center is slightly depressed gently from the front.

Thus, the inventive aspect of this embodiment has the effect of combining the task of performing gradation modulation of a predetermined section within the image through brightness modulation that is based on angle modulation due to the angle that is formed by a predetermined normal direction and the light source direction, which is the feature of the twelfth embodiment, with the processing for the addition of shadow, which is the feature of the second embodiment, and thus it is possible to achieve a better three-dimensional effect.

Fourteenth Embodiment

The image processing method and the image processing device 1400 of the fourteenth embodiment shown in FIGS. 72 through 75 are described.

Figure 72:
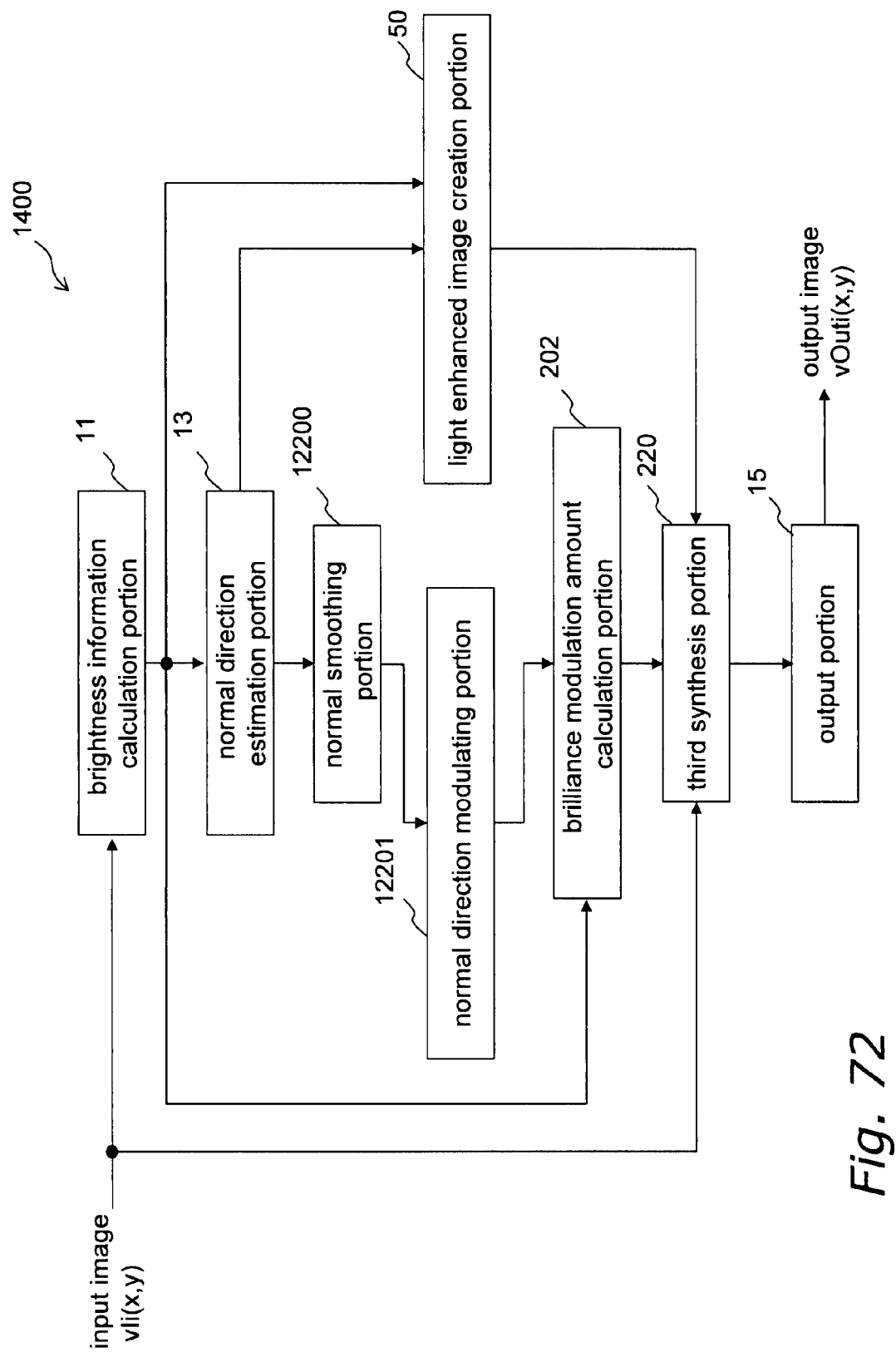
FIG. 72 is a block diagram that shows the configuration of the image processing device according to a fourteenth embodiment of the invention.
Figure 73:
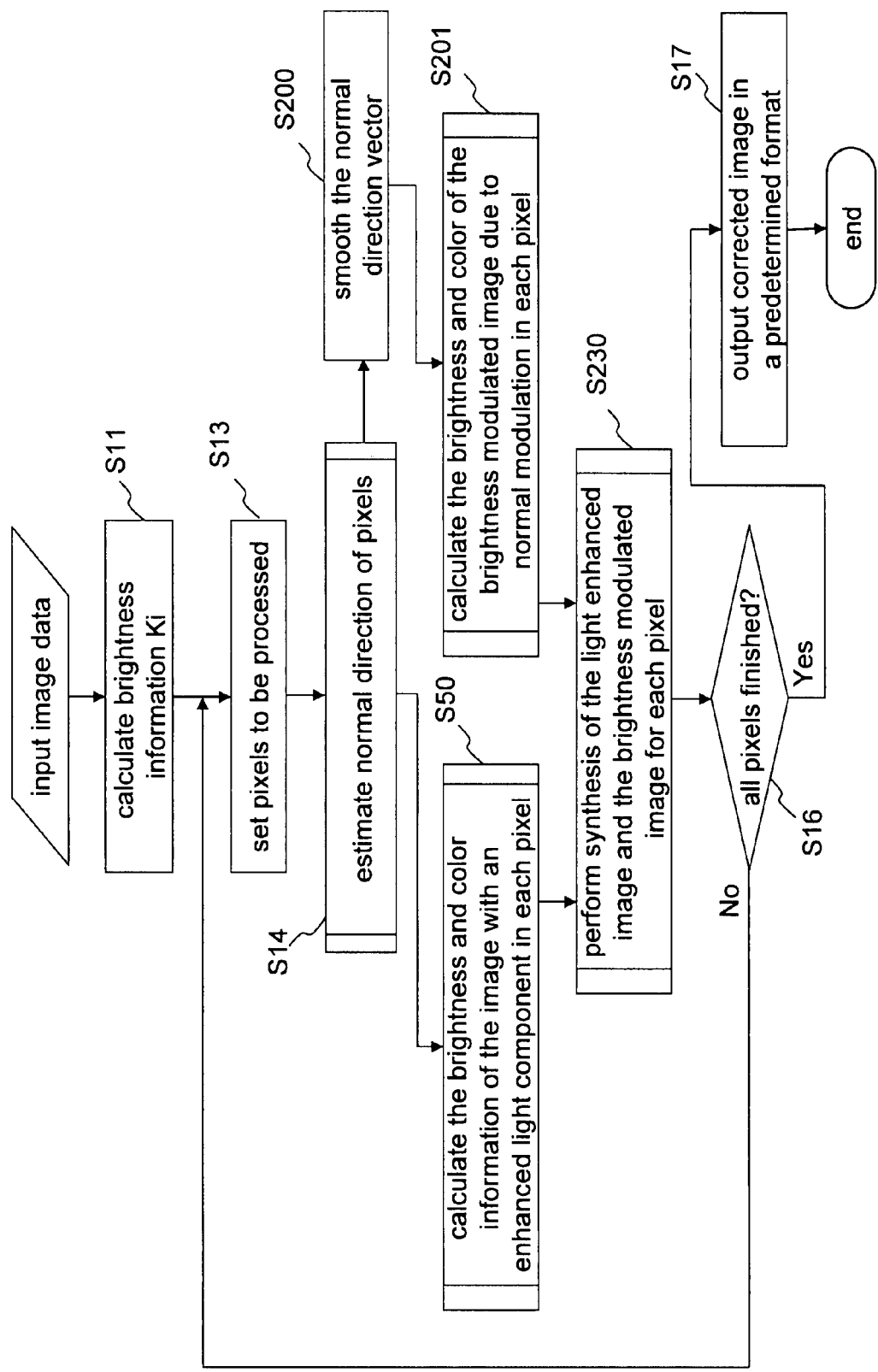
FIG. 73 is a flowchart of the image processing method according to the fourteenth embodiment of the invention.

FIG. 72 is a block diagram that shows the configuration of the image processing device 1400 of this embodiment. FIG. 73 shows a flowchart of the processing (image processing method) of the image processing device 1400.

It should be noted that sections that are the same as those of the previous embodiment are assigned the same reference numerals as before and are not described.

As shown in FIGS. 72 and 73, here the brightness information $LK_i(x,y)$ in the pixel $i(x,y)$ of a light-enhanced image that is obtained by the light enhanced image creation portion 50 in the third embodiment, and the brightness information $FK_i(x,y)=K_i(x,y)+dFK_i(x,y)$ of the brightness modulated image that is obtained from the brightness information $K_i(x,y)$ of the input image and the brilliance modulation amount $dFK_i(x,y)$ of the brightness information $K_i(x,y)$ that is obtained by the brilliance modulation amount calculation portion 202 in the twelfth embodiment, are combined by a third synthesis portion 220. The brightness information $OK_i(x,y)$ of the final processed image that is obtained by the third synthesis portion 220 at this time can also be simply synthesized as in Formula 39. This is because there is a little overlap between sections that add the two effects.

Formula 39

$$OK_i(x,y)=FK_i(x,y)+LK_i(x,y) \quad (39)$$

It is also possible for $FK_i(x,y)$ to be controlled by a control coefficient wfl, and in this case, the control coefficient wfl can be controlled with the brightness contrast amount $RK_i(x,y)$ of the target pixel $i(x,y)$.

Formula 40

$$wfl=\exp(-(RK_i(x,y)-1.0)^2/wfs\text{delta}^2) \quad (40)$$

In Formula 40, wfldelta is a predetermined positive constant that indicates the degree of variance of wfl, which changes with a Gaussian distribution. In this case, the brightness information $OK_i(x,y)$ of the processed image that is ultimately obtained is obtained by:

Formula 41

$$OK_i(x,y)=wfl\times FK_i(x,y)+(1.0-wfl)\times LK_i(x,y) \quad (41)$$

Here, when $RK_i(x,y)$ is near 1 it is likely that the target pixel $i(x,y)$ is included in a section that is flat and that changes gently, and thus the control coefficient wfl for the brightness information $FK_i(x,y)$ after brightness modulation is increased. On the other hand, when $RK_i(x,y)$ is near 0 or is much larger than 1 it is likely that the target pixel $i(x,y)$ is present near a border, and thus the control coefficient (1.0–wfl) that acts on the brightness information $LK_i(x,y)$ after light enhancement is increased. By performing control in this manner it is possible to more effectively balance the two effects.

FIG. 74 shows the tendency (condition) of the image processed by the image processing device 1400, with regard to the result example 1 that is schematically shown in the second embodiment and the third embodiment. This drawing is an example in which a virtual light source that irradiates light from the upper left has been set, and shows a case in which the center section has a higher luminance than the surrounding region. As shown in FIG. 74A, in region (1) on the lower right of the center circle the light source direction that has been set and the normal direction that has been calculated are different (the angle formed by the light source direction vector and the normal direction vector is large). Thus, in region (1), as shown in FIG. 74B, there is a difference between the light source direction vector vR1 and the normal direction vector vHi (the angle formed by the light source direction vector and the normal direction vector is large) and thus, first, the light enhancement effect is inhibited. Conversely, shadow modulation due to modulation of the brightness occurs in portions that changed gently in the low-luminance outside circle.

In contrast to this, in region (2) at the upper left of the center circle in FIG. 74A, the light source direction that has been set and the normal direction that has been calculated are substantially the same direction (the angle formed by the light source direction vector and the normal direction vector is small). Thus, as shown in FIG. 74C, in region (2) the light source direction vector vR1 and the normal direction vector vHi approach the same direction and as a result the effect of light modulation occurs. Conversely, shadow modulation due to brightness modulation is suppressed by pointing the normal in the same direction as the light source direction.

The result of the above is an image in which the high-luminance circle portion in the middle projects toward the front and which gives the feeling of bulging at the luminance flat portion in the low-luminance circle, due to the light enhancement effect in the section that is in contact with the high-luminance circle in the center in region (2), and the gradation modulation in portions that gently change toward the outer circumference from the center of the low-luminance outside circle in region (1).

FIG. 75 shows the tendency (condition) of the image processed by the image processing device 1400, with respect to the result example 2 that is schematically shown in the second embodiment and the third embodiment. This drawing is an example in which a virtual light source that irradiates light from the upper left has been set, and shows a case in which the center section has a lower luminance than the surrounding region. In region (1) on the lower right of the center circle in FIG. 75A, the light source direction that has been set and the normal direction that has been calculated are substantially the same direction (the angle formed by the light source direction vector and the normal direction vector is small). Thus, in region (1), as shown in FIG. 75B, the angle formed by the light source direction vector vR1 and the normal direction vector vHi is small and thus light enhancement occurs, but shadow modulation due to brightness modulation is inhibited by having the light source direction and the normal direction point in the substantially the same direction.

In contrast to this, in region (2) at the upper left of the center circle shown in FIG. 75A, the light source direction that has been set and the normal direction that has been calculated are different (the angle formed by the light source direction vector and the normal direction vector is large). Thus, as shown in FIG. 75C, in region (2) the light source direction vector vR1 and the normal direction vector vHi are different (the angle formed by the light source direction vector and the normal direction vector is large) and thus the effect of light enhancement does not occur. However, brightness modulation (shadow modulation) occurs in portions that gently change from the low-luminance center circle toward the center.

The outcome of the above is an image that gives the impression of a gentle, slight depression inward from the front due to the shadow enhancement effect from the border of the center circle toward the center in region (2) and the enhancement of light in the section that is in contact with the low-luminance circle of the center in region (1).

Thus, this embodiment has the effect of combining the task of performing gradation modulation of a predetermined section within the image through brightness modulation that is based on angle modulation due to the angle that is formed by a predetermined normal direction and the light source direction, which is the feature of the twelfth embodiment, with the processing for the addition of light, which is the feature of the third embodiment, and thus it is possible to achieve a better three-dimensional effect.

Fifteenth Embodiment

The image processing method and the image processing device 1500 of the fifteenth embodiment shown in FIGS. 76 through 79 are described.

Figure 76:
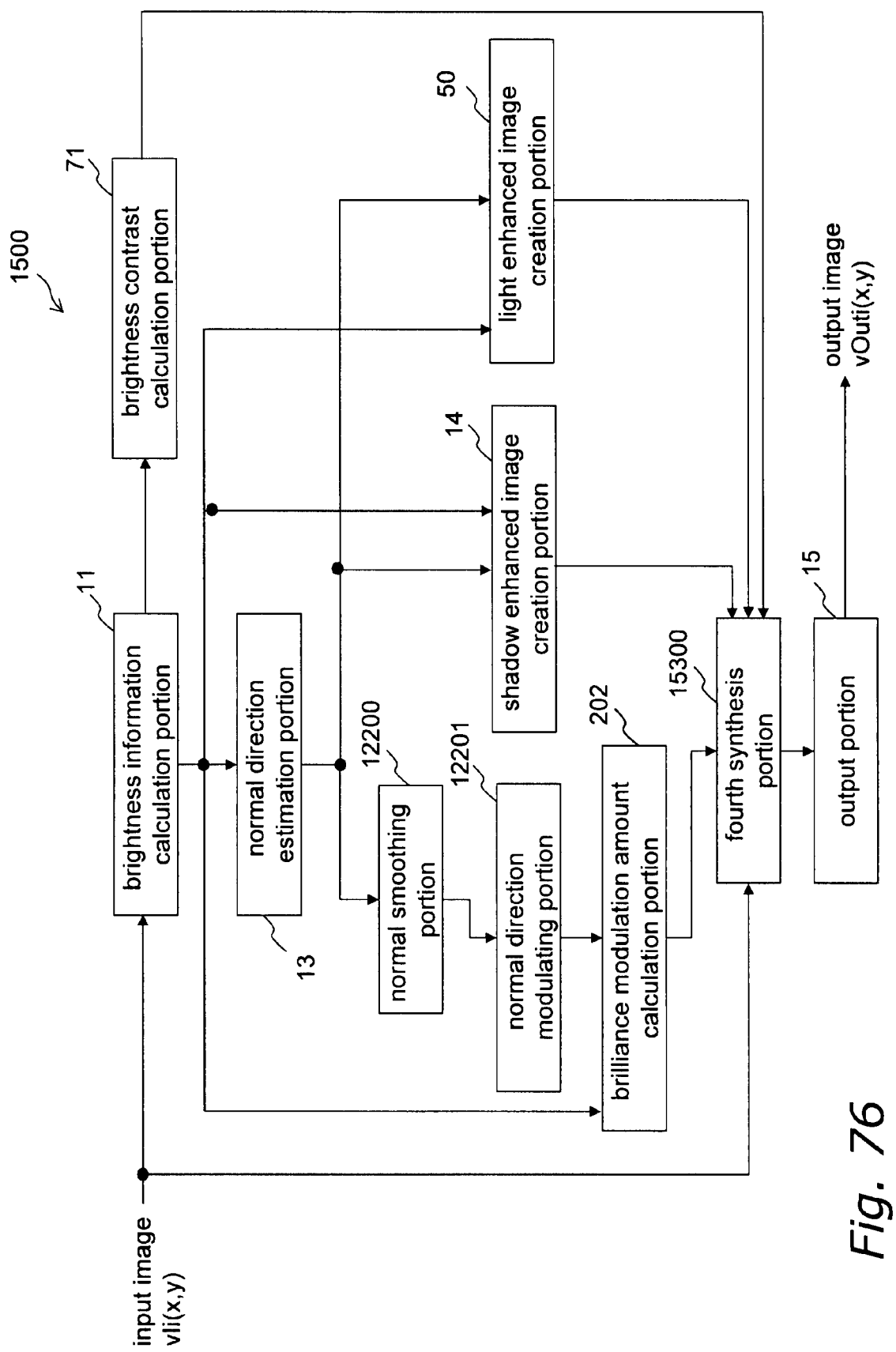
FIG. 76 is a block diagram that shows the configuration of the image processing device according to a fifteenth embodiment of the invention.
Figure 77:
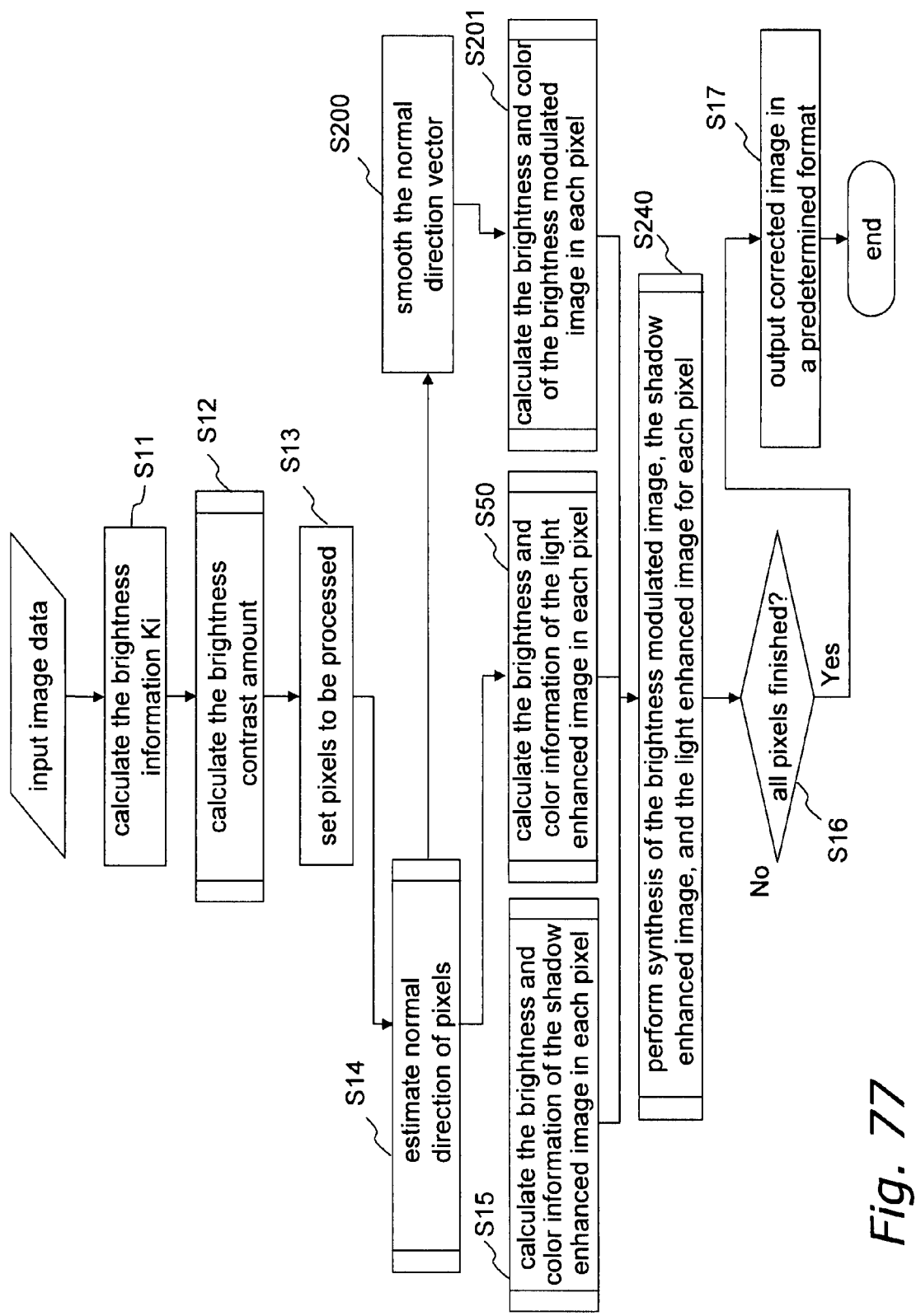
FIG. 77 is a flowchart of the image processing method according to the fifteenth embodiment of the invention.

FIG. 76 is a block diagram that shows the configuration of the image processing device 1500 of this embodiment. FIG. 77 shows a flowchart of the processing (image processing method) of the image processing device 1500.

It should be noted that sections that are the same as those of the previous embodiment are assigned the same reference numerals as before and are not described.

As shown in FIGS. 76 and 77, here the synthesized brightness information OKTi(x,y) of the brightness information SKi(x,y) of the shadow-enhanced image that is obtained by the shadow enhanced image creation portion 14 and the brightness information LKi(x,y) of the light-enhanced image that is obtained by the light enhanced image creation portion 50 in the fourth embodiment, and the brightness information FKi(x,y)=Ki(x,y)+dFKi(x,y) of the brightness modulated image that is obtained from the brightness information Ki(x,y) of the input image and the brilliance modulation amount dFKi(x,y) of the brightness information Ki(x,y) that is obtained by the brilliance modulation amount calculation portion 202 in the twelfth embodiment, are combined by a fourth synthesis portion 15300.

The fourth synthesis portion 15300 first finds the brightness information OKTi(x,y) of the synthesized image of SKi(x,y) and LKi(x,y) like in the fourth embodiment. This processing is executed based on the weighting coefficient wlt2 that is applied to LKi(x,y) due to the brightness contrast amount RKi(x,y). It should be noted the details of this are the same as in the fourth embodiment and thus will not be described.

Next, the brightness information OKi(x,y) of the final processed image is found by synthesizing FKi(x,y) and OKTi(x,y). This synthesis processing can also be executed by the simple synthesis shown in Formula 42. The processing of Formula 42 is possible because there is a little overlap between the sections that add the three effects.

Formula 42

$$OKi(x,y)=FKi(x,y)+OKTi(x,y) \qquad (42)$$

It is also possible for FKi(x,y) to be controlled by a control coefficient wfsl, and in this case, the control coefficient wfsl can be controlled with the brightness contrast amount RKi(x,y) of the target pixel i(x,y).

Formula 43

$$wfsl=\exp(-(RKi(x,y)-1.0)^2/wfsl\text{delta}^2) \qquad (43)$$

In Formula 43, wfsldelta is a predetermined positive constant that indicates the degree of varianace of wfsl, which changes with a Gaussian distribution. In this case, the brightness information OKi(x,y) of the processed image that is ultimately obtained is obtained by:

Formula 44

$$OKi(x,y)=wfsl\times FKi(x,y)+(1.0-wfsl)\times OKTi(x,y) \qquad (44)$$

Here, when RKi(x,y) is near 1 it is likely that the target pixel i(x,y) is included in a section that is flat and that changes gently, and thus the control coefficient wfsl for the brightness information FKi(x,y) after brightness modulation is increased. On the other hand, when RKi(x,y) is near 0 or is much larger than 1 it is likely that the target pixel i(x,y) is present near a border, and thus the control coefficient (1.0−wfsl) that acts on the brightness information OKTi(x,y) after shadow enhancement and light enhancement is increased. By performing control in this manner it is possible to even more effectively balance the three effects.

FIG. 78 shows the tendency (condition) of the image processed by the image processing device 1500, with regard to the result example 1 that is schematically shown in the second embodiment and the third embodiment. This drawing is an example in which a virtual light source that irradiates light from the upper left has been set, and shows a case in which the center section has a higher luminance than the surrounding region. As shown in FIG. 78A, in region (1) on the lower right of the center circle the light source direction that has been set and the normal direction that has been calculated are different (the angle formed by the light source direction vector and the normal direction vector is large). In region (1), as shown in FIG. 78B, there is a difference between the light source direction vector vR1 and the normal direction vector vHi (the angle formed by the light source direction vector and the normal direction vector is large) and thus, first, the shadow enhancement effect occurs near the border. Shadow modulation due to modulation of the brightness also occurs in portions that changed gently in the low-luminance outside circle. In other words, in region (1), the two effects of improving the sense of contrast through shadow enhancement at borders, and improving the sense of bulging due to shadow modulation in portions that change gently from the center of the low-luminance outside circle toward the outer circumference, occur.

In contrast to this, in region (2) at the upper left of the center circle in FIG. 78A, the light source direction that has been set and the normal direction that has been calculated are substantially the same direction (the angle formed by the light source direction vector and the normal direction vector is small). Thus, as shown in FIG. 78C, in region (2) the light source direction vector vR1 and the normal direction vector vHi approach the same direction and as a result the light enhancement effect occurs at border portions, but shadow modulation due to brightness modulation is suppressed.

The result of the above is an image in which the high-luminance circle portion in the middle projects toward the front and which gives the feeling of bulging at the luminance flat portion in the low-luminance circle.

FIG. 79 shows the tendency (condition) of the image processed by the image processing device 1500, with regard to the result example 2 that is schematically shown in the second embodiment and the third embodiment. This drawing is an example in which a virtual light source that irradiates light from the upper left has been set, and shows a case in which the center section has a lower luminance than the surrounding region. In region (1) on the lower right of the center circle in FIG. 79A, the light source direction that has been set and the normal direction that has been calculated are in the same direction. Thus, in region (1), as shown in FIG. 79B, the angle formed by the light source direction vector vR1 and the normal direction vector vHi is small and thus the shadow enhancement effect does not occur and the light enhancement effect does occur. With regard to this, shadow modulation due to brightness modulation is inhibited.

In contrast to this, in region (2) at the upper left of the center circle shown in FIG. 79A, the light source direction that has been set and the normal direction that has been calculated are different (the angle formed by the light source direction vector and the normal direction vector is large). Thus, as shown in FIG. 79C, in region (2) the light source direction vector vR1 and the normal direction vector vHi are different (the angle formed by the light source direction vector and the normal direction vector is large) and thus the shadow enhancement effect occurs near the border. However, brightness modulation (shadow modulation) occurs in portions that gently change from the center of the low-luminance center circle toward the outer circumference. In other words, in region (2) there is an increase in the feeling of contrast through shadow enhancement at the border and also a shadow modulation effect occurs from the border toward the center of the center circle.

As a result, in the case of FIG. 79, an image in which the low-luminance circle section in the center has an even greater feeling of being slightly depressed inward with a gentle slope from the front.

Thus, this embodiment has combines the task of performing gradation modulation of a predetermined section within the image through brightness modulation that is based on modulation of the angle that is formed by a predetermined normal direction and the light source direction, which is the feature of the twelfth embodiment, with the effect of increasing the feeling of contrast particularly near borders, in order to achieve a three-dimensional feeling that has a sense of contrast that also feels more natural.

Sixteenth Embodiment

Figure 80:
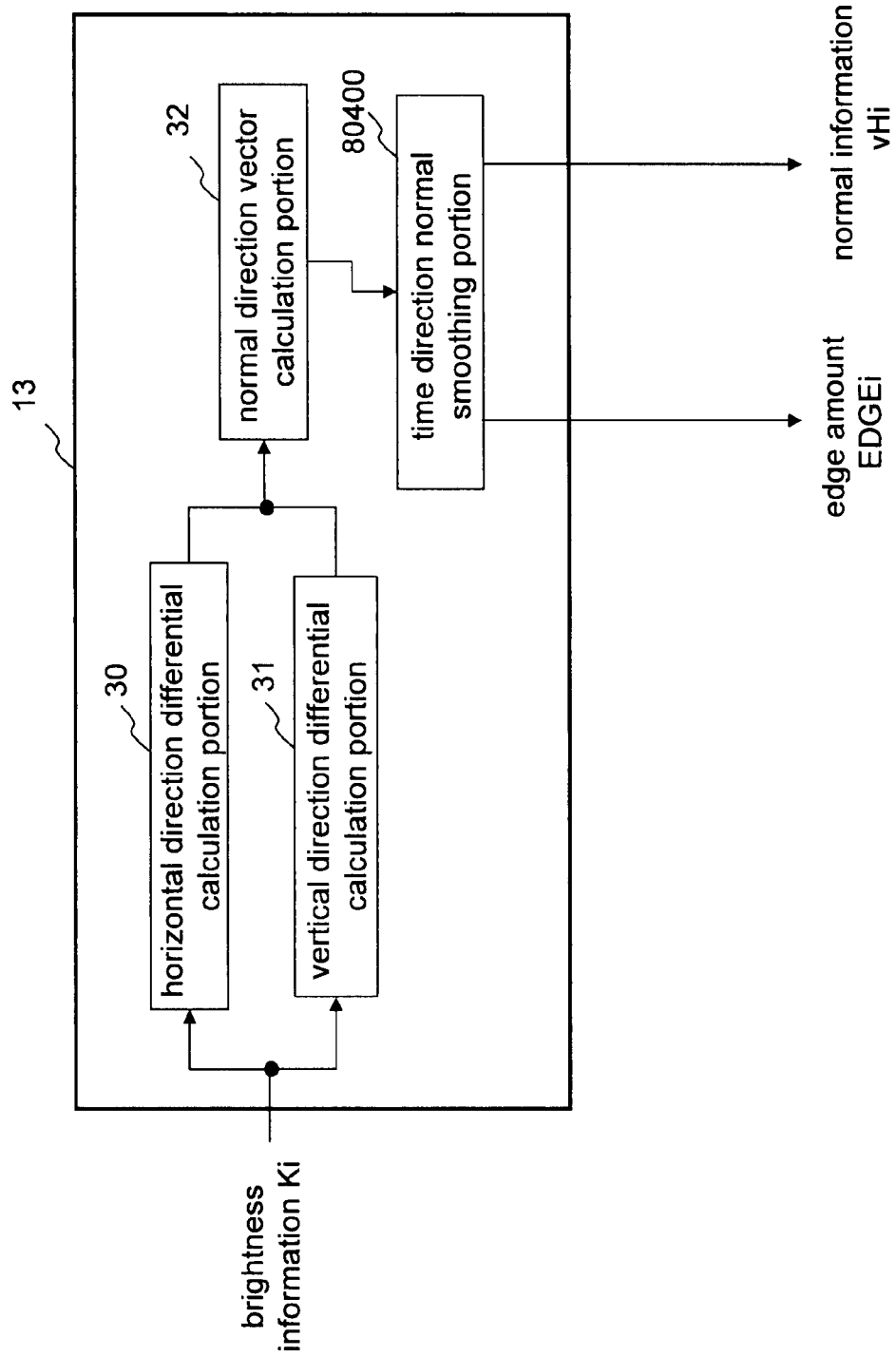
FIG. 80 is a block diagram that shows the configuration of the image processing device according to a sixteenth embodiment of the invention.
Figure 81:
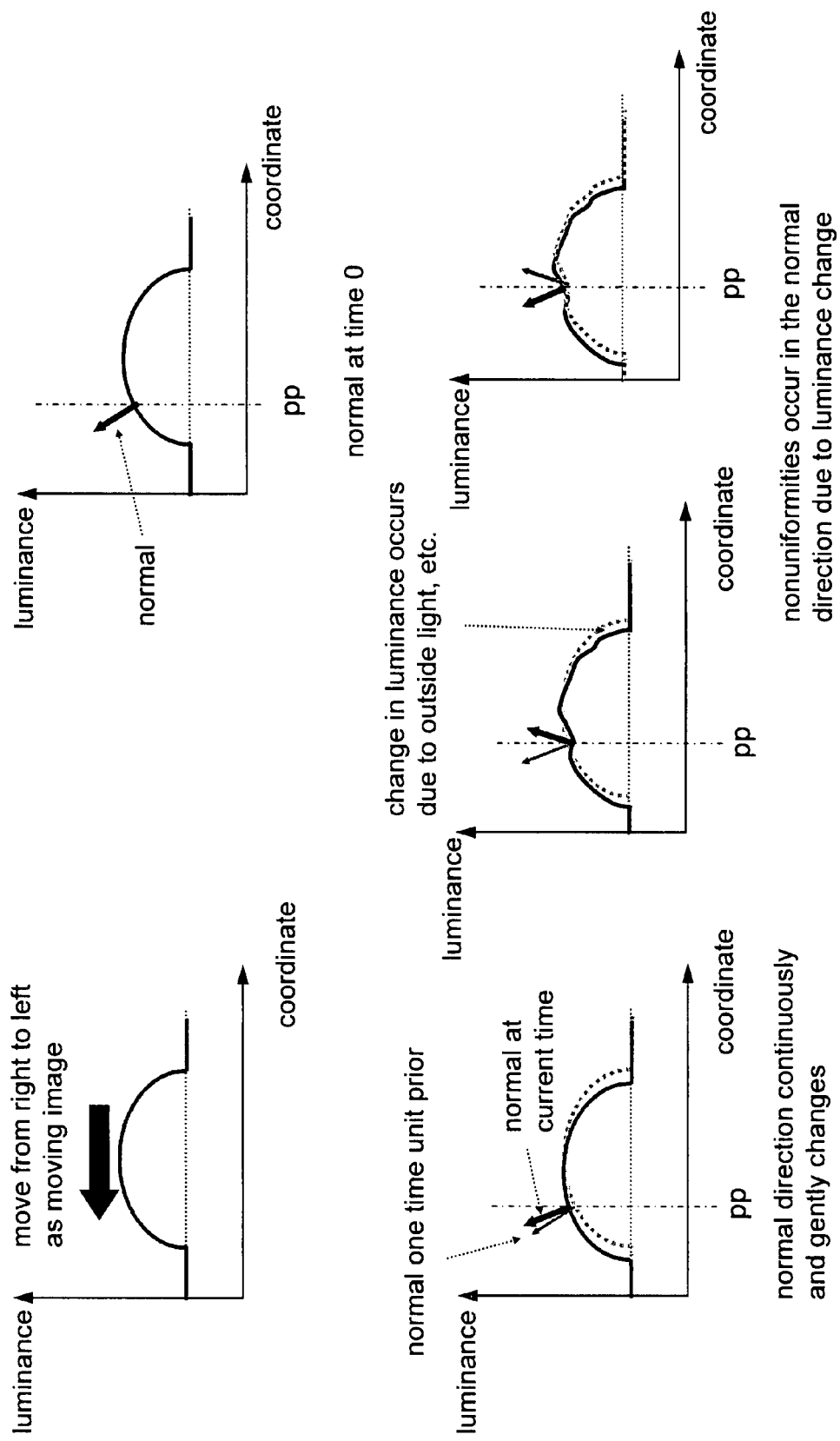
FIG. 81 schematically illustrates the change in normal direction estimation with respect to a moving image of the image processing method according to the sixteenth embodiment of the invention.

The image processing method and the image processing device of the sixteenth embodiment are describing using FIGS. 80 and 81.

The inventive aspect of this embodiment is characterized in that to the normal direction estimation portion 13 of the image processing methods and the image processing devices of the second through fifteenth embodiments has been added a time direction normal smoothing portion 80400 that uses the normal direction vector of a target pixel i(x,y) that has been obtained from each frame image up to the frame image one frame prior to the current frame, from the frame images p frames prior to the current frame, on the x, y and z components of the normal direction vector vHi(x,y) in the target pixel i(x,y) of the current frame.

It should be noted that in FIG. 80, the time direction normal smoothing portion 80400 has been added to the normal direction estimation portion 13 of the second embodiment. It is also possible to adopt the time direction normal smoothing portion 80400 in the case of the seventh through eleventh embodiments as well. By inserting the time direction normal smoothing portion 80400 after the normal direction vector adjustment portion 101 in the case of the seventh, ninth, tenth, and eleventh embodiments, and inserting the time direction normal smoothing portion 80400 after the normal direction vector calculation portion 32 in the case of the eighth embodiment, it is possible to achieve the same effects as in this embodiment.

The processing other than the processing for calculating the normal direction vector vHi(x,y) of the target pixel i(x,y) is the same as in the second through fifteenth embodiments, and thus will not be described here.

Using FIG. 80, the processing of the inventive aspect of this embodiment shall be described.

The x direction differential dKx and the y direction differential dKy of the brightness information Ki(x,y) of the target pixel i(x,y) are found, and by assigning a predetermined size 1 for the z direction, the normal direction vector vHi(x,y,t) is found for the current frame image (the time at which the current frame is obtained is treated as time t).

Formula 45

$$tkeisu = \exp(-TK\text{Delta} \times (t-k)^2) \qquad (45)$$

Here, the time that the frame image p frames prior to the current frame is obtained is regarded as t−p, and the time that the frame image one frame prior to the current frame is obtained is regarded as t−1.

After the above processing, the time direction normal smoothing portion 80400 determines a weighting coefficient tkeisu to multiply with the normal direction vector vHi(x,y,k) (k=t−p, . . . , t−1) in the pixel i(x,y) of the frame image at time k, which is obtained at a time that is between the time t−p and the time t−1. The coefficient keisu is a weighting coefficient that is determined as in Formula 45 according to the time different dt=t−k from the time t, which is the time that the current frame is obtained, and is multiplied with vHi(x,y,k).

In Formula 45, TKDelta is a predetermined positive constant, and the larger it is the greater tkeisu changes with respect to the change in dt.

The average vector vHiG(x,y) of the normal direction vector to which the weighting coefficient has been applied is found in the frame image p frames prior to the current frame image to the frame image one frame prior to the current frame image, and that value is taken as the new normal direction vector vHi(x,y,t) at the current frame time t. Here, Totalkeisu indicates the sum of the weighting coefficients from k=t−p to k=t−1.

The goal of this processing is described using the schematic representation shown in FIG. 81.

The upper left diagram of FIG. 81 expresses a cross section of a three-dimensional curved surface that has a certain luminance distribution (a three-dimensional curved surface that is determined by the normal direction vector), and if this is viewed as a moving image, then the cross section moves from right to left in this example. In the upper right diagram of FIG. 81, the arrow indicates the normal direction vector in the target pixel pp at time 0.

Formula 46

$$vHiG(x, y) = \sum_{k=t-p}^{t-1} (vHi(x, y, k) \times tkeisu) / Totaltkeisu \qquad (46)$$

If this cross section moves gently as in the lower left diagram of FIG. 81, then it can be predicted that the normal direction also will change continuously and gently compared to the upper right diagram of FIG. 81. However, if external lighting or the like causes the cross section luminance of the three-dimensional curved surface to change, then as shown in the lower middle diagram of FIG. 81, the minor changes in the cross section of the three-dimensional curved surface cause the normal direction to suddenly change significantly.

Then, irregularities occur in the normal direction when the normal direction returns to a direction that is close to the original normal direction at the time that the section close to the original cross section has passed the section of minor fluctuation in the cross section and moved to the position of pp. On account of this there is a risk that flickering may occur in the time direction of shadow enhancement, light enhancement, and brightness modulation of the processing of the inventive aspect of this embodiment (flickering on the image (video) that has been processed by the inventive aspect of this embodiment).

Accordingly, in the inventive aspect of this embodiment, such sudden changes in the time direction of the normal direction vector are suppressed so as to inhibit adverse effects such as flickering in the processed image if processing a moving image. Moreover, in the inventive aspect of this embodiment, movement of the normal direction in the time direction in the same pixel is smoothed, and by doing so it is not necessary to add compensatory processing in the time direction, which likely would be necessary if the processing methods of the second through fifteenth embodiments had been adopted for the frame images of a moving image.

It should be noted that here, the case of luminance fluctuation due to outside light has been described in FIG. 81, but with the inventive aspect of this embodiment it is possible to similarly inhibit adverse effects on sudden fluctuations in the normal direction in scene change sections where the content of the image itself changes suddenly.

In the inventive aspect of this embodiment, before the time direction normal smoothing portion 80400 it is also possible to add a smoothing determination portion for determining whether or not the normal direction vector vHiG(x,y) that has been smoothed in the time direction is the normal direction vector at time t, based on the normal direction vector vHi(x, y,k) (k=t−p, . . . , t−1) from the frame image p frames prior to the current frame image to the frame image one frame prior to the current frame, and the value that is obtained from the size of the difference vector of the normal direction vector vHi(x, y,t) of the current frame image. Accordingly, although there is a chance that the effect will be slightly weakened due to smoothing of the normal in the time direction, by determining whether or not that processing is necessary, with the inventive aspect of this embodiment it is possible to suppress the weakening of the effect of shadow enhancement, light enhancement, and brightness modulation while also inhibiting ill effects such as flickering in the processed moving image due to sudden changes in the normal direction.

Seventeenth Embodiment

Figure 82:
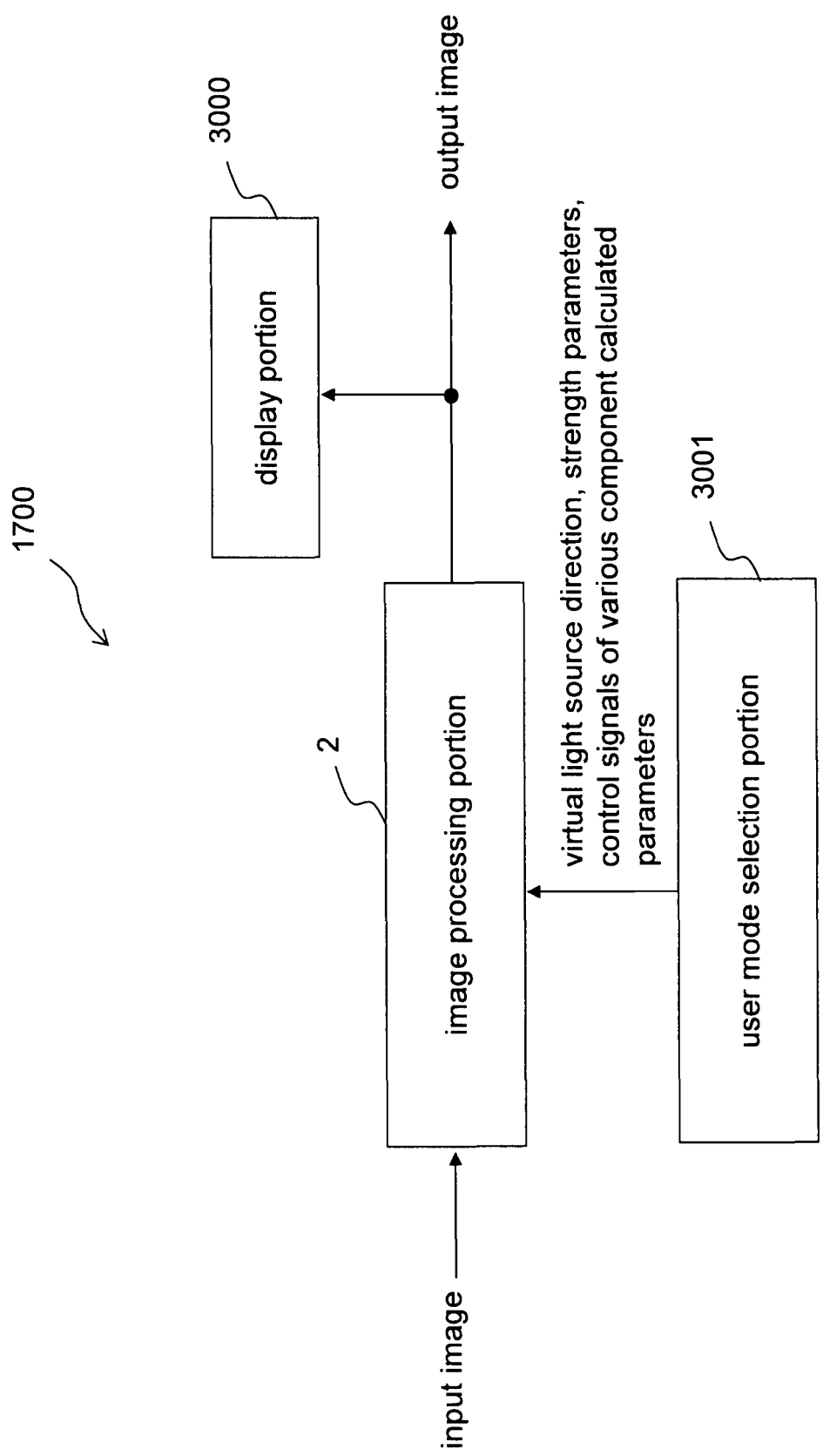
FIG. 82 is a block diagram that shows the configuration of the image processing device according to the seventeenth embodiment of the invention.

The image processing method and the image processing device 1700 of the seventeenth embodiment are describing using FIGS. 82 and 83.

In this aspect of the invention, a user mode selection portion 3001 for a user to select a processing mode in accordance with the depth information for executing depth correction through the addition of shadow, the addition of light, and brightness modulation has been added to the device.

As shown in FIG. 82, the image processing device 1700 primarily has an image processing portion 2 that achieves the functions described in the first through sixteenth embodiments of the invention, a display portion 3000 for displaying the result of the processing of the image processing portion 2, and the user mode selection portion 3001 for the user to select a processing mode.

In the image processing device 1700, the display portion 3000 displays the image resulting from depth correction that is obtained by the image processing portion 2. The user visually confirms the processed image on the display portion 3000 and can select a processing mode with the user mode selection portion 3001. In other words, the image processing device 1700 is configured such that color correction that corresponds to more individual characteristics (user preferences) is possible. Here, the display portion 3000 has the function of allowing an image (video) to be displayed, and can be the main screen display device or the sub-screen display device of a liquid crystal display device, a plasma display device or an ordinary TV. In the case of selecting the virtual light source direction, for example, is it possible for the user mode selection portion 3001 to use a menu selection method such as in FIG. 67 the (1) above light source mode, (1-2) above right light source mode, (1-3) directly overhead light source mode, (1-4) bottom left light source mode, (1-5) bottom right light source mode, (1-6) directly below light source mode, and (1-7) default light source direction mode.

If the strength parameter is to be selected, then it is possible to use a menu selection method such as (2-1) strong mode, (2-2) weak mode, (2-3) moderate mode, and (2-4) default strength mode.

It should be obvious that there is no limitation to these.

The user views image (video) that is displayed by the display portion 3000 and selects an option from the menu that has been prepared by the user mode selection portion 3001. For example, in the case of selecting the virtual light source direction, a light source direction from above left is set as the default light source direction mode. This default light source direction mode can be the same as the (1-1) above left light source mode of the menu, or it can be a mode for setting a virtual light source that also is above left but that has a different angle.

Figure 84:
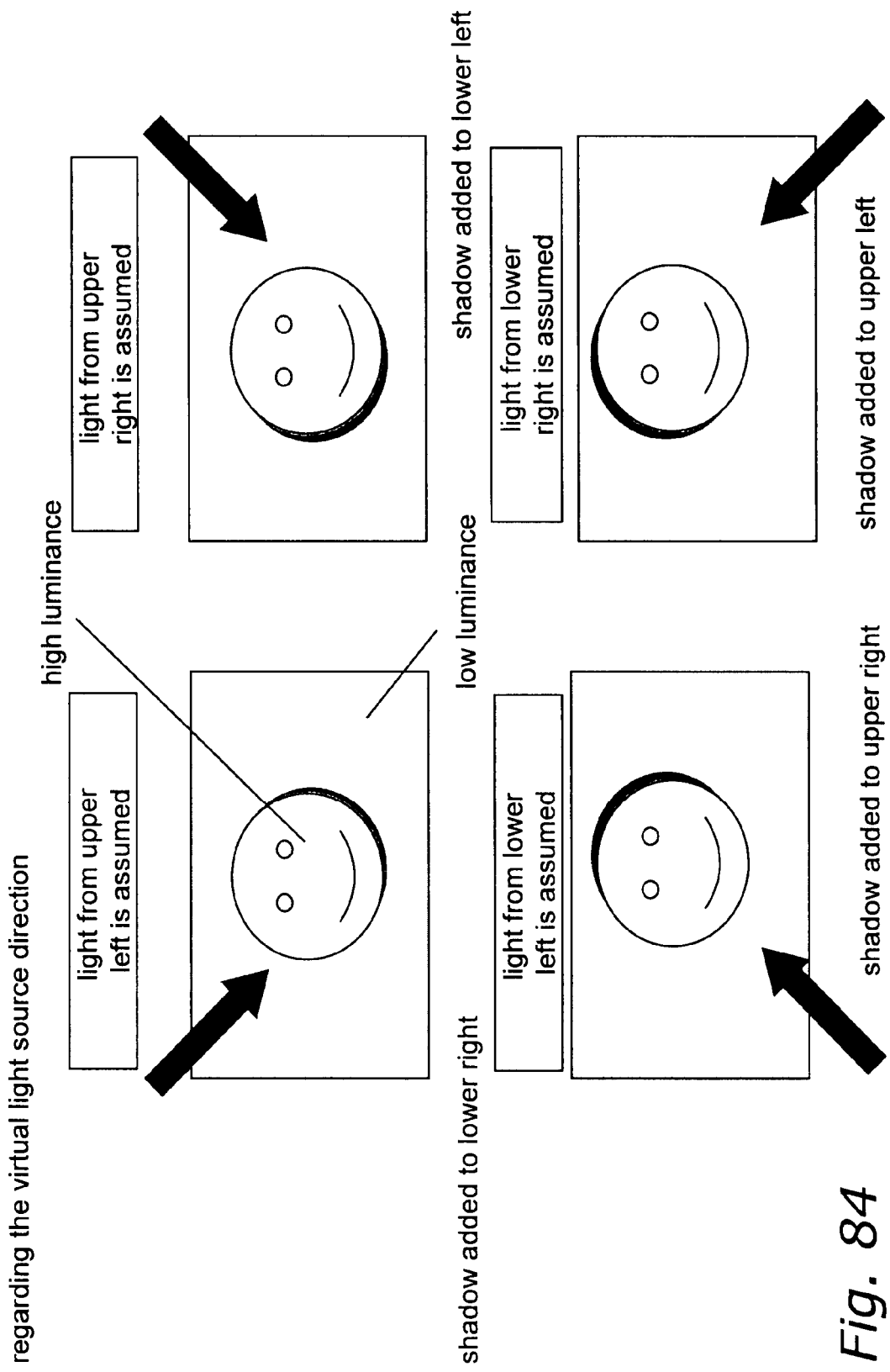
FIG. 84 is a schematic illustration of the shadow addition direction in the first through seventeenth embodiments of the invention.
Figure 85:
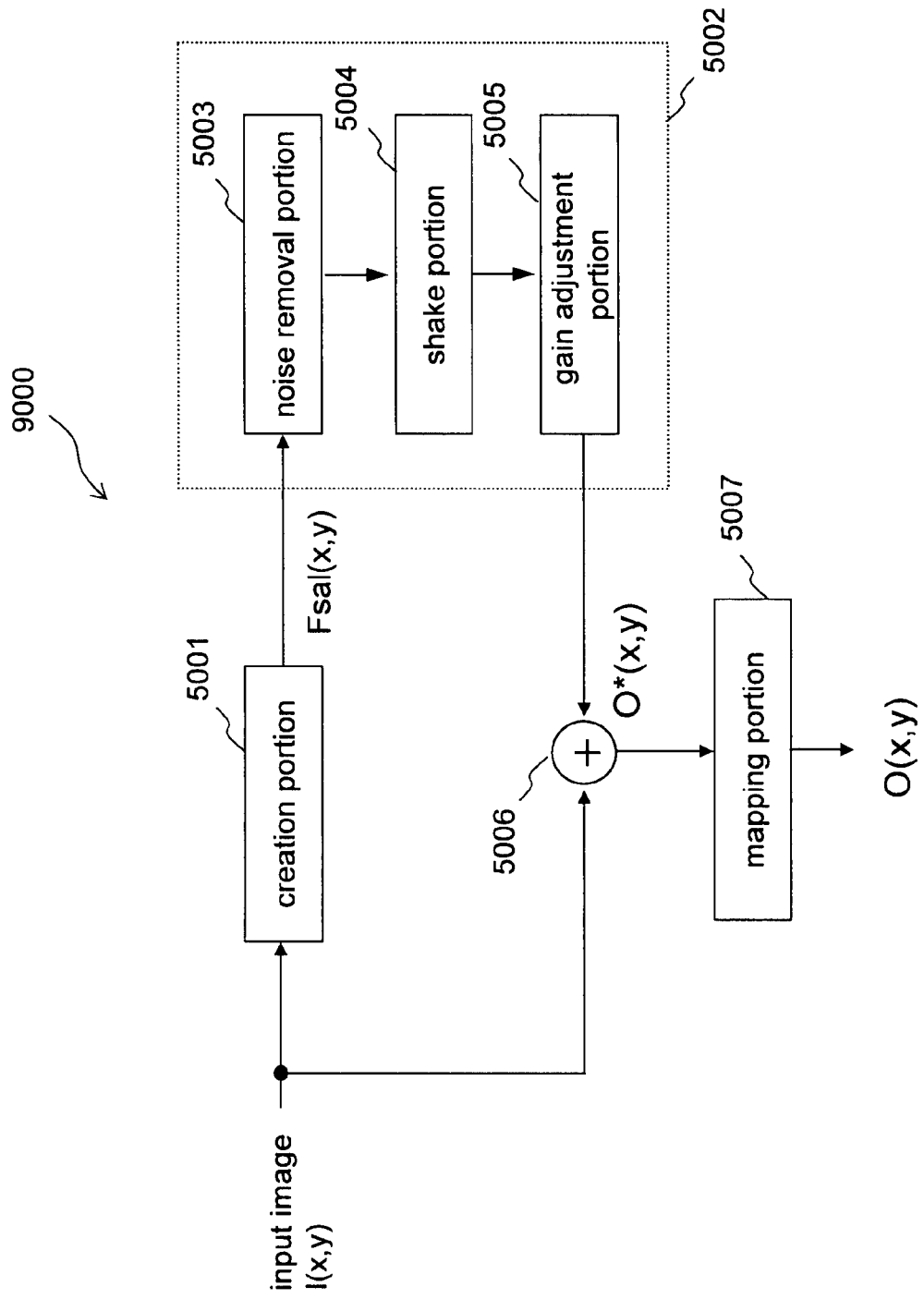
FIG. 85 is a block diagram that shows the configuration of a conventional image processing device.

The creation, of a shadow-enhanced image like in the second through sixth embodiments is described using a case in which a high-luminance pattern region is present in a low-luminance background like in FIG. 84 as one example.

In the case of the default light source direction mode, shadow is added to and enhanced on the lower right of the pattern as shown in the upper left diagram of FIG. 84. If the user views this image and selects the (1-2) above right light source mode, then shadow is added to and enhanced at the lower left as shown in the upper right diagram of FIG. 84.

If the user selects the (1-4) bottom left light source mode, then as shown in the lower left diagram in FIG. 84, shadow is added to and enhanced at the upper right. If the user selects the (1-5) bottom right light source mode, then as shown in the lower right diagram in FIG. 84, shadow is added to and enhanced in the upper left.

If the third embodiment is similarly described using a case in which a high-luminance pattern region is on a low-luminance background, then in the (1-7) default light source direction mode, light is added to and enhanced at the upper left. If the user selects the (1-2) above right light source mode, then light is added to and enhanced at the above right.

If the user selects the (1-4) bottom left light source mode, then light is added to and enhanced at the lower left. If the user selects the (1-5) bottom right light source mode, then light is added to and enhanced at the lower right.

If the fourth through sixth embodiments also are similarly described using a case in which a high-luminance pattern region is on a low-luminance background, then in the (1-7) default light source direction mode, shadow is added to and enhanced at the bottom right and light is added to and enhanced at the upper left.

If the user selects the (1-2) above right light source mode, then shadow is added to and enhanced at the lower left and light is added to and enhanced at the upper right. If the user selects the (1-4) bottom left light source mode, then shadow is added to and enhanced at the upper right and light is added to and enhanced at the lower left. If the user selects the (1-5) bottom right light source mode, then shadow is added to and enhanced at the upper left and light is added to and enhanced at the lower right.

On the other hand, the case of the brightness modulation of the twelfth embodiment is illustrated under the assumption that the angle modulation of the target pixel in the brightness modulation is shadow modulation of a section where the gradation changes gently. For a high-luminance pattern on a low-luminance background like in FIG. 84, in the (1-7) default light source direction mode, gradation modulation (shadow modulation) of the lower right section of the high-luminance pattern is executed but its effect is suppressed at the border portion.

If the user selects the (1-2) above right light source mode, then gradation modulation (shadow modulation) of the lower left section of the high-luminance pattern is executed. If the user selects the (1-4) bottom left light source mode, then gradation modulation (shadow modulation) of the upper right section of the high-luminance pattern is executed, and if the user selects the (1-5) bottom right light source mode, then gradation modulation (shadow modulation) of the upper left section of the high-luminance pattern is executed.

In the case of the thirteenth through fifteenth embodiments, the effect of the corresponding second, third, fourth, or twelfth embodiment is achieved according to the selection of the light source direction and based on the corresponding combination of shadow enhancement, light enhancement, and brightness modulation.

Thus, the user can view the display portion 3000 and select a desired virtual light source direction based on the feeling of depth and the sense of three dimensions resulting from the extent of shadow enhancement and light enhancement.

Similarly, the user can view the display portion 3000 and make a selection from among the strength parameters in the menu prepared by the user mode selection portion 3001, such as a selection from among (2-1) strong mode, (2-2) weak mode, (2-3) moderate mode, and (2-4) default strength mode. Here, the default mode corresponds to the mode in which the strength of shadow enhancement, light enhancement, and brightness modulation when correcting the depth are set to default values. The result of this selection is received and used to control the strength for the addition of shadow, the addition of light, and brightness modulation in a shadow-enhanced, light-enhanced, or brightness-modulated image. It should be noted that in the menu for these strength parameters, it is also possible to concurrently adjust the object surface parameter that is assumed when calculating the diffuse reflection component, the mirror reflection component, and the ambient light component, in addition to the strength parameters, and it is also possible to prepare a separate selection menu for the assumed parameters when calculating the components.

In accordance with these selections, the user mode selection portion 3001 can control the degree of shadow enhancement, light enhancement, and brightness modulation and the shadow addition and light addition directions and the brightness modulation direction that are adopted by the image processing portion 2 so as to achieve a desired sense of three dimensions and feeling of depth. By doing this, the depth feeling is corrected to give an impression that is closer to a person's visual characteristics, and it is also possible to control the level according to how each individual views the image.

It should be noted that here, an example of the menu selection format has been described, but in the case of selection of the virtual light source direction, it is also possible to adopt a method of specifying a direction with a continuously moving interface such as a mouse or a pointer, in which case the pointer interface can move in an analog fashion or move digitally only in a plurality of directions that have been set in advance.

Figure 83A:
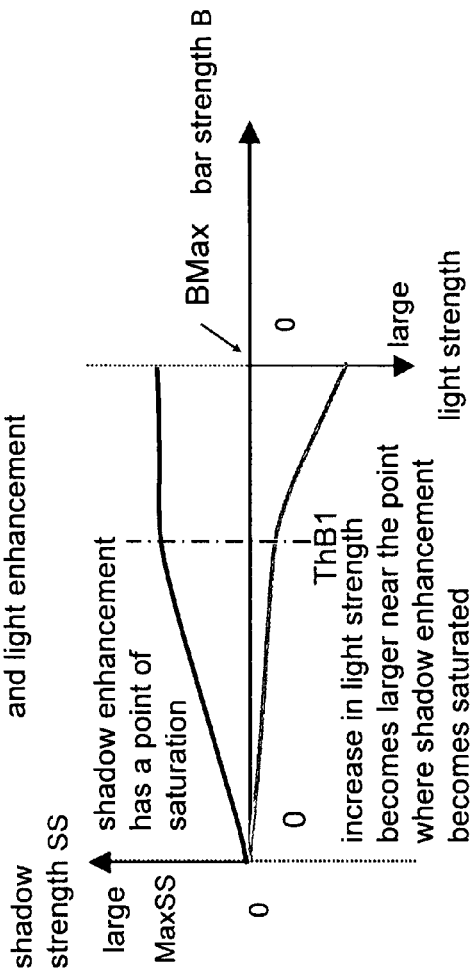
FIG. 83 is a conceptual diagram of the control of two different processes with a single bar in the image processing method according to the seventeenth embodiment of the invention.

Further, as shown in FIG. 83, it is also possible to adopt a configuration in which different combinations such as 1) shadow enhancement and light enhancement, 2) shadow enhancement and brightness adjustment, 3) light enhancement and brightness modulation, and 4) shadow enhancement, light enhancement and brightness modulation, are adjusted simultaneously with a single slider or bar. For example, the case where 1) shadow enhancement and light enhancement has been selected is shown in FIG. 83A. A bar strength B can be selected from 0 to BMax, and the strength SS of shadow enhancement and the strength LS of light enhancement is defined as a function of bar strength B. The strength SS(B) of shadow enhancement is increased as the bar strength B increases, but by suppressing the amount of increase in the strength LS(B) of the light enhancement, the effect due to shadow enhancement is emphasized. However, in an image in which shadow has been enhanced to a certain degree, the drop in average luminance and excessive addition in the target section become problems, and thus at the point that the bar strength B crosses a set threshold value ThB1, the shadow enhancement strength SS(B) is gradually converged to a predetermined maximum shadow enhancement strength MaxSS. Conversely, the light enhancement strength LS(B) is changed such that it is significantly increased. This prioritizes the effect due to light enhancement over the effect due to shadow, and by doing so it is possible to suppress the drop in luminance more than a certain degree as well as raise the sense of three dimensions with the contrast effect due to shadow and light.

Figure 83B:
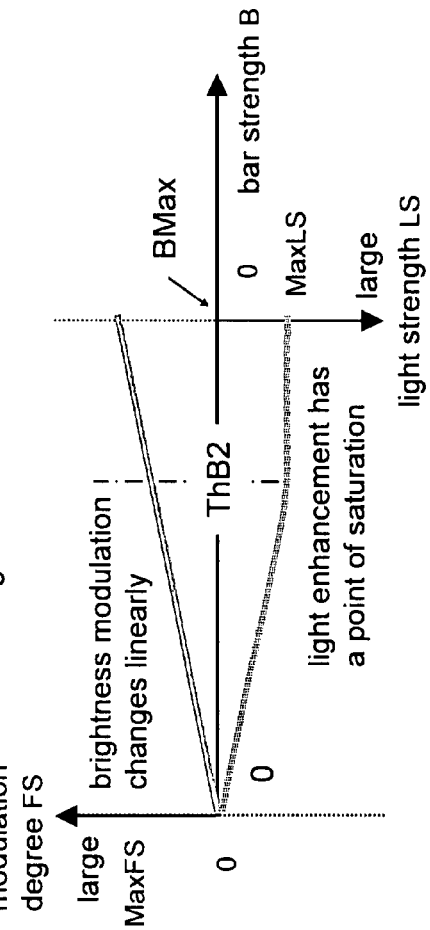

The case where 2) shadow enhancement and brightness adjustment has been selected is shown in FIG. 83B. In this case, it is more natural to linearly change the strength FS(B) of brightness modulation in accordance with the bar strength S, and thus operation is performed in this manner, but there is the risk that this may lead to a drop in the average luminance the larger the section that is modulated. Accordingly, the strength LS of light enhancement is monotonically increased if the bar strength B is less than a set threshold ThB2. There is a risk that once light enhancement has been strengthened to a certain degree, its negative effect will become particularly noticeable near borders, and thus the bar strength B is fixed at a constant MaxLS if it exceeds the set threshold ThB2.

Figure 83C:
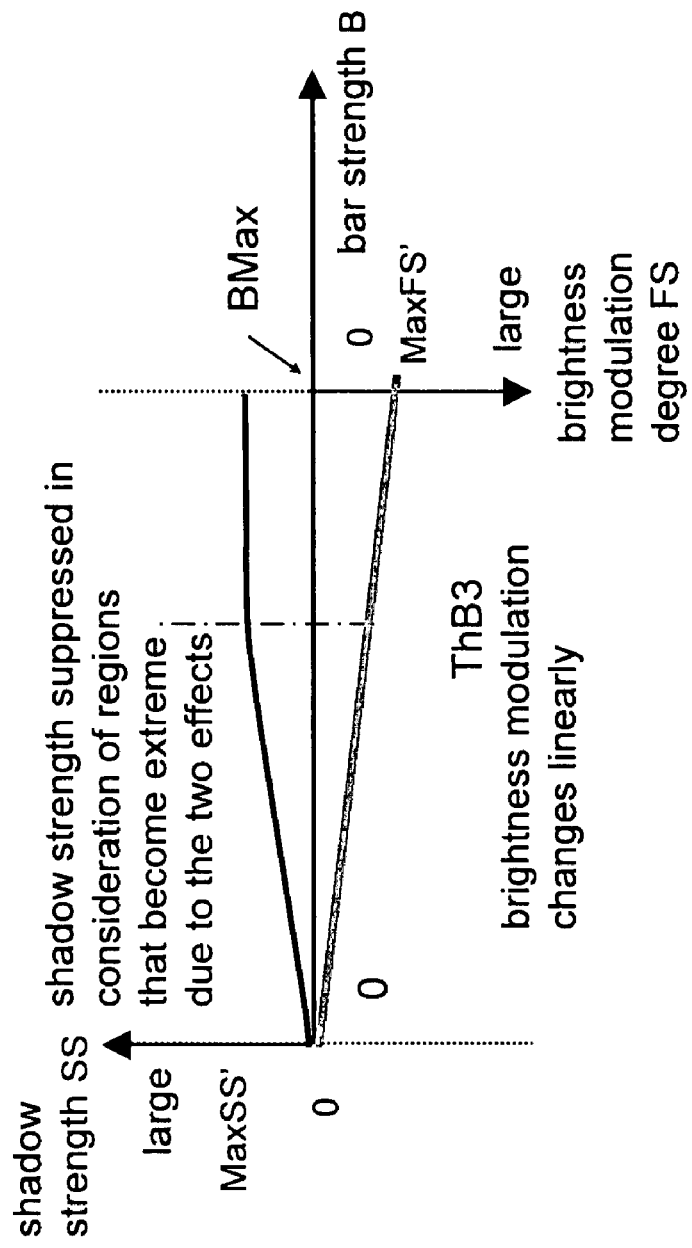

The case where 3) light enhancement and brightness modulation has been selected is shown in FIG. 83C. In this case, it is more natural to linearly change the strength FS(B) of brightness modulation in accordance with the bar strength S, but there is a risk that the effect of shadow enhancement will overlap with this. Accordingly, the rate of increase in the line of the strength FS(B) of brightness modulation is kept lower than in the case of 2). In contrast, the strength SS(B) of strength enhancement also is changed such that it is saturated at a lower level than in 1). By doing this, the effect of shadow on sections where the gradation changes gently and on border sections is increased (made higher), and overcorrection due to overlap between these two processes is suppressed. It should be noted that a drop in luminance occurs in the case of 3) and thus to improve this it is possible to simultaneously execute light enhancement as well. In this case, by controlling the strength LS(B) of the light strength as in 1), it is possible to suppress the drop in average luminance in the image and also deepen the sense of three dimensions by improving the contrast between shadow and light.

Other Embodiments

Here, the description was made defining the processed image as an image that is obtained by synthesizing the shadow-enhanced image and the light-enhanced image due to a virtual light source that is from the upper left, due to the fact that our visual characteristics lead us to strongly feel light that comes from above. However, this is not important, and it is also possible to use a virtual light source from another direction from above or from other directions.

In the image processing methods and the image processing devices of the invention that were described in the above embodiments, the edge information $EDGEi(x,y)$, the normal direction vector $vHi(x,y)$, and the brightness information $Ki(x,y)$ were used in the process for creating a shadow-enhanced image and in the process for creating a light-enhanced image, but it is also possible to use the brightness contrast amount $RYi(x,y)$ that was described in the fourth embodiment instead of the edge information.

In the image processing methods and the image processing devices of the invention that were described in the above embodiments, as the brightness contrast data $RKi(x,y)$ of the brightness information that is targeted it is preferable to use (1) the ratio of the brightness information of the target pixel to the representative brightness information of the surroundings and (2) the difference between the brightness information of the target pixel and the representative brightness information of the surroundings, but in addition to this, it is also possible to use a value that is obtained by transforming (1) and (2) with a predetermined function. Further, a region of a predetermined size around the target pixel was used as the surrounding region that is used for calculating the representative brightness information, but it is not absolutely necessary for this to be fixed, and for example, it is also possible to suitably change the surrounding region in accordance with the difference between the brightness information $Ki(x,y)$ of the target pixel $i(x,y)$ and the brightness information $Kk(s,t)$ of a pixel $k(s,t)$ within the surrounding region, or the distance length between the pixel and the pixel k. In a case where the average within the surrounding region is used as the representative brightness information, it is possible to weaken or strengthen the weighting coefficient that is applied to the brightness $Kk(s,t)$ of the surrounding region pixel k in accordance with the difference between the brightness information $Ki(x,y)$ of the target pixel $i(x,y)$ and the brightness information $Kk(s,t)$ of the pixel k within the surrounding region, or the distance length between the pixel i and the pixel k.

The virtual light source direction information and the strength parameters in these processing devices may be saved in the image processing devices, but there is no limitation to this, and for example, it is also possible to provide these data through an outside memory such as a RAM or an input portion from the outside.

The image processing methods and image processing devices of the invention that were described in the foregoing embodiments are devices that are used installed in or connected to devices that handles images, such as a computer, television, digital camera, portable telephone, PDA, or car TV, and they also can be achieved as an integrated circuit such as an LSI.

A part or all of each functional block that executes various functions described in the foregoing embodiments may be realized by a separate integrated circuit, or a one tip integrated circuit as a part of them or as a whole.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit. It is possible to use an FPGA (Field Programmable Gate Array) that is programmable after the LSI is produced or a silicon figurable processor that can restructure connection or setting of circuit cells in the LSI.

Furthermore, if another technique for integrating circuits rather than he LSI appears with the progress of semiconductor technology, then that technique may be utilized for integrating the functional blocks. Biotechnology has the potential for such technology.

Some or all of the processing of the functional blocks of the embodiments can be achieved by a program. Then some or all of the processing of the functional blocks in the embodiments are run by a central processing device (CPU) on a computer.

A program for performing the various processes is stored on a memory device such as a hard disk or a ROM, and is run on the ROM or read to and run on a RAM.

If the shadow enhancement processing and the light enhancement processing of the second through fourth embodiments are performed, then the light source was a predetermined light source that has been set, but it is also possible to use a light source direction that is obtained using the optimum light source estimation portion that was additionally described in the twelfth embodiment.

Each of the processing functions explained in the aforementioned embodiments may be carried out by hardware, or by software. Alternatively, it may be carried out by mixed processing using the hardware and software.

It should be noted that the specific configuration of the invention is not limited to the foregoing embodiments, and various changes and modifications are possible in a range that does not depart from the gist of the invention.

[Attachments]

The present invention can also be expressed as follows.

(Attachment 1)

A shadow addition method, comprising steps of inputting a coordinate (c1,c2,c3) of a light source position;

inputting a difference x between a luminance of a pixel at a predetermined position (p1,p2) and a luminance of a pixel that is adjacent in the x direction, and a difference y between the luminance of the pixel at the predetermined position (p1, p2) and a luminance of a pixel that is adjacent in the y direction; and correcting the pixel based on a vector 1 (difference x, difference y, c3) and a vector 2 (c1-p1, c2-p2, c3).

(Attachment 2)

A light addition method, comprising steps of:

inputting a coordinate (c1,2,c3) of a light source position;

inputting a difference x between a luminance of a pixel at a predetermined position (p1,p2) and a luminance of a pixel that is adjacent in the x direction, and a difference y between the luminance of the pixel at the predetermined position (p1, p2) and a luminance of a pixel that is adjacent in the y direction; and correcting the pixel based on a vector 1 (difference x, difference y, c3) and a vector 2 (c1-p1, c2-p2, c3).

(Attachment 3)

The shadow or light addition method according to attachment 1 or 2, wherein in a case where the light source position is in an infinite parallel position such as sunlight, then the coordinate (c1,c2,c3) of the light source position is a value that has a predetermined size in the infinite parallel position direction.

(Attachment 4)

A color image processing method of correcting color image data that have been input, comprising steps of:

calculating brightness information of the image signal that has been input;

estimating a normal direction for providing a feeling of depth to the image;

enhancing shadow sections using the normal direction information of the target pixel to correct the brightness information of the input image; and outputting the shadow-enhanced image that has been obtained in the form of predetermined image data.

(Attachment 5)

A color image processing method of correcting color image data that have been input, comprising steps of:

calculating brightness information of the image signal that has been input;

estimating a normal direction for giving the image a feeling of depth;

creating a light-enhanced image in which a tiny light component has been added to the input image, based on the normal direction information in the target pixel; and outputting the light-enhanced image that has been obtained in the form of predetermined image data.

(Attachment 6)

A color image processing method of correcting color image data that have been input, comprising steps of:

calculating brightness information of the image signal that has been input;

finding a brightness contrast amount from the brightness information;

estimating a normal direction for giving the image a feeling of depth;

enhancing shadow portions in the input image using the normal direction information of the target pixel;

creating a light-enhanced image in which a tiny light component has been added to the input image, based on the light source direction information in the target pixel;

synthesizing the shadow-enhanced image and the light-enhanced image, based on the brightness contrast amount of the target pixel; and outputting the processed image that is obtained in the synthesis step as predetermined image data.

(Attachment 7)

A color image processing method of correcting color image data that have been input, comprising steps of:

calculating brightness information of the image signal that has been input;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image; and outputting the brightness-modulated image that has been obtained in the form of predetermined image data.

(Attachment 8)

A color image processing method of correcting color image data that have been input, comprising steps of:

calculating brightness information of the image signal that has been input;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image;

enhancing shadow portions in the input image by correcting the brightness information of the input image using the predetermined normal direction information that has been obtained;

synthesizing the brightness-modulated image and the shadow-enhanced image of the target pixel; and outputting the processed image that is obtained in the synthesis step as predetermined image data.

(Attachment 9)

A color image processing method of correcting color image data that have been input, comprising steps of:

calculating brightness information of the image signal that has been input;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image;

creating a light-enhanced image in which a tiny light component has been added to the input image, using the predetermined normal direction information that has been obtained;

synthesizing the brightness-modulated image and the light-enhanced image of the target pixel; and outputting the processed image that is obtained in the synthesis step as predetermined image data.

(Attachment 10)

A color image processing method of correcting color image data that have been input, comprising steps of:

calculating brightness information of the image signal that has been input;

finding a brightness contrast amount from the brightness information;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image;

enhancing shadow portions in the input image using the predetermined normal direction information of the target pixel;

creating a light-enhanced image in which a tiny light component has been added to the input image, using the predetermined light source direction information of the target pixel;

synthesizing the shadow-enhanced image, the light-enhanced image, the brightness-modulated image using the brightness contrast amount of the target pixel; and outputting the processed image that is obtained in the synthesis step as predetermined image data.

(Attachment 11)

The image processing method according to attachment 6 or 10, wherein the brightness contrast calculation step is achieved by brightness contrast processing of comparing the brightness information of the pixel that is targeted with the surrounding brightness information that represents the brightness information within the region around the pixel.

(Attachment 12)

The image processing method according to attachment 6, wherein the synthesis step creates the processed image by:

calculating a synthesis coefficient from the brightness contrast amount;

calculating the brightness information of the processed image by synthesizing the brightness information of the shadow-enhanced image and the light-enhanced image; and calculating a chroma component of the processed image from the brightness information of the processed image and the brightness information of the input image.

(Attachment 13)

The image processing method according to attachment 10, wherein the synthesis step creates the processed image by:

calculating a synthesis coefficient from the brightness contrast amount;

calculating the brightness information of the image that is obtained by synthesizing the brightness information of the shadow-enhanced image and the light-enhanced image, and then calculating the brightness information of the processed image by synthesizing the brightness information of the brightness-modulated image with the synthesized image; and calculating a chroma component of the processed image from the brightness information of the processed image and the brightness information of the input image.

(Attachment 14)

The image processing method according to any one of attachments 4 through 10, wherein the output step comprises steps of:

executing gradation transformation of the luminance of the processed image based on a value that expresses the luminance distribution of the input image and a value that expresses the luminance distribution of the processed image; and executing correction of the chroma component that fits the output format, based on the output luminance value that is obtained in the output gradation correction step.

(Attachment 15)

The image processing method according to any one of attachments 4 through 10, wherein the normal direction information in the target region is determined based on:

the difference x with respect to the average luminance of pixels in the region pixels adjacent to the region in the x direction, and the difference y with respect to the average luminance of pixels in the region pixels adjacent to the region in the y direction.

(Attachment 16)

The image processing method according to any one of attachments 4 through 10, wherein the normal direction information in the target region is determined based on:

the difference x with respect to the average luminance of pixels in the region pixels adjacent to the region in the x direction;

the difference y with respect to the average luminance of pixels in the region pixels adjacent to the region in the y direction; and a value that corresponds to a luminance contrast amount that shows the relationship between the average luminance value of the pixels in the target region and the average luminance value of the pixels in a surrounding region that is located within a predetermined distance around the target region.

(Attachment 17)

The image processing method according to any one of attachments 4 through 10, wherein the normal direction information in the target region is determined based on:

the difference x with respect to the average luminance of pixels in the region pixels adjacent to the region in the x direction;

the difference y with respect to the average luminance of pixels in the region pixels adjacent to the region in the y direction; and a value that corresponds to a color contrast amount that shows the relationship between the average color information value of the pixels in the target region and the average color information value of the pixels in a surrounding region that is located within a predetermined distance around the target region.

(Attachment 18)

The image processing method according to any one of attachments 4 through 10, wherein the normal direction information in the target region is determined based on:

the difference x with respect to the average luminance of pixels in the region pixels adjacent to the region in the x direction;

the difference y with respect to the average luminance of pixels in the region pixels adjacent to the region in the y direction;

a value that corresponds to a luminance contrast amount that shows the relationship between the average luminance value of the pixels in the target region and the average luminance value of the pixels in a surrounding region that is located within a predetermined distance around the target region; and a value that corresponds to a color contrast amount that shows the relationship between the average color information value of the pixels in the target region and the average color information value of the pixels in a surrounding region that is located within a predetermined distance around the target region.

(Attachment 19)

The image processing method according to any one of attachments 4 through 10, wherein the normal direction information in the target region is determined based on:

the difference x with respect to the average luminance of pixels in the region pixels adjacent to the region in the x direction;

the difference y with respect to the average luminance of pixels in the region pixels adjacent to the region in the y direction; and a value that indicates the luminance fluctuation within the target region.

(Attachment 20)

The image processing method according to any one of attachments 4, 6, 7, and 10, wherein the shadow-enhanced image creation step involves:

setting a virtual light source direction;

calculating a diffuse reflection component due to that virtual light source, from the brightness information of the input image;

calculating a mirror reflection component due to that virtual light source, from the brightness information of the input image;

calculating an ambient light component due to that virtual light source, from the brightness information of the input image;

creating a shadow component image based on the diffuse reflection component, the mirror reflection component, and the ambient light component;

calculating a synthesis coefficient to be applied to the shadow component image from the edge amount and the normal information calculated in the normal direction estimation step;

calculating brightness information of a shadow-enhanced image from the shadow component image and the brightness information of the input image based on the synthesis coefficient; and calculating the chroma component of the shadow-enhanced image from the brightness information of the shadow-enhanced image and the brightness information of the input image, thereby creating the shadow-enhanced image.

(Attachment 21)

The image processing method according to any one of attachments 5, 6, 9, and 10, wherein the light-enhanced image creation step involves:

setting a virtual light source direction to add;

calculating an added diffuse reflection component due to that virtual light source;

calculating an added mirror reflection component due to that virtual light source;

calculating an added ambient light component due to that virtual light source;

creating a light-added image based on the added diffuse reflection component, the added mirror reflection component, and the added ambient light component;

calculating a synthesis coefficient to be applied to the light-added image from the edge amount and the normal information calculated in the normal direction estimation step;

calculating brightness information of a light-enhanced image from the light-added image and the brightness information of the input image based on the synthesis coefficient; and calculating the chroma component of the light-enhanced image from the brightness information of the shadow-enhanced image and the brightness information of the input image, thereby creating the light-enhanced image.

(Attachment 22)

The image processing method according to any one of attachments 7, 8, 9, and 10, wherein the brightness-modulated image creation step involves:

setting a virtual light source;

finding the amount of change in angle between the normal direction vector before modulation, and the normal difference vector after modulation, of the target pixel that is executed in the normal direction modulation step;

calculating the amount of change in the diffuse reflection component due to the virtual light source, from that amount of change in angle;

calculating the amount of change in the mirror reflection component due to the virtual light source, from that amount of change in angle; and correcting the brightness information of the input image based on the amount of change in the diffuse reflection component and the mirror reflection component, thereby creating the brightness-modulated image.

(Attachment 23)

The image processing method according to any one of attachments 7 through 10, wherein in the normal smoothing step, the normal direction information of the target region is smoothed in the space direction using the normal direction information of a surrounding region within a predetermined distance from the target region in the image at the same frame time.

(Attachment 24)

The image processing method according to any one of attachments 1 through 10, wherein in the normal direction estimation step, the normal direction information in the target region from the frame image p time units prior to the current time up to the frame image of the current time is used to perform smoothing in the time direction.

(Attachment 25)

The image processing method according to any one of attachments 7 through 10, wherein in the normal direction smoothing step, the normal direction information of the target region is smoothed in the space direction using the normal direction information of a surrounding region within a predetermined distance from the target region in the image at the same frame time, and also the normal direction information in the target region from the frame image p time units prior to the current time up to the frame image of the current time is used to perform smoothing in the time direction.

(Attachment 26)

The color image processing method of correcting color image data that have been input, according to any one of attachments 2 through 7, comprising steps of:

a user selecting a processing mode from a menu or buttons displayed by a predetermined method, controlling the processing of the image processing method according to any one of attachments 4 through 10, in accordance with the processing mode that has been obtained in the user processing selection step;

displaying the results of the image processing method on a predetermined display device;

the user making a command to output the image by a predetermined method in the case that the processed iamge that is obtained in the display step is favorable; and outputting the processed image with a predetermined method at the point that the output command has been made in the user output step.

(Attachment 27)

The image processing method according to attachment 26, wherein the user processing selection step is for adjusting the parameters that relate to the virtual light source direction when adding shadow, light, or modulating the brightness, the diffuse reflection coefficient, the mirror reflection coefficient, or the ambient light coefficient, or to the strength of shadow enhancement or light enhancement or the strength of brightness modulation, in the processing of the image processing method according to any one of attachments 4 through 10, and is characterized in that a selection is made from a plurality of predetermined modes that have been set.

(Attachment 28)

The image processing method according to attachment 27, wherein the user processing selection method is for adjusting two different effects that have been selected from among shadow enhancement, light enhancement, and brightness modulation, in the processing of the image processing method according to any one of attachments 4 through 10, with a slider bar that has a single axis, and is characterized in that a single mode is selected from a plurality of modes corresponding to the combination of the two effects that have been selected.

(Attachment 29)

An image processing device comprising:

a setting portion for setting a light source position in the image;

a partitioning portion that partitions the image into regions; and a determining portion for determining a correction amount of the luminance of a first region, and a correction amount of the luminance of a second region that is adjacent to the first region;

wherein the determining portion determines that the correction amount of the second region is larger than the first correction amount in a case where the average luminance of the first region is higher than the average luminance of the second region, and the central coordinates of the first region are closer to the light source position than the central coordinates of the second region.

(Attachment 30)

A color image processing device for correcting color image data that have been input, comprising:

a brightness information calculation portion that calculates brightness information of an image signal that has been input;

a normal direction estimation portion that estimates a normal direction for giving the image a feeling of depth;

a shadow-enhanced image creation portion that uses the normal direction information of a target pixel to enhance shadow portions of the input image; and an output portion that outputs the shadow-enhanced image that has been obtained in the form of predetermined image data.

(Attachment 31)

A color image processing device for correcting color image data that have been input, comprising:

a brightness information calculation portion that calculates brightness information of an image signal that has been input;

a normal direction estimation portion that estimates a normal direction for giving a feeling of depth to the image;

a light-enhanced image creation portion that creates a light-enhanced image in which a tiny light component has been added to a input image, from the normal direction information of a target pixel; and an output portion that outputs the light-enhanced image that has been obtained in the form of predetermined image data.

(Attachment 32)

A color image processing device for correcting color image data that have been input, comprising:

a brightness information calculation portion that calculates brightness information of an image signal that has been input;

a brightness contrast calculation portion that finds a brightness contrast amount from the brightness information;

a normal direction estimation portion that estimates a normal direction for giving the image a feeling of depth;

a shadow-enhanced image creation portion that enhances shadow portions in the input image using the normal direction information of a target pixel;

a light-enhanced image creation portion that creates a light-enhanced image in which a tiny light component has been added to the input image, based on the light source direction information in the target pixel;

a synthesis portion that synthesizes the shadow-enhanced image and the light-enhanced image, based on the brightness contrast amount of the target pixel; and an output portion that outputs the processed image that is obtained by the synthesis portion as predetermined image data.

(Attachment 33)

A color image processing device for correcting color image data that have been input, comprising:

a brightness information calculation portion that calculates brightness information of an image signal that has been input;

a normal direction estimation portion that estimates a normal direction for giving the image a feeling of depth;

a normal smoothing portion for obtaining a predetermined normal direction from the normal direction;

a normal direction modulation portion that modulates the predetermined normal direction that has been obtained;

a brightness-modulated image creation portion that calculates an amount of modulation of the brightness information from the normal direction that has been modulated and corrects the brightness information of the input image; and an output portion that outputs the brightness-modulated image that is obtained as predetermined image data.

(Attachment 34)

A color image processing device for correcting color image data that have been input, comprising:

a brightness information calculation portion that calculates brightness information of an image signal that has been input;

a normal direction estimation portion that estimates a normal direction for giving a feeling of depth to the image;

a normal smoothing portion for obtaining a predetermined normal direction from the normal direction;

a normal direction modulation portion that modulates the predetermined normal direction that has been obtained;

a brightness-modulated image creation portion that calculates the amount of modulation of the brightness information from the normal direction that has been modulated and corrects the brightness information of the input image;

a shadow-enhanced image creation portion that uses the predetermined normal direction information that has been obtained to correct the brightness information and enhance shadow portions in the input image;

a synthesis portion that synthesizes the shadow-enhanced image and the brightness-modulated image of the target pixel; and an output portion that outputs the processed image that is obtained by the synthesis portion as predetermined image data.

(Attachment 35)

A color image processing device for correcting color image data that have been input, comprising:

a brightness information calculation portion that calculates brightness information of an image signal that has been input;

a normal direction estimation portion that estimates a normal direction for giving a feeling of depth to the image;

a normal smoothing portion for obtaining a predetermined normal direction from the normal direction;

a normal direction modulation portion that modulates the predetermined normal direction that has been obtained;

a brightness-modulated image creation portion that calculates the amount of modulation of the brightness information from the normal direction that has been modulated and corrects the brightness information of the input image;

a light-enhanced image creation portion that uses the predetermined normal direction information that has been obtained to create a light-enhanced image in which a tiny light component has been added to the input image;

a synthesis portion that synthesizes the light-enhanced image and the brightness-modulated image of the target pixel; and an output portion that outputs the processed image that is obtained by the synthesis portion as predetermined image data.

(Attachment 36)

A color image processing device for correcting color image data that have been input, comprising:

a brightness information calculation portion that calculates brightness information of an image signal that has been input;

a normal direction estimation portion that estimates a normal direction for giving a feeling of depth to the image;

a normal smoothing portion for obtaining a predetermined normal direction from the normal direction;

a normal direction modulation portion that modulates the predetermined normal direction that has been obtained;

a brightness-modulated image creation portion that calculates the amount of modulation of the brightness information from the normal direction that has been modulated and corrects the brightness information of the input image;

a shadow-enhanced image creation portion that uses the predetermined normal direction information that has been obtained to correct the brightness information and enhance shadow portions in the input image;

a light-enhanced image creation portion that uses the predetermined normal direction information that has been obtained to create a light-enhanced image in which a tiny light component has been added to the input image;

a synthesis portion that synthesizes the brightness-modulated image, the shadow-enhanced image, and the light-enhanced image of the target pixel; and an output portion that outputs the processed image that is obtained by the synthesis portion as predetermined image data.

(Attachment 37)

An image processing program for performing correction of a color image with a computer, wherein the image processing program is an image processing method comprising steps of:

calculating brightness information of the image signal that has been input;

estimating a normal direction for giving a feeling of depth to the image;

enhancing shadow sections of the input image using the normal direction information and the edge information of the target pixel; and outputting the shadow-enhanced image that has been obtained in the form of predetermined image data.

(Attachment 38)

An image processing program for performing correction of a color image with a computer, wherein the image processing program is an image processing method comprising steps of:

calculating brightness information of the image signal that has been input;

estimating a normal direction for giving a feeling of depth to the image;

creating a light-enhanced image in which a tiny light component has been added to the input image, based on the normal direction information in the target pixel; and outputting the light-enhanced image that has been obtained in the form of predetermined image data.

(Attachment 39)

An image processing program for performing correction of a color image with a computer, wherein the image processing program is an image processing method comprising steps of:

calculating brightness information of the image signal that has been input;

finding a brightness contrast amount from the brightness information;

estimating a normal direction for giving the image a feeling of depth;

enhancing shadow portions of the input image using the normal direction information in the target pixel;

creating a light-enhanced image in which a tiny light component has been added to the input image, based on the light source direction information in the target pixel;

synthesizing the shadow-enhanced image and the light-enhanced image, based on the brightness contrast amount of the target pixel; and outputting the processed image that is obtained in the synthesis step as predetermined image data.

(Attachment 40)

An image processing program for performing correction of a color image with a computer, wherein the image processing program is an image processing method comprising steps of:

calculating brightness information of the image signal that has been input;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image; and outputting the brightness-modulated image that has been obtained in the form of predetermined image data.

(Attachment 41)

An image processing program for performing correction of a color image with a computer, wherein the image processing program is an image processing method comprising steps of:

calculating brightness information of the image signal that has been input;

estimating a normal direction for giving the image a feeling of depth;

obtaining a predetermined normal direction from the normal direction;

modulating the predetermined normal direction that has been obtained;

calculating the amount of modulation of the brightness information from the modulated normal direction and correcting the brightness information of the input image;

enhancing shadow portions in the input image by correcting the brightness information of the input image using the predetermined normal direction information that has been obtained;

synthesizing the brightness-modulated image and the shadow-enhanced image of the target pixel; and outputting the processed image that is obtained in the synthesis step as predetermined image data.

(Attachment 42)

An image processing program for performing correction of a color image with a computer, wherein the image processing program is an image processing method comprising steps of:
calculating brightness information of the image signal that has been input;
estimating a normal direction for giving the image a feeling of depth;
obtaining a predetermined normal direction from the normal direction;
modulating the predetermined normal direction that has been obtained;
calculating the amount of modulation of the brightness information from the modulated normal direction and correcting the brightness information of the input image;
creating a light-enhanced image in which a tiny light component has been added to the input image, using the predetermined normal direction information that has been obtained;
synthesizing the brightness-modulated image and the light-enhanced image of the target pixel; and
outputting the processed image that is obtained in the synthesis step as predetermined image data.

(Attachment 43)
An image processing program for performing correction of a color image with a computer,
wherein the image processing program is an image processing method comprising steps of:
calculating brightness information of the image signal that has been input;
estimating a normal direction for giving the image a feeling of depth;
obtaining a predetermined normal direction from the normal direction;
modulating the predetermined normal direction that has been obtained;
calculating the amount of modulation of the brightness information from the modulated normal direction and correcting the brightness information of the input image;
enhancing shadow portions by correcting the brightness information of the input image using the predetermined normal direction information of the target pixel;
creating a light-enhanced image in which a tiny light component has been added to the input image, using the predetermined light source direction information that has been obtained;
synthesizing the brightness-modulated image, the shadow-enhanced image, and the light-enhanced image in the target pixel; and
outputting the processed image that is obtained in the synthesis step as predetermined image data.

(Attachment 44)
An integrated circuit, comprising:
a brightness information calculation portion that calculates brightness information of an image signal that has been input;
a normal direction estimation portion that estimates a normal direction for giving a feeling of depth to the image;
a shadow-enhanced image creation portion that uses the normal direction information of a target pixel to enhance shadow portions of the input image; and
an output portion that outputs the shadow-enhanced image that has been obtained in the form of predetermined image data.

(Attachment 45)
An integrated circuit, comprising:
a brightness information calculation portion that calculates brightness information of an image signal that has been input;
a normal direction estimation portion that estimates a normal direction for giving the image a feeling of depth;
a light-enhanced image creation portion that creates a light-enhanced image in which a tiny light component has been added to the input image, from the normal direction information in a target pixel; and
an output portion that outputs the light-enhanced image that has been obtained in the form of predetermined image data.

(Attachment 46)
An integrated circuit, comprising:
a brightness information calculation portion that calculates brightness information of an image signal that has been input;
a brightness contrast calculation portion that finds a brightness contrast amount from the brightness information;
a normal direction estimation portion that estimates a normal direction for giving the image a feeling of depth;
a shadow-enhanced image creation portion that enhances shadow portions in the input image using the normal direction information of a target pixel;
a light-enhanced image creation portion that creates a light-enhanced image in which a tiny light component has been added to the input image, based on the light source direction information in the target pixel;
a synthesis portion that synthesizes the shadow-enhanced image and the light-enhanced image, based on the brightness contrast amount of the target pixel; and
an output portion that outputs the processed image that is obtained by the synthesis portion as predetermined image data.

(Attachment 47)
An integrated circuit, comprising:
a brightness information calculation portion that calculates brightness information of an image signal that has been input;
a normal direction estimation portion that estimates a normal direction for giving the image a feeling of depth;
a normal smoothing portion for obtaining a predetermined normal direction from the normal direction;
a normal direction modulation portion that modulates the predetermined normal direction that has been obtained;
a brightness-modulated image creation portion that calculates an amount of modulation of the brightness information from the normal direction that has been modulated and corrects the brightness information of the input image; and
an output portion that outputs the brightness-modulated image that is obtained as predetermined image data.

(Attachment 48)
An integrated circuit, comprising:
a brightness information calculation portion that calculates brightness information of an image signal that has been input;
a normal direction estimation portion that estimates a normal direction for giving a feeling of depth to the image;
a normal smoothing portion for obtaining a predetermined normal direction from the normal direction;
a normal direction modulation portion that modulates the predetermined normal direction that has been obtained;
a brightness-modulated image creation portion that calculates the amount of modulation of the brightness information from the modulated normal direction and corrects the brightness information of the input image;
a shadow-enhanced image creation portion that uses the predetermined normal direction information that has been obtained to correct the brightness information and enhance shadow portions in the input image;
a synthesis portion that synthesizes the shadow-enhanced image and the brightness-modulated image of the target pixel; and an output portion that outputs the processed image that is obtained by the synthesis portion as predetermined image data.

(Attachment 49)

An integrated circuit, comprising:
a brightness information calculation portion that calculates brightness information of an image signal that has been input;
a normal direction estimation portion that estimates a normal direction for giving a feeling of depth to the image;
a normal smoothing portion for obtaining a predetermined normal direction from the normal direction;
a normal direction modulation portion that modulates the predetermined normal direction that has been obtained;
a brightness-modulated image creation portion that calculates the amount of modulation of the brightness information from the modulated normal direction and corrects the brightness information of the input image;
a light-enhanced image creation portion that uses the predetermined normal direction information that has been obtained to create a light-enhanced image in which a tiny light component has been added to the input image;
a synthesis portion that synthesizes the light-enhanced image and the brightness-modulated image of the target pixel; and
an output portion that outputs the processed image that is obtained by the synthesis portion as predetermined image data.

(Attachment 50)

An integrated circuit, comprising:
a brightness information calculation portion that calculates brightness information of the image signal that has been input;
a normal direction estimation portion that estimates a normal direction for giving a feeling of depth to the image;
a normal smoothing portion for obtaining a predetermined normal direction from the normal direction;
a normal direction modulation portion that modulates the predetermined normal direction that has been obtained;
a brightness-modulated image creation portion that calculates the amount of modulation of the brightness information from the modulated normal direction and corrects the brightness information of the input image;
a shadow-enhanced image creation portion that uses the predetermined normal direction information that has been obtained to correct the brightness information and enhance shadow portions in the input image;
a light-enhanced image creation portion that uses the predetermined normal direction information that has been obtained to create a light-enhanced image in which a tiny light component has been added to the input image;
a synthesis portion that synthesizes the brightness-modulated image, the shadow-enhanced image, and the light-enhanced image of the target pixel; and
an output portion that outputs the processed image that is obtained by the synthesis portion as predetermined image data.

The image processing devices, image processing methods, programs, recording media, and integrated circuits according to the invention can easily, and without requiring special devices like a 3D image display, increase the feeling of depth of a 2D image by adding shadow, adding light, or performing brightness modulation, and thus the invention is useful in industrial fields related to video devices, and the image processing devices, image processing methods, programs, recording media, and integrated circuits according to the invention can be implemented in those fields.

The invention claimed is:

1. An image processing device comprising:
a brightness information calculation portion that calculates brightness information of an image signal that is input and that forms a two-dimensional image made from pixels;
a normal direction estimation portion that estimates a normal direction for each pixel, or each region made of a plurality of pixels, from the brightness information, and obtains a normal direction vector that is a three-dimensional vector for each pixel or for each region based on the estimated normal direction;
a corrected gradation derivation portion that finds a correction amount of the brightness information based on the normal direction vector that is obtained by the normal direction estimation portion, and corrects the brightness information of the image signal based on the correction amount of the brightness information; and
a processor that controls at least one of the brightness information calculation portion, the normal direction estimation portion, and the corrected gradation derivation portion,
wherein the normal direction estimation portion (i) sets a third direction component value for each pixel or each region to a first value that is a predetermined value, the third direction component value being a value of a component of a third direction that is not included on a plane that is formed by the two-dimensional image, and (ii) obtains the normal direction vector from values of three direction components including:
(1) a first direction component value that is a value of a component of a first direction; and
(2) a second direction component value that is a value of a component of a second direction, the first direction component value and the second direction component value serving as two-dimensional coordinate information for determining a pixel position of a pixel in the two-dimensional image, and
wherein the normal direction estimation portion sets, for a plurality of pixels, the third direction component value to the same value as the first value and determines the normal direction value for each pixel or for each region.

2. The image processing device according to claim 1, further comprising:
an output portion that outputs the image signal, whose brightness information has been corrected by the corrected gradation derivation portion, in a predetermined format.

3. The image processing device according to claim 2, further comprising:
a user mode selection portion that allows a processing mode to be selected by a user command; and
a display portion that displays the output from the output portion as an image.

4. The image processing device according to claim 3,
wherein the user mode selection portion allows selection of at least a processing mode that includes information relating to a strength of correction of the brightness information.

5. The image processing device according to claim 1,
wherein the corrected gradation derivation portion sets at least one virtual light source and determines a light source position of the virtual light source, and corrects the brightness information of the image signal based on the normal direction vector and a positional relationship between the pixel position of the pixel and the light source position.

6. The image processing device according to claim 1,
wherein the corrected gradation derivation portion sets at least one virtual light source and finds a light source direction vector, which is a three-dimensional vector that has a direction toward the virtual light source, for each pixel or for each region, and corrects the brightness information of the image signal based on the normal direction vector and the light source direction vector.

7. The image processing device according to claim 6,
wherein the corrected gradation derivation portion corrects the brightness information of the image signal by adding shadow to a pixel value of the pixel.

8. The image processing device according to claim 6,
wherein the corrected gradation derivation portion corrects the brightness information of the image signal by adding light to a pixel value of the pixel.

9. The image processing device according to claim 6,
wherein the normal direction estimation portion obtains a modulated normal direction vector by modulating the normal direction vector, and
wherein the corrected gradation derivation portion finds the correction amount of the brightness information based on the modulated normal direction vector and the light source direction vector, and corrects the brightness information of the image signal based on the correction amount of the brightness information.

10. The image processing device according to claim 9,
wherein the normal direction estimation portion modulates the normal direction vector based on an angle $\alpha$ that is formed between the normal direction vector and the light source direction vector.

11. The image processing device according to claim 10,
wherein the corrected gradation derivation portion increases the correction amount of the brightness information as the angle $\alpha$ becomes larger.

12. The image processing device according to claim 10,
wherein the corrected gradation derivation portion increases the correction amount of the brightness information as the angle $\alpha$ becomes larger, in a case where the angle $\alpha$ is larger than $\alpha 0$ and less than or equal to a first threshold angle $\alpha 1$, the angle $\alpha 0$ being an angle that is formed by the normal direction vector and the light source direction vector of the two-dimensional image, and
wherein the corrected gradation derivation portion decreases the correction amount as the angle $\alpha$ becomes larger in a case where the angle $\alpha$ is larger than the first threshold angle $\alpha 1$.

13. The image processing device according to claim 12,
wherein the corrected gradation derivation portion corrects the brightness information of the image signal with the correction amount by adding shadow to a pixel value of the pixel.

14. The image processing device according to claim 6,
wherein the corrected gradation derivation portion corrects the brightness information of the image signal based on a scalar product of the light source direction vector and the normal direction vector.

15. The image processing device according to claim 6,
wherein the corrected gradation derivation portion corrects the brightness information of the image signal by applying the light source direction vector and the normal direction vector to a mathematical model or lookup table to obtain a shadow-enhanced image signal and then synthesizing the shadow-enhanced image signal with the image signal.

16. The image processing device according to claim 6,
wherein the corrected gradation derivation portion corrects the brightness information of the image signal by applying the light source direction vector and the normal direction vector in a mathematical model or lookup table to obtain a light-enhanced image signal and then synthesizing the light-enhanced image signal with the image signal.

17. The image processing device according to claim 6,
wherein the corrected gradation derivation portion corrects the brightness information of the image signal by applying the light source direction vector and the normal direction vector in a mathematical model or lookup table to obtain a shadow-enhanced image signal and a light-enhanced image signal, and then synthesizing the shadow-enhanced image signal and the light-enhanced image signal with the image signal.

18. The image processing device according to claim 1,
wherein the normal direction estimation portion determines the first direction component value of the normal direction vector based on a differential value for the first direction of a pixel value of the pixel.

19. The image processing device according to claim 1,
wherein the normal direction estimation portion determines the second direction component value of the normal direction vector based on a differential value for the second direction of a pixel value of the pixel.

20. The image processing device according to claim 1,
wherein the normal direction estimation portion determines the first direction component value of the normal direction vector based on a differential value of the first direction of a pixel value of the pixel, and determines the second direction component value of the normal direction vector based on a differential value of the second direction of the pixel value of the pixel, and
wherein the corrected gradation derivation portion finds the correction amount of the brightness information based on a modulated normal direction vector, and corrects the brightness information of the image signal based on the correction amount of the brightness information.

21. The image processing device according to claim 20,
wherein the correction amount of the brightness information changes along with a change in the first direction component value or the second direction component value of the normal direction vector.

22. The image processing device according to claim 1,
wherein the normal direction estimation portion obtains a modulated normal direction vector by modulating the normal direction vector, and
wherein the corrected gradation derivation portion finds the correction amount of the brightness information based on the modulated normal direction vector, and corrects the brightness information of the image signal based on the correction amount of the brightness information.

23. The image processing device according to claim 22,
wherein the normal direction estimation portion obtains the modulated normal direction vector by modulating the normal direction vector based on a differential value for the first direction of a pixel value of the pixel.

24. The image processing device according to claim 22,
wherein the normal direction estimation portion obtains the modulated normal direction vector by modulating the normal direction vector based on a differential value for the second direction of a pixel value of the pixel.

25. The image processing device according to claim 22,
wherein the normal direction estimation portion obtains the modulated normal direction vector by modulating the normal direction vector based on a differential value for the first direction and the second direction of a pixel value of the pixel.

26. The image processing device according to claim 22,
wherein the normal direction estimation portion calculates the brightness contrast amount based on brightness information of a pixel of interest, which is a pixel that is targeted for processing in the image signal, and brightness information of pixels surrounding the pixel of interest, and
wherein the normal direction estimation portion obtains the modulated normal direction vector by changing the third direction component value of the normal direction vector based on the brightness contrast amount.

27. The image processing device according to claim 22,
wherein the normal direction estimation portion calculates a brightness contrast amount based on brightness information of a pixel of interest, which is a pixel that is targeted for processing in the image signal, and brightness information of pixels surrounding the pixel of interest,
wherein the normal direction estimation portion calculates a first visual depth amount that indicates a degree of perception of visual depth based on the brightness contrast amount, and
wherein the normal direction estimation portion obtains the modulated normal direction vector by changing the first direction component value and the second direction component value of the normal direction vector based on the first visual depth amount.

28. The image processing device according to claim 22,
wherein the normal direction estimation portion calculates a color contrast amount based on color information of a pixel of interest, which is a pixel that is targeted for processing in the image signal, and color information of pixels surrounding the pixel of interest,
wherein the normal direction estimation portion calculates a second visual depth amount that indicates a degree of perception of visual depth based on the color contrast amount, and
wherein the normal direction estimation portion obtains the modulated normal direction vector by changing the first direction component value and the second direction component value of the normal direction vector based on the second visual depth amount.

29. The image processing device according to claim 22,
wherein the normal direction estimation portion calculates a brightness contrast amount based on brightness information of a pixel of interest, which is a pixel that is targeted for processing in the image signal, and brightness information of pixels surrounding the pixel of interest,
wherein the normal direction estimation portion calculates a first visual depth amount that indicates a degree of perception of visual depth based on the brightness contrast amount,
wherein the normal direction estimation portion calculates a color contrast amount based on color information of the pixel of interest and color information of the pixels surrounding the pixel of interest,
wherein the normal direction estimation portion calculates a second visual depth amount that indicates a degree of perception of visual depth based on the color contrast amount, and
wherein the normal direction estimation portion obtains the modulated normal direction vector by changing the first direction component value and the second direction component value of the normal direction vector based on the first visual depth amount and the second visual depth amount.

30. The image processing device according to claim 22, further comprising:
an input portion that can input information for determining a characteristic by which to modulate the normal direction vector.

31. The image processing device according to claim 1,
wherein the normal direction estimation portion finds a smoothed normal direction vector that is obtained by smoothing the normal direction vector in a space direction, and
wherein the corrected gradation derivation portion corrects the brightness information of the image signal based on the smoothed normal direction vector.

32. The image processing device according to claim 1,
wherein the normal direction estimation portion finds a smoothed normal direction vector that is obtained by smoothing the normal direction vector in the a direction, and
wherein the corrected gradation derivation portion corrects the brightness information of the image signal based on the smoothed normal direction vector.

33. An image processing method performed used with an image processing device including a brightness information calculation portion, a normal direction estimation portion, a corrected gradation derivation portion, and a processor that controls at least one of the brightness information calculation portion, the normal direction estimation portion, and the corrected gradation derivation portion, the method comprising:
calculating, using the brightness information calculation portion, brightness information of an image signal that is input and that forms a two-dimensional image made from pixels;
estimating, using the normal direction estimation portion, a normal direction for each pixel, or for each region made of a plurality of pixels, from the brightness information, and obtaining a normal direction vector that is a three-dimensional vector for each pixel or for each region based on the estimated normal direction;
finding, using the corrected gradation derivation portion, a correction amount of the brightness information based on the normal direction vector that is obtained in the normal direction estimation step; and
correcting, using the corrected gradation derivation portion, the brightness information of the image signal based on the correction amount of the brightness information,
wherein the step of estimating the normal direction (i) asets a third direction component value for each pixel or each region to a first value that is a predetermined value, the third direction component value being a value of a component of a third direction that is not included on a plane that is formed by the two-dimensional image, and (ii) obtains the normal direction vector from values of three direction components including:
(1) a first direction component value that is a value of a component of a first direction; and
(2) a second direction component value that is a value of a component of a second direction, the first direction component value and the second direction component value serving as two-dimensional coordinate information for determining a pixel position of a pixel on the two-dimensional image, and wherein the step of estimating the normal direction sets, for a plurality of pixels, the third direction component value to the same value as the first value and determines the normal direction value for each pixel or for each region.

34. A non-transitory computer-readable storage medium having stored thereon a program, wherein when executed, the program causes a computer to function as an image processing device comprising:

a brightness information calculation portion that calculates brightness information of an image signal that is input and that forms a two-dimensional image made from pixels;

a normal direction estimation portion that estimates a normal direction for each pixel, or each region made of a plurality of pixels, from the brightness information, and obtains a normal direction vector that is a three-dimensional vector for each pixel or for each region based on the estimated normal direction; and a corrected gradation derivation portion that finds a correction amount of the brightness information based on the normal direction vector that is obtained by the normal direction estimation portion, and corrects the brightness information of the image signal based on the correction amount of the brightness information, wherein the normal direction estimation portion (i) sets a third direction component value for each pixel or each region to a first value that is a predetermined value, the third direction component value being a value of a component of a third direction that is not included on a plane that is formed by the two-dimensional image, and (ii) obtains the normal direction vector from values of three direction components including:

(1) a first direction component value that is a value of a component of a first direction; and (2) a second direction component value that is a value of a component of a second direction, the first direction component value and the second direction component value serving as two-dimensional coordinate information for determining a pixel position of a pixel on the two-dimensional image, and wherein the normal direction estimation portion sets, for a plurality of pixels, the third direction component value to the same value as the first value and determines the normal direction value for each pixel or for each region.

35. An integrated circuit, comprising:

a brightness information calculation portion that calculates brightness information of an image signal that is input and that forms a two-dimensional image made from pixels;

a normal direction estimation portion that estimates a normal direction for each pixel, or each region made of a plurality of pixels, from the brightness information, and obtains a normal direction vector that is a three-dimensional vector for each pixel or for each region based on the estimated normal direction; and a corrected gradation derivation portion that finds a correction amount of the brightness information based on the normal direction vector that is obtained by the normal direction estimation portion, and corrects the brightness information of the image signal based on the correction amount of the brightness information, wherein the normal direction estimation portion (i) sets a third direction component value for each pixel or each region to a first value that is a predetermined value, the third direction component value being a value of a component of a third direction that is not included on a plane that is formed by the two-dimensional image, and (ii) obtains the normal direction vector from values of three direction components including:

(1) a first direction component value that is a value of a component of a first direction; and (2) a second direction component value that is a value of a component of a second direction, the first direction component value and the second direction component value serving as two-dimensional coordinate information for determining a pixel position of a pixel on the two-dimensional image, and wherein the normal direction estimation portion sets, for a plurality of pixels, the third direction component value to the same value as the first value and determines the normal direction value for each pixel or for each region.

* * * * *